US011988755B1

(12) United States Patent
Olsson

(10) Patent No.: US 11,988,755 B1
(45) Date of Patent: May 21, 2024

(54) UTILITY LOCATING DEVICES EMPLOYING MULTIPLE SPACED APART GNSS ANTENNAS

(71) Applicant: SeeScan, Inc., San Diego, CA (US)

(72) Inventor: Mark S. Olsson, La Jolla, CA (US)

(73) Assignee: SeeScan, Inc., San Diego, CA (US)

(*) Notice: Subject to any disclaimer, the term of this patent is extended or adjusted under 35 U.S.C. 154(b) by 72 days.

(21) Appl. No.: 17/235,507

(22) Filed: Apr. 20, 2021

Related U.S. Application Data

(60) Provisional application No. 63/012,480, filed on Apr. 20, 2020.

(51) Int. Cl.
| | |
|---|---|
| G01S 19/36 | (2010.01) |
| G01S 19/07 | (2010.01) |
| G01S 19/32 | (2010.01) |
| G01S 19/47 | (2010.01) |
| G01V 3/08 | (2006.01) |

(52) U.S. Cl.
CPC .............. *G01S 19/36* (2013.01); *G01S 19/32* (2013.01); *G01S 19/47* (2013.01); *G01V 3/081* (2013.01); *G01S 19/071* (2019.08)

(58) Field of Classification Search
CPC .......... G01S 19/41; G01S 19/42; G01S 19/53; G01S 13/88; G01S 19/13; G01S 5/02; G01S 19/51; G01V 3/10; G01V 3/081; G01V 3/15; G01V 3/165; G01V 2210/1429; G01V 3/12; G01R 29/085; G01R 33/1215

See application file for complete search history.

(56) References Cited

U.S. PATENT DOCUMENTS

| | | | | | |
|---|---|---|---|---|---|
| 5,446,465 | A | * | 8/1995 | Diefes ...................... | G01S 3/48 342/357.34 |
| 5,506,588 | A | * | 4/1996 | Diefes ..................... | G01S 19/54 342/357.41 |
| 5,568,152 | A | * | 10/1996 | Janky ...................... | G01S 19/51 342/357.68 |
| 5,576,973 | A | * | 11/1996 | Haddy ..................... | G01V 3/15 342/357.52 |
| 5,844,405 | A | * | 12/1998 | Eslambolchi ........ | G06K 7/0008 324/67 |
| 5,943,008 | A | * | 8/1999 | Van Dusseldorp ..... | G01S 19/54 342/357.65 |
| 7,283,091 | B1 | * | 10/2007 | Loomis ................... | G01S 19/48 342/357.62 |
| 7,348,922 | B2 | * | 3/2008 | Chang .................... | H01Q 1/243 342/357.25 |
| 7,642,957 | B2 | * | 1/2010 | Lennen ................... | G01S 19/22 342/357.41 |
| 7,746,272 | B2 | * | 6/2010 | Vollath .................... | G01S 19/44 342/357.27 |
| 7,834,801 | B2 | * | 11/2010 | Waite ..................... | G01V 11/00 342/22 |

(Continued)

*Primary Examiner* — Olumide Ajibade Akonai
(74) *Attorney, Agent, or Firm* — Steven C. Tietsworth, Esq.; Michael J. Pennington, Esq.

(57) ABSTRACT

The present disclosure relates to buried utility locating devices, system, and methods having a plurality of spatially separated GNSS antennas. Baselines or other spatial relationships may be formed between pairs of position estimates associated with the GNSS antennas to determine information about the position, heading, and tilt/pose of the utility locating device.

14 Claims, 87 Drawing Sheets

(56) References Cited

U.S. PATENT DOCUMENTS

| | | | | |
|---|---|---|---|---|
| 7,898,475 | B2* | 3/2011 | Nayyar | G01S 19/30 |
| | | | | 342/357.77 |
| 7,948,769 | B2* | 5/2011 | Jakab | H01Q 1/243 |
| | | | | 455/272 |
| 8,115,675 | B2* | 2/2012 | Warloe | G01S 19/425 |
| | | | | 342/357.73 |
| 8,532,341 | B2* | 9/2013 | Nielsen | G06V 10/242 |
| | | | | 382/109 |
| 9,835,729 | B2* | 12/2017 | Wallace | G01S 19/41 |
| 11,372,125 | B2* | 6/2022 | Zheng | G01V 3/081 |
| 2002/0044085 | A1* | 4/2002 | Howell | G01S 19/36 |
| | | | | 342/357.63 |
| 2004/0176102 | A1* | 9/2004 | Lawrence | G01S 19/44 |
| | | | | 455/456.1 |
| 2007/0139262 | A1* | 6/2007 | Scherzinger | G01S 19/51 |
| | | | | 701/472 |
| 2010/0141261 | A1* | 6/2010 | Overby | G01V 3/12 |
| | | | | 702/2 |
| 2011/0109437 | A1* | 5/2011 | Olsson | G01N 21/954 |
| | | | | 340/8.1 |
| 2014/0111376 | A1* | 4/2014 | Bench | H01Q 9/44 |
| | | | | 343/893 |
| 2016/0070001 | A1* | 3/2016 | Krantz | G01S 19/36 |
| | | | | 342/357.72 |
| 2017/0017010 | A1* | 1/2017 | Olsson | G01S 19/42 |

* cited by examiner

1250

Begin using multi-GNSS antenna transmitter device that may receive GNSS signals via GNSS antennas/receivers and data associated with RTK or like differential corrections at the wireless communication element while the transmitter device may further couple signal(s) onto one or more utility lines.
1252

Broadcast correction data.
1254

Receive the correction data at a utility locator device and make RTK or other differential corrections as the locate procedure is carried out generating locating data.
1256

Store locating data that includes corrected position data on one or more non-transitory memories.
1258

FIG. 12B

UTILITY LOCATING DEVICES EMPLOYING MULTIPLE SPACED APART GNSS ANTENNAS

CROSS-REFERENCE TO RELATED APPLICATIONS

This application claims priority under 35 U.S.C. § 119(e) to U.S. Provisional Patent Application Ser. No. 63/012,480, entitled UTILITY LOCATING DEVICES EMPLOYING MULTIPLE SPACED APART GNSS ANTENNAS, filed Apr. 20, 2020, the content of which is incorporated by reference herein in its entirety for all purpose.

FIELD

This disclosure relates generally to systems, devices, and methods used for locating utility lines, pipes, and/or other conductors that may be obscured from view. More specifically, but not exclusively, the disclosure relates to utility locating systems, devices, and methods that include multiple spaced apart GNSS antennas.

BACKGROUND

Systems known in the art for locating utility lines (also denoted herein as "utility locating systems" or "locating systems") may include at least one utility locator device that may further be used in combination with a variety of other devices. Utility locator devices (also denoted as "buried object locators," "utility locators," "buried utility locators," or "locators") are devices for sensing magnetic fields emitted from one or more utilities (e.g., underground utilities such as pipes, conduits, or cables) or other conductors which may be buried or hidden from sight to determine positions as well as other information about the conductors and the associated underground environment.

Such emitted magnetic fields may be the result of currents flowing through the utilities. For instance, such magnetic fields may be due to currents inherently flowing in the utility (e.g., electrical or telecommunication lines) or through currents coupled, either directly, inductively, or capacitively, from a signal transmitter device (also denoted herein as "transmitter" or "transmitter device") specifically designed for such tasks.

Utility locator devices may further be used in conjunction with GNSS backpack devices to enhance positioning capabilities. Such GNSS backpack devices known in the art may advantageously receive GNSS signals at an antenna near or above the head height of a user allowing for a less obstructed pathway for GNSS signals so as to avoid full or partial occlusion of one or more satellites, multipath errors, or like problems. The resulting positioning data may further be communicated to an associated utility locator device.

Further utility locating systems known in the art may include vehicle-mounted locating devices. Such vehicle-mounted locating devices may allow for the coupling of one or more utility locator devices to a vehicle so as to determine the locations of utility lines as the vehicle traverses an area.

The above described utility locating devices as used in utility locating systems are known in the art to use GPS and/or other GNSS antennas and receivers to map utility line positions and related data in a world coordinate system. Such devices, systems, and methods known in the art include, at most, the use of a singular GNSS antenna or antenna structure to provide positioning data. Such known GNSS antenna/receiver configurations may be limiting in functionality for the various utility locating devices.

Accordingly, there is a need in the art to address the above-described as well as other problems.

SUMMARY

This disclosure relates generally to utility locating systems, devices, and methods used for locating utility lines, pipes, and/or other conductors that are obscured from view. More specifically, but not exclusively, the disclosure relates to utility locating systems, devices, and methods that include multiple spaced apart GNSS antennas.

According to one embodiment, a human-portable utility locator device is provided which may include at least one antenna node to sense magnetic fields emitted from one or more buried utilities and provide locating antenna output signals corresponding to the sensed magnetic fields. The utility locator device may further include a multi-antenna GNSS element comprising two or more GNSS antennas spaced apart a predetermined known spacing that is at least 100 millimeters, each receiving GNSS signals from navigation satellites. Likewise real time kinematic (RTK), space state representation (SSR), or other differential correction data may be received via a wireless communication element from one or more base stations. In the multi-antenna GNSS element, the GNSS antennas may further supply signals to at least one GNSS receiver to generate position output signals corresponding to the estimated position of the associated one of the GNSS antennas. The utility locator device may further include a processing element comprising one or more processors coupled to the antenna node(s) and the multi-antenna GNSS element. The processing element may receive locating antenna output signals from the antenna node(s) and position output signals from the multi-antenna GNSS element to generate data relating to identifying the presence or absence of buried utility lines and corresponding positions thereof in the world frame. The processing element may further be used for processing and compressing the data and/or for making differential corrections to the position output data. A wireless communication element comprising one or more radio transceivers may further be coupled to the processing element for communicating position output signals, communicating data with other system devices, and/or receiving differential correction signals. The utility locator device may further include a memory element having one or more non-transitory memories for storing data associated with utility line positioning data and a battery element to supply the device with electrical power.

According to another embodiment, a multi-GNSS antenna transmitter device for use in utility locating systems may include a transmitter element for generating an output current for provision to one or more utilities so as to generate a magnetic field in the one or more utilities for detection by a utility locator device. The multi-GNSS antenna transmitter device may further include a multi-antenna GNSS element comprising two or more GNSS antennas spaced apart a predetermined known spacing that is at least 100 millimeters each receiving GNSS signals. In the multi-antenna GNSS element, the GNSS antennas may further supply signals to at least one GNSS receiver to generate position output signals corresponding to the estimated position of the associated one of the GNSS antennas. The multi-GNSS antenna transmitter device may include a processing element comprising one or more processors which may be coupled to the transmitter element for controlling current to the utility line(s) and further coupled to the GNSS element to receive the position output signals from the GNSS receiver elements and generate position data associated with the multi-GNSS antenna transmitter device. The processing element may further be used for processing and compressing the data and/or for making differential corrections to the position output data. A wireless communication element comprising one or more radio transceivers may further be coupled to the processing element for communicating position output signals, communicating data with other system devices, and/or receiving or broadcasting differential correction signals. The multi-GNSS antenna transmitter device may further include a memory element having one or more non-transitory memories for storing data associated with the GNSS element and transmitter element and a battery element to supply the device with electrical power.

According to another embodiment, a multi-antenna GNSS backpack device embodiment may include a backpack element wearable by a user to support a multi-antenna GNSS element. The multi-antenna GNSS element may include two or more GNSS antennas spaced apart a predetermined known spacing that is at least 100 millimeters each receiving GNSS signals and at least one GNSS receiver to generate position output signals corresponding to the estimated position of the associated ones of the GNSS antennas. A processing element may further be used for processing and compressing the data and/or for making differential corrections to the position output data. A wireless communication element comprising one or more radio transceivers may further be coupled to the processing element for communicating position output signals, communicating data with other system devices, and/or receiving differential correction signals. The multi-antenna GNSS backpack device may further include a memory element comprising one or more non-transitory memories may to store data associated with position data. Position output signals may further be communicated to a utility locator device via a communication element. A battery element may be included in the multi-antenna GNSS backpack device embodiment to supply electrical power to the various powered elements thereof.

According to yet another embodiment, a multi-GNSS antenna vehicle-mounted locating device embodiment may include a vehicle-mounting element that may couple to a vehicle and further provide mounting for one or more utility locator devices. The vehicle-mounting element may further include a multi-antenna GNSS element. The multi-antenna GNSS element may include two or more GNSS antennas spaced apart a predetermined known spacing that is at least 100 millimeters each receiving GNSS signals and at least one GNSS receiver to generate position output signals corresponding to the estimated position of the associated ones of the GNSS antennas. A processing element may further be included for processing and compressing the data and/or for making differential corrections to the position output data. A communication element comprising one or more radio transceivers may further be coupled to the processing element for communicating position output signals, communicating data with other system devices, and/or receiving differential correction signals. The communication element may be included to further communicate position output signals to one or more utility locator devices or other devices. The multi-GNSS antenna vehicle-mounted locating device may further include a power source to supply electrical power to its various powered elements.

According to another embodiment, a method for determining heading in a utility locating device including a multi-GNSS antenna element is presented. The method may include determining at least one position at each GNSS antenna, determining a baseline between two GNSS antennas, and determining heading angle for baseline relative to true north. Such methods may optionally include comparing position estimates to known GNSS antenna spacing so as to determine a quality metric of position estimate data. Optionally, the method may include a step using the measured heading angle to update IMU/INS element. In another optional step, the method may further include using IMU/INS element data to improve GNSS fix rate and position accuracy. The method may further iterate between the optional step using the measured heading angle to update IMU/INS element and the other optional step using IMU/INS element data to improve GNSS fix rate and position accuracy.

According to another embodiment, a method for determining tilt/pose in a utility locating device including a multi-GNSS antenna element is presented. The method may include determining at least one position at each GNSS antenna, determining a baseline between two or more GNSS antennas, and using the degree and direction of the baseline to determine yaw or heading and roll type tilt/pose. Such methods may optionally include comparing position estimates to known GNSS antenna spacing so as to determine a quality metric of position estimate data. In some embodiments, the method may optionally include using other pose/tilt sensors to determine the pitch type tilt/pose. In another optional step, the method may further include using IMU/INS element data to improve GNSS fix rate and position accuracy. The method may further iterate between the optional step using the measured heading angle to update IMU/INS element and the other optional step using IMU/INS element data to improve GNSS fix rate and position accuracy. Optionally, the method may include using IMU/INS element data to improve GNSS fix rate and position accuracy. In another optional step, the method may include using pose/tilt measurement to update IMU/INS element velocity, displacement, and orientation. The method may further iterate between the optional step using IMU/INS element data to improve GNSS fix rate and position accuracy and the other optional step using pose/tilt measurement to update IMU/INS element velocity, displacement, and orientation.

According to yet another embodiment, a method for determining tilt/pose in a utility locating device including a multi-GNSS antenna element is presented. The method may include determining at least one position at each of three or more GNSS antenna. The method may further include determining spatial relationships between GNSS antennas. Such methods may optionally include comparing spatial relationships of position estimates to known GNSS antenna spatial relationships to determine a quality metric of position estimate data. The method may further include determining tilt/pose based on the degree and direction of a calculated transformation of between the relative geometry in the rigid body frame of the multi-GNSS antenna element and the RTK, SSR, or like position estimates in the world frame. Optionally, the method may include using IMU/INS element data to improve GNSS fix rate and position accuracy. In another optional step, the method may include using pose/tilt measurement to update IMU/INS element velocity, displacement, and orientation. The method may further iterate between the optional step using IMU/INS element data to improve GNSS fix rate and position accuracy and the other optional step using pose/tilt measurement to update IMU/INS element velocity, displacement, and orientation.

According to another embodiment, a post-processing method for using a multi-GNSS antenna transmitter device as a base station is presented. The method may include operating a transmitter device receiving GNSS signals and data signals relating to RTK, SSR, or like differential corrections while coupling signal on one or more utility lines. Correction data may be stored on a memory element in the transmitter device. The method may further include operating a utility locator device to produce locating data that includes data relating to the presence or absence of utility lines and correlating GNSS position data. Locating data may be stored on a memory element in the utility locator device. In another step, the method may include receiving correction data and applying corrections to locate data in a utility locator device while performing a locating procedure. The method may further include storing locating data that includes corrected position data.

According to another embodiment, a real-time or near real-time or post-processing method for using a multi-GNSS antenna transmitter device as a base station is presented. The method may include operating a transmitter device receiving GNSS signals and data signals relating to RTK, SSR, or like differential corrections while coupling signal on one or more utility lines. The method may further include broadcasting correction data from the transmitter device. The broadcasted correction data may be received at one or more utility locator devices such that RTK. SSR, or other differential corrections to position data may be made as the utility locator device carries out the locating procedure thus generating locating data. The locating data, including corrected position data, may be stored in one or more non-transitory memories.

According to another embodiment, a multi-GNSS antenna vehicle tracking device is presented. The multi-GNSS antenna vehicle tracking device may include a mounting element for mounting to a vehicle. The multi-GNSS antenna vehicle tracking device may further include a multi-antenna GNSS element comprising two or more GNSS antennas spaced apart by a predetermined known spacing that is at least 100 millimeters. Each GNSS antenna may receive GNSS signals and further supply signals to at least one GNSS receiver to generate position output signals corresponding to the estimated position of the associated one of the GNSS antennas. The multi-GNSS antenna vehicle tracking device may include a processing element comprising one or more processors coupled to the GNSS element to receive position output signals for purposes of processing and compressing the data and/or for making differential corrections to the position output data. In some embodiments, a wireless communication element comprising one or more radio transceivers coupled to the processing element for communicating position output signals, communicating data with other system devices, and/or receiving differential correction signals. A memory element having one or more non-transitory memories may be included for storing data associated with utilities and positioning data and a power element for supplying of electrical power.

Various additional aspects, features, and functionality are further described below in conjunction with the appended Drawings.

BRIEF DESCRIPTION OF THE DRAWINGS

The present application may be more fully appreciated in connection with the following detailed description taken in conjunction with the accompanying Drawings, wherein:

FIG. 12B is a diagram describing a real-time or near real-time method for a multi-GNSS antenna transmitter device base station.

DETAILED DESCRIPTION OF EMBODIMENTS

Terminology

Figure 1A:
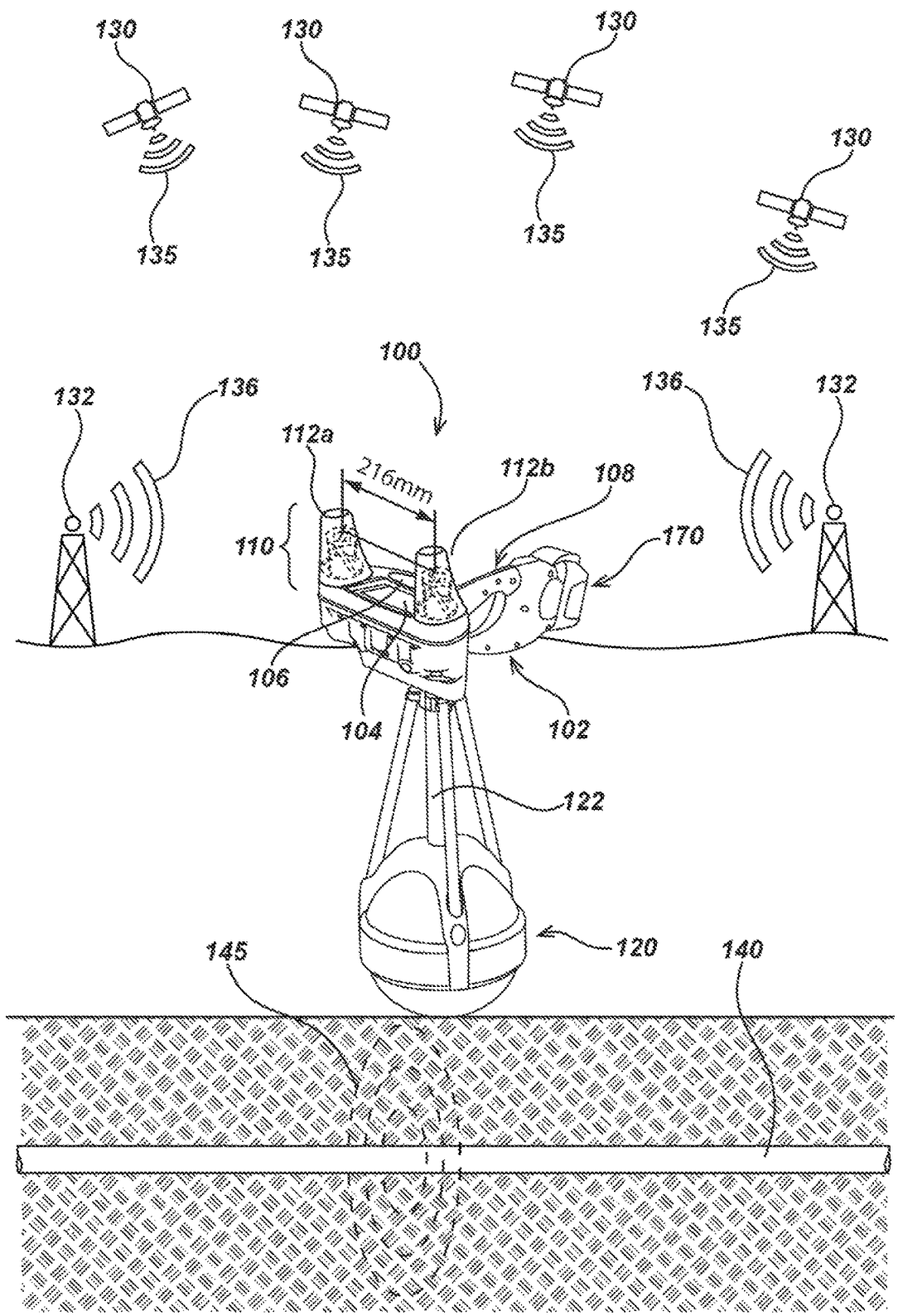
FIG. 1A is an illustration of a multi-antenna utility locator device.

As used herein, the terms "multi-GNSS antenna utility locator device," "utility locator devices," "utility locators," and "locators" may refer to devices for sensing and measuring "signals" or radiation of electromagnetic energy generally emitted by utility lines which may be buried in the ground. The utility locator devices herein may further process the received signals to determine positions as well as other information about hidden or buried conductors (e.g., underground utilities such as pipes, conduits, or cables) and the associated underground environment.

The terms "locate operation" and "locate procedure" as used herein may refer to one or more processes or methods, which may involve the use of one or more utility locator devices to measure one or more electromagnetic signals to determine various information regarding the locate area. Such information, which may be referred to herein as "locate data" or "locating data," may include, but is not limited to, using electromagnetic signal measurements to determine the presence or absence, position, depth, and/or orientation of underground utility lines and/or other conductors. Such locate information may further include changes in soil properties, other changes in properties of pipes or other conductors in time and/or space, quality metrics of measured data, azimuthal angles, measures of frequency, signal strength, and phase, and/or other aspects of the utility line and/or the locate environment.

The term "position" as used herein, may refer to a location within three dimensional space as well as an "orientation" or "pose" that may describe the degree and direction of tilt at a location. Such orientation, pose, or tilt may include a measure of yaw, roll, or pitch relative to the world frame. Likewise, the devices herein may determine "heading" or yaw type tilt/pose relative to true north.

The various devices herein may include a "multi-GNSS antenna element" which may refer to the geometry of two or more GNSS antennas spaced apart a predetermined known spacing that is at least 100 millimeters each coupled to one or more GNSS receivers. As used herein, "GNSS" may refer to any global satellite navigation systems including, but not limited to, GPS, GLONASS, Galileo, Beidou, Quasi-Zenith Satellite System (QZSS) or the like. Such GNSS antennas and receivers may, for instance, be dual or triple band elements. For example, the GNSS antennas and receivers may be configured for the L1, L2, and L5 GPS bands. In other embodiments, the GNSS antennas and associated GNSS receivers may be configured for other signal bands.

Overview

This disclosure relates generally to systems, devices, and methods used for locating utility lines, pipes, and/or other conductors that are obscured from view. More specifically, but not exclusively, the disclosure relates to utility locating systems, devices, and methods that include multiple spaced apart GNSS antennas.

Details of example devices, systems, and methods that may be combined with the geographic map updating system and method embodiments herein, as well as additional components, methods, and configurations that may be used in conjunction with the embodiments described herein, are disclosed in co-assigned patents and patent applications including: U.S. Pat. No. 7,009,399, issued Mar. 7, 2006, entitled OMNIDIRECTIONAL SONDE AND LINE LOCATOR; U.S. Pat. No. 7,136,765, issued Nov. 14, 2006, entitled A BURIED OBJECT LOCATING AND TRACING METHOD AND SYSTEM EMPLOYING PRINCIPAL COMPONENTS ANALYSIS FOR BLIND SIGNAL DETECTION; U.S. Pat. No. 7,221,136, issued May 22, 2007, entitled SONDES FOR LOCATING UNDERGROUND PIPES AND CONDUITS; U.S. Pat. No. 7,276,910, issued Oct. 2, 2007, entitled A COMPACT SELF-TUNED ELECTRICAL RESONATOR FOR BURIED OBJECT LOCATOR APPLICATIONS; U.S. Pat. No. 7,288,929, issued Oct. 30, 2007, entitled INDUCTIVE CLAMP FOR APPLYING SIGNAL TO BURIED UTILITIES; U.S. Pat. No. 7,298,126, issued Nov. 20, 2007, entitled SONDES FOR LOCATING UNDERGROUND PIPES AND CONDUITS; U.S. Pat. No. 7,332,901, issued Feb. 19, 2008, entitled LOCATOR WITH APPARENT DEPTH INDICATION; U.S. Pat. No. 7,443,154, issued Oct. 28, 2008, entitled MULTI-SENSOR MAPPING OMNIDIRECTIONAL SONDE AND LINE LOCATOR; U.S. Pat. No. 7,498,797, issued Mar. 3, 2009, entitled LOCATOR WITH CURRENT-MEASURING CAPABILITY; U.S. Pat. No. 7,498,816, issued Mar. 3, 2009, entitled OMNIDIRECTIONAL SONDE AND LINE LOCATOR; U.S. Pat. No. 7,336,078, issued Feb. 26, 2008, entitled MULTI-SENSOR MAPPING OMNIDIRECTIONAL SONDE AND LINE LOCATORS; U.S. Pat. No. 7,518,374, issued Apr. 14, 2009, entitled RECONFIGURABLE PORTABLE LOCATOR EMPLOYING MULTIPLE SENSOR ARRAYS HAVING FLEXIBLE NESTED ORTHOGONAL ANTENNAS; U.S. Pat. No. 7,557,559, issued Jul. 7, 2009, entitled COMPACT LINE ILLUMINATOR FOR BURIED PIPES AND CABLES; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,619,516, issued Nov. 17, 2009, entitled SINGLE AND MULTI-TRACE OMNIDIRECTIONAL SONDE AND LINE LOCATORS AND TRANSMITTER USED THEREWITH; U.S. Pat. No. 7,733,077, issued Jun. 8, 2010, entitled MULTI-SENSOR MAPPING OMNIDIRECTIONAL SONDE AND LINE LOCATORS AND TRANSMITTER USED THEREWITH; U.S. Pat. No. 7,741,848, issued Jun. 22, 2010, entitled ADAPTIVE MULTICHANNEL LOCATOR SYSTEM FOR MULTIPLE PROXIMITY DETECTION; U.S. Pat. No. 7,755,360, issued Jul. 13, 2010, entitled PORTABLE LOCATOR SYSTEM WITH JAMMING REDUCTION; U.S. Pat. No. 7,825,647, issued Nov. 2, 2010, entitled METHOD FOR LOCATING BURIED PIPES AND CABLES; U.S. Pat. No. 7,830,149, issued Nov. 9, 2010, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 7,864,980, issued Jan. 4, 2011, entitled SONDES FOR LOCATING UNDERGROUND PIPES AND CONDUITS; U.S. Pat. No. 7,948,236, issued May 24, 2011, entitled ADAPTIVE MULTI-CHANNEL LOCATOR SYSTEM FOR MULTIPLE PROXIMITY DETECTION; U.S. Pat. No. 7,969,151, issued Jun. 28, 2011, entitled PRE-AMPLIFIER AND MIXER CIRCUITRY FOR A LOCATOR ANTENNA; U.S. Pat. No. 7,990,151, issued Aug. 2, 2011, entitled TRI-POD BURIED LOCATOR SYSTEM; U.S. Pat. No. 8,013,610, issued Sep. 6, 2011, entitled HIGH Q SELF-TUNING LOCATING TRANSMITTER; U.S. Pat. No. 8,035,390, issued Oct. 11, 2011, entitled OMNIDIRECTIONAL SONDE AND LINE LOCATOR; U.S. Pat. No. 8,106,660, issued Jan. 31, 2012, entitled SONDE ARRAY FOR USE WITH BURIED LINE LOCATOR; U.S. Pat. No. 8,203,343, issued Jun. 19, 2012, entitled RECONFIGURABLE PORTABLE LOCATOR EMPLOYING MULTIPLE SENSOR ARRAYS HAVING FLEXIBLE NESTED ORTHOGONAL ANTENNAS, U.S. Pat. No. 8,264,226, issued Sep. 11, 2012, entitled SYSTEM AND METHOD FOR LOCATING BURIED PIPES AND CABLES WITH A MAN PORTABLE LOCATOR AND A TRANSMITTER IN A MESH NETWORK; U.S. Pat. No. 8,248,056, issued Aug. 21, 2012, entitled A BURIED OBJECT LOCATOR SYSTEM EMPLOYING AUTOMATED VIRTUAL DEPTH EVENT DETECTION AND SIGNALING; U.S. patent application Ser. No. 13/769,202, filed Feb. 15, 2013, entitled SMART PAINT STICK DEVICES AND METHODS; U.S. patent application Ser. No. 13/793,168, filed Mar. 11, 2013, entitled BURIED OBJECT LOCATORS WITH CONDUCTIVE ANTENNA BOBBINS; U.S. Pat. No. 8,400,154, issued Mar. 19, 2013, entitled LOCATOR ANTENNA WITH CONDUCTIVE BOBBIN; U.S. patent application Ser. No. 14/027,027, filed Sep. 13, 2013, entitled SONDE DEVICES INCLUDING A SECTIONAL FERRITE CORE STRUCTURE; U.S. patent application Ser. No. 14/033,349, filed Sep. 20, 2013, entitled AN UNDERGROUND UTILITY LOCATOR WITH A TRANSMITTER, A PAIR OF UPWARDLY OPENING POCKET AND HELICAL COIL TYPE ELECTRICAL CORDS; U.S. Pat. No. 8,547,428, issued Oct. 1, 2013, entitled PIPE MAPPING SYSTEM; U.S. Pat. No. 8,564,295, issued Oct. 22, 2013, entitled METHOD FOR SIMULTANEOUSLY DETERMINING A PLURALITY OF DIFFERENT LOCATIONS OF THE BURIED OBJECTS AND SIMULTANEOUSLY INDICATING THE DIFFERENT LOCATIONS TO A USER; U.S. patent application Ser. No. 14/148,649, filed Jan. 6, 2014, entitled MAPPING LOCATING SYSTEMS & METHODS; U.S. Pat. No. 8,635,043, issued Jan. 21, 2014, entitled LOCATOR AND TRANSMITTER CALIBRATION SYSTEM; U.S. Pat. No. 8,717,028, issued May 6, 2014, entitled SPRING CLIPS FOR USE WITH LOCATING TRANSMITTERS; U.S. Pat. No. 8,773,133, issued Jul. 8, 2014, entitled ADAPTIVE MULTICHANNEL LOCATOR SYSTEM FOR MULTIPLE PROXIMITY DETECTION; U.S. Pat. No. 8,841,912, issued Sep. 23, 2014, entitled PRE-AMPLIFIER AND MIXER CIRCUITRY FOR A LOCATOR ANTENNA; U.S. Pat. No. 9,041,794, issued May 26, 2015, entitled PIPE MAPPING SYSTEMS AND METHODS; U.S. Pat. No. 9,057,754, issued Jun. 16, 2015, entitled ECONOMICAL MAGNETIC LOCATOR APPARATUS AND METHOD; U.S. Pat. No. 9,081,109, issued Jul. 14, 2015, entitled GROUND-TRACKING DEVICES FOR USE WITH A MAPPING LOCATOR, U.S. Pat. No. 9,082,269, issued Jul. 14, 2015, entitled HAPTIC DIRECTIONAL FEEDBACK HANDLES FOR LOCATION DEVICES, U.S. Pat. No. 9,085,007, issued Jul. 21, 2015, entitled MARKING PAINT APPLICATOR FOR PORTABLE LOCATOR; U.S. Pat. No. 9,207,350, issued Dec. 8, 2015, entitled BURIED OBJECT LOCATOR APPARATUS WITH SAFETY LIGHTING ARRAY; U.S. Pat. No. 9,341,740, issued May 17, 2016, entitled OPTICAL GROUND TRACKING APPARATUS, SYSTEMS, AND METHODS; U.S. Pat. No. 9,372,117, issued Jun. 21, 2016, entitled OPTICAL GROUND TRACKING APPARATUS, SYSTEMS, AND METHODS; U.S. patent application Ser. No. 15/187,785, filed Jun. 21, 2016, entitled BURIED UTILITY LOCATOR GROUND TRACKING APPARATUS, SYSTEMS, AND METHODS; U.S. Pat. No. 9,411,066, issued Aug. 9, 2016, entitled SONDES & METHODS FOR USE WITH BURIED LINE LOCATOR SYSTEMS; U.S. Pat. No. 9,411,067, issued Aug. 9, 2016, entitled GROUND-TRACKING SYSTEMS AND APPARATUS; U.S. Pat. No. 9,435,907, issued Sep. 6, 2016, entitled PHASE SYNCHRONIZED BURIED OBJECT LOCATOR APPARATUS, SYSTEMS, AND METHODS; U.S. Pat. No. 9,465,129, issued Oct. 11, 2016, entitled IMAGE-BASED MAPPING LOCATING SYSTEM; U.S. Pat. No. 9,488,747, issued Nov. 8, 2016, entitled GRADIENT ANTENNA COILS AND ARRAYS FOR USE IN LOCATING SYSTEM; U.S. Pat. No. 9,494,706, issued Nov. 15, 2016, entitled OMNI-INDUCER TRANSMITTING DEVICES AND METHODS; U.S. Pat. No. 9,523,788, issued Dec. 20, 2016, entitled MAGNETIC SENSING BURIED OBJECT LOCATOR INCLUDING A CAMERA; U.S. Pat. No. 9,571,326, issued Feb. 14, 2017, entitled METHOD AND APPARATUS FOR HIGH-SPEED DATA TRANSFER EMPLOYING SELF-SYNCHRONIZING QUADRATURE AMPLITUDE MODULATION (QAM); U.S. Pat. No. 9,599,449, issued Mar. 21, 2017, entitled SYSTEMS AND METHODS FOR LOCATING BURIED OR HIDDEN OBJECTS USING SHEET CURRENT FLOW MODELS, U.S. Pat. No. 9,599,740, issued Mar. 21, 2017, entitled USER INTERFACES FOR UTILITY LOCATORS; U.S. Pat. No. 9,625,602, issued Apr. 18, 2017, entitled SMART PERSONAL COMMUNICATION DEVICES AS USER INTERFACES; U.S. Pat. No. 9,632,202, issued Apr. 25, 2017, entitled ECONOMICAL MAGNETIC LOCATOR APPARATUS AND METHODS; U.S. Pat. No. 9,634,878, issued Apr. 25, 2017, entitled SYSTEMS AND METHODS FOR DATA TRANSFER USING SELF-SYNCHRONIZING QUADRATURE AMPLITUDE MODULATION (QAM); U.S. patent application, filed Apr. 25, 2017, entitled SYSTEMS AND METHODS FOR LOCATING AND/OR MAPPING BURIED UTILITIES USING VEHICLE-MOUNTED LOCATING DEVICES; U.S. Pat. No. 9,638,824, issued May 2, 2017, entitled QUAD-GRADIENT COILS FOR USE IN LOCATING SYSTEMS; U.S. patent application, filed May 9, 2017, entitled BORING INSPECTION SYSTEMS AND METHODS; U.S. Pat. No. 9,651,711, issued May 16, 2017, entitled HORIZONTAL BORING INSPECTION DEVICE AND METHODS; U.S. Pat. No. 9,684,090, issued Jun. 20, 2017, entitled NULLED-SIGNAL LOCATING DEVICES, SYSTEMS, AND METHODS; U.S. Pat. No. 9,696,447, issued Jul. 4, 2017, entitled BURIED OBJECT LOCATING METHODS AND APPARATUS USING MULTIPLE ELECTROMAGNETIC SIGNALS; U.S. Pat. No. 9,696,448, issued Jul. 4, 2017, entitled GROUND-TRACKING DEVICES AND METHODS FOR USE WITH A UTILITY LOCATOR; U.S. Pat. No. 9,703,002, issued Jun. 11, 2017, entitled UTILITY LOCATOR SYSTEMS & METHODS; U.S. patent application Ser. No. 15/670,845, filed Aug. 7, 2016, entitled HIGH FREQUENCY AC-POWERED DRAIN CLEANING AND INSPECTION APPARATUS & METHODS; U.S. patent application Ser. No. 15/681,250, filed Aug. 18, 2017, entitled ELECTRONIC MARKER DEVICES AND SYSTEMS; U.S. patent application Ser. No. 15/681,409, filed Aug. 20, 2017, entitled WIRELESS BURIED PIPE & CABLE LOCATING SYSTEMS; U.S. Pat. No. 9,746,572, issued Aug. 29, 2017, entitled ELECTRONIC MARKER DEVICES AND SYSTEMS; U.S. Pat. No. 9,746,573, issued Aug. 29, 2017, entitled WIRELESS BURIED PIPE AND CABLE LOCATING SYSTEMS; U.S. Pat. No. 9,784,837, issued Oct. 10, 2017, entitled OPTICAL GROUND TRACKING APPARATUS, SYSTEMS & METHODS; U.S. patent application Ser. No. 15/811,361, filed Nov. 13, 2017, entitled OPTICAL GROUND-TRACKING APPARATUS, SYSTEMS, AND METHODS; U.S. Pat. No. 9,841,503, issued Dec. 12, 2017, entitled OPTICAL GROUND-TRACKING APPARATUS, SYSTEMS, AND METHODS; U.S. patent application Ser. No. 15/846,102, filed Dec. 18, 2017, entitled SYSTEMS AND METHOD FOR ELECTRONICALLY MARKING, LOCATING AND VIRTUALLY DISPLAYING BURIED UTILITIES; U.S. patent application Ser. No. 15/866,360, filed Jan. 9, 2018, entitled TRACKED DISTANCE MEASURING DEVICES, SYSTEMS, AND METHODS; U.S. Pat. No. 9,891,337, issued Feb. 13, 2018, entitled UTILITY LOCATOR TRANSMITTER DEVICES, SYSTEMS, and METHODS WITH DOCKABLE APPARATUS; U.S. Pat. No. 9,914,157, issued Mar. 13, 2018, entitled METHODS AND APPA- RATUS FOR CLEARING OBSTRUCTIONS WITH A JETTER PUSH-CABLE APPARATUS; U.S. patent application Ser. No. 15/925,643, issued Mar. 19, 2018, entitled PHASE-SYNCHRONIZED BURIED OBJECT TRANSMITTER AND LOCATOR METHODS AND APPARATUS; U.S. patent application Ser. No. 15/925,671, issued Mar. 19, 2018, entitled MULTI-FREQUENCY LOCATING SYSTEMS AND METHODS; U.S. patent application Ser. No. 15/936,250, filed Mar. 26, 2018, entitled GROUND TRACKING APPARATUS, SYSTEMS, AND METHODS; U.S. Pat. No. 9,927,545, issued Mar. 27, 2018, entitled MULTI-FREQUENCY LOCATING SYSTEMS & METHODS; U.S. Pat. No. 9,928,613, issued Mar. 27, 2018, entitled GROUND TRACKING APPARATUS, SYSTEMS, AND METHODS; U.S. patent application Ser. No. 15/250,666, filed Mar. 27, 2018, entitled PHASE-SYNCHRONIZED BURIED OBJECT TRANSMITTER AND LOCATOR METHODS AND APPARATUS; U.S. Pat. No. 9,880,309, issued Mar. 28, 2018, entitled UTILITY LOCATOR TRANSMITTER APPARATUS & METHODS, U.S. patent application Ser. No. 15/954,486, filed Apr. 16, 2018, entitled UTILITY LOCATOR APPARATUS, SYSTEMS, AND METHODS; U.S. Pat. No. 9,945,976, issued Apr. 17, 2018, entitled UTILITY LOCATOR APPARATUS, SYSTEMS, AND METHODS; U.S. Pat. No. 9,989,662, issued Jun. 5, 2018, entitled BURIED OBJECT LOCATING DEVICE WITH A PLURALITY OF SPHERICAL SENSOR BALLS THAT INCLUDE A PLURALITY OF ORTHOGONAL ANTENNAE; U.S. patent application Ser. No. 16/036,713, issued Jul. 16, 2018, entitled UTILITY LOCATOR APPARATUS AND SYSTEMS; U.S. Pat. No. 10,024,994, issued Jul. 17, 2018, entitled WEARABLE MAGNETIC FIELD UTILITY LOCATOR SYSTEM WITH SOUND FIELD GENERATION; U.S. Pat. No. 10,031,253, issued Jul. 24, 2018, entitled GRADIENT ANTENNA COILS AND ARRAYS FOR USE IN LOCATING SYSTEMS; U.S. Pat. No. 10,042,072, issued Aug. 7, 2018, entitled OMNI-INDUCER TRANSMITTING DEVICES AND METHODS; U.S. Pat. No. 10,059,504, issued Aug. 28, 2018, entitled MARKING PAINT APPLICATOR FOR USE WITH PORTABLE UTILITY LOCATOR; U.S. patent application Ser. No. 16/049,699, filed Jul. 30, 2018, entitled OMNI-INDUCER TRANSMITTING DEVICES AND METHODS; U.S. Pat. No. 10,069,667, issued Sep. 4, 2018, entitled SYSTEMS AND METHODS FOR DATA TRANSFER USING SELF-SYNCHRONIZING QUADRATURE AMPLITUDE MODULATION (QAM); U.S. patent application Ser. No. 16/121,379, filed Sep. 4, 2018, entitled KEYED CURRENT SIGNAL UTILITY LOCATING SYSTEMS AND METHODS; U.S. patent application Ser. No. 16/125,768, filed Sep. 10, 2018, entitled BURIED OBJECT LOCATOR APPARATUS AND METHODS; U.S. Pat. No. 10,073,186, issued Sep. 11, 2018, entitled KEYED CURRENT SIGNAL UTILITY LOCATING SYSTEMS AND METHODS; U.S. patent application Ser. No. 16/133,642, issued Sep. 17, 2018, entitled MAGNETIC UTILITY LOCATOR DEVICES AND METHODS; U.S. Pat. No. 10,078,149, issued Sep. 18, 2018, entitled BURIED OBJECT LOCATORS WITH DODECAHEDRAL ANTENNA NODES; U.S. Pat. No. 10,082,591, issued Sep. 25, 2018, entitled MAGNETIC UTILITY LOCATOR DEVICES & METHODS; U.S. Pat. No. 10,082,599, issued Sep. 25, 2018, entitled MAGNETIC SENSING BURIED OBJECT LOCATOR INCLUDING A CAMERA, U.S. Pat. No. 10,090,498, issued Oct. 2, 2018, entitled MODULAR BATTERY PACK APPARATUS, SYSTEMS, AND METHODS INCLUDING VIRAL DATA AND/OR CODE TRANSFER; U.S. patent application Ser. No. 16/160,874, filed Oct. 15, 2018, entitled TRACKABLE DIPOLE DEVICES, METHODS, AND SYSTEMS FOR USE WITH MARKING PAINT STICKS; U.S. patent application Ser. No. 16/222,994, filed Dec. 17, 2018, entitled UTILITY LOCATORS WITH RETRACTABLE SUPPORT T STRUCTURES AND APPLICATIONS THEREOF; U.S. Pat. No. 10,105,723, issued Oct. 23, 2018, entitled TRACKABLE DIPOLE DEVICES, METHODS, AND SYSTEMS FOR USE WITH MARKING PAINT STICKS; U.S. Pat. No. 10,162,074, issued Dec. 25, 2018, entitled UTILITY LOCATORS WITH RETRACTABLE SUPPORT STRUCTURES AND APPLICATIONS THEREOF; U.S. patent application Ser. No. 16/241,864, filed Jan. 7, 2019, entitled TRACKED DISTANCE MEASURING DEVICES, SYSTEMS, AND METHODS; U.S. patent application Ser. No. 16/255,524, filed Jan. 23, 2019, entitled RECHARGEABLE BATTERY PACK ONBOARD CHARGE STATE INDICATION METHODS AND APPARATUS; U.S. Pat. No. 10,247,845, issued Apr. 2, 2019, entitled UTILITY LOCATOR TRANSMITTER APPARATUS AND METHODS; U.S. patent application Ser. No. 16/382,136, filed Apr. 11, 2019, entitled GEOGRAPHIC MAP UPDATING METHODS AND SYSTEMS; U.S. Pat. No. 10,274,632, issued Apr. 20, 2019, entitled UTILITY LOCATING SYSTEMS WITH MOBILE BASE STATION; U.S. patent application Ser. No. 16/390,967, filed Apr. 22, 2019, entitled UTILITY LOCATING SYSTEMS WITH MOBILE BASE STATION; U.S. patent application Ser. No. 29/692,937, filed May 29, 2019, entitled BURIED OBJECT LOCATOR; U.S. patent application Ser. No. 16/436,903, filed Jun. 10, 2019, entitled OPTICAL GROUND TRACKING APPARATUS, SYSTEMS, AND METHODS FOR USE WITH BURIED UTILITY LOCATORS; U.S. Pat. No. 10,317,559, issued Jun. 11, 2019, entitled GROUND-TRACKING DEVICES AND METHODS FOR USE WITH A UTILITY LOCATOR; U.S. patent application Ser. No. 16/449,187, filed Jun. 21, 2019, entitled ELECTROMAGNETIC MARKER DEVICES FOR BURIED OR HIDDEN USE, U.S. patent application Ser. No. 16/455,491, filed Jun. 27, 2019, entitled SELF-STANDING MULTI-LEG ATTACHMENT DEVICES FOR USE WITH UTILITY LOCATORS; U.S. Pat. No. 10,353,103, issued Jul. 16, 2019, entitled SELF-STANDING MULTI-LEG ATTACHMENT DEVICES FOR USE WITH UTILITY LOCATORS; U.S. patent application Ser. No. 16/551,653, filed Aug. 26, 2019, entitled BURIED UTILITY MARKER DEVICES, SYSTEMS, AND METHODS; U.S. Pat. No. 10,401,526, issued Sep. 3, 2019, entitled BURIED UTILITY MARKER DEVICES, SYSTEMS, AND METHODS; U.S. Pat. No. 10,324,188, issued Oct. 9, 2019, entitled OPTICAL GROUND TRACKING APPARATUS, SYSTEMS, AND METHODS FOR USE WITH BURIED UTILITY LOCATORS; U.S. patent application Ser. No. 16/446,456, filed Jun. 19, 2019, entitled DOCKABLE TRIPODAL CAMERA CONTROL UNIT; U.S. patent application Ser. No. 16/520,248, filed Jul. 23, 2019, entitled MODULAR BATTERY PACK APPARATUS, SYSTEMS, AND METHODS; U.S. Pat. No. 10,371,305, issued Aug. 6, 2019, entitled DOCKABLE TRIPODAL CAMERA CONTROL UNIT; U.S. Pat. No. 10,490,908, issued Nov. 26, 2019, entitled DUAL ANTENNA SYSTEMS WITH VARIABLE POLARIZATION, U.S. patent application Ser. No. 16/701,085, filed Dec. 2, 2019, entitled MAP GENERATION BASED ON UTILITY LINE POSITION AND ORIENTATION ESTIMATES; U.S. Pat. No. 10,534,105, issued Jan. 14, 2020, entitled UTILITY LOCATING TRANSMITTER APPARATUS AND METH- ODS; U.S. patent application Ser. No. 16/773,952, filed Jan. 27, 2020, entitled MAGNETIC FIELD CANCELING AUDIO DEVICES; U.S. patent application Ser. No. 16/780,813, filed Feb. 3, 2020, entitled RESILIENTLY DEFORMABLE MAGNETIC FIELD CORE APPARATUS AND APPLICATIONS; U.S. Pat. No. 10,555,086, issued Feb. 4, 2020, entitled MAGNETIC FIELD CANCELING AUDIO SPEAKERS FOR USE WITH BURIED UTILITY LOCATORS OR OTHER DEVICES; U.S. patent application Ser. No. 16/786,935, filed Feb. 10, 2020, entitled SYSTEMS AND METHODS FOR UNIQUELY IDENTIFYING BURIED UTILITIES IN A MULTI-UTILITY ENVIRONMENT; U.S. Pat. No. 10,557,824, issued Feb. 11, 2020, entitled RESILIENTLY DEFORMABLE MAGNETIC FIELD TRANSMITTER CORES FOR USE WITH UTILITY LOCATING DEVICES AND SYSTEMS; U.S. patent application Ser. No. 16/791,979, issued Feb. 14, 2020, entitled MARKING PAINT APPLICATOR APPARATUS; U.S. patent application Ser. No. 16/792,047, filed Feb. 14, 2020, entitled SATELLITE AND MAGNETIC FIELD SONDE APPARATUS AND METHODS; U.S. Pat. No. 10,564,309, issued Feb. 18, 2020, entitled SYSTEMS AND METHODS FOR UNIQUELY IDENTIFYING BURIED UTILITIES IN A MULTI-UTILITY ENVIRONMENT; U.S. Pat. No. 10,571,594, issued Feb. 25, 2020, entitled UTILITY LOCATOR DEVICES, SYSTEMS, AND METHODS WITH SATELLITE AND MAGNETIC FIELD SONDE ANTENNA SYSTEMS; U.S. Pat. No. 10,569,952, issued Feb. 25, 2020, entitled MARKING PAINT APPLICATOR FOR USE WITH PORTABLE UTILITY LOCATOR; U.S. patent application Ser. No. 16/810,788, filed Mar. 5, 2019, entitled MAGNETICALLY RETAINED DEVICE HANDLES; U.S. patent application Ser. No. 16/827,672, filed Mar. 23, 2020, entitled DUAL ANTENNA SYSTEMS WITH VARIABLE POLARIZATION; U.S. patent application Ser. No. 16/833,426, filed Mar. 27, 2020, entitled LOW COST, HIGH PERFORMANCE SIGNAL PROCESSING IN A MAGNETIC-FIELD SENSING BURIED UTILITY LOCATOR SYSTEM; U.S. Pat. No. 10,608,348, issued Mar. 31, 2020, entitled DUAL ANTENNA SYSTEMS WITH VARIABLE POLARIZATION; U.S. patent application Ser. No. 16/837,923, filed Apr. 1, 2020, entitled MODULAR BATTERY PACK APPARATUS, SYSTEMS, AND METHODS INCLUDING VIRAL DATA AND/OR CODE TRANSFER; U.S. Provisional Patent Application 63/012,480, filed Apr. 20, 2020, entitled UTILITY LOCATING DEVICES EMPLOYING MULTIPLE SPACED APART GNSS ANTENNAS; U.S. Provisional Patent Application 63/015,692, filed Apr. 27, 2020, entitled SPATIALLY AND PROCESSING-BASED DIVERSE REDUNDANCY FOR RTK POSITIONING; U.S. patent application Ser. No. 16/872,362, filed May 11, 2020, entitled BURIED LOCATOR SYSTEMS AND METHODS; U.S. patent application Ser. No. 16/882,719, filed May 25, 2020, entitled UTILITY LOCATING SYSTEMS, DEVICES, AND METHODS USING RADIO BROADCAST SIGNALS; U.S. Pat. No. 10,670,766, issued Jun. 2, 2020, entitled UTILITY LOCATING SYSTEMS, DEVICES, AND METHODS USING RADIO BROADCAST SIGNALS; U.S. Pat. No. 10,677,820, issued Jun. 9, 2020, entitled BURIED LOCATOR SYSTEMS AND METHODS; U.S. patent application Ser. No. 16/902,245, filed Jun. 15, 2020, entitled LOCATING DEVICES, SYSTEMS, AND METHODS USING FREQUENCY SUITES FOR UTILITY DETECTION; U.S. patent application Ser. No. 16/902,249, filed Jun. 15, 2020, entitled USER INTERFACES FOR UTILITY LOCATORS; U.S. Pat. No. 10,690,795, issued Jun. 23, 2020, entitled LOCATING DEVICES, SYSTEMS, AND METHODS USING FREQUENCY SUITES FOR UTILITY DETECTION; U.S. patent application Ser. No. 16/908,625, filed Jun. 22, 2020, entitled ELECTROMAGNETIC MARKER DEVICES WITH SEPARATE RECEIVE AND TRANSMIT ANTENNA ELEMENTS; U.S. Pat. No. 10,690,796, issued Jun. 23, 2020, entitled USER INTERFACES FOR UTILITY LOCATORS; U.S. patent application Ser. No. 16/921,775, filed Jul. 6, 2020, entitled AUTO-TUNING CIRCUIT APPARATUS AND METHODS; U.S. Provisional Patent Application 63/055,278, filed Jul. 22, 2020, entitled VEHICLE-BASED UTILITY LOCATING USING PRINCIPAL COMPONENTS; U.S. patent application Ser. No. 16/995,801, filed Aug. 17, 2020, entitled UTILITY LOCATOR TRANSMITTER DEVICES, SYSTEMS, AND METHODS; U.S. patent application Ser. No. 17/001,200, filed Aug. 24, 2020, entitled MAGNETIC SENSING BURIED UTILITY LOCATOR INCLUDING A CAMERA; U.S. patent Ser. No. 16/995,793, filed Aug. 17, 2020, entitled UTILITY LOCATOR APPARATUS AND METHODS; U.S. Pat. No. 10,753,722, issued Aug. 25, 2020, entitled SYSTEMS AND METHODS FOR LOCATING BURIED OR HIDDEN OBJECTS USING SHEET CURRENT FLOW MODELS; U.S. Pat. No. 10,754,053, issued Aug. 25, 2020, entitled UTILITY LOCATOR TRANSMITTER DEVICES, SYSTEMS, AND METHODS WITH DOCKABLE APPARATUS; U.S. Pat. No. 10,761,233, issued Sep. 1, 2020, entitled SONDES AND METHODS FOR USE WITH BURIED LINE LOCATOR SYSTEMS; U.S. Pat. No. 10,761,239, issued Sep. 1, 2020, entitled MAGNETIC SENSING BURIED UTILITY LOCATOR INCLUDING A CAMERA; U.S. patent application Ser. No. 17/013,831, filed Sep. 7, 2020, entitled MULTIFUNCTION BURIED UTILITY LOCATING CLIPS; U.S. Pat. No. 10,777,919, issued Sep. 15, 2020, entitled MULTIFUNCTION BURIED UTILITY LOCATING CLIPS; U.S. patent application Ser. No. 17/020,487, filed Sep. 14, 2020, entitled ANTENNA SYSTEMS FOR CIRCULARLY POLARIZED RADIO SIGNALS; U.S. patent application Ser. No. 17/068,156, filed Oct. 12, 2020, entitled DUAL SENSED LOCATING SYSTEMS AND METHODS; United States Provisional Patent Application 63/091,67, filed Oct. 14, 2020, entitled ELECTRONIC MARKER-BASED NAVIGATION SYSTEMS AND METHODS FOR USE IN GNSS-DEPRIVED ENVIRONMENTS; U.S. Pat. No. 10,809,408, issued Oct. 20, 2020, entitled DUAL SENSED LOCATING SYSTEMS AND METHODS; U.S. Pat. No. 10,845,497, issued Nov. 24, 2020, entitled PHASE-SYNCHRONIZED BURIED OBJECT TRANSMITTER AND LOCATOR METHODS AND APPARATUS; U.S. Pat. No. 10,859,727, issued Dec. 8, 2020, entitled ELECTRONIC MARKER DEVICES AND SYSTEMS; U.S. Pat. No. 10,908,311, issued Feb. 2, 2021, entitled SELF-STANDING MULTI-LEG ATTACHMENT DEVICES FOR USE WITH UTILITY LOCATORS; U.S. Pat. No. 10,928,538, issued Feb. 23, 2021, entitled KEYED CURRENT SIGNAL LOCATING SYSTEMS AND METHODS; U.S. Pat. No. 10,935,686, issued Mar. 2, 2021, entitled UTILITY LOCATING SYSTEM WITH MOBILE BASE STATION; and U.S. Pat. No. 10,955,583, issued Mar. 23, 2021, entitled BORING INSPECTION SYSTEMS AND METHODS. The content of each of the above-described patents and applications is incorporated by reference herein in its entirety. The above applications may be collectively denoted herein as the "co-assigned applications" or "incorporated applications."

The following exemplary embodiments are provided for the purpose of illustrating examples of various aspects, details, and functions of the present disclosure; however, the described embodiments are not intended to be in any way limiting. It will be apparent to one of ordinary skill in the art that various aspects may be implemented in other embodiments within the spirit and scope of the present disclosure.

In one aspect, the present disclosure may include a human-portable utility locator device which may include at least one antenna node to sense magnetic fields emitted from one or more buried utilities and provide locating antenna output signals corresponding to the sensed magnetic fields. The utility locator device may further include a multi-antenna GNSS element comprising two or more GNSS antennas spaced apart a predetermined known spacing that is at least 100 millimeters each receiving GNSS signals. Each GNSS antenna may further supply signals to at least one GNSS receiver to each generate position output signals corresponding to the estimated position associated with one of the GNSS antennas. The GNSS antennas may include, but should not be limited to, helical or patch antennas which may be dual or triple band antennas. Likewise, the associated GNSS receivers may be dual or triple band receivers. For example, the GNSS antennas and receivers may be configured for the L1, L2, and L5 GPS bands. In other embodiments, the GNSS antennas and associated GNSS receivers may be configured for other signal bands. In some embodiments, the multi-antenna GNSS elements of the utility locator devices disclosed herein may include two or more GNSS receivers coupled at each GNSS antenna. In further embodiments, each GNSS antenna may couple to a single GNSS receiver. In yet further embodiments, two or more antennas may couple to a single GNSS receiver. A processing element comprising one or more processors may couple to the antenna node(s) and multi-antenna GNSS element. The processing element may receive locating antenna output signals from the antenna node(s) and position output signals from the multi-antenna GNSS element to generate data relating to identifying the presence or absence or buried utility lines and corresponding positions thereof in a world frame. The processing element may further be used for processing and compressing the data and/or for making differential corrections to the position output data. A wireless communication element comprising one or more radio transceivers may further be coupled to the processing element for communicating position output signals, communicating data with other system devices, and/or receiving differential correction signals. The utility locator device may further include a memory element having one or more non-transitory memories for storing data associated with utilities and positioning data and a battery element to supply the device with electrical power. In some embodiments, the utility locator device may include a wireless communication element configured to communicate data with an associated transmitter device and/or other system devices (e.g., cellular, ISM, Bluetooth, Wi-Fi, or like radio transceiver).

The multi-GNSS antenna utility locator devices of the present disclosure may further include one or more additional sensors and systems to measure positions, orientations, poses, and/or movements or lack of movements of the multi-GNSS antenna utility locator devices. For instance, such sensors and systems may include, but should not be limited to, accelerometers, gyroscopic sensors, compasses/magnetometers, or inertial navigation systems (INS). In some embodiments, the magnetometers may be arranged in an array to sense magnetic distortions.

According to another aspect, the present disclosure may include a multi-GNSS antenna transmitter device for use in utility locating systems that may include a transmitter element for generating an output current for provision to one or more utilities so as to generate a magnetic field for detection by a utility locator device. The transmitter device may further include a multi-antenna GNSS element comprising two or more GNSS antennas spaced apart a predetermined known spacing that is at least 100 millimeters each receiving GNSS signals. In the multi-antenna GNSS element, the GNSS antennas may further supply signals to at least one GNSS receiver so as to generate position output signals corresponding to the estimated position of the associated one of the GNSS antennas. The GNSS antennas may include, but should not be limited to, helical or patch antennas which may be dual or triple band antennas. Likewise, the associated GNSS receivers may be dual or triple band receivers. For example, the GNSS antennas and receivers may be configured for the L1, L2, and L5 GPS bands. In other embodiments, the GNSS antennas and associated GNSS receivers may be configured for other signal bands. In some embodiments, the multi-antenna GNSS elements of the transmitter devices disclosed herein may include two or more GNSS receivers coupled at each GNSS antenna. In further embodiments, each GNSS antenna may couple to a single GNSS receiver. In yet further embodiments, two or more antennas may couple to a single GNSS receiver. The multi-GNSS antenna transmitter device may further include a processing element comprising one or more processors coupled to the transmitter element for controlling current to the utility line(s) and further coupled to the GNSS element to receive the position output signals from the GNSS receiver elements and generate position data associated with the transmitter device. The processing element may further be used for processing and compressing the data and/or for making differential corrections to the position output data. A wireless communication element comprising one or more radio transceivers may further be coupled to the processing element for communicating position output signals, communicating data with other system devices, and/or receiving and/or broadcasting differential correction signals. The transmitter device may further include a memory element having one or more non-transitory memories for storing data associated with the GNSS element and transmitter element and a battery element to supply the device with electrical power.

The multi-GNSS antenna transmitter devices of the present disclosure may further include one or more additional sensors and systems to measure positions, orientations, poses, and/or movements or lack of movements of the multi-GNSS antenna transmitter devices. For instance, such sensors and systems may include, but should not be limited to, accelerometers, gyroscopic sensors, compasses/magnetometers, or INS(s). In some embodiments, the magnetometers may be arranged in an array to sense magnetic distortions.

In another aspect, the multi-GNSS antenna transmitter device may be a base station broadcasting correction data for performing Real Time Kinematic (RTK), space state representation (SSR), or other differential corrections. In some such embodiments, the correction data may be stored in the memory element to perform RTK, SSR, or other differential corrections in a post-processing procedure. In other embodiments, the transmitter device may communicate correction data with an associated utility locator device and/or other rover(s) for real-time or near real-time corrections. Such multi-GNSS antenna transmitter device may include an IMU/INS element which may include, but should not be limited to, accelerometers, gyroscopic sensors, compasses/ magnetometers, and/or IMU/INS(s). In some embodiments, the magnetometers may be arranged in an array to sense magnetic distortions.

According to another aspect, a multi-antenna GNSS backpack device may include a backpack element wearable by a user to support a multi-antenna GNSS element. The multi-antenna GNSS element may include two or more GNSS antennas spaced apart a predetermined known spacing that is at least 100 millimeters each receiving GNSS signals and at least one GNSS receiver to generate position output signals corresponding to the estimated position of the associated one of the GNSS antennas. The GNSS antennas may include, but should not be limited to, helical or patch antennas which may be dual or triple band antennas. Likewise, the associated GNSS receivers may be dual or triple band receivers. For example, the GNSS antennas and receivers may be configured for the L1, L2, and L5 GPS bands. In other embodiments, the GNSS antennas and associated GNSS receivers may be configured for other signal bands. In some embodiments, the multi-antenna GNSS elements of the multi-antenna GNSS backpack devices disclosed herein may include two or more GNSS receivers coupled at each GNSS antenna. In further embodiments, each GNSS antenna may couple to a single GNSS receiver. In yet further embodiments, two or more antennas may couple to a single GNSS receiver. A processing element may further be used for processing and compressing the data and/or for making differential corrections to the position output data. A wireless communication element comprising one or more radio transceivers may further be coupled to the processing element for communicating position output signals, communicating data with other system devices, and/or receiving differential correction signals. Position output signals may, for instance, be communicated to a utility locator device via the communication element (e.g., cellular, ISM, Bluetooth, Wi-Fi, or like radio transceiver). The multi-antenna GNSS backpack device may further include a memory element comprising one or more non-transitory memories may be included to store data associated with position data. A battery element may be included in the multi-antenna GNSS backpack device embodiment to supply electrical power to the various powered elements thereof.

The multi-antenna GNSS backpack devices of the present disclosure may further include one or more additional sensors and systems to measure positions, orientations, poses, and/or movements or lack of movements of GNSS backpack devices. For instance, such sensors and systems may include, but should not be limited to, accelerometers, gyroscopic sensors, compasses/magnetometers, and/or IMU/INS(s). In some embodiments, the magnetometers may be arranged in an array to sense magnetic distortions.

According to yet another aspect, multi-GNSS antenna vehicle-mounted locating devices of the present disclosure may include a vehicle-mounting element that may couple to a vehicle and further provide mounting of one or more utility locator devices. The vehicle-mounting element may further include a multi-antenna GNSS element. The multi-antenna GNSS element may include two or more GNSS antennas spaced apart a predetermined known spacing that is at least 100 millimeters each receiving GNSS signals and at least one GNSS receiver to generate position output signals corresponding to the estimated position of the associated one of the GNSS antennas. The GNSS antennas may include, but should not be limited to, helical or patch antennas which may be dual or triple band antennas. Likewise, the associated GNSS receivers may be dual or triple band receivers. For example, the GNSS antennas and receivers may be configured for the L1, L2, and L5 GPS bands. In other embodiments, the GNSS antennas and associated GNSS receivers may be configured for other signal bands. In some embodiments, two or more GNSS receivers may couple at each GNSS antenna. In further embodiments, each GNSS antenna may couple to a single GNSS receiver. In yet further embodiments, two or more antennas may couple to a single GNSS receiver. A processing element may further be included for processing and compressing the data and/or for making differential corrections to the position output data. A communication element comprising one or more radio transceivers may further be coupled to the processing element for communicating position output signals, communicating data with other system devices, and/or receiving differential correction signals. The communication element may be included to further communicate position output signals to one or more utility locator devices or other devices. The multi-GNSS antenna vehicle-mounted locating device may further include a power source to supply electrical power to its various powered elements.

The multi-GNSS antenna vehicle-mounted locating devices of the present disclosure may further include one or more additional sensors and systems to measure positions, orientations, poses, and/or movements or lack of movements of multi-GNSS antenna vehicle-mounted locating devices. For instance, such sensors and systems may include, but should not be limited to, accelerometers, gyroscopic sensors, compasses/magnetometers, or IMU/INS(s). In some embodiments, the magnetometers may be arranged in an array to sense magnetic distortions.

According to another aspect, a method for determining heading in a utility locating device including a multi-GNSS antenna element is presented. The method may include determining at least one position at each GNSS antenna, determining a baseline between two GNSS antennas, and determining a heading angle for the baseline relative to true north. Such methods may optionally include comparing position estimates to known GNSS antenna spacing to determine a quality metric of position estimate data. In another optional step, the method may further include using IMU/INS element data to improve GNSS fix rate and position accuracy. The method may further iterate between the optional step using the measured heading angle to update IMU/INS element and the other optional step using IMU/INS element data to improve GNSS fix rate and position accuracy.

According to another aspect, a method for determining tilt/pose in a utility locating device including a multi-GNSS antenna element is presented. The method may include determining at least one position at each GNSS antenna, determining a baseline between two or more GNSS antennas, and using the degree and direction of the baseline to determine the yaw or heading and roll type tilt/pose. Such methods may optionally include comparing position estimates to known GNSS antenna spacing to determine a quality metric of position estimate data. In some embodiments, the method may optionally include using other pose/tilt sensors to determine the pitch type tilt/pose. In another optional step, the method may further include using IMU/INS element data to improve GNSS fix rate and position accuracy. The method may further iterate between the optional step using the measured heading angle to update IMU/INS element and the other optional step using IMU/INS element data to improve GNSS fix rate and position accuracy.

According to yet another aspect, a method for determining tilt/pose in a utility locating device including a multi- GNSS antenna element is presented. The method may include determining at least one position at each of three or more GNSS antenna. The method may further include determining spatial relationships between the GNSS antennas. The method may further include determining tilt/pose based on the degree and direction of a calculated transformation of between the relative geometry in the rigid body frame of the multi-GNSS antenna element and the RTK, SSR, or like position estimates in the world frame. Such methods may optionally include comparing position estimates to known GNSS antenna spacing to determine a quality metric of position estimate data. Optionally, the method may include using IMU/INS element data to improve GNSS fix rate and position accuracy. In another optional step, the method may include using pose/tilt measurement to update IMU/INS element velocity, displacement, and orientation. The method may further iterate between the optional step using IMU/INS element data to improve GNSS fix rate and position accuracy and the other optional step using pose/tilt measurement to update IMU/INS element velocity, displacement, and orientation.

According to another aspect, a post-processing method for using a multi-GNSS antenna transmitter device as a base station is presented. The method may include operating a transmitter device receiving GNSS signals and data signals relating to RTK, SSR, or like differential corrections while coupling signal on one or more utility lines. Correction data may be stored on a memory element in the transmitter device. The method may further include operating a utility locator device to produce locating data that includes data relating to the presence or absence of utility lines that correlates to GNSS position data at the utility locator device. Locating data may be stored on a memory element in the utility locator device. In another step, the method may include receiving correction data and applying corrections to locate data in a utility locator while performing locating procedure. The method may further include storing locate data that includes corrected position data.

According to another aspect, a real-time or near real-time or post-processing method for using a multi-GNSS antenna transmitter device as a base station is presented. The method may include operating a transmitter device receiving GNSS signals and data signals relating to RTK, SSR, or like differential corrections while coupling signal(s) on one or more utility lines. The method may further include broadcasting correction data from the transmitter device. The broadcasted correction data may be received at a utility locator devices allowing for RTK, SSR, or other differential corrections to be made to position data as the utility locator device carries out the locating procedure thus generating locating data. The locating data, including corrected position data, may be stored in one or more non-transitory memories.

According to another aspect, a multi-GNSS antenna vehicle tracking device is presented. The multi-GNSS antenna vehicle tracking device may include a mounting element for mounting to a vehicle. The multi-GNSS antenna vehicle tracking device may further include a multi-antenna GNSS element comprising two or more GNSS antennas spaced apart by a predetermined known spacing at least 100 millimeters. The GNSS antennas may include, but should not be limited to, helical or patch antennas which may be dual or triple band antennas. Likewise, the associated GNSS receivers may be dual or triple band receivers. For example, the GNSS antennas and receivers may be configured for the L1, L2, and L5 GPS bands. In other embodiments, the GNSS antennas and associated GNSS receivers may be configured for other signal bands. In some embodiments, two or more GNSS receivers may couple at each GNSS antenna. In further embodiments, each GNSS antenna may couple to a single GNSS receiver. In yet further embodiments, two or more antennas may couple to a single GNSS receiver. Each GNSS antenna may receive GNSS signals and further supply signals to at least one GNSS receiver to generate position output signals corresponding to the estimated position of the associated one of the GNSS antennas. The multi-GNSS antenna vehicle tracking device may include a processing element comprising one or more processors coupled to the GNSS element to receive position output signals for purposes of processing and compressing the data and/or for making differential corrections to the position output data. In some embodiments, a wireless communication element comprising one or more radio transceivers coupled to the processing element for communicating position output signals, communicating data with other system devices, and/or receiving differential correction signals. A memory element having one or more non-transitory memories may be included for storing data associated with utilities and positioning data and a power element for supplying of electrical power.

The multi-GNSS antenna vehicle tracking devices of the present disclosure may further include one or more additional sensors and systems to measure positions, orientations, poses, and/or movements or lack of movements of multi-GNSS antenna vehicle-mounted locating devices. For instance, such sensors and systems may include, but should not be limited to, accelerometers, gyroscopic sensors, compasses/magnetometers, and/or IMU/INS(s). In some embodiments, the magnetometers may be arranged in an array to sense magnetic distortions Various additional aspects, features, and functions are described below in conjunction with FIGS. 1A through 18E of the appended Drawings.

It is noted as used herein, the term, "exemplary" means "serving as an example, instance, or illustration." Any aspect, detail, function, implementation, and/or embodiment described herein as "exemplary" is not necessarily to be construed as preferred or advantageous over other aspects and/or embodiments.

Example Utility Locating Devices Employing Multiple Spaced Apart GNSS Antennas

Figure 1B:
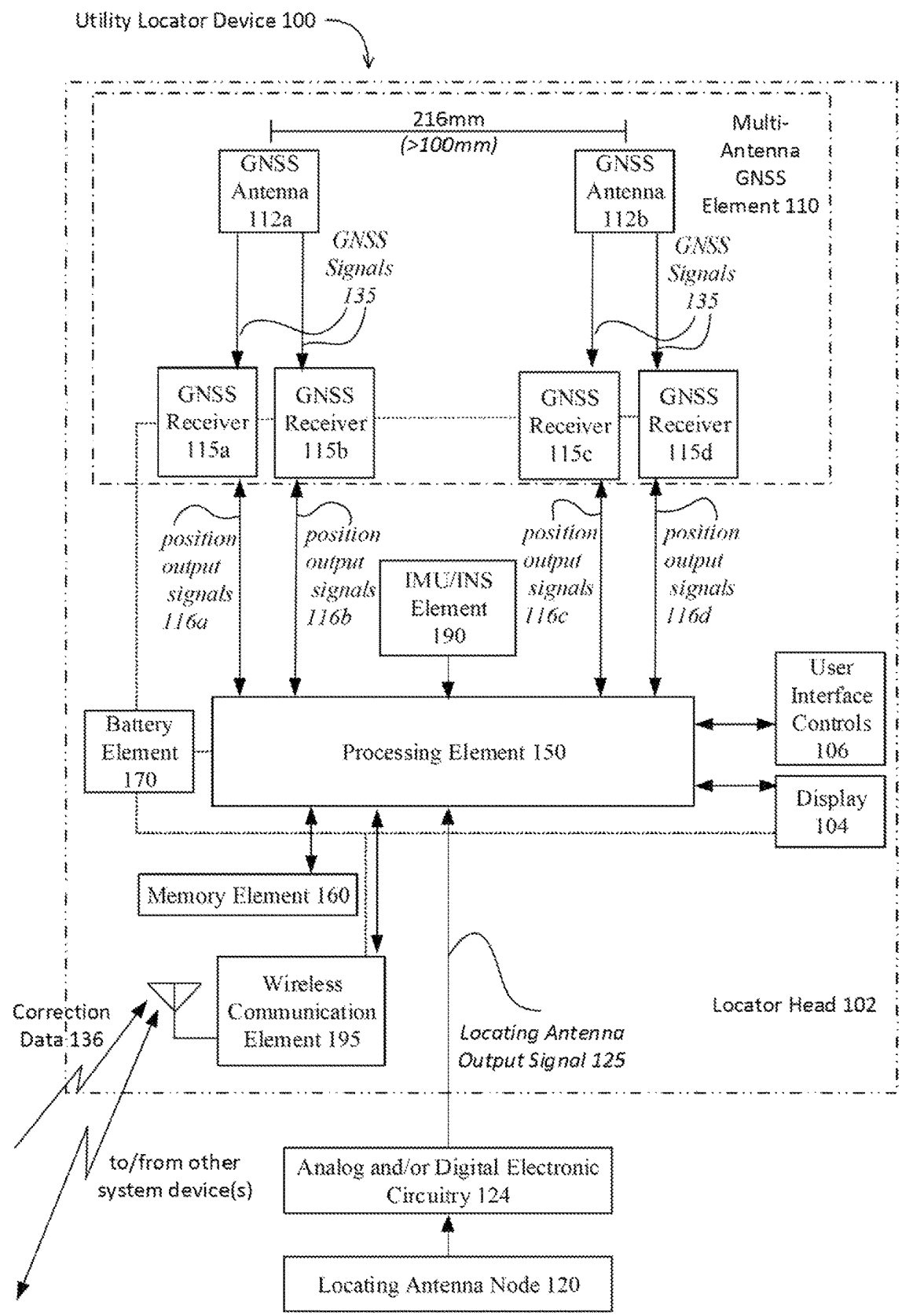
FIG. 1B is a diagram of the multi-antenna utility locator device of FIG. 1A.

In FIGS. 1A and 1B, a multi-GNSS antenna utility locator device 100 is illustrated which may share aspects with the utility locator devices described in U.S. patent application Ser. No. 15/360,979, filed Nov. 23, 2016, entitled UTILITY LOCATING SYSTEMS, DEVICES, AND METHODS USING RADIO BROADCAST SIGNALS; U.S. patent application Ser. No. 15/626,399, filed Jun. 19, 2017, entitled SYSTEMS AND METHODS FOR UNIQUELY IDENTIFYING BURIED UTILITIES IN A MULTI-UTILITY ENVIRONMENT; U.S. Pat. No. 9,927,545, issued Mar. 27, 2018, entitled MULTI-FREQUENCY LOCATING SYSTEMS AND METHODS; U.S. Pat. No. 9,927,546, filed Mar. 27, 2018, entitled PHASE-SYNCHRONIZED BURIED OBJECT TRANSMITTER AND LOCATOR METHODS AND APPARATUS; U.S. Pat. No. 10,078,149, issued Sep. 18, 2018, entitled BURIED OBJECT LOCATOR APPARATUS AND SYSTEMS; and U.S. Pat. No. 10,162,074, issued Dec. 25, 2018, entitled UTILITY LOCATORS WITH RETRACTABLE SUPPORT STRUCTURES AND APPLICATIONS THEREOF; U.S. Pat. No. 10,670,766, issued Jun. 2, 2020, entitled UTILITY LOCATING SYSTEMS, DEVICES, AND METHODS USING RADIO BROADCAST SIGNALS; and U.S. Pat. No. 10,564,309, filed Feb. 18, 2020, entitled SYSTEMS AND METHODS FOR UNIQUELY IDENTIFYING BURIED UTILITIES IN A MULTI-UTILITY ENVIRONMENT as well as the other utility locator devices of the incorporated applications.

In FIGS. 1A and 1B, the multi-GNSS antenna utility locator device 100 may include a locator head 102 which may house electronics associated with the methods and functions of the present disclosure as well as further include a display 104 to communicate information to a user (e.g., user 180 of FIG. 1C), user input controls 106, and a handle 108 (FIG. 1A) by which the multi-GNSS antenna utility locator device 100 may be carried. The locator head 102 may further include a multi-antenna GNSS element 110 in keeping with the present disclosure. The multi-antenna GNSS element 110 may be positioned forward along the locator head 102 away from the user (e.g., user 180 of FIG. 1C) during normal usage and further positioned opposite the one or more locating antenna nodes, such as locating antenna node 120, along a mast 122.

In keeping with the present disclosure, the multi-antenna GNSS element 110 may include two or more GNSS antennas spaced apart a predetermined known spacing that is at least 100 millimeters, such as the GNSS antennas 112a and 112b which are separated by 216 millimeters, and at least one GNSS receiver, such as the GNSS receivers 115a, 115b, 115c, and 115d (FIG. 1B) in the multi-GNSS antenna utility locator device 100. Two of the GNSS receivers 115a, 115b, 115c, and 115d (FIG. 1B) may be coupled to each one of the GNSS antennas 112a and 112b. It should be noted, that the embodiments described herein having multiple GNSS receivers coupled to a single GNSS antenna, such as the multi-GNSS antenna utility locator device 100, the multiple GNSS observables data streams may compress removing redundant information that is common to the data provided by each GNSS receiver. In other embodiments, other numbers of GNSS antennas having different numbers of associated GNSS receivers may be used.

It should be noted that a splitter may be present in some embodiments where distributing of GNSS signals from a single GNSS antenna to a plurality of GNSS receivers may occur such as with the multi-GNSS antenna utility locator device 100 of FIG. 1B. Though such a splitter may be implied to practitioners of the art, the multi-GNSS antenna utility locator device 100e of FIG. 1E is illustrated for additional clarity having such a splitter 199. The splitter 199 may further be diagrammed in FIG. 1H though other splitter configurations may be used for distributing of GNSS signals to GNSS receivers in such embodiments in keeping with the present disclosure.

The GNSS antennas 112a and 112b may, for example, be dual or triple band antennas. Likewise, the associated GNSS receivers 115a, 115b, 115c, and 115d (FIG. 1B) may be dual or triple band receivers. For example, the GNSS antennas 112a/112b and GNSS receivers 115a-115d (FIG. 1B) may be configured for the L1, L2, and L5 GPS bands. In other embodiments, the GNSS antennas and associated GNSS receivers may be configured for other signal bands. Embodiments in keeping with the present disclosure may have GNSS antennas with different form factors including, but not limited to, helical antennas (e.g., the helical antennas 214a/214b of FIG. 2B), patch antennas (e.g., the patch antennas 314a/314b of FIG. 3B), or other antenna configurations. Each GNSS antenna 112a and 112b may receive GNSS signals 135 from a plurality of navigation satellites 130 (FIG. 1A) Likewise, real time kinematic (RTK), space state representation (SSR), or other differential correction data 136 (FIG. 1A) may be received via a wireless communication element 195 from one or more base stations 132 (FIG. 1A). The GNSS signals 135 to the GNSS receivers 115a, 115b, 115c, and 115d (FIG. 1B) so as to generate position output signals 116a, 116b, 116c, and 116d (FIG. 1B) corresponding to estimated positions associated with one of the GNSS antennas 112a and 112b. Such estimated positions may be corrected via correction data 136 (FIG. 1A) at a processing element 150 (FIG. 1B).

It should be noted that in FIG. 1B, a pair of GNSS receivers 115a/115b and 115c/115d may couple to a single GNSS antenna 112a or 112b in the multi-GNSS antenna utility locator device 100. In other embodiments, other multi-GNSS antenna utility locator device embodiments may have other numbers of GNSS antennas and GNSS receivers in various other configurations. Some such configurations are illustrated with the GNSS antennas 112 and GNSS receivers 115 of the multi-GNSS antenna utility locator device embodiments 100f and 100g illustrated in FIGS. 1F and 1G.

Figure 1C:
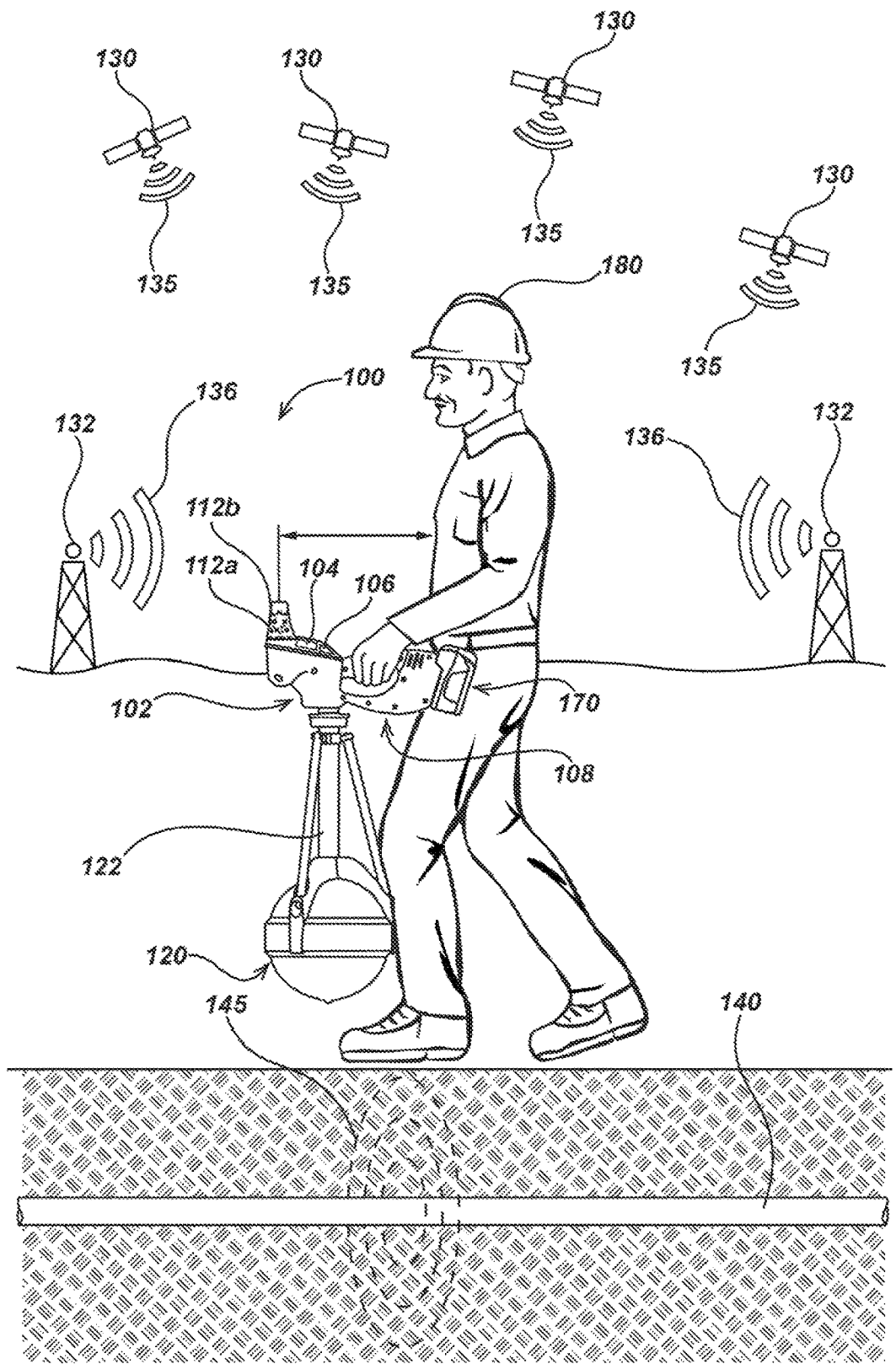
FIG. 1C is an illustration of a user holding the multi-antenna utility locator device of FIG. 1A from the side.
Figure 1D:
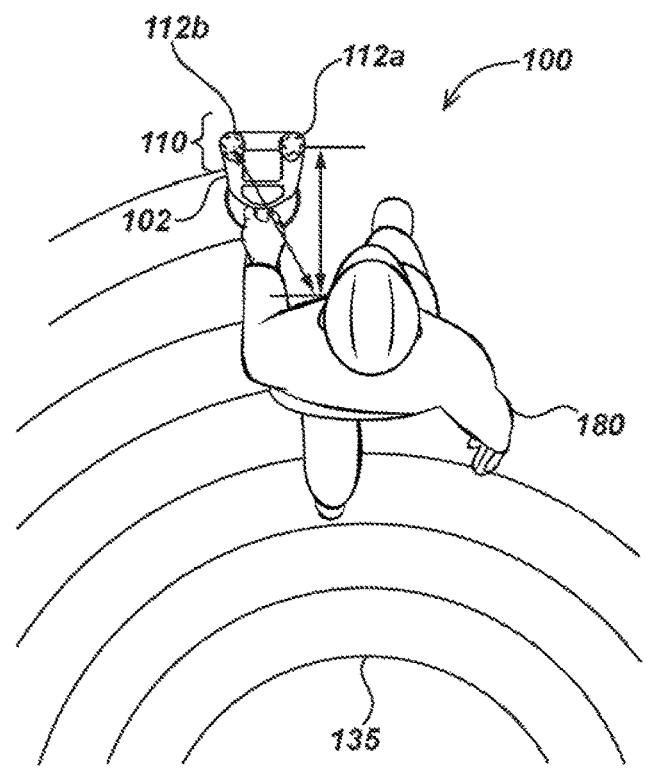
FIG. 1D is an illustration of a user holding the multi-antenna utility locator device of FIG. 1A from above.
Figure 1D:
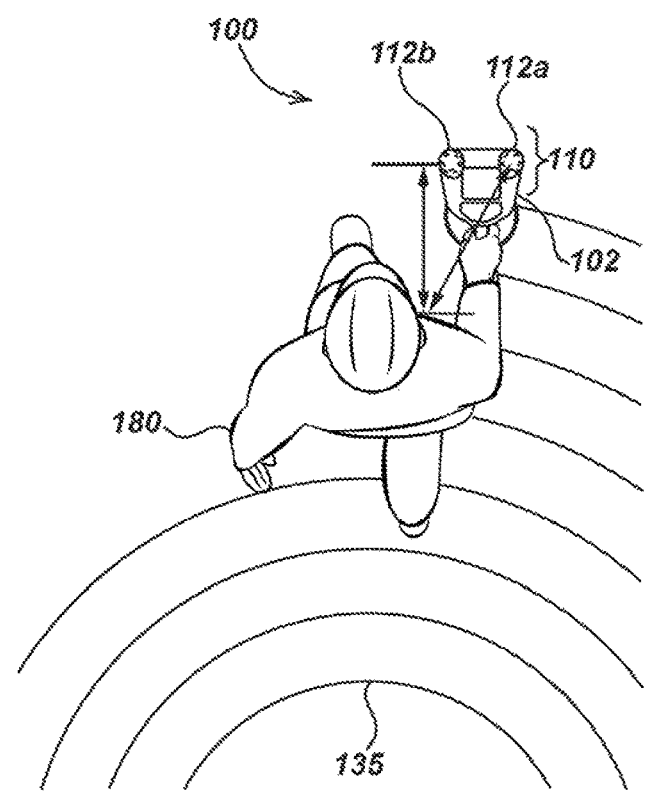
Figure 1E:
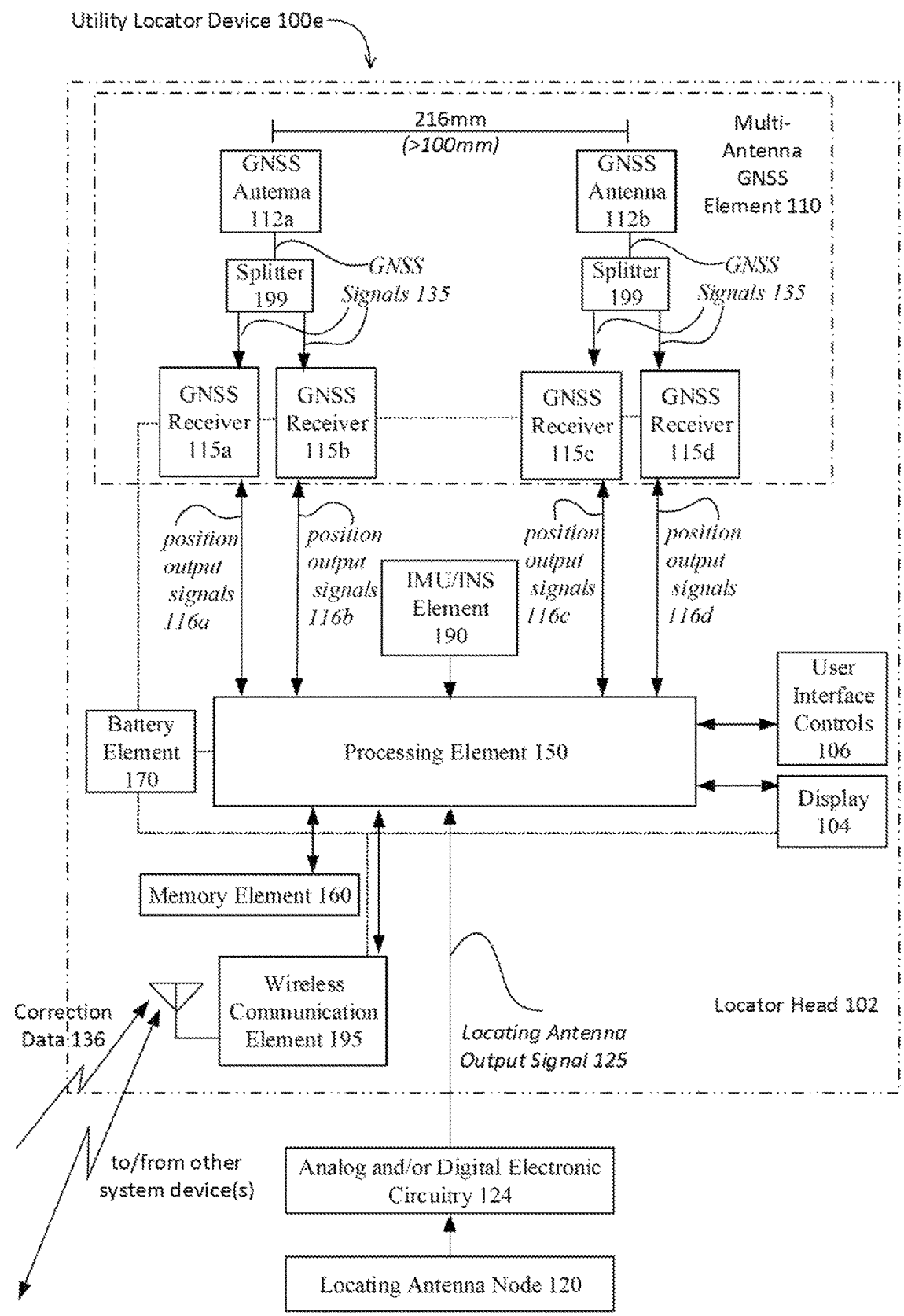
FIG. 1E is an illustration of a multi-antenna utility locator device further showing a splitter.
Figure 1F:
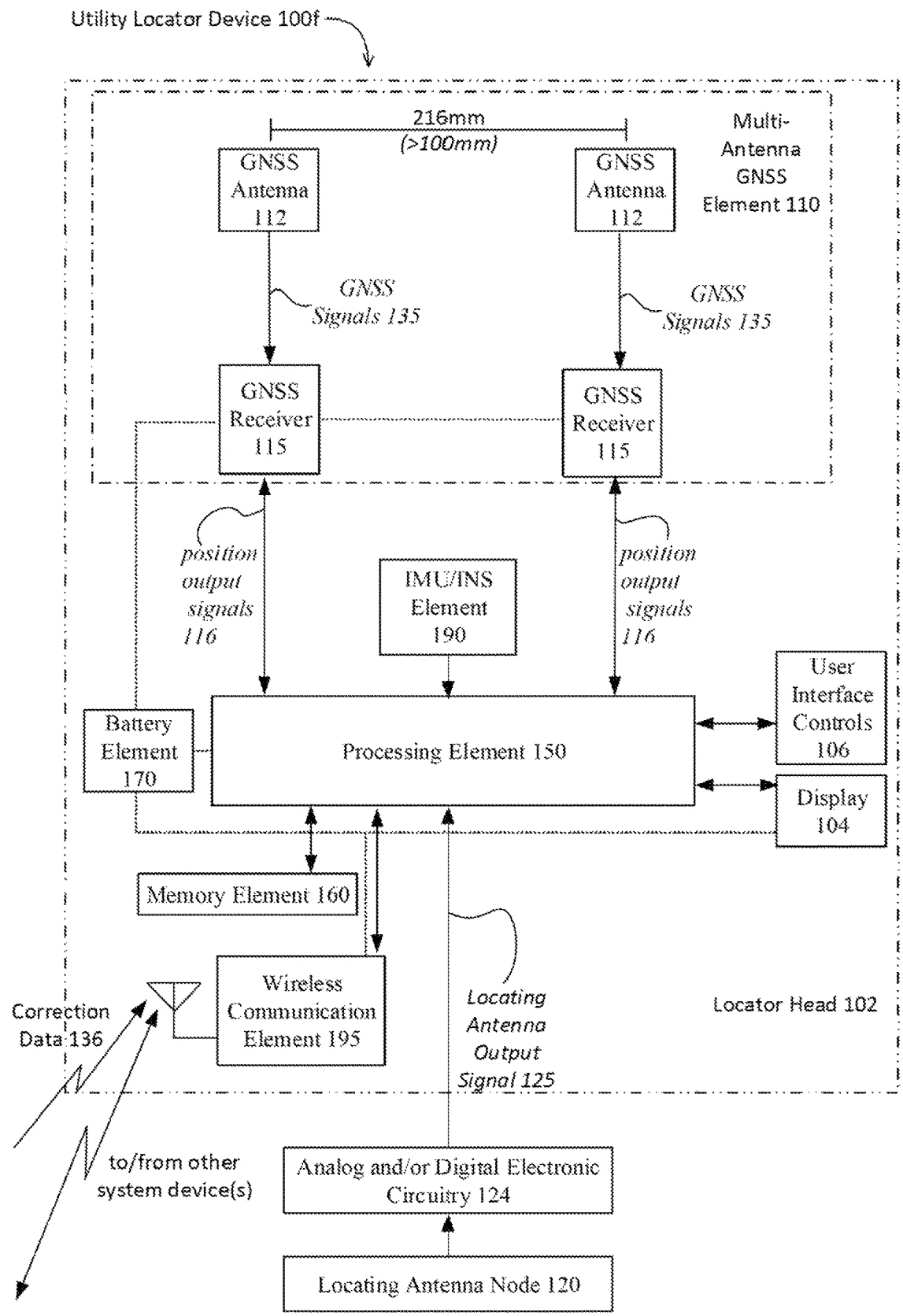
FIG. 1F is an illustration of another multi-antenna utility locator device embodiment.

As illustrated in FIG. 1F, for instance, the multi-GNSS antenna utility locator device 100f may include a single GNSS antennas 112 coupled to each individual GNSS receivers 115. The GNSS receivers 115 may be dual or triple band receivers. Likewise, the GNSS antennas 112 and GNSS receivers 115 may be configured for the L1, L2, and L5 GPS bands and/or other signal bands. In the multi-GNSS antenna utility locator device 100f, GNSS signals 135 may be communicated from each GNSS antenna 112 to an individually coupled one of the GNSS receivers 115. Each of the GNSS receivers 115 may further communicate position output signals 116 to a processing element 150.

Figure 1G:
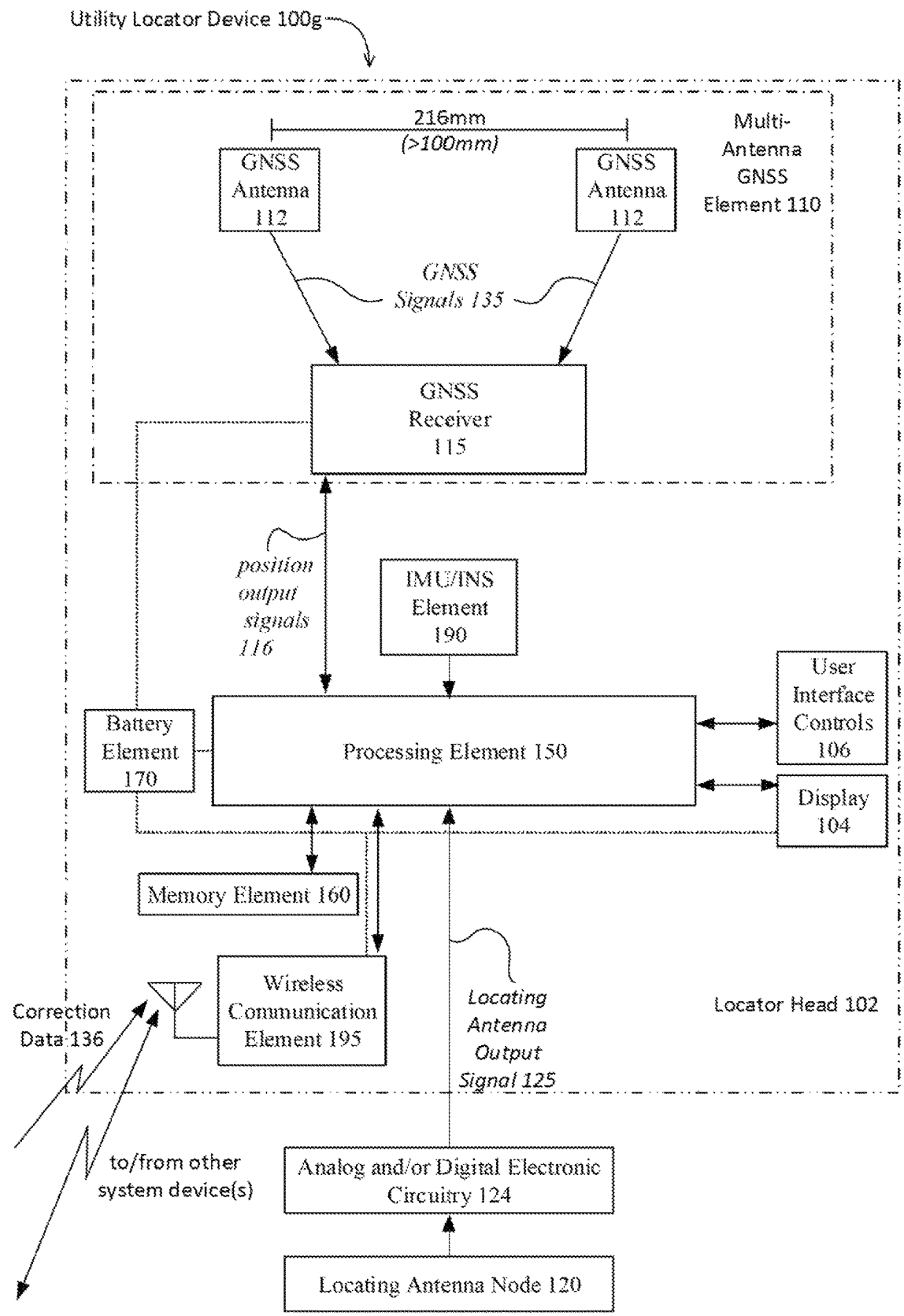
FIG. 1G is an illustration of another multi-antenna utility locator device embodiment.

In yet further embodiments, such as the multi-GNSS antenna utility locator device 100g of FIG. 1G, multiple GNSS antennas 112 may couple to one GNSS receivers 115. The GNSS receivers 115 may be dual or triple band receivers. Likewise, the GNSS antennas 112 and GNSS receivers 115 may be configured for the L1, L2, and L5 GPS bands and/or other signal bands. In some such embodiments, a GNSS receiver configured for use with multiple GNSS antennas may be a multi-input GNSS receiver that provides a measure of pose (pitch, roll, heading, or like orientation measurements) such as the mosaic-H GNSS receiver commercially available from Septentrio.

Turning back to FIGS. 1A and 1B, the locating antenna node 120 may sense magnetic fields 145 (FIG. 1A) emitted from one or more buried utilities, such as utility line 140, and provide locating antenna output signals 125 (FIG. 1B) corresponding to the sensed magnetic fields 145 (FIG. 1A). Analog and/or digital electronic circuitry 124 (FIG. 1B), including additional analog and/or digital circuit elements such as filters, signal conditioners, analog-to-digital (A/D) converters, multiplexers, and the like, may be coupled to the locating antenna node 120 of the multi-GNSS antenna utility locator device 100 to condition the locating antenna output signals 125 (FIG. 1B). The magnetic fields 145 (FIG. 1A) may be caused by current inherent in the line (e.g., electrical lines or telecommunication lines) or may be caused by current coupled thereto (e.g., water lines, sewer lines, or gas lines) via a transmitter device such as the multi-GNSS antenna transmitter 900 of FIGS. 9A-9C multi-GNSS, multi-GNSS antenna transmitter 900d of FIG. 9D, multi-GNSS antenna transmitter 900e of FIG. 9E, multi-GNSS antenna transmitter 900f of FIG. 9F, antenna transmitter 1000 of FIGS. 10A-10B, multi-GNSS antenna transmitter 1000c of FIG. 10C, multi-GNSS antenna transmitter 1000d of FIG. 10D, multi-GNSS antenna transmitter 1000e of FIG.

Figure 11A:
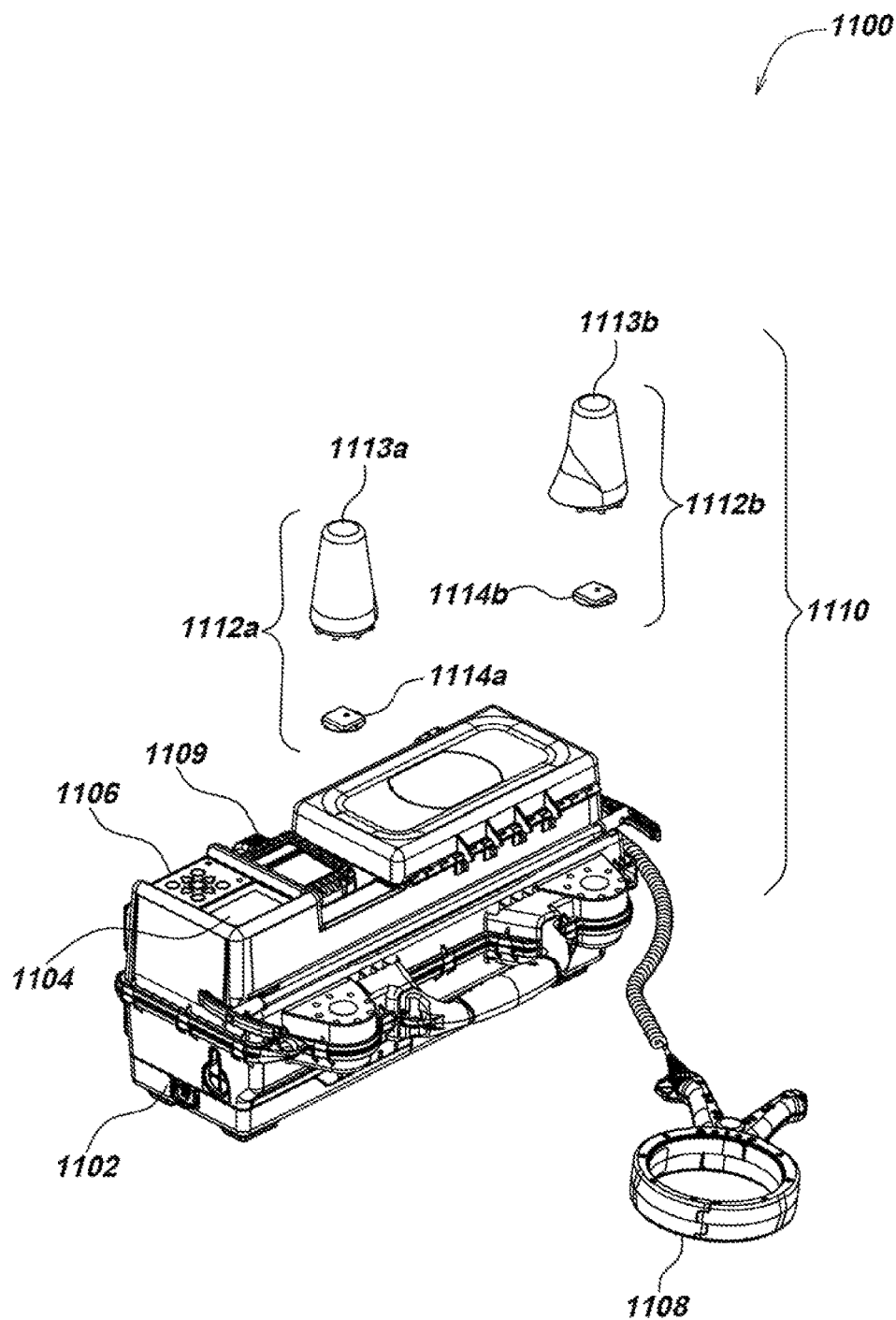
FIG. 11A is an isometric view of a multi-GNSS antenna transmitter device with partially exploded GNSS antennas revealing patch antennas.
Figure 11B:
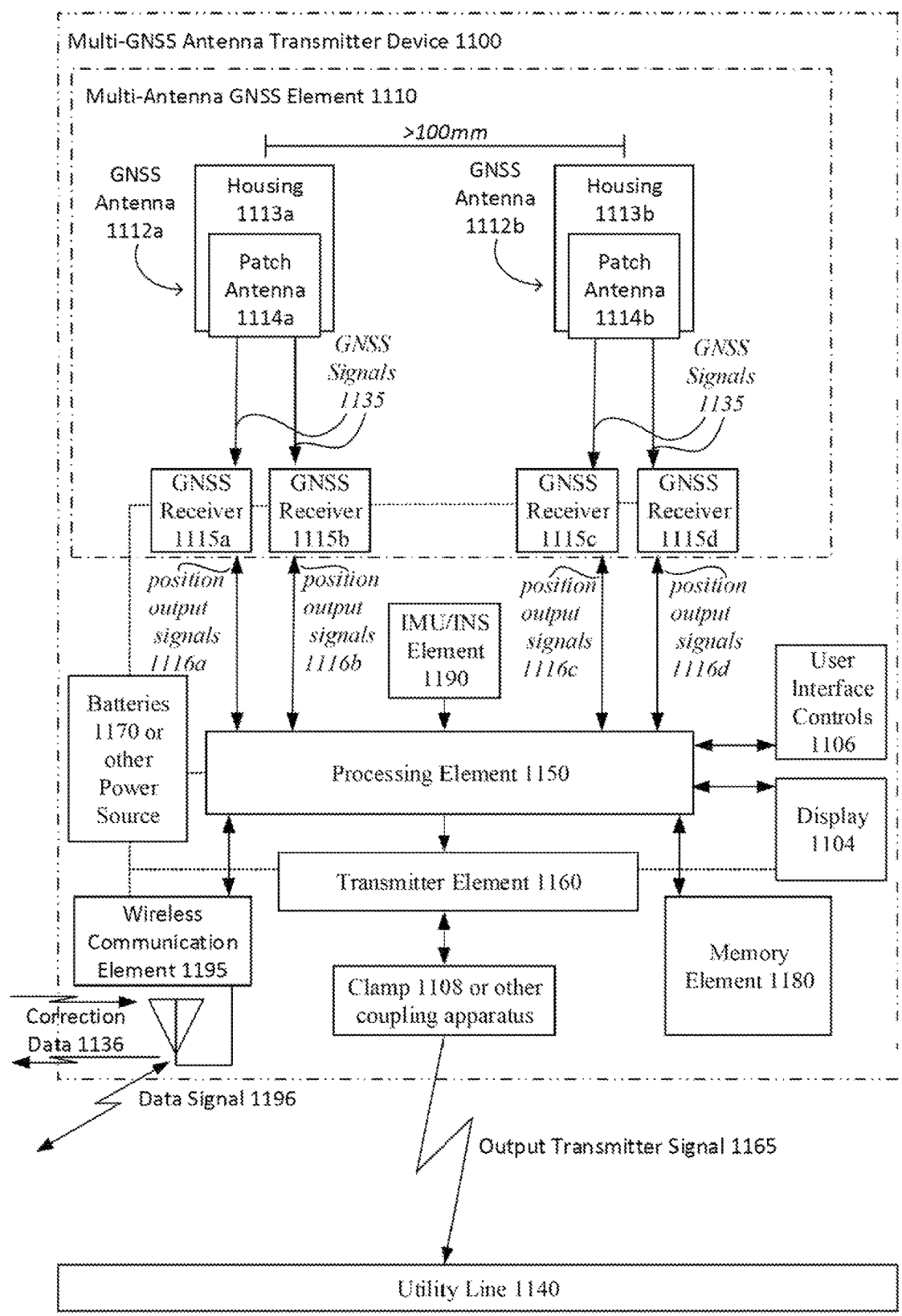
FIG. 11B is a diagram of the multi-GNSS antenna transmitter device of FIG. 11A.
Figure 11C:
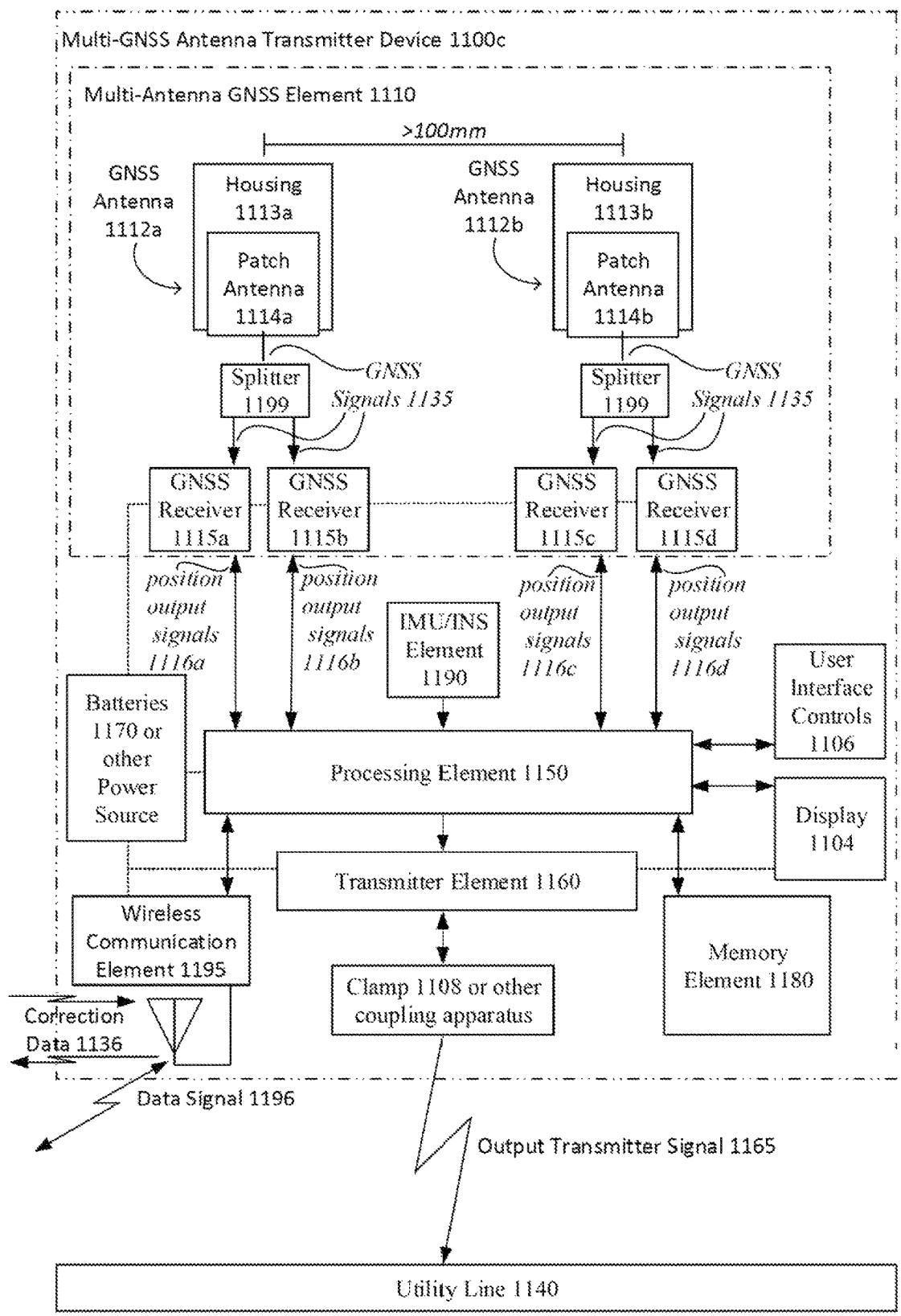
FIG. 11C is an illustration of a multi-antenna utility locator device further showing a splitter.
Figure 11D:
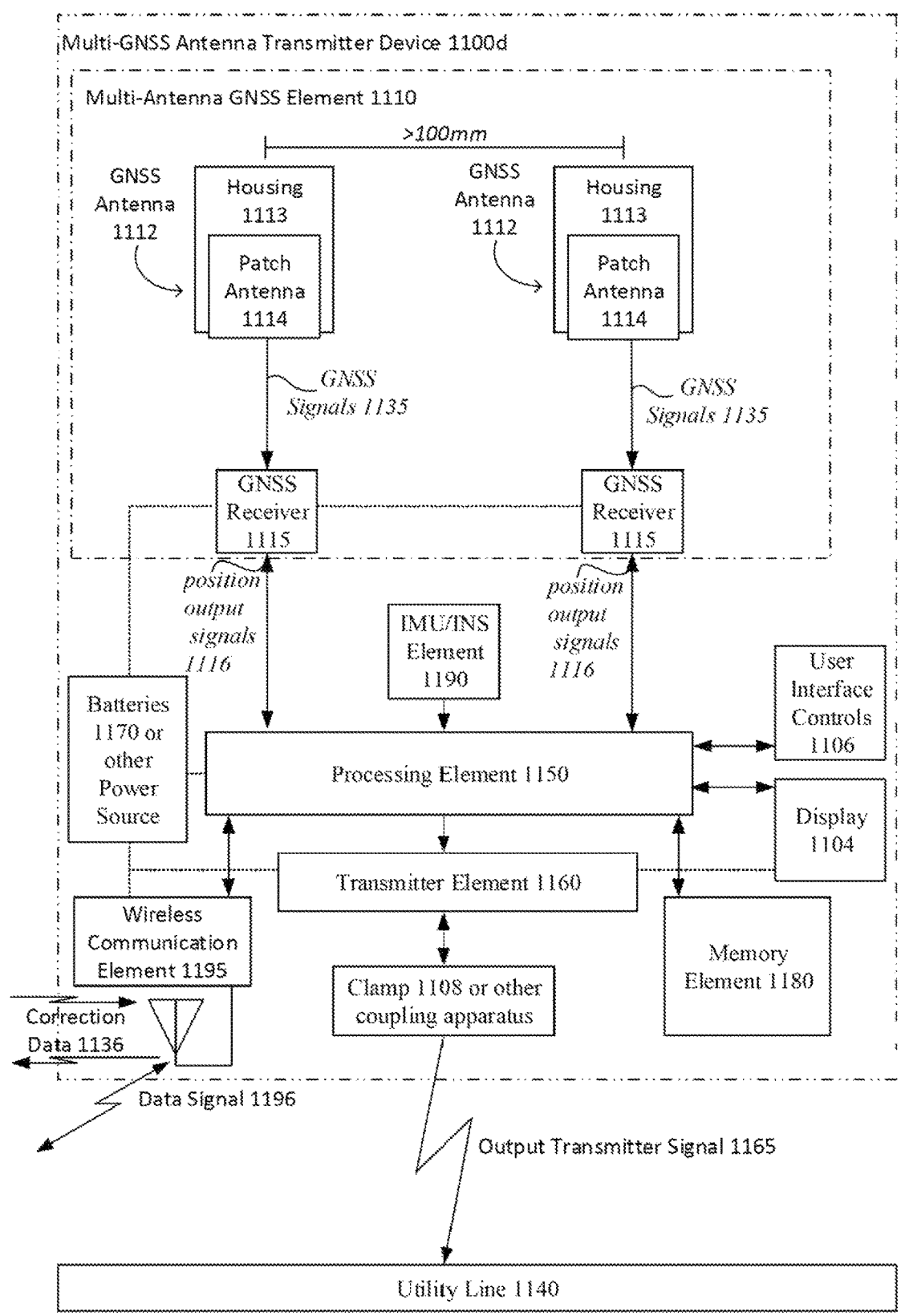
FIG. 11D is an illustration of another multi-antenna utility locator device embodiment.
Figure 11E:
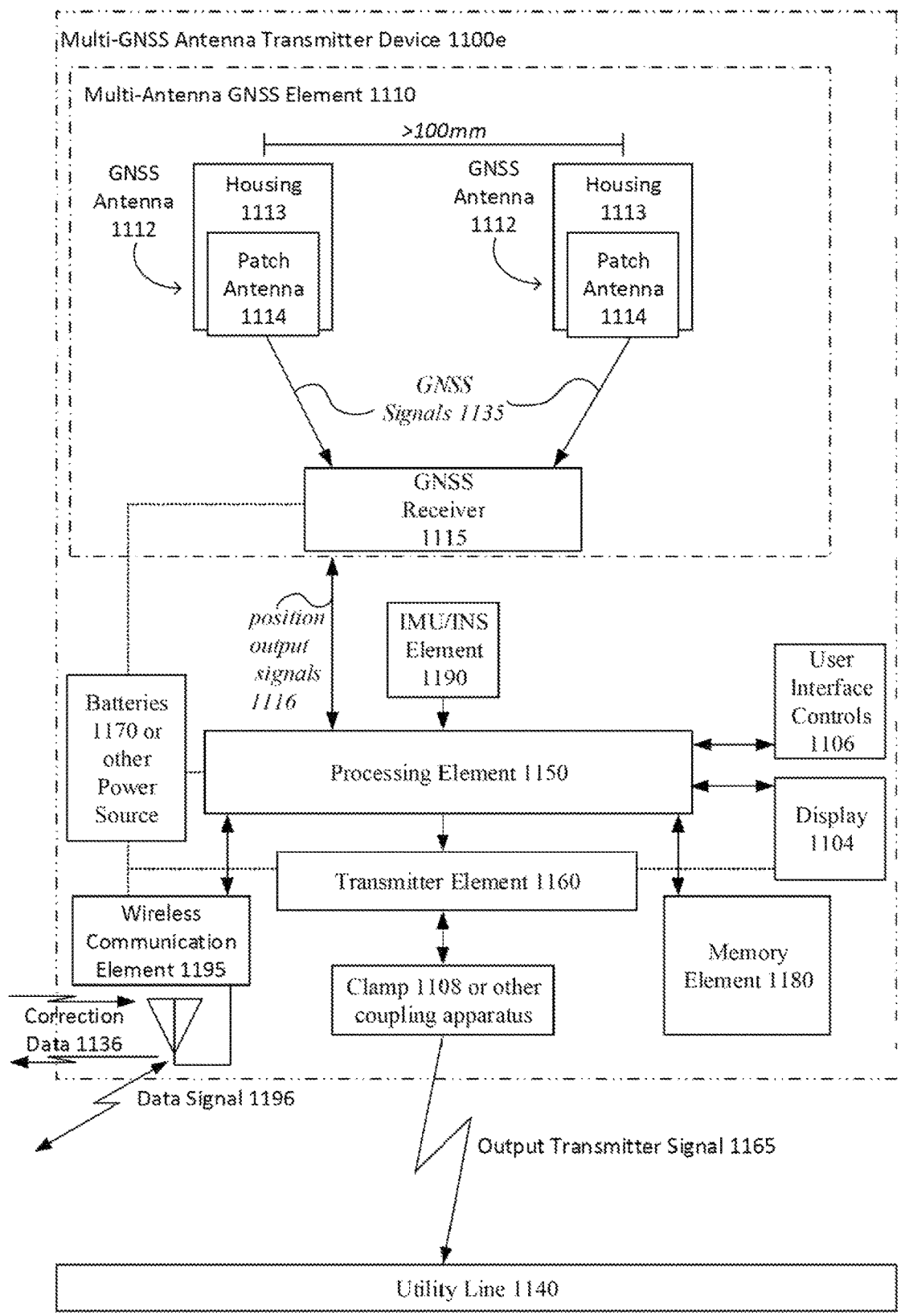
FIG. 11E is an illustration of another multi-antenna utility locator device embodiment.

10E, multi-GNSS antenna transmitter 1100 of FIGS. 11A-11B, multi-GNSS antenna transmitter 1100c of FIG. 11C, multi-GNSS antenna transmitter 1100d of FIG. 11D, or multi-GNSS antenna transmitter 1100e of FIG. 11E.

Further illustrated in FIG. 1B, the multi-GNSS antenna utility locator device 100 may include a processing element 150 comprising one or more processors coupled to the locating antenna node(s) 120 via an analog and/or digital electronic circuitry 124 to receive locating antenna output signals 125. The processing element 150 may further be coupled to the multi-antenna GNSS element 110 to receive position output signals 116a-116d in order to generate data relating to identifying the presence or absence of buried utility lines, such as utility line 140 (FIG. 1A), and corresponding positions thereof in the world frame. The processing element 150 may, for instance, receive position output signals 116a-116d and locating antenna output signals 125 for purposes of processing and compressing the data and/or for making differential corrections to the position output signals 116a-116d data via correction data 136 received at a wireless communication element 195. The multi-GNSS antenna utility locator device 100 may further include a memory element 160 having one or more non-transitory memories for storing data associated with utilities (e.g., magnetic fields 145 and locating antenna output signals 125), and positioning data (e.g., GNSS signals 135 and output signals 116a and 116b). The utility locator device 100 may further include a battery element 170 for supplying electrical power, which may be a battery as described in U.S. Pat. No. 10,090,498, issued Oct. 2, 2018, MODULAR BATTERY PACK APPARATUS, SYSTEMS, AND METHODS INCLUDING VIRAL AND/OR CODE TRANSFER, U.S. patent application Ser. No. 16/140,467, issued Sep. 24, 2018, entitled MODULAR BATTERY PACK APPARATUS, SYSTEMS, AND METHODS INCLUDING VIRAL AND/OR CODE TRANSFER, U.S. patent application Ser. No. 16/520,248, issued Jul. 23, 2019, entitled MODULAR BATTERY PACK APPARATUS, SYSTEMS, AND METHODS INCLUDING VIRAL AND/OR CODE TRANSFER, and U.S. patent application Ser. No. 16/837,923, issued Apr. 1, 2020, entitled MODULAR BATTERY PACK APPARATUS, SYSTEMS, AND METHODS INCLUDING VIRAL AND/OR CODE TRANSFER of the incorporated applications.

Some multi-GNSS antenna utility locator device embodiments in keeping with the present disclosure may optionally include additional sensors and systems for determining position, orientation, and pose. As illustrated in FIG. 1B, the utility locator device 100 is illustrated having an optional IMU/INS element 190 that may include, but should not be limited to, one or more accelerometers, gyroscopic sensors, magnetometers, inertial measurement units (IMU), inertial navigation systems (INS) and/or other like sensors. In some embodiments, the IMU/INS element 190 may include plurality of magnetometers arranged in an array to sense magnetic distortions.

Still referring to FIG. 1B, the utility locator 100 may further include a wireless communication element 195 comprising one or more radio transceivers. The wireless communication element 195 may communicate data with one or more system devices such as, but not limited to, GNSS backpack devices (e.g., the multi-GNSS antenna backpack device 600 of FIGS. 6A-6C, the multi-GNSS antenna backpack device 600d of FIG. 6D, the multi-GNSS antenna backpack device 600e of FIG. 6E, the multi-GNSS antenna backpack device 600f of FIG. 6F, multi-GNSS antenna backpack device 700 of FIGS. 7A-7B, the multi-GNSS antenna backpack device 700c of FIG. 7C, the multi-GNSS antenna backpack device 700d of FIG. 7D, the multi-GNSS antenna backpack device 700e of FIG. 7E, multi-GNSS antenna backpack device 800 of FIGS. 8A-8C, multi-GNSS antenna backpack device 800d of FIG. 8D, multi-GNSS antenna backpack device 800e of FIG. 8E, multi-GNSS antenna backpack device 800f of FIG. 8F) transmitter devices (e.g., the multi-GNSS antenna transmitter device 900 of FIGS. 9A-9C, the multi-GNSS antenna transmitter device 900d of FIG. 9D, the multi-GNSS antenna transmitter device 900e of FIG. 9E, or the multi-GNSS antenna transmitter device 900f of FIG. 9F), vehicle-mounted locating devices (e.g., multi-GNSS antenna vehicle-mounted locating device 1300 of FIGS. 13A-13B, multi-GNSS antenna vehicle-mounted locating device 1300c of FIG. 13C, multi-GNSS antenna vehicle-mounted locating device 1300d of FIG. 13D, multi-GNSS antenna vehicle-mounted locating device 1300e of FIG. 13E, multi-GNSS antenna vehicle-mounted locating device 1400 of FIGS. 14A-14B, multi-GNSS antenna vehicle-mounted locating device 1400c of FIG. 14C, multi-GNSS antenna vehicle-mounted locating device 1400d of FIG. 14D, multi-GNSS antenna vehicle-mounted locating device 1400e of FIG. 14E, multi-GNSS antenna vehicle-mounted locating device 1500 of FIGS. 15A-15B, multi-GNSS antenna vehicle-mounted locating device 1500c of FIG. 15C, multi-GNSS antenna vehicle-mounted locating device 1500d of FIG. 15D, and multi-GNSS antenna vehicle-mounted locating device 1500e of FIG. 15E), other computing devices (e.g., remote databases, laptop, smart phone, or the like), and/or the like. The wireless communication element 195 may, for example, be or include cellular, Bluetooth, ISM, Wi-Fi, or like wireless transceivers. The wireless communication elements 195 may further receive correction data 136 from one or more base stations 132 to perform RTK, SSR, or like differential corrections to position output signals 116a-116d data.

As further illustrated in FIG. 1C, the geometry of the GNSS antennas 112a and 112b placement may place the GNSS antennas 112a and 112b above the horizontal plane of the locator head 102 containing display 104, user input controls 106, and other internal electronics as well as the handle 108 by which user 180 may grip the multi-GNSS antenna utility locator device 100, and battery element 170 providing a clear and unobstructed path towards the sky and satellite navigation signals to the extent possible.

As further illustrated in FIG. 1D, the GNSS antennas 112a and 112b may additionally be positioned on the locator head 102 as far away from the user 180 as possible such that the body of user 180 may interfere as little as possible with receiving the GNSS signals 135 from navigation satellites 130 (FIG. 1A). Further, the spacing of GNSS antennas 112a and 112b on either side of the multi-GNSS antenna utility locator device 100 may aid in preventing the user 180 from obstructing GNSS signals 135 emanating from behind the user 180 at both GNSS antennas 112a and 112b simultaneously regardless of the handedness of user 180.

The multi-GNSS antenna utility locator devices of the present disclosure may have different GNSS antenna types or form factors. For example, embodiments in keeping with the present disclosure may have helical, patch, or other configurations of GNSS antennas that may be dual or triple band antennas or, in some embodiments, GNSS antennas configured for other signal bands.

Figure 2A:
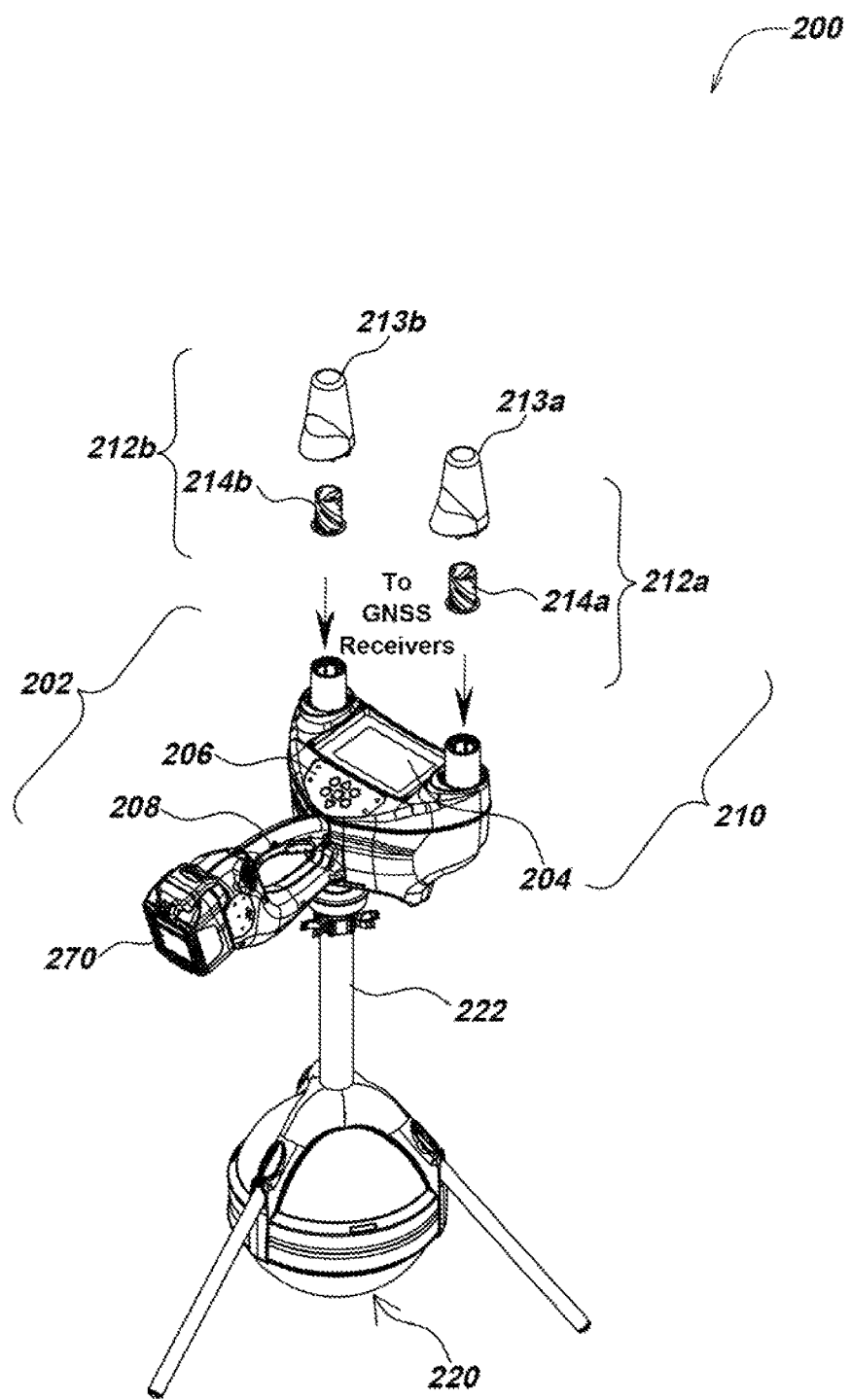
FIG. 2A is an isometric view of a multi-antenna utility locator device with partially exploded GNSS antennas revealing helical antennas.
Figure 2B:
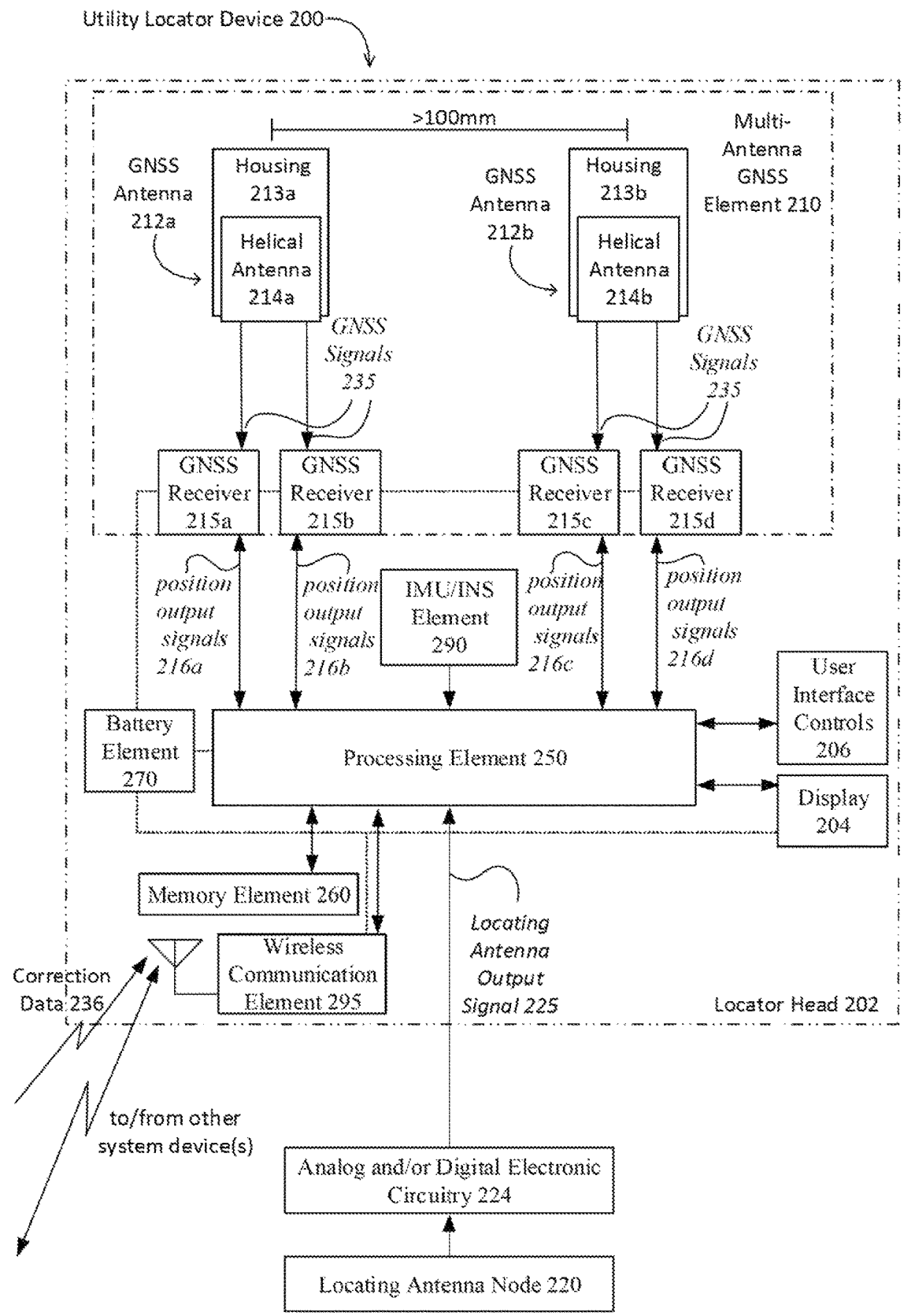
FIG. 2B is a diagram of the multi-antenna utility locator device of FIG. 2A.

As illustrated in FIGS. 2A and 2B, a multi-GNSS antenna utility locator device 200 is illustrated which may be or share aspects with the utility locator device 100 of FIGS. 1A-1D having GNSS antennas 212a and 212b illustrated as partially exploded. The multi-GNSS antenna utility locator device 200 may include a locator head 202 which may house electronics associated with the methods and functions of the present disclosure as well as a display 204 to communicate information to a user, user input controls 206, and a handle 208 (FIG. 2A) by which the utility locator device 200 may be carried. The locator head 202 may further include a multi-antenna GNSS element 210 in keeping with the present disclosure. The multi-antenna GNSS element 210 may include two GNSS antennas 212*a* and 212*b* separated by 100 mm or more. Each GNSS antenna 212*a* and 212*b* may include a housing 213*a*/213*b* encapsulating a helical antenna 214*a*/214*b*, respectively.

It should be noted that a splitter may be present in some embodiments where distributing of GNSS signals from a single GNSS antenna to a plurality of GNSS receivers may occur such as the multi-GNSS antenna utility locator device 200 of FIG. 2B. Though such a splitter may be implied to practitioners of the art, the multi-GNSS antenna utility locator device 200*c* of FIG. 2C is illustrated with a splitter 299 for clarity. The splitter 299 may be or share aspects with the splitter 199 of FIGS. 1E and 1H or other splitter configuration for distributing of GNSS signals to GNSS receivers.

Turning to FIG. 2B, each helical antenna 214*a* and 214*b* may couple to one or more GNSS receivers 215*a*-215*d* to produce position output signals 216*a*-216*d*. The utility locator device 200 may include a processing element 250 comprising one or more processors coupled to the locating antenna node(s) 220 via an analog and/or digital electronic circuitry 224 to receive locating antenna output signals 225. The processing element 250 may further be coupled to the multi-antenna GNSS element 210 to receive position output signals 216*a*-216*d* in order to generate data relating to identifying the presence or absence of buried utility lines, such as utility line 240 (FIG. 2A), and corresponding positions thereof in the world frame. The processing element 250 may, for instance, receive position output signals 216*a*-216*d* and locating antenna output signals 225 for purposes of processing and compressing the data and/or for making differential corrections to the position output signals 216*a*-216*d* data via correction data 236 received at a wireless communication element 295. The multi-GNSS antenna utility locator device 200 may further include a memory element 260 having one or more non-transitory memories for storing data associated with utilities, and positioning data. The utility locator device 200 may further include a battery element 270 for supplying electrical power. The utility locator device 200 is illustrated having an optional IMU/INS element 290 that may include, but should not be limited to, one or more accelerometers, gyroscopic sensors, magnetometers, inertial measurement units (IMU), inertial navigation systems (INS) and/or other like sensors. In some embodiments, the magnetometers may be arranged in an array to sense magnetic distortions.

Still referring to FIG. 2B, the utility locator 200 may further include a wireless communication element 295 comprising one or more radio transceivers. The wireless communication element 295 may communicate data with one or more system devices, other computing devices (e.g., remote databases, laptop, smart phone, or the like), and/or the like. The wireless communication element 295 may, for example, be or include cellular, Bluetooth, ISM, Wi-Fi, or like wireless transceivers. The wireless communication elements 295 may further receive correction data 236 from one or more base stations to perform RTK, SSR, or like differential corrections to position output signals 216*a*-216*d* data.

It should be noted that in FIG. 2B, a pair of GNSS receivers 215*a*/215*b* and 215*c*/215*d* may each couple to a single GNSS antenna 212*a* or 212*b* in the multi-GNSS antenna utility locator device 200. In other embodiments, other multi-GNSS antenna utility locator device embodiments may have other numbers of GNSS antennas and GNSS receivers in various other configurations. Some such embodiments are illustrated with the GNSS antennas 212 and GNSS receivers 215 of the multi-GNSS antenna utility locator device embodiments 200*d* and 200*e* illustrated in FIGS. 2D and 2E.

Figure 2C:
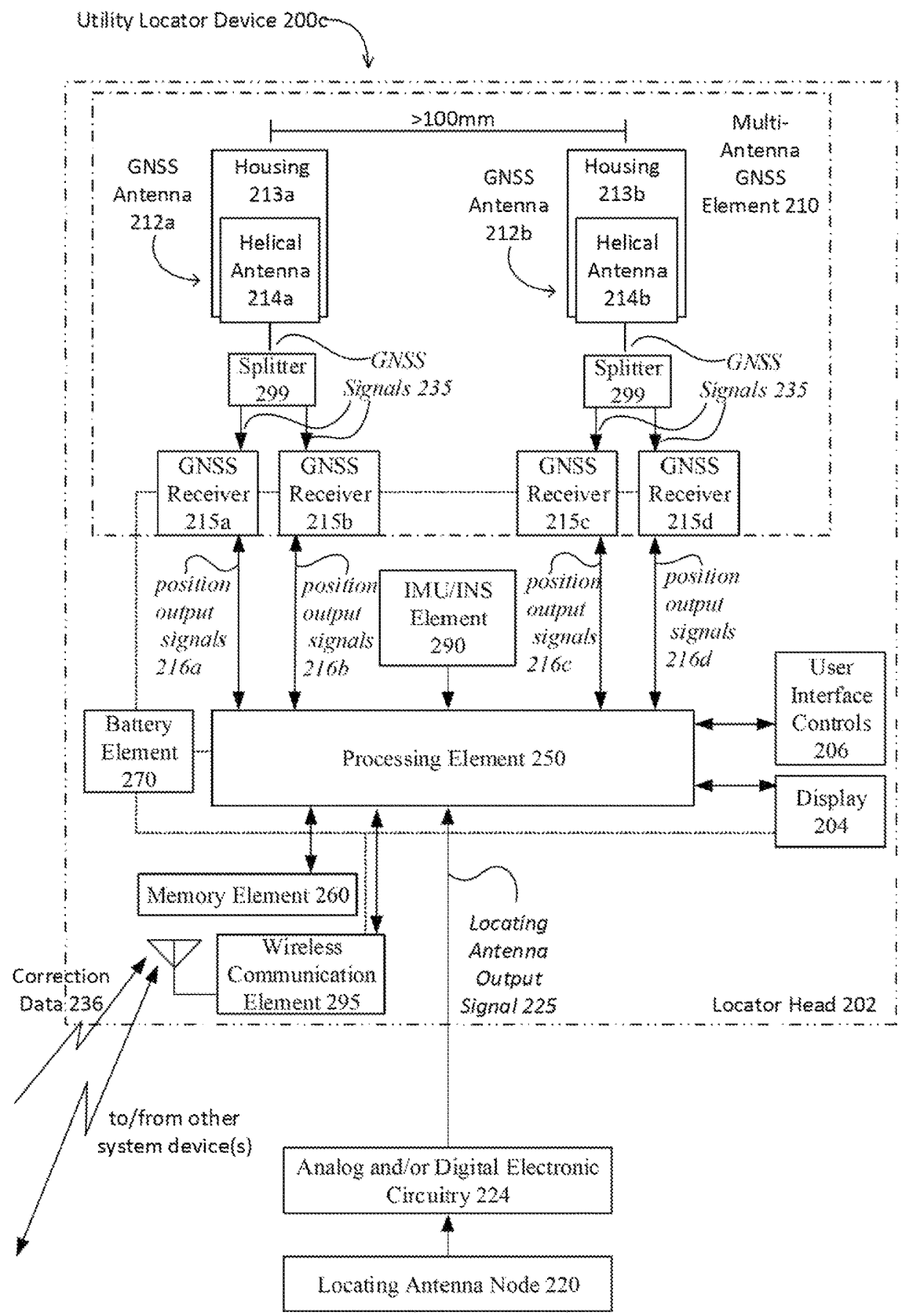
FIG. 2C is an illustration of a multi-antenna utility locator device further showing a splitter.
Figure 2D:
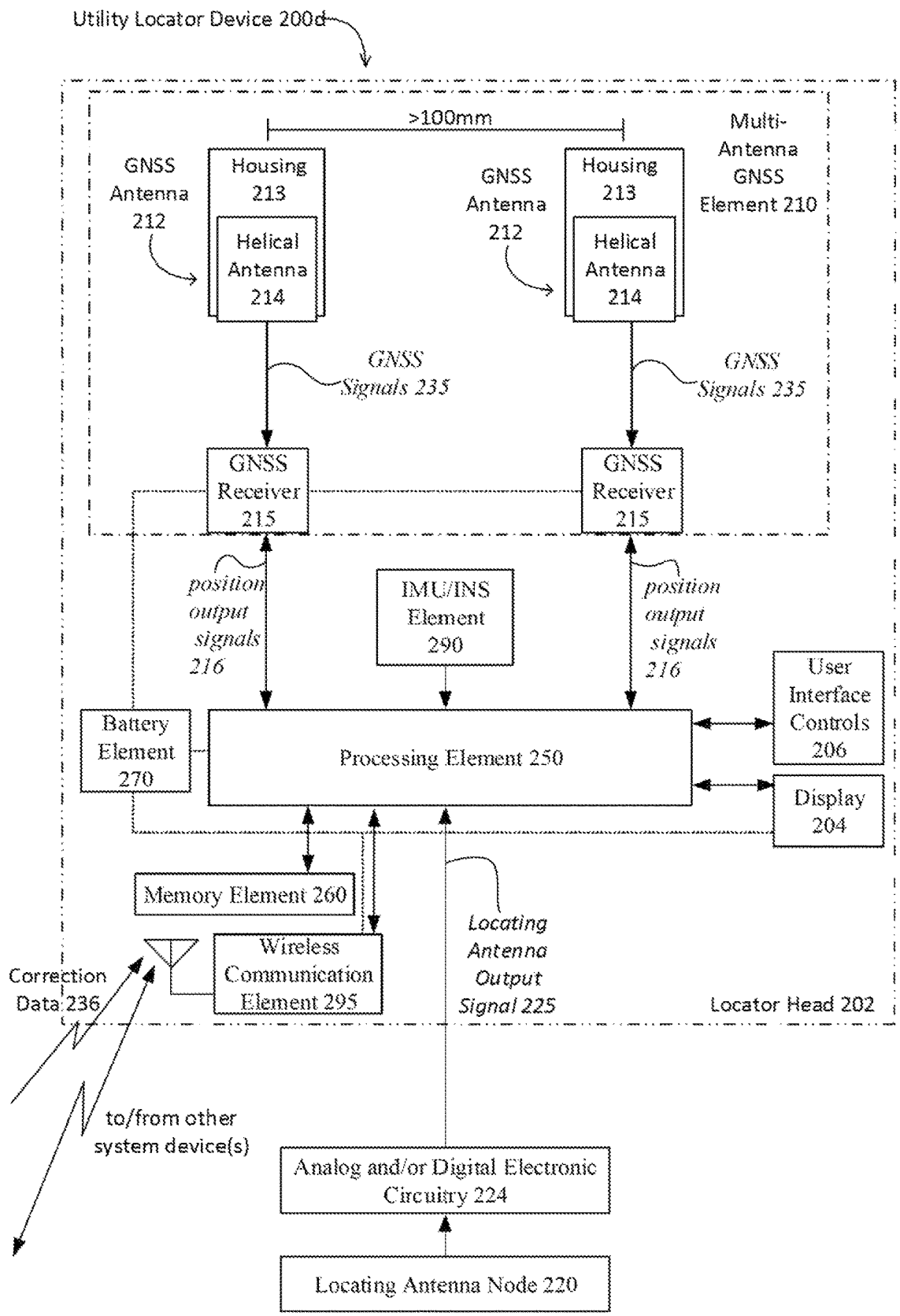
FIG. 2D is an illustration of another multi-antenna utility locator device embodiment.

As illustrated in FIG. 2D, for instance, the multi-GNSS antenna utility locator device 200*d* may include a single GNSS antennas 212 coupled to each individual GNSS receivers 215. The GNSS receivers 215 may be dual or triple band receivers. Likewise, the GNSS antennas 212 and GNSS receivers 215 may be configured for the L1, L2, and L5 GPS bands and/or other signal bands. In the multi-GNSS antenna utility locator device 200*d*, a GNSS signal 235 may be communicated from each GNSS antenna 212 to an individually coupled one of the GNSS receivers 215. Each of the GNSS receivers 215 may further communicate position output signals 216 to a processing element 250.

Figure 2E:
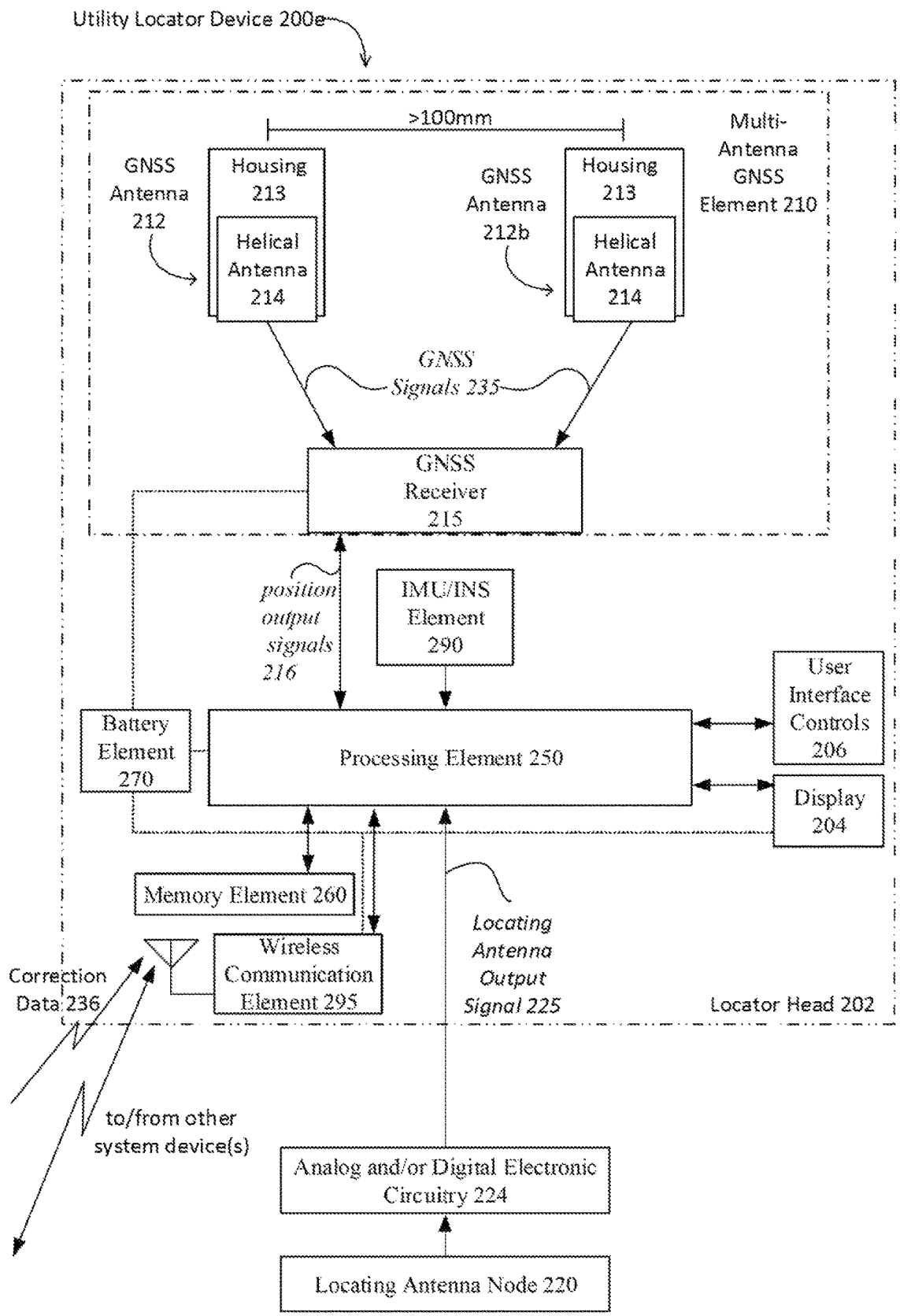
FIG. 2E is an illustration of another multi-antenna utility locator device embodiment.

In yet further embodiments, such as the multi-GNSS antenna utility locator device 200*e* of FIG. 2E, multiple GNSS antennas 212 may couple to one GNSS receivers 215. The GNSS receivers 215 may be dual or triple band receivers. Likewise, the GNSS antennas 212 and GNSS receivers 215 may be configured for the L1, L2, and L5 GPS bands and/or other signal bands. In some such embodiments, a GNSS receiver configured for use with multiple GNSS antennas may be a multi-input GNSS receiver that provides a measure of pose (pitch, roll, heading, or like orientation measurements) such as the mosaic-H GNSS receiver commercially available from Septentrio.

Figure 3A:
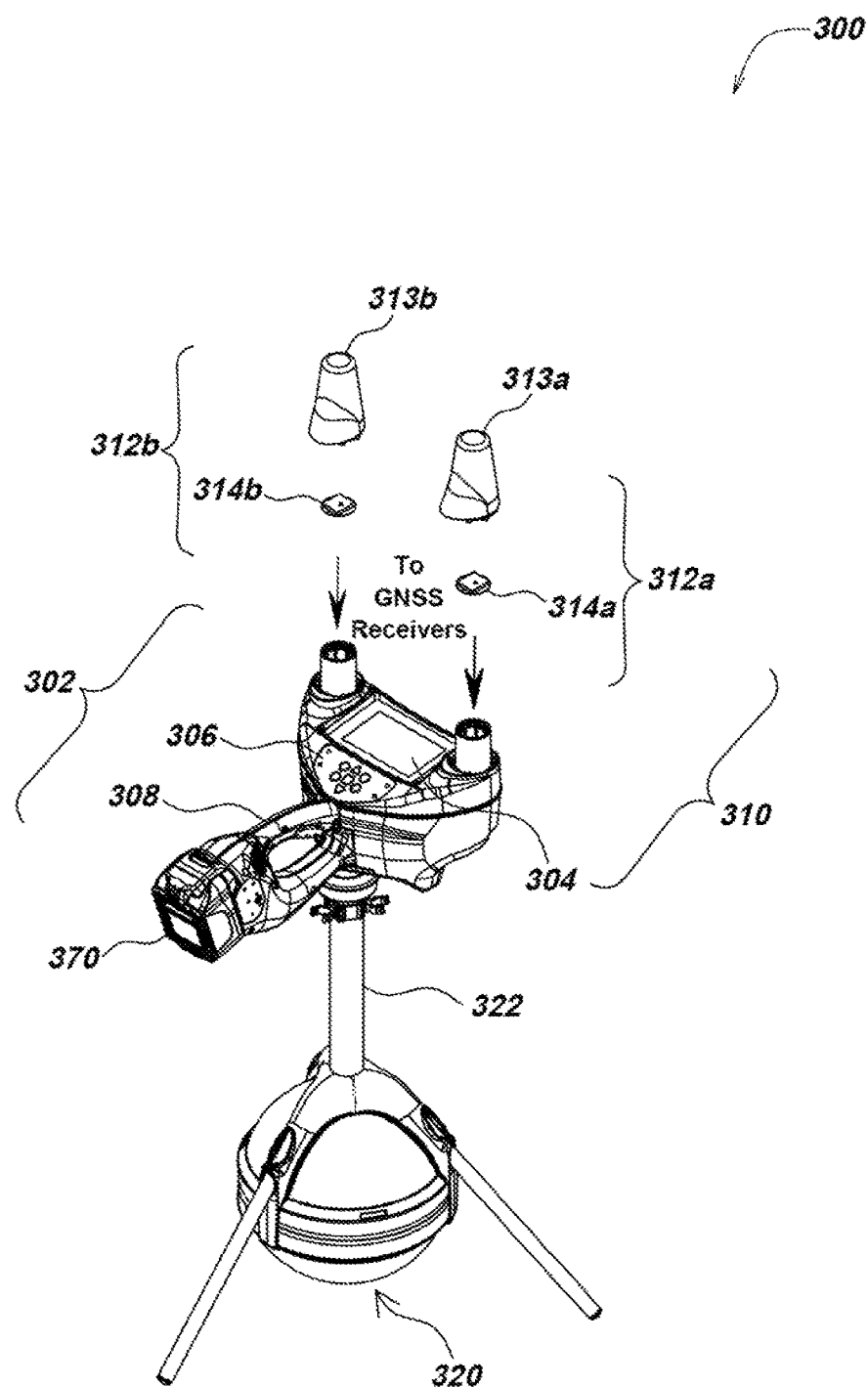
FIG. 3A is an isometric view of a multi-antenna utility locator device with partially exploded GNSS antennas revealing patch antennas.
Figure 3B:
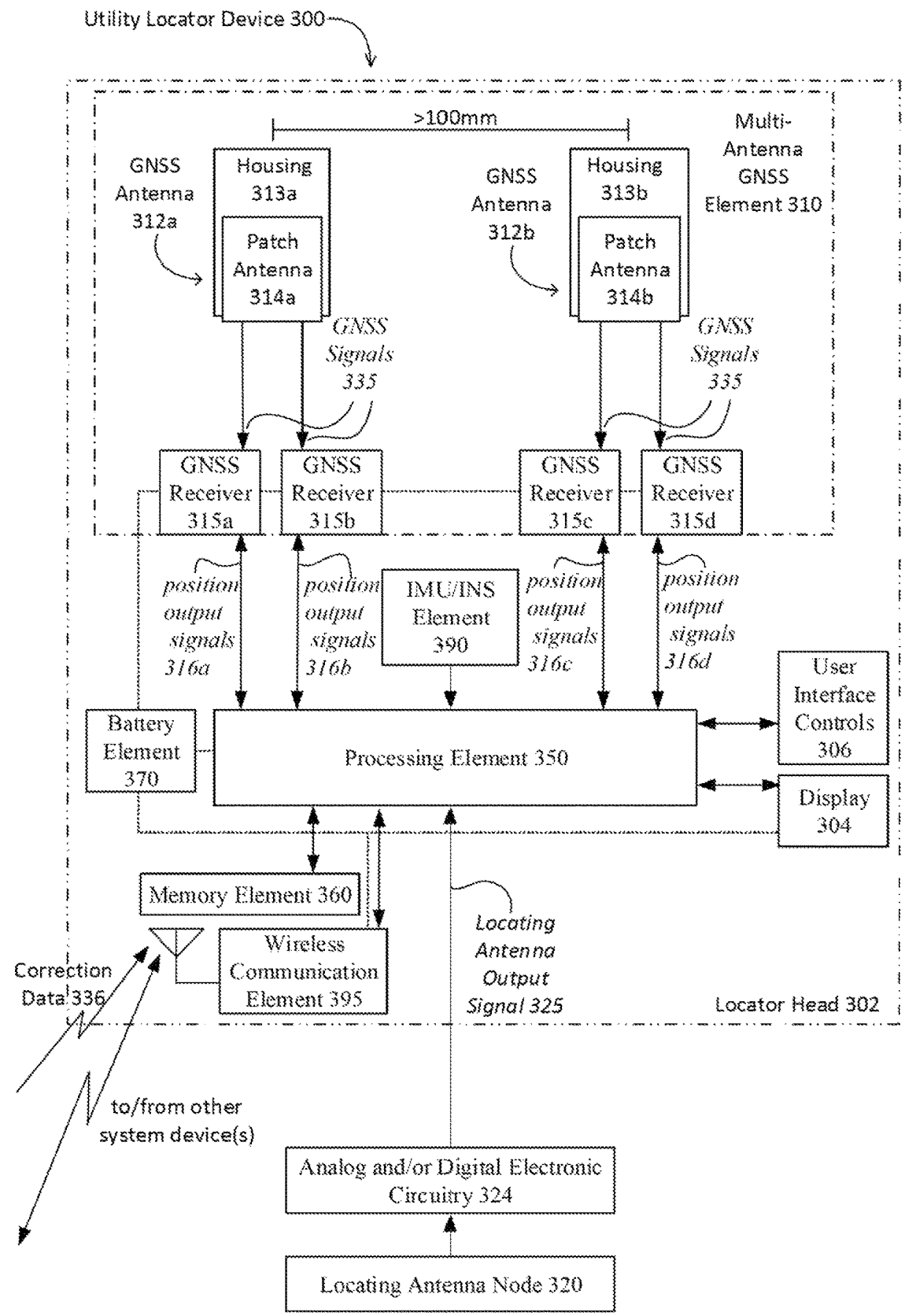
FIG. 3B is a diagram of the multi-antenna utility locator device of FIG. 3A.

As illustrated in FIGS. 3A and 3B, a utility locator device 300 is illustrated which may be or share aspects with the multi-GNSS antenna utility locator device 100 of FIGS. 1A—ID, having GNSS antennas 312*a* and 312*b* partially exploded. The utility locator device 300 may include a locator head 302 which may house electronics associated with the methods and functions of the present disclosure as well as a display 304 to communicate information to a user, user input controls 306, and other internal electronics as well as a handle 308 by which the utility locator device 300 may be carried. The locator head 302 may further include a multi-antenna GNSS element 310 in keeping with the present disclosure. The multi-antenna GNSS element 310 may include two GNSS antennas 312*a* and 312*b* which may be separated by 100 mm or more. Each GNSS antenna 312*a*/312*b* may include a housing 313*a*/313*b* encapsulating a patch antenna 314*a*/314*b*, respectively.

Figure 3C:
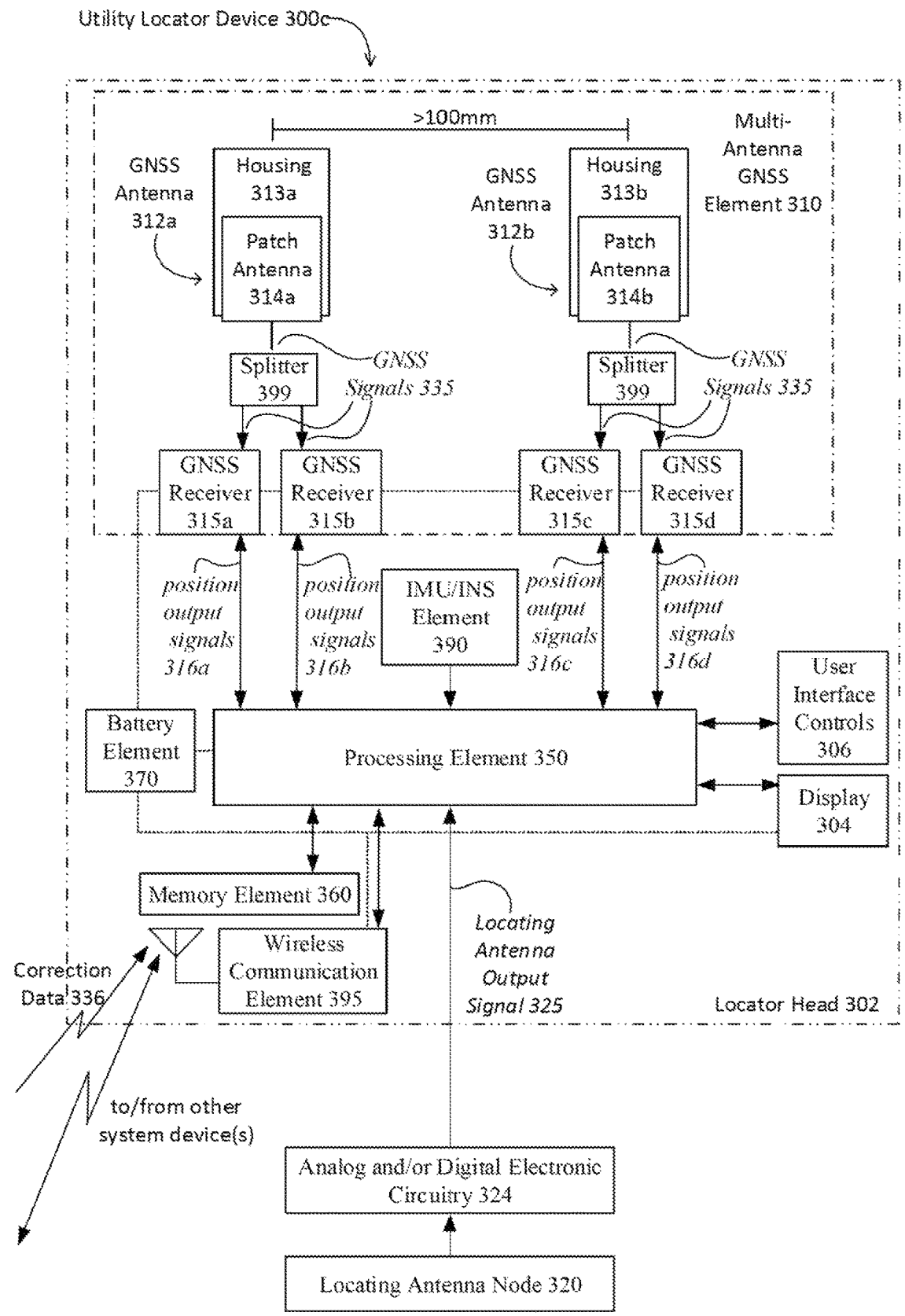
FIG. 3C is an illustration of a multi-antenna utility locator device further showing a splitter.

It should be noted that a splitter may be present in some embodiments where distributing of GNSS signals from a single GNSS antenna to a plurality of GNSS receivers may occur such as the multi-GNSS antenna utility locator device 300 of FIG. 3B. Though such a splitter may be implied to practitioners of the art, the multi-GNSS antenna utility locator device 300*c* of FIG. 3C is illustrated with a splitter 399 for clarity. The splitter 399 may be or share aspects with the splitter 199 of FIGS. 1E and 1H or other splitter configuration for distributing of GNSS signals to GNSS receivers.

Turning to FIG. 3B, each patch antenna 314*a* and 314*b* may couple to one or more GNSS receivers 315*a*-315*d* to generate position output signals 316*a*-316*d*. The utility locator device 300 may include a processing element 350 comprising one or more processors coupled to the locating antenna node(s) 320 via an analog and/or digital electronic circuitry 324 to receive locating antenna output signals 325. The processing element 350 may further be coupled to the multi-antenna GNSS element 310 to receive position output signals 316a-316d in order to generate data relating to identifying the presence or absence of buried utility lines, such as utility line 340 (FIG. 3A), and corresponding positions thereof in the world frame. The processing element 350 may, for instance, receive position output signals 316a-316d and locating antenna output signals 325 for purposes of processing and compressing the data and/or for making differential corrections to the position output signals 316a-316d data via correction data 336 received at a wireless communication element 395. The multi-GNSS antenna utility locator device 300 may further include a memory element 360 having one or more non-transitory memories for storing data associated with utilities, and positioning data. The utility locator device 300 may further include a battery element 370 for supplying electrical power. The utility locator device 300 is illustrated having an optional IMU/INS element 390 that may include, but should not be limited to, one or more accelerometers, gyroscopic sensors, magnetometers, inertial measurement units (IMU), inertial navigation systems (INS) and/or other like sensors. In some embodiments, the magnetometers may be arranged in an array to sense magnetic distortions.

Still referring to FIG. 3B, the utility locator 300 may further include a wireless communication element 395 comprising one or more radio transceivers. The wireless communication element 395 may communicate data with one or more system devices, other computing devices (e.g., remote databases, laptop, smart phone, or the like), and/or the like. The wireless communication element 395 may, for example, be or include cellular, Bluetooth, ISM, Wi-Fi, or like wireless transceivers. The wireless communication elements 395 may further receive correction data 336 from one or more base stations to perform RTK, SSR, or like differential corrections to position output signals 316a-316d data.

It should be noted that in FIG. 3B, a pair of GNSS receivers 315a/315b and 315c/315d may couple to a single GNSS antenna 312a or 312b in the multi-GNSS antenna utility locator device 300. In other embodiments, a multi-GNSS antenna utility locator device in keeping with the present disclosure may have other numbers of GNSS antennas and GNSS receivers in various other configurations. Some such configurations are illustrated with the GNSS antennas 312 and GNSS receivers 315 of the multi-GNSS antenna utility locator device embodiments 300d and 300e illustrated in FIGS. 3D and 3E.

Figure 3D:
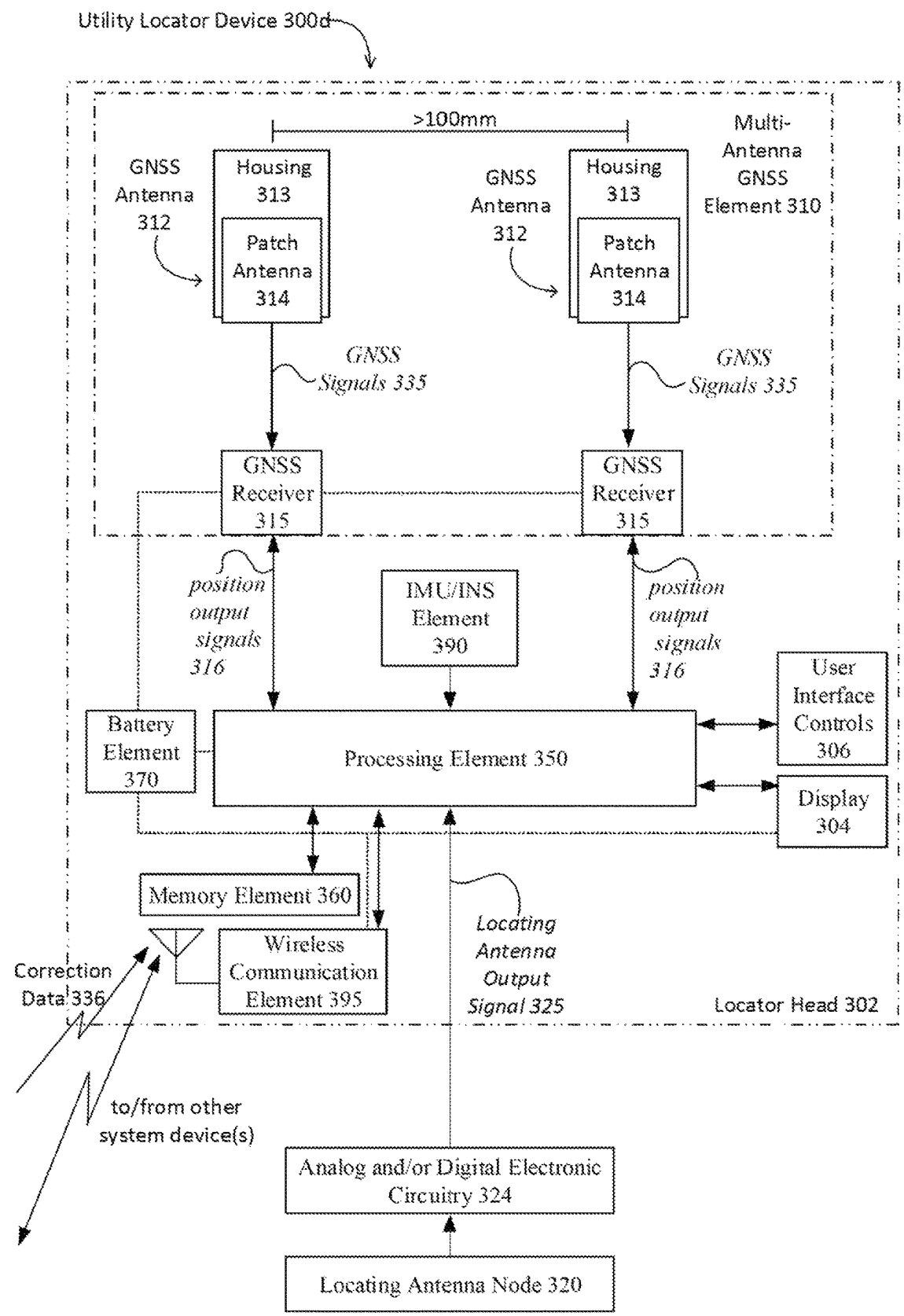
FIG. 3D is an illustration of another multi-antenna utility locator device embodiment.

As illustrated in FIG. 3D, for instance, the multi-GNSS antenna utility locator device 300d may include a single GNSS antennas 312 coupled to each individual GNSS receivers 315. The GNSS receivers 315 may be dual or triple band receivers. Likewise, the GNSS antennas 312 and GNSS receivers 315 may be configured for the L1, L2, and L5 GPS bands and/or other signal bands. In the multi-GNSS antenna utility locator device 200c, a GNSS signal 335 may be communicated from each GNSS antenna 312 to an individually coupled one of the GNSS receivers 315. Each of the GNSS receivers 315 may further communicate position output signals 316 to a processing element 350.

Figure 3E:
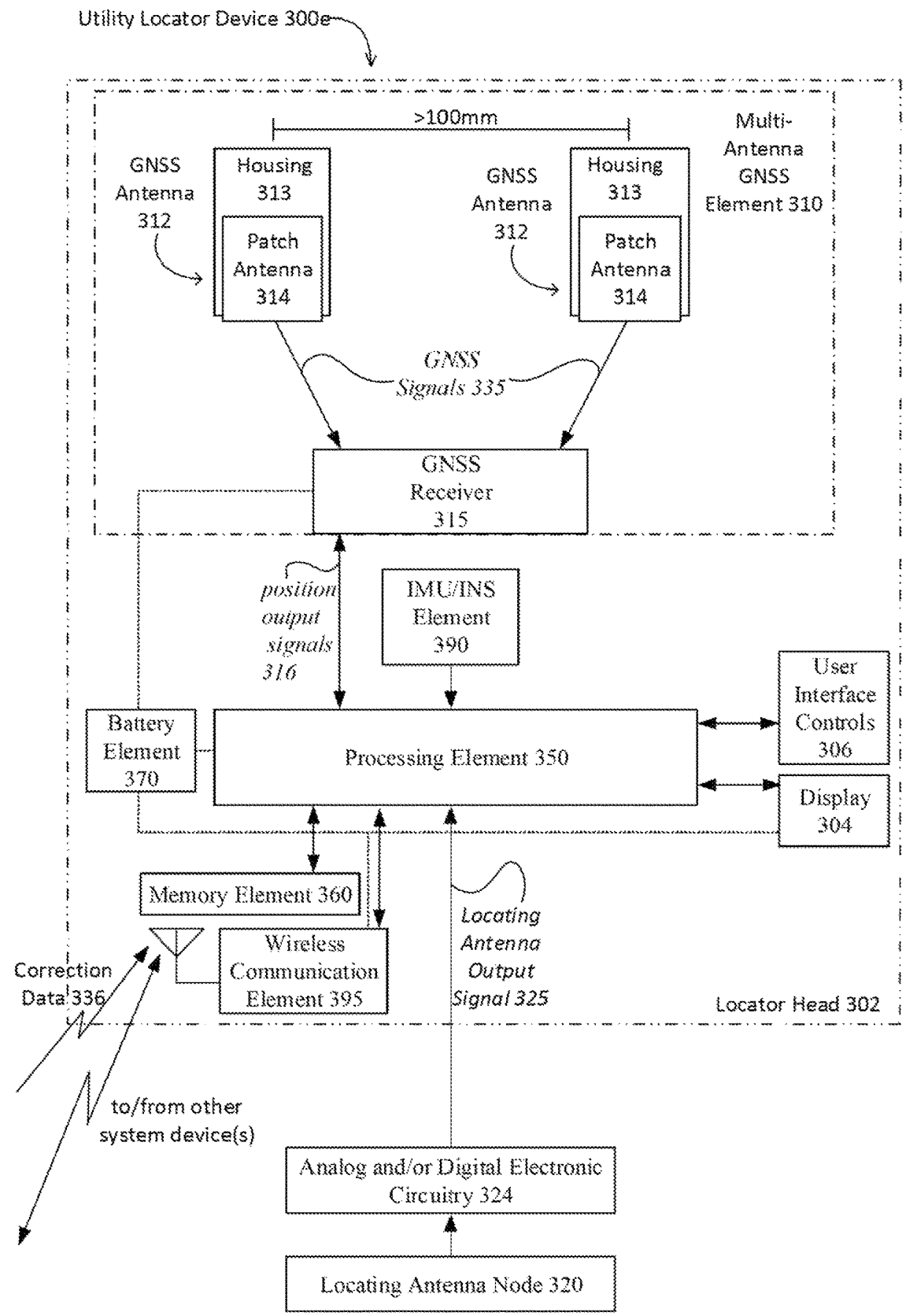
FIG. 3E is an illustration of another multi-antenna utility locator device embodiment.

In yet further embodiments, such as the multi-GNSS antenna utility locator device 300e of FIG. 3E, multiple GNSS antennas 312 may couple to one GNSS receivers 315. The GNSS receivers 315 may be dual or triple band receivers. Likewise, the GNSS antennas 312 and GNSS receivers 315 may be configured for the L1, L2, and L5 GPS bands and/or other signal bands. In some such embodiments, a GNSS receiver configured for use with multiple GNSS antennas may be a multi-input GNSS receiver that provides a measure of pose (pitch, roll, heading, or like orientation measurements) such as the mosaic-H GNSS receiver commercially available from Septentrio.

The two or more spaced apart GNSS antennas of multi-GNSS antenna utility locator devices of the present disclosure may be used to determine the heading and/or tilt/pose of the utility locator devices.

Figure 1H:
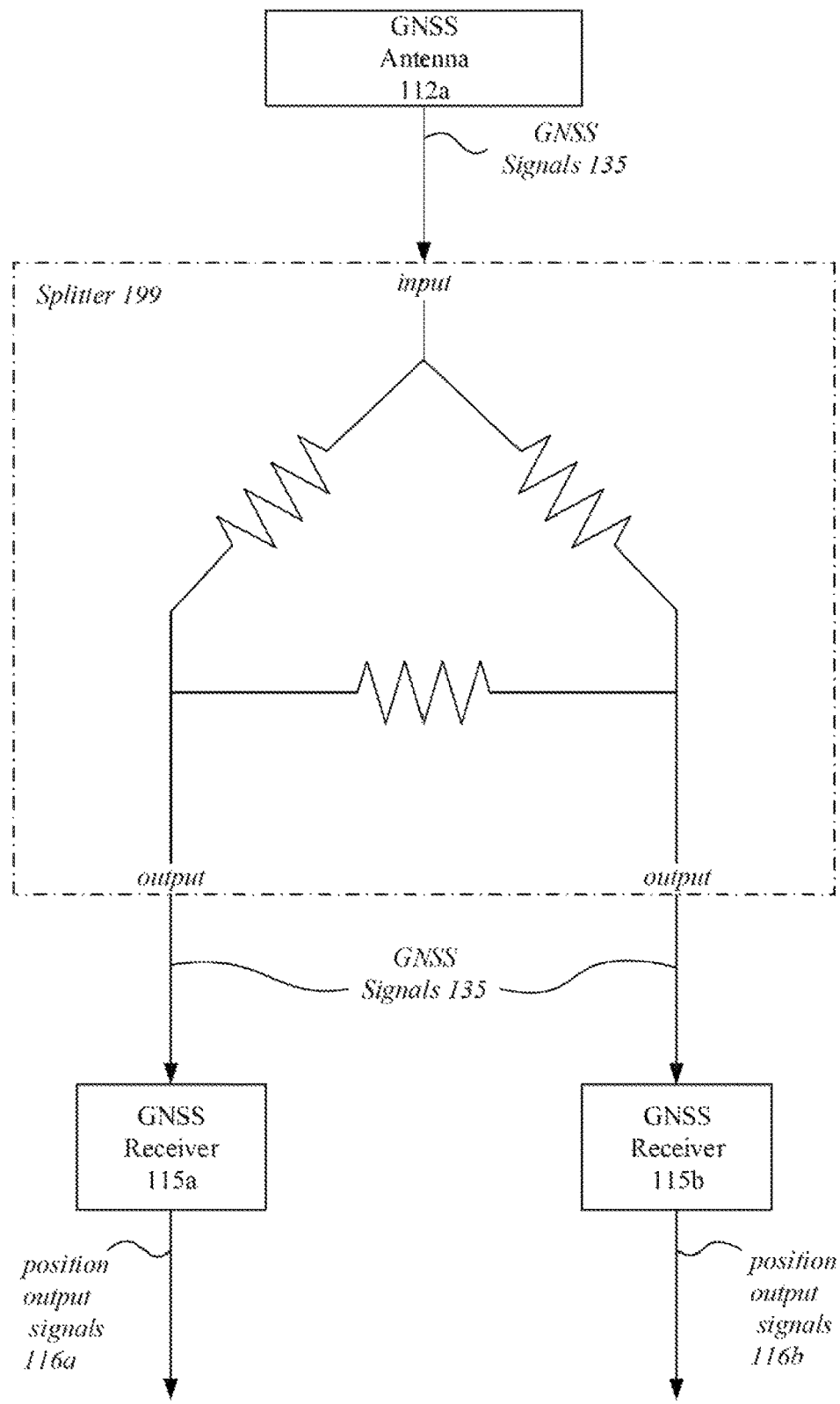
FIG. 1H is an illustration of a multi-antenna utility locator device further showing a splitter.
Figure 4A:
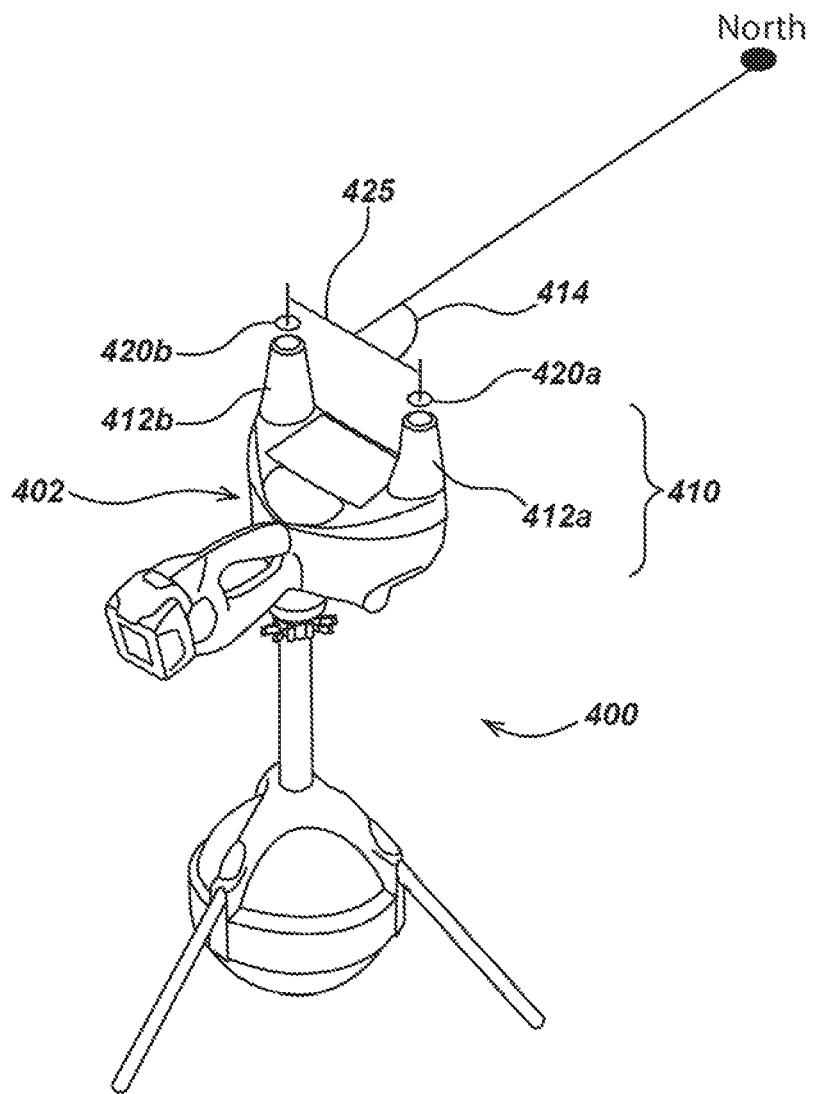
FIG. 4A is an illustration of using the multi-antenna GNSS element of a multi-antenna utility locator device to determine heading.
Figure 4B:
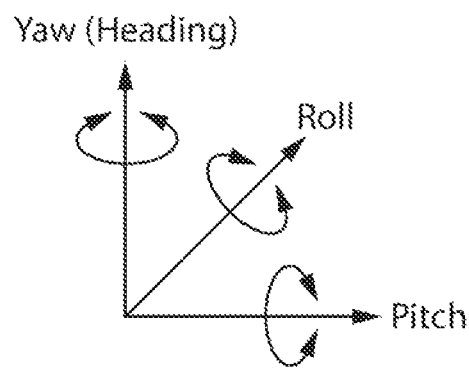
FIG. 4B is an illustration of using the multi-antenna GNSS element of a multi-antenna utility locator device to determine tilt/pose.
Figure 4B:
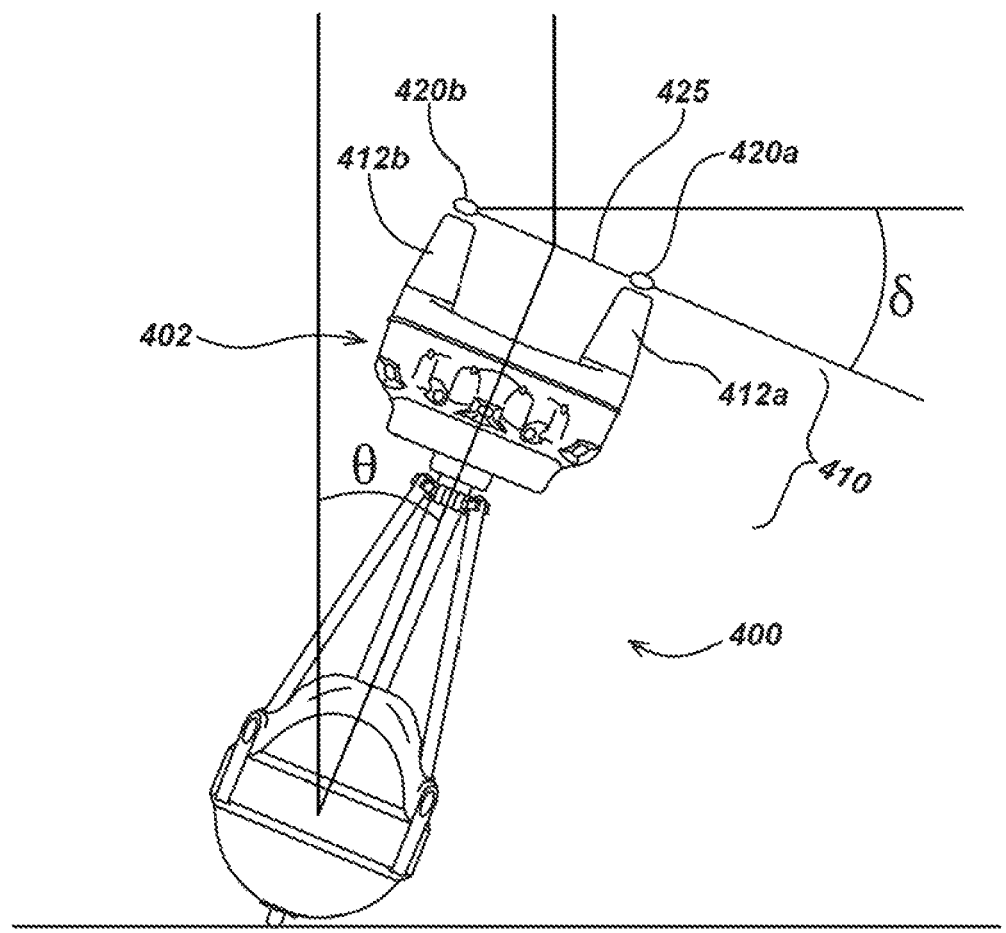

As illustrated in FIGS. 4A and 4B, a multi-GNSS antenna utility locator device 400 may be or share aspects with the multi-GNSS antenna utility locator device 100 of FIGS. 1A-1D, multi-GNSS antenna utility locator device 100e of FIG. 1E, multi-GNSS antenna utility locator device 100f of FIG. 1G, multi-GNSS antenna utility locator device 100h of FIG. 1H, multi-GNSS antenna utility locator device 200 of FIGS. 2A-2B, multi-GNSS antenna utility locator device 200c of FIG. 2C, multi-GNSS antenna utility locator device 200d of FIG. 2D, multi-GNSS antenna utility locator device 200e of FIG. 2E, multi-GNSS antenna utility locator device 300 of FIGS. 3A-3B, multi-GNSS antenna utility locator device 300c of FIG. 3C, multi-GNSS antenna utility locator device 300d of FIG. 3D, or multi-GNSS antenna utility locator device 300e of FIG. 3E. Utility locator device 400 may include a locator head 402 including a multi-antenna GNSS element 410. The multi-antenna GNSS element 410 may include GNSS antennas 412a and 412b spaced apart by at least 100 millimeters. Other multi-antenna GNSS element embodiments may include different numbers of GNSS antennas. In FIGS. 4A and 4B, each GNSS antenna 412a/412b may generate at least one position estimate 420a/420b with a baseline 425 formed in between pairs of position estimates 420a/420b. It should be noted that in some embodiments, such as those having multiple GNSS receivers coupled at each GNSS antenna (e.g., the multi-GNSS antenna utility locator device 100 of FIGS. 1A-1D), more than one position estimate may be determined corresponding to a single GNSS antenna such that more than one baseline may be formed between pairs of position estimates. For instance, in those embodiments having multiple GNSS receivers coupled at each GNSS antenna, each GNSS receiver may independently produce at least one estimate of position. There may therefore be multiple position estimates associated with each GNSS antenna. In such embodiments, the device may be configured to determine which position estimates to use through some metric of position accuracy (e.g., through some error statistic, best fit modeling or the like).

FIG. 4A illustrates the utility locator device 400 being used to determine heading via GNSS or satellite compassing techniques. As illustrated, a baseline 425 may be formed between the position estimates 420a/420b which may be representative or estimative of the relative displacements between the GNSS antennas 412a/412b in the common rigid body frame of the multi-GNSS antenna utility locator device 400. A heading angle 414 towards true north may be calculated relative to baseline 425 between position estimates 420a/420b allowing a heading for the utility locator device 400 to be determined. Such a method for determining heading may be further described in method 500 of FIG. 5A.

FIG. 4B illustrates the utility locator device 400 being used to determine tilt/pose. As illustrated, each position estimate 420a/420b may be in three dimensions. Having a known baseline 425 measurement and position estimates 420a/420b in three dimensions relative to the rigid body frame of the multi-GNSS antenna utility locator device 400, the degree and direction of yaw (or heading) and roll type tilt or pose may be determined. For instance, an angle δ measurement from the horizontal orientation of GNSS antennas 412a and 412b as expressed through corresponding position estimates 420a and 420b may be used to determine a tilt angle θ measurement in both degree and direction from the upright vertical orientation of the multi-GNSS antenna utility locator device 400 during normal usage. In some embodiments having one or more additional sensors and systems for determining position and orientation/pose such as the IMU/INS 190 in the utility locator device 100 of FIG. 1B, pitch type pose or tilt may also be determined. Such a method for determining tilt/pose may be described in method 530 of FIG. 5B. In further utility locator devices or other utility locating devices that include three or more GNSS antennas and associated GNSS receivers, pitch type pose or tilt may also be determined without the need for additional sensors and systems for determining position and orientation/pose. Such a method for determining tilt/pose may be described in method 560 of FIG. 5C.

Figure 5A:
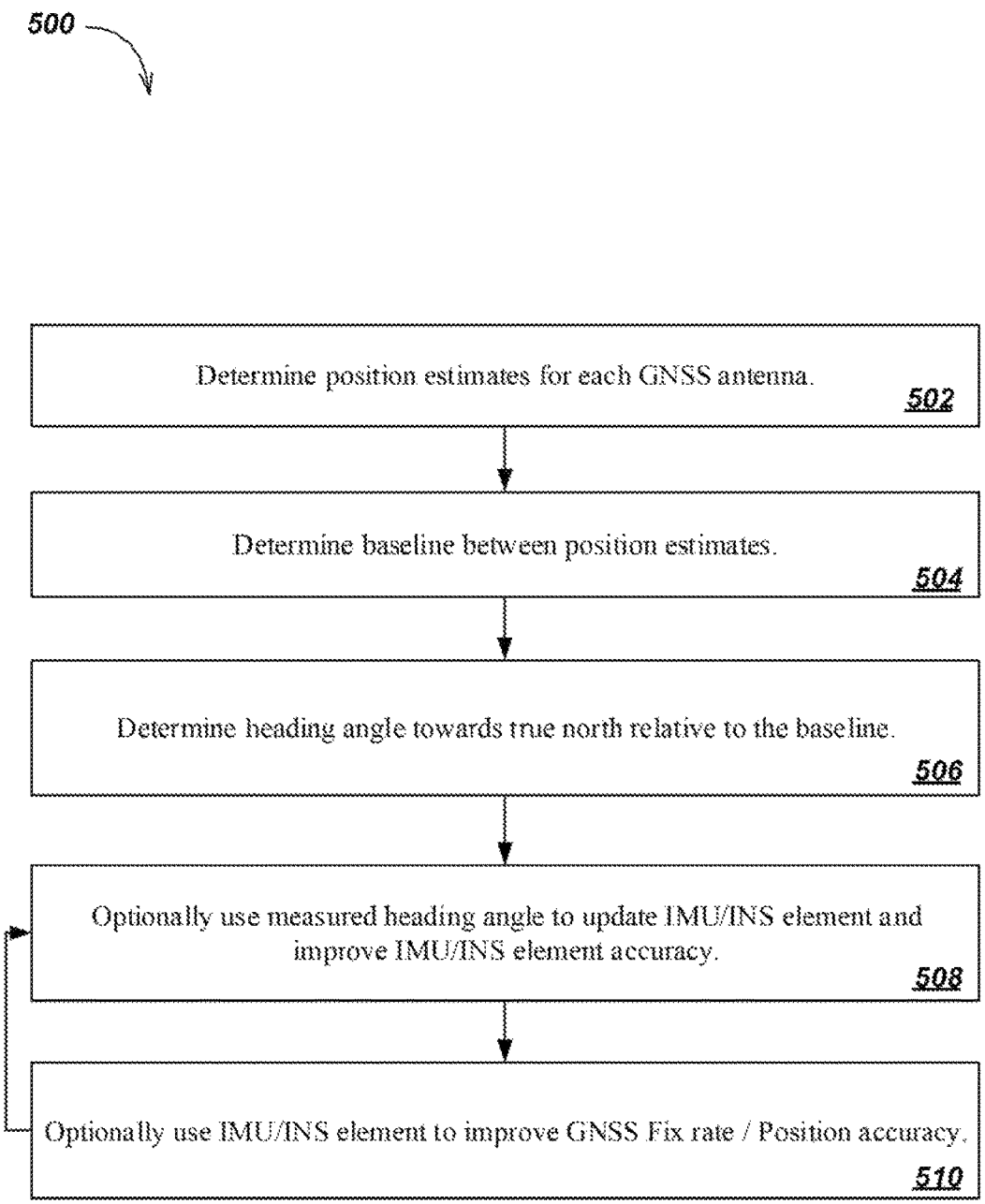
FIG. 5A is a diagram describing a method for determining heading.

In FIG. 5A, a method 500 for determining heading with a multi-GNSS antenna utility locator device or other locating device having a multi-GNSS antenna element of the present disclosure is described. In a first step 502, method 500 may determine position estimates for each GNSS antenna (e.g., the position estimates 420a/420b associated with GNSS antennas 412a/412b of FIG. 4A). In another step 504, a baseline may be calculated between the position estimates (e.g., the baseline 425 between position estimates 420a/420b of FIG. 4A). The baseline may be representative or estimative of the relative displacements between the GNSS antennas in the common rigid body frame of the multi-GNSS antenna utility locator device or other multi-GNSS antenna utility locating device. Such methods may optionally include comparing position estimates to known GNSS antenna spacing to determine a quality metric of position estimate data. In another step 506, a heading angle towards true north may be calculated relative to the baseline (e.g., heading angle 414 of FIG. 4A). In an optional step 508, the method 500 may use the measured heading angle to update IMU/INS element and improve the IMU/INS element accuracy. In another optional step 510, the method 500 may the improved IMU/INS element accuracy may be used to improve GNSS fix rate and/or position accuracy. The method 500 may optionally iterate between steps 508 and 510.

Figure 5B:
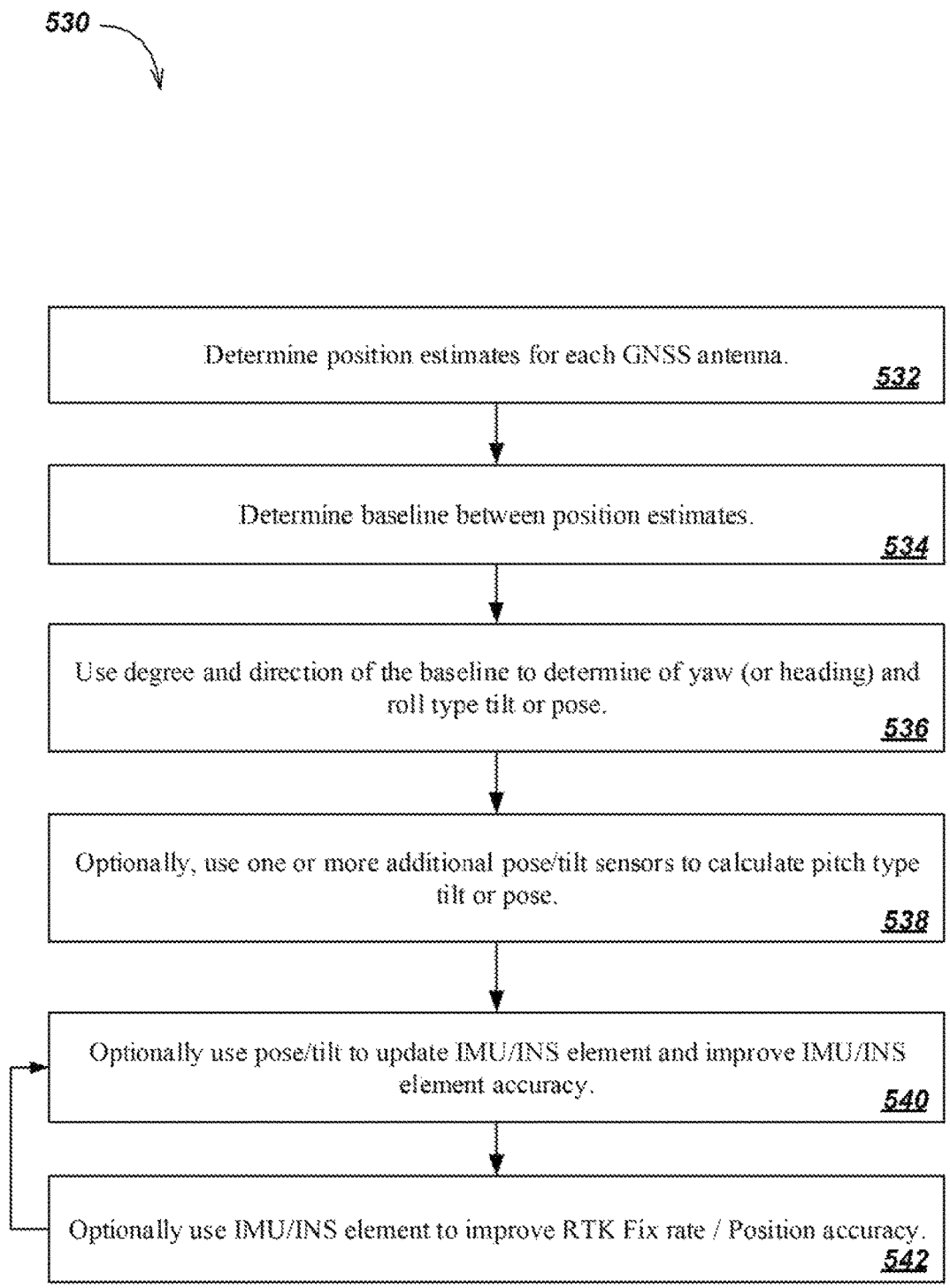
FIG. 5B is a diagram describing a method for determining tilt/pose.

In FIG. 5B, a method 530 for determining tilt/pose in a multi-GNSS antenna utility locator device or other multi-GNSS antenna utility locating device having two GNSS antennas and optionally one or more additional pose/tilt sensors (e.g., IMU/INS element 190 of FIG. 1B) is described. In a first step 532, method 530 may determine position estimates for each GNSS antenna in three dimensions (e.g., the position estimates 420a/420b of GNSS antennas 412a/412b of FIG. 4B). In another step 534, a baseline may be calculated between the position estimates (e.g., the baseline 425 between position estimates 420a/420b of FIG. 4B) The baseline may be representative or estimative of the relative displacements between the GNSS antennas in the common rigid body frame of the utility locator device or other multi-GNSS antenna utility locating device in three dimensions. Such methods may optionally include comparing position estimates to known GNSS antenna spacing to determine a quality metric of position estimate data. In a step 536, the degree and direction of the baseline may be used to determine yaw (or heading) and roll type tilt or pose. In an optional step 538, the one or more additional pose/tilt sensors (e.g., the IMU/INS element 190 of FIGS. 1B, 1E, 1F, 1G, or other like sensors and systems) may be used to calculate pitch type tilt or pose of the multi-GNSS antenna utility locator device or other multi-GNSS antenna utility locating device. In an optional step 540, the method 530 may use the measured tilt/pose to update IMU/INS element and improve the IMU/INS element accuracy. In another optional step 542 the improved IMU/INS element accuracy may be used to improve GNSS fix rate and/or position accuracy. The method 530 may optionally iterate between steps 540 and 542.

Figure 5C:
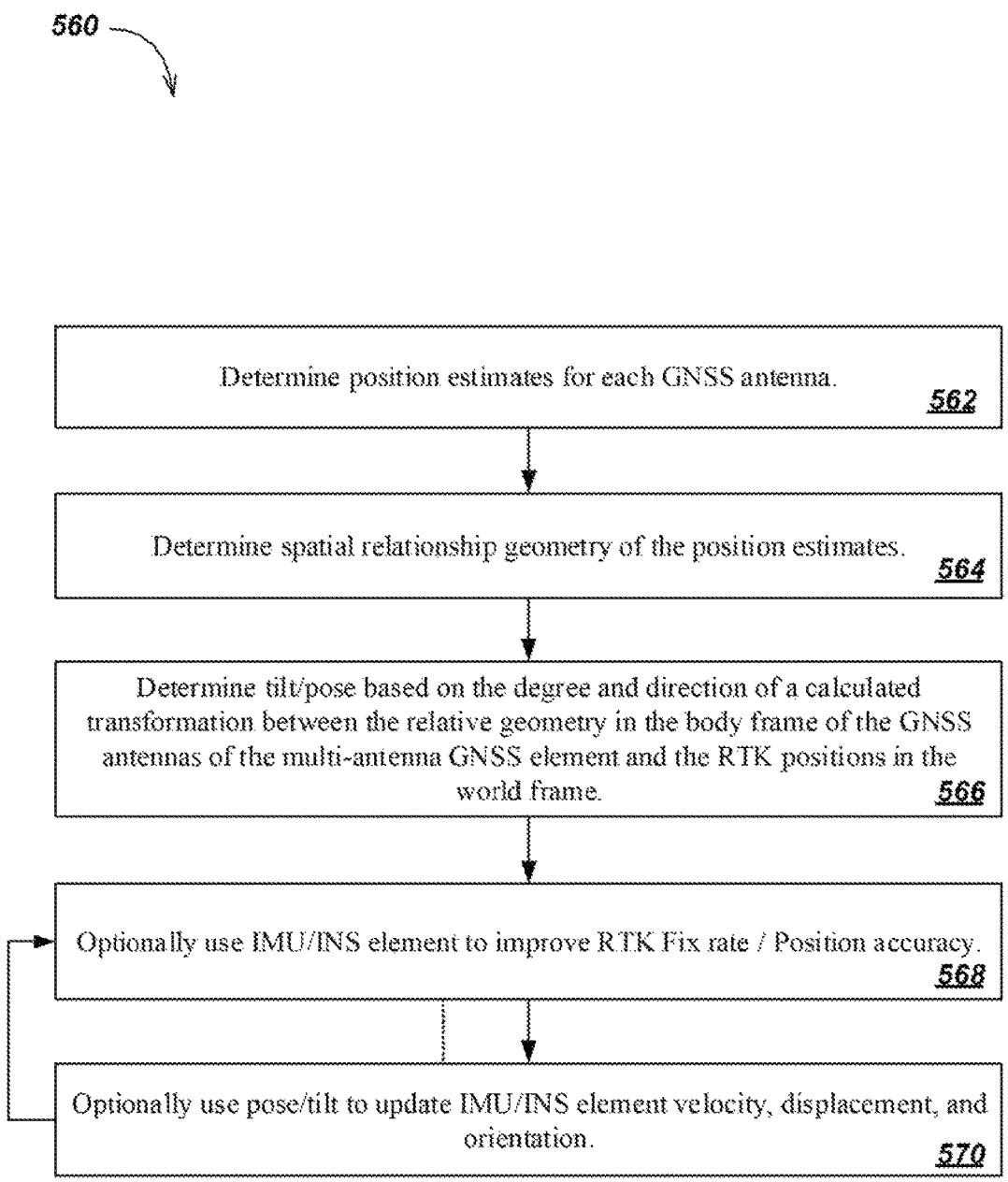
FIG. 5C is a diagram describing another method for determining tilt/pose.

In FIG. 5C, a method 560 for determining tilt/pose in a multi-GNSS antenna utility locator device or other multi-GNSS antenna utility locating device having at least three GNSS antennas and associated GNSS receivers is described. In a first step 562, method 560 may determine position estimates for each GNSS antenna. In another step 564, spatial relationship geometry of the position estimates may be determined. Such methods may optionally include comparing spatial relationships of position estimates to known GNSS antenna spatial relationships to determine a quality metric of position estimate data. The spatial relationship may be representative or estimative of the relative displacements between the GNSS antennas in the common rigid body frame of the multi-GNSS antenna utility locator device or other multi-GNSS antenna utility locating device in three dimensions. The step 564 may be solved for as a best fit, for example using a variant of least squares or other optimization method. Likewise, individual position estimates or baselines in between individual position estimates may be weighted based on reported error or other accuracy metric. In a step 566, tilt/pose may be determined based on the degree and direction of a calculated transformation between the relative geometry in the body frame of the GNSS antennas of the multi-antenna GNSS element and the RTK, SSR, or like positions in the world frame. In an optional step 568, the method 560 may use the IMU/INS element to improve GNSS fix rate and/or position accuracy. In another optional step 570, pose/tilt measurements may be used to update the IMU/INS element velocity, displacement, and orientation. The method 560 may further iterate between steps 568 and 570.

Figure 6A:
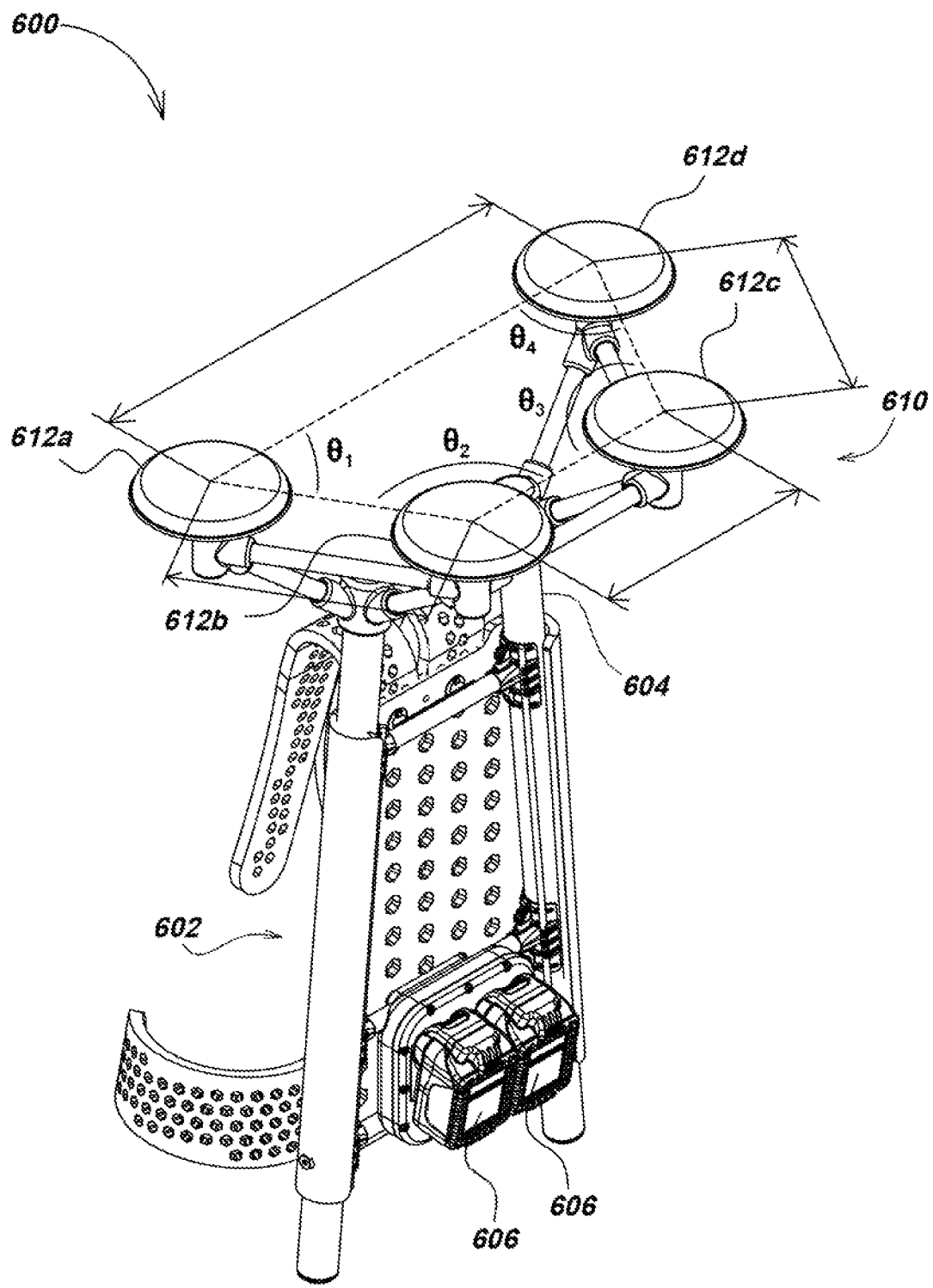
FIG. 6A is an isometric view of a multi-GNSS antenna backpack device.
Figure 6B:
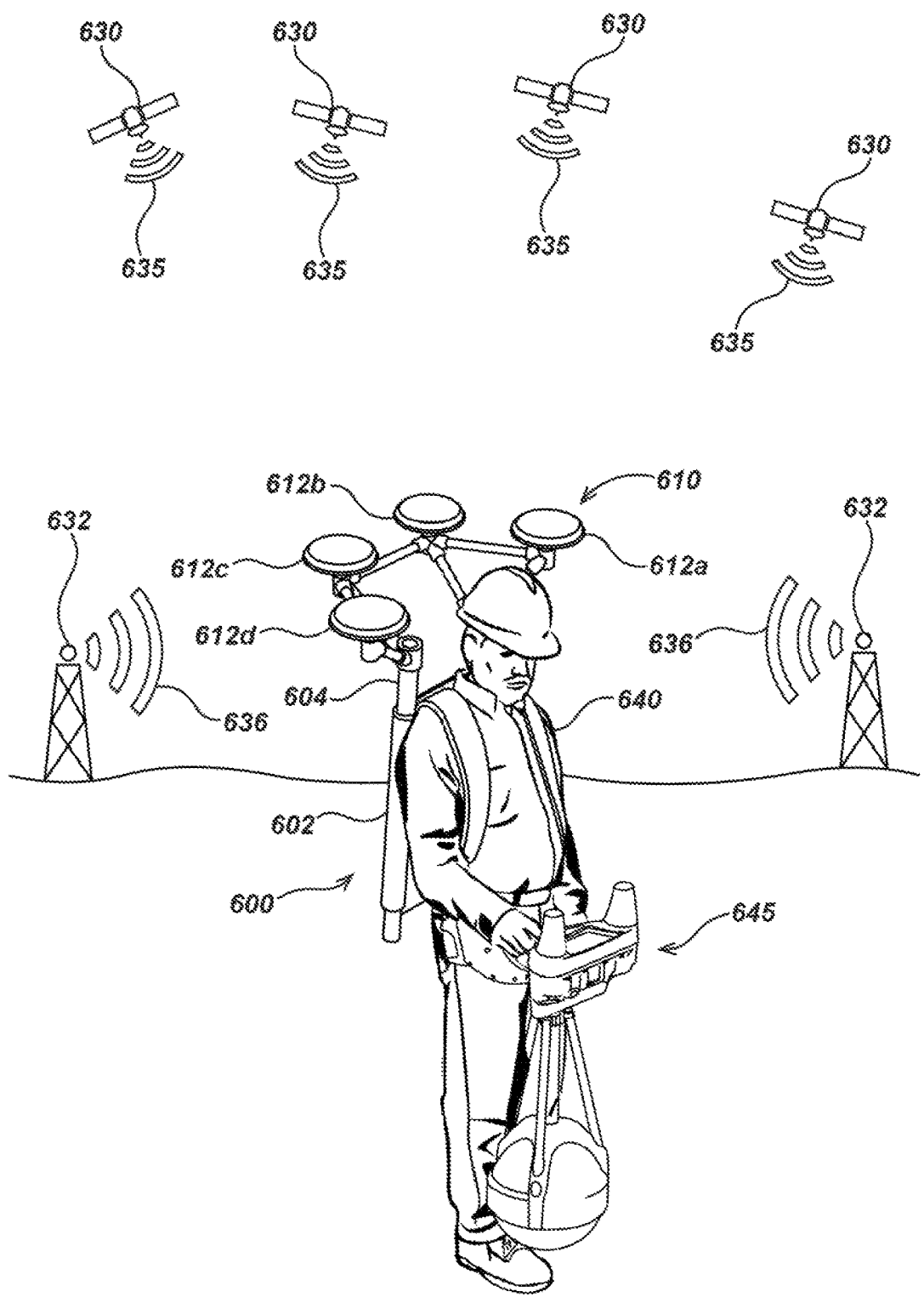
FIG. 6B is an illustration of the multi-GNSS antenna backpack device carried by a user.
Figure 6C:
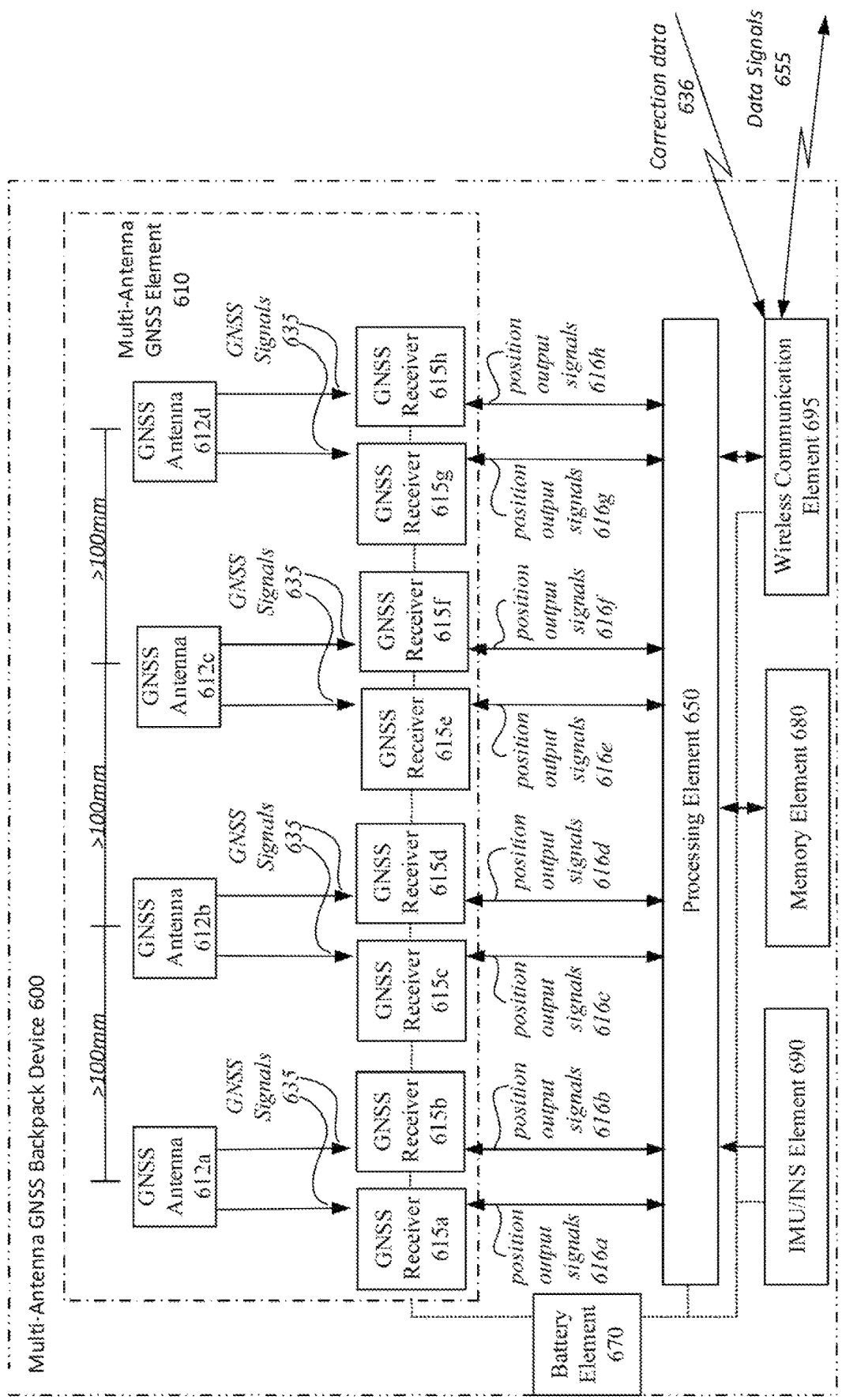
FIG. 6C is a diagram of the multi-GNSS antenna backpack device of FIG. 6A.

The utility locator devices described herein may communicate data with various other system devices further including a multi-antenna GNSS element. Such system devices may include, for instance, a multi-antenna GNSS backpack device 600 as illustrated in FIGS. 6A-6C, a multi-antenna GNSS backpack device 600d of FIG. 6D, a multi-antenna GNSS backpack device 600e of FIG. 6E, and/or a multi-antenna GNSS backpack device 600f of FIG. 6F to further refine position information. The multi-antenna GNSS backpack device 600 of FIGS. 6A-6C, multi-antenna GNSS backpack device 600d of FIG. 6D, multi-antenna GNSS backpack device 600e of FIG. 6E, multi-antenna GNSS backpack device 600f of FIG. 6F, and other multi-antenna GNSS backpack device embodiments described herein, may be or share aspects with the U.S. Pat. No. 9,488,747, issued Nov. 8, 2016, entitled DUAL ANTENNA SYSTEMS WITH VARIABLE POLARIZATION; U.S. patent application Ser. No. 15/866,360, filed Jan. 9, 2018, entitled TRACKED DISTANCE MEASURING DEVICES, SYSTEMS, AND METHODS; U.S. patent application Ser. No. 16/241,864, filed Jan. 7, 2019, entitled TRACKED DISTANCE MEASURING DEVICES, SYSTEMS, AND METHODS; and other such devices described in the incorporated applications.

Illustrated in FIGS. 6A-6C, the multi-antenna GNSS backpack device 600 may include a backpack element 602 that may be worn by a user 640 (FIGS. 6B and 6C) to support a multi-antenna GNSS element 610. The multi-antenna GNSS element 610 may be positioned above a user atop of masts 604 so as to not obstruct pathways of GNSS signals 635 (FIG. 6B). The multi-antenna GNSS backpack device 600 may further include a battery element 670 comprising multiple batteries for supplying electrical power to the various powered components thereof. The battery element 670 for supplying electrical power may be batteries as described in U.S. Pat. No. 10,090,498, issued Oct. 2, 2018, MODULAR BATTERY PACK APPARATUS, SYSTEMS, AND METHODS INCLUDING VIRAL AND/OR CODE TRANSFER and U.S. patent application Ser. No. 16/140,467, issued Sep. 24, 2018, entitled MODULAR BATTERY PACK APPARATUS, SYSTEMS, AND METHODS INCLUDING VIRAL AND/OR CODE TRANSFER; U.S. patent application Ser. No. 16/520,248, issued Jul. 23, 2019, entitled MODULAR BATTERY PACK APPARATUS, SYSTEMS, AND METHODS INCLUDING VIRAL AND/OR CODE TRANSFER, and U.S. patent application Ser. No. 16/837,923, issued Apr. 1, 2020, entitled MODULAR BATTERY PACK APPARATUS, SYSTEMS, AND METHODS INCLUDING VIRAL AND/OR CODE TRANSFER the contents of which are incorporated by reference herein in their entirety.

The multi-antenna GNSS element 610 may include a multitude of GNSS antennas 612a, 612b, 612c, and 612d each spaced apart by at least 100 millimeters and each further coupled to one or more GNSS receivers such as the GNSS receivers 615a, 615b, 615c, 615d, 615e, 615f, 615g, and 615h of FIG. 6C. It should be noted, that the embodiments described herein having multiple GNSS receivers coupled to a single GNSS antenna, such as the multi-antenna GNSS backpack device 600, the multiple GNSS observables data streams may compress removing redundant information that is common to the data provided by each GNSS receiver. In some embodiments, the GNSS antennas 612a-612d, for example, may be dual or triple band antennas. Likewise, associated GNSS receivers 615a-615h (FIG. 6C) may be dual or triple band receivers. For example, the GNSS antennas 612a-612d and GNSS receivers 615a-615h (FIG. 6C) may be configured for the L1, L2, and L5 GPS bands. In other embodiments, the GNSS antennas and associated GNSS receivers may be configured for other signal bands. The GNSS antennas, such as GNSS antennas 612a-612d, may have different form factors including, but not limited to, helical antennas (e.g., the helical antennas 714a/714b of FIG. 7B), patch antennas (e.g., the patch antennas 814a/814b of FIG. 8B), or other antenna configurations.

Figure 6D:
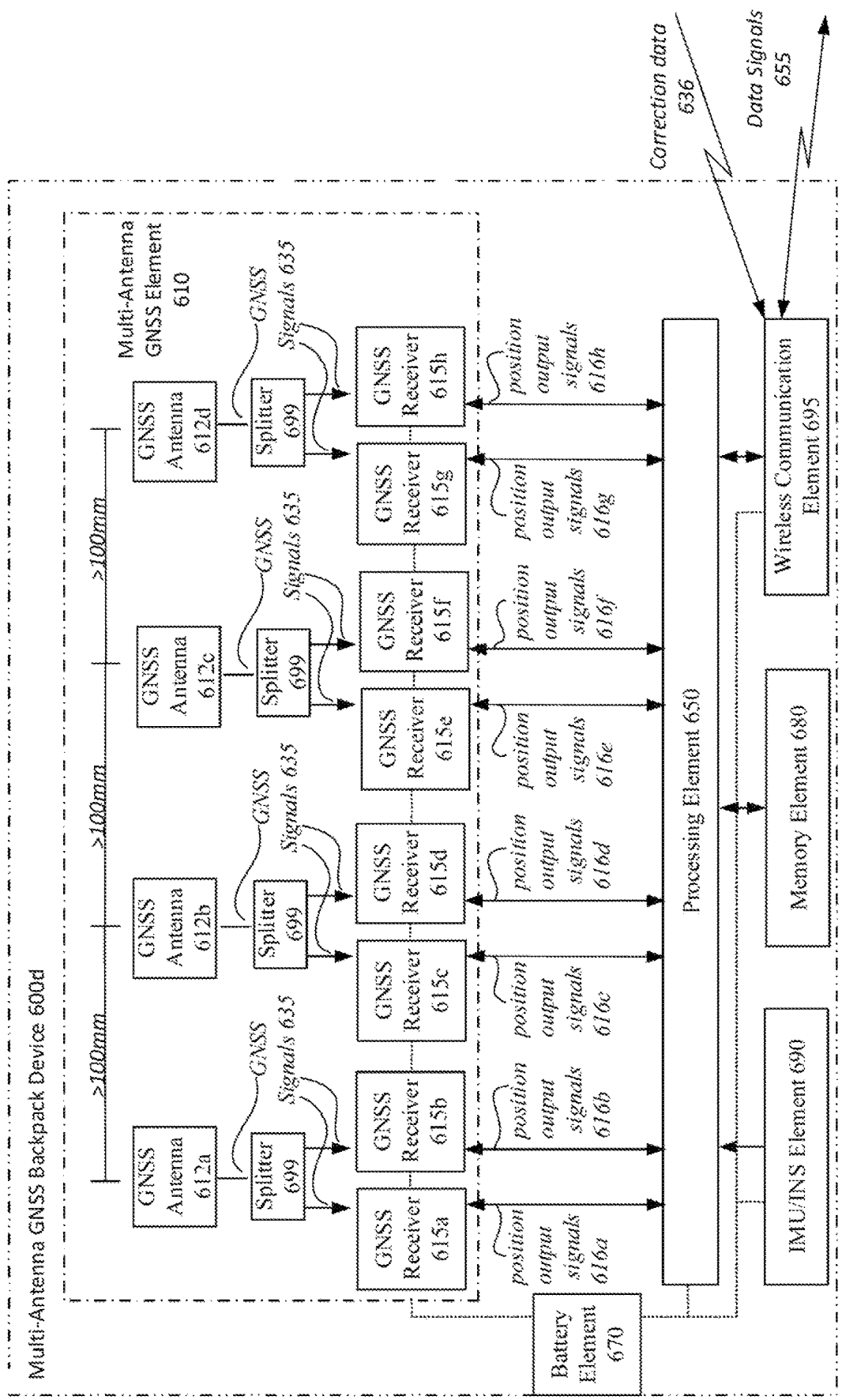
FIG. 6D is an illustration of a multi-antenna utility locator device further showing a splitter.

It should be noted that a splitter may be present in some embodiments where distributing of GNSS signals from a single GNSS antenna to a plurality of GNSS receivers may occur such as the multi-antenna GNSS backpack device 600 of FIG. 6C. Though such a splitter may be implied to practitioners of the art, the multi-antenna GNSS backpack device 600d of FIG. 6D is illustrated with a splitter 699 for clarity. The splitter 699 may be or share aspects with the splitter 199 of FIGS. 1E and 1H or other splitter configuration for distributing of GNSS signals to GNSS receivers.

Turning to FIG. 6B, each GNSS antenna 612a-612d may receive GNSS signals 635 from a plurality of navigation satellites 630 and correction data 636 from base stations 632. When worn by a user 640, the multi-antenna GNSS backpack device 600 may optimally position the GNSS antennas 612a-612d of the multi-antenna GNSS element 610 above the user 640 to aid in preventing the body of the user 640 from obstructing the pathway of GNSS signals 635 to the GNSS antennas 612a-612d. The multi-antenna GNSS backpack device 600 may further communicate positioning data to an associated utility locator device 645 which may be or share aspects with the multi-GNSS antenna utility locator device 100 of FIGS. 1A—1D, the multi-GNSS antenna utility locator device 100e of FIG. 1E, the multi-GNSS antenna utility locator device 100f of FIG. 1F, and the multi-GNSS antenna utility locator device 100g of FIG. 1G configured for wireless communication.

Further illustrated in FIG. 6C, the multi-antenna GNSS backpack device 600 may include a processing element 650 comprising one or more processors coupled to the multi-antenna GNSS element 610 to receive position output signals 616a-616h for purposes of processing and compressing the data and/or for making differential corrections to the position output signals 616a-616h data via correction data 636 received at a wireless communication element 695. The multi-antenna GNSS backpack device 600 may further include a memory element 660 having one or more non-transitory memories for storing positioning data such as the position output signals 616a-616h.

Still referring to FIG. 6C, the wireless communication element 695, comprising one or more radio transceivers, may communicate data with an associated utility locator devices (e.g., multi-GNSS antenna utility locator device 100 of FIG. 1A-1D) via data signal 655. In some embodiments, the wireless communication element 695 may additionally or instead communicate data to one or more other system devices such as transmitter devices (e.g., the multi-GNSS antenna transmitter device 900 of FIGS. 9A-9C), vehicle-mounted locating devices (e.g., multi-GNSS antenna vehicle-mounted locating device 1300 of FIGS. 13A-13B), other computing devices (e.g., remote databases, laptops, smart phones, or the like), and/or the like. The wireless communication element 695 may be or include cellular, Bluetooth, ISM, Wi-Fi, or like wireless transceivers. In yet further embodiments, the multi-GNSS backpack device 600 may store the position output signals 616a-616h or other data on a memory element 680 for post-processing of data. The wireless communication elements 695 may further receive correction data 636 from one or more base stations 632 (FIG. 6B) to perform RTK, SSR, or like differential corrections to position output signals 616a-616h that may be done in real-time, near real-time, or in post-processing.

Some multi-antenna GNSS backpack device embodiments in keeping with the present disclosure may optionally include additional sensors and systems for determining orientation, tilt, and pose. As illustrated in FIG. 6C, the multi-antenna GNSS backpack device 600 may optionally include an IMU/INS element 690 that may include, but should not be limited to, one or more accelerometers, gyroscopic sensors, magnetometers, inertial measurement units (IMU), inertial navigation systems (INS) and or other like sensors. In some embodiments, the magnetometers may be arranged in an array to sense magnetic distortions.

It should be noted that in FIG. 6C, pairs of GNSS receivers 615a/615b, 615c/615d, 615e/615f, and 615g/615h may each couple to a single one of the GNSS antennas 612a, 612b, 612c, and 612d in the multi-antenna GNSS backpack device 600. In other embodiments, a multi-antenna GNSS backpack device in keeping with the present disclosure may have other numbers of GNSS antennas and GNSS receivers in various other configurations. Some such different configurations are illustrated with the GNSS antennas 612 and GNSS receivers 615 of the multi-antenna GNSS backpack device embodiments 600e and 600f illustrated in FIGS. 6E and 6F.

Figure 6E:
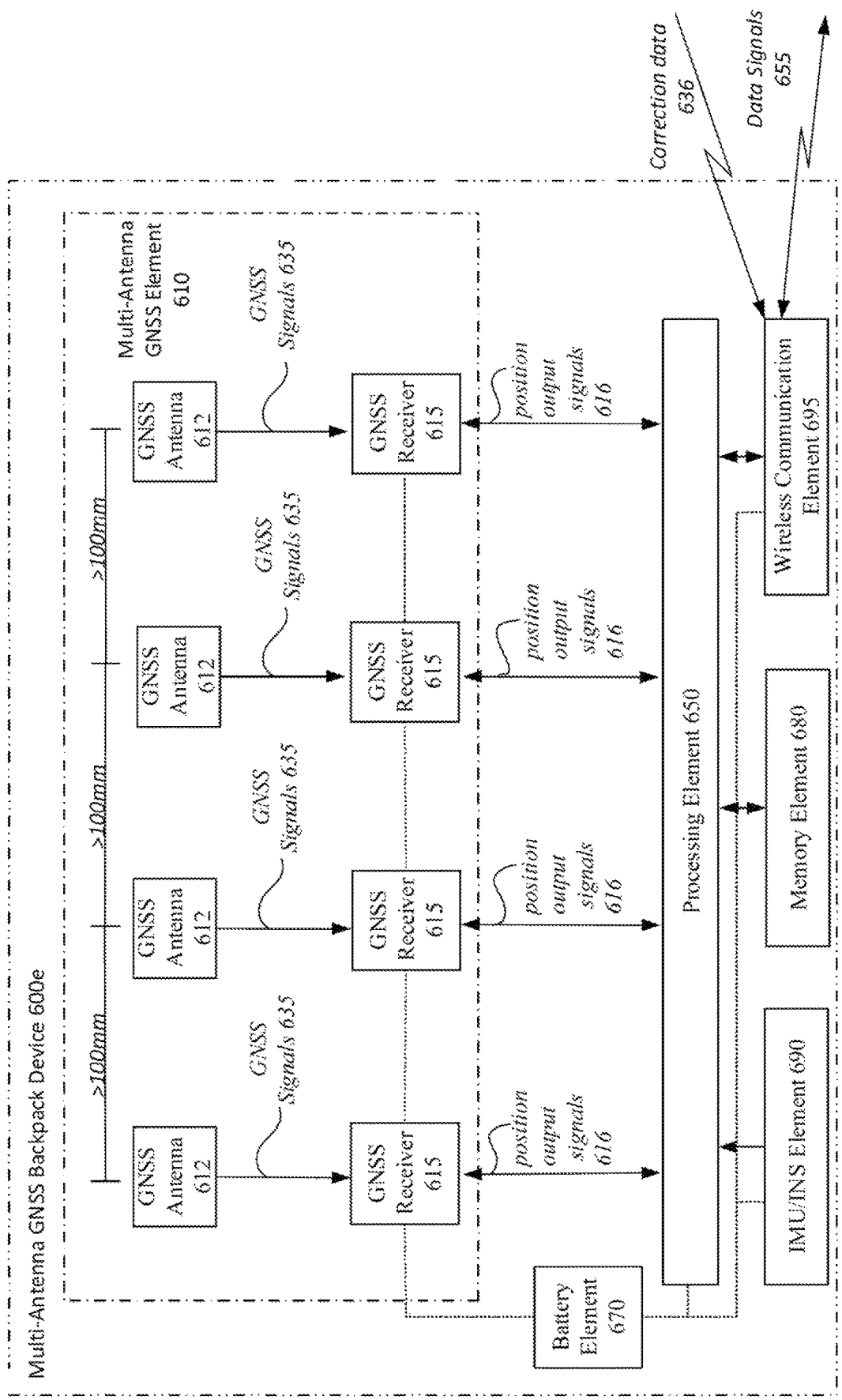
FIG. 6E is an illustration of another multi-antenna utility locator device embodiment.

As illustrated in FIG. 6E, for instance, the multi-antenna GNSS backpack device 600e may include a single GNSS antennas 612 coupled to each individual GNSS receivers 615. The GNSS receivers 615 may be dual or triple band receivers. Likewise, the GNSS antennas 612 and GNSS receivers 615 may be configured for the L1, L2, and L5 GPS bands and/or other signal bands. In the multi-antenna GNSS backpack device 600c, a GNSS signal 635 may be communicated from each GNSS antenna 612 to an individually coupled one of the GNSS receivers 615. Each of the GNSS receivers 615 may further communicate position output signals 616 to a processing element 650.

Figure 6F:
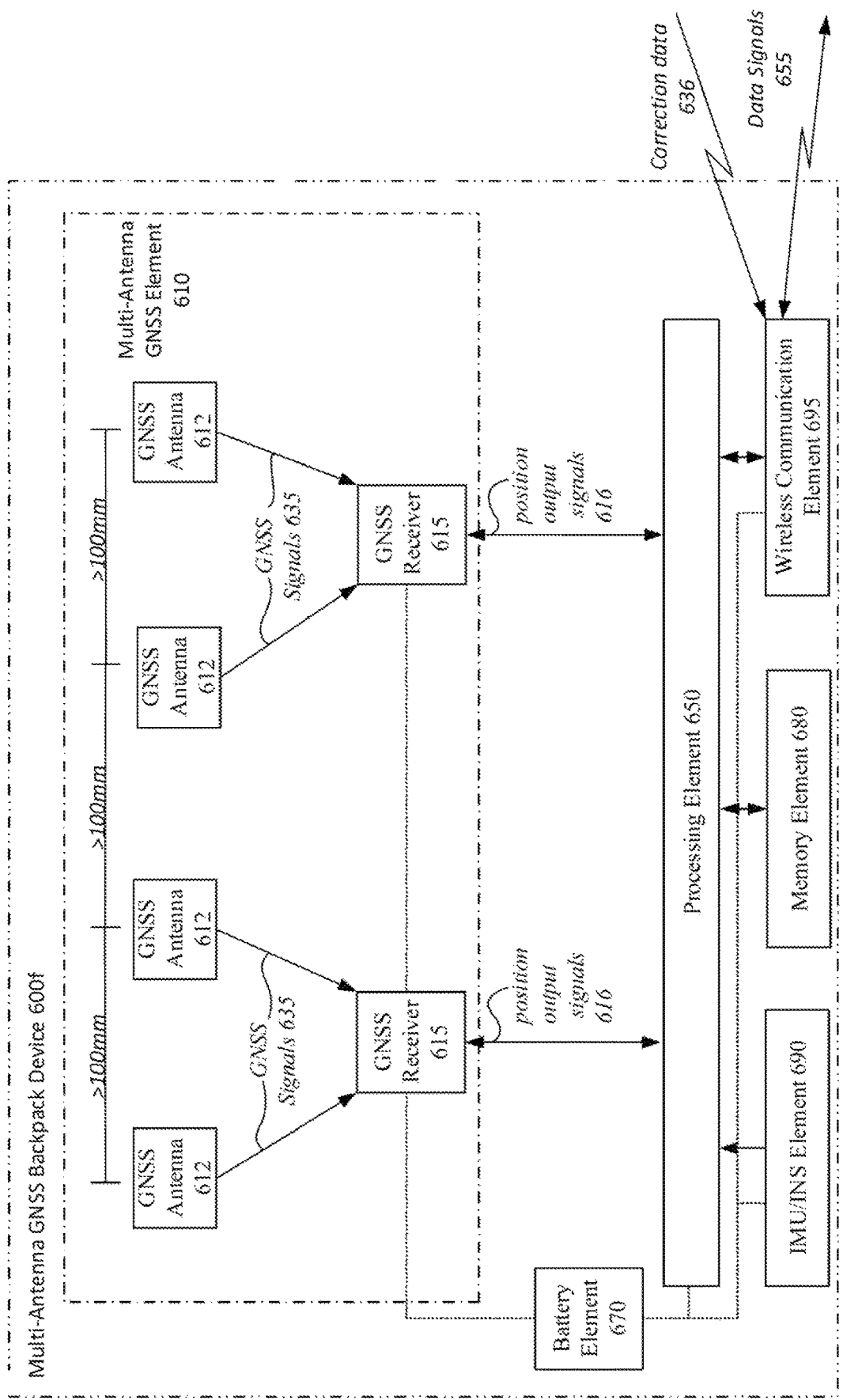
FIG. 6F is an illustration of another multi-antenna utility locator device embodiment.

In yet further embodiments, such as the multi-antenna GNSS backpack device 600f of FIG. 6F, multiple GNSS antennas 612 may couple to a single one of the GNSS receivers 615. The GNSS receivers 615 may be dual or triple band receivers. Likewise, the GNSS antennas 612 and GNSS receivers 615 may be configured for the L1, L2, and L5 GPS bands and/or other signal bands. In some such embodiments, a GNSS receiver configured for use with multiple GNSS antennas may be a multi-input GNSS receiver that provides a measure of pose (pitch, roll, heading, or like orientation measurements) such as the mosaic-H GNSS receiver commercially available from Septentrio.

The multi-antenna GNSS backpack devices of the present disclosure may have different GNSS antenna types or form factors. For example, embodiments in keeping with the present disclosure may have helical, patch, or other configurations of GNSS antennas that may be dual or triple band antennas or antennas configured for other signal bands.

Figure 7A:
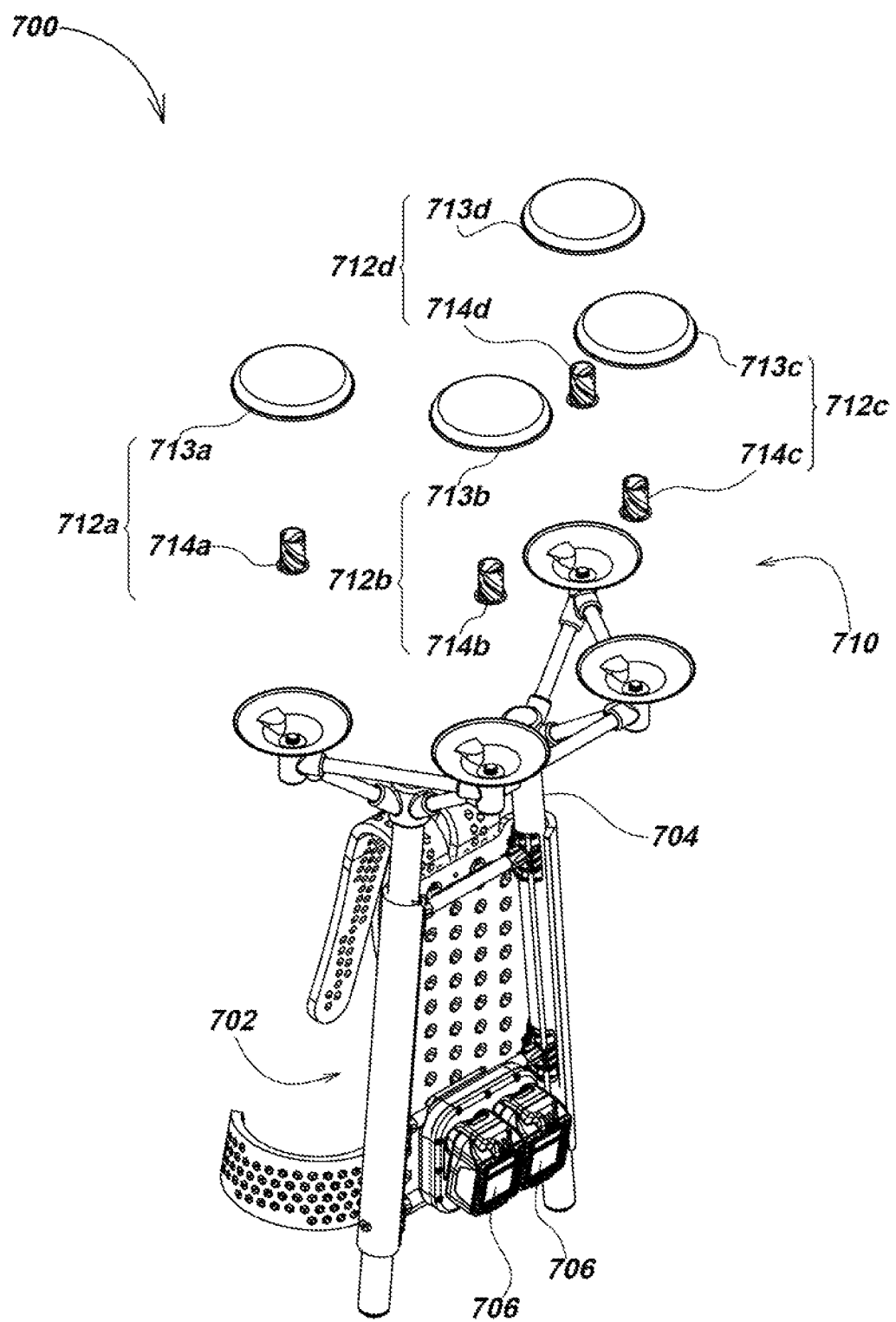
FIG. 7A is an isometric view of a multi-GNSS antenna backpack device with partially exploded GNSS antennas revealing helical antennas.
Figure 7B:
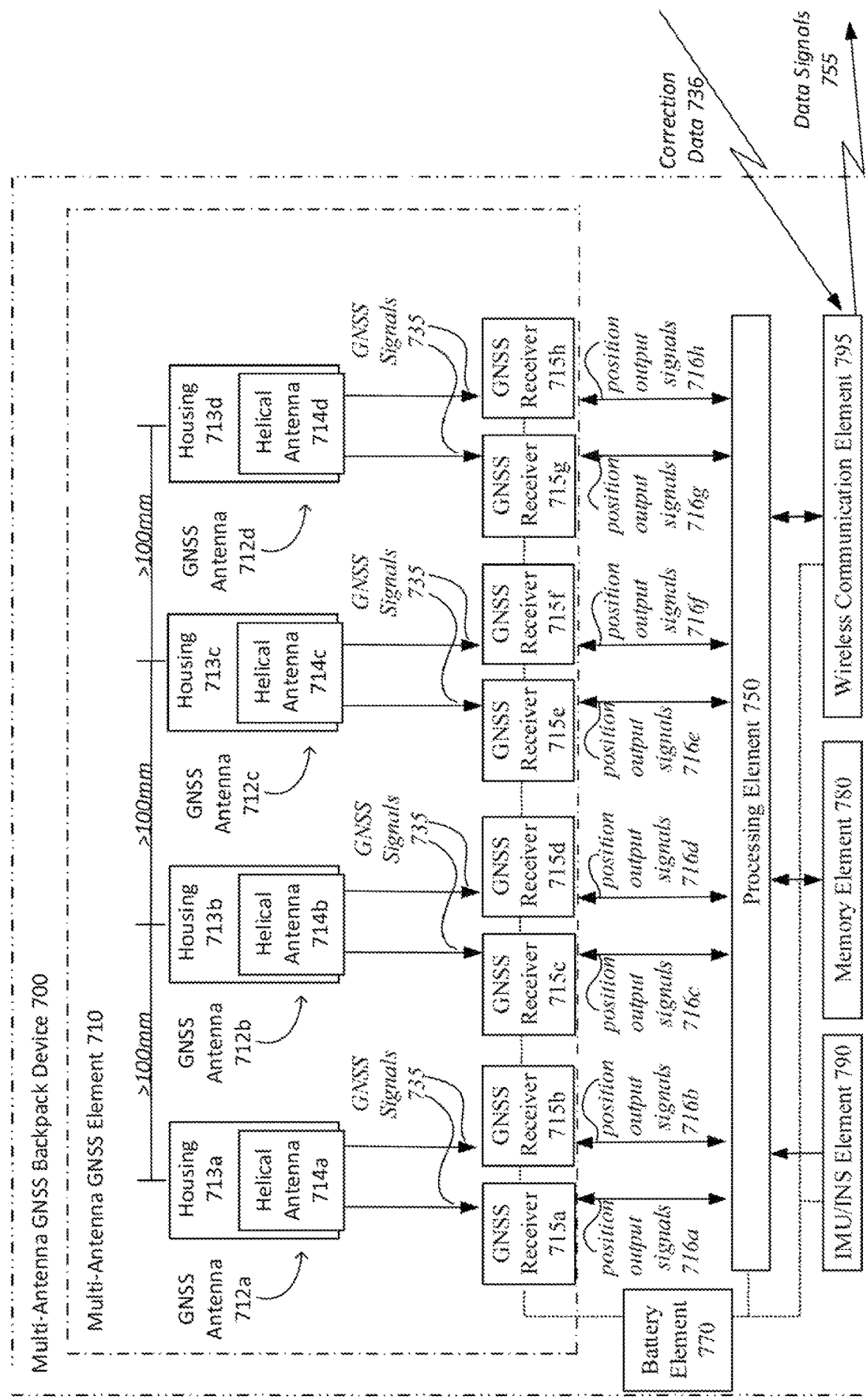
FIG. 7B is a diagram of the multi-GNSS antenna backpack device of FIG. 7A.

As illustrated in FIGS. 7A and 7B, a multi-antenna GNSS backpack device 700 is illustrated which may be or share aspects with the multi-antenna GNSS backpack device 600 of FIGS. 6A-6C. The multi-antenna GNSS backpack device 700 may include a backpack element 702 (FIG. 7A) that may be worn by a user (e.g., user 640 of FIG. 6B) and include one or more masts such as masts 704 (FIG. 7A) to support a multi-antenna GNSS element 710. The multi-antenna GNSS backpack device 700 may further include a battery element 770 for supplying electrical power to the various powered components thereof. The multi-antenna GNSS element 710 may include a multitude of GNSS antennas 712a, 712b, 712c, and 712d each spaced apart by at least 100 millimeters. Each antenna 712a, 712b, 712c, and 712d may include a housing 713a, 713b, 713c, and 713d each encapsulating a respective helical antenna 714a, 714b, 714c, and 714d.

Turning to FIG. 7B, each helical antenna 714a-714d may couple to one or more GNSS receivers 715a-715h. The multi-antenna GNSS backpack device 700 may include a processing element 750 comprising one or more processors coupled to the multi-antenna GNSS element 710 to receive position output signals 716a-716h for purposes of processing and compressing the data and/or for making differential corrections to the position output signals 716a-716h data via correction data 736 received at a wireless communication element 795. The multi-antenna GNSS backpack device 700 may further include a memory element 760 having one or more non-transitory memories for storing positioning data such as the position output signals 716a-716h.

Figure 7C:
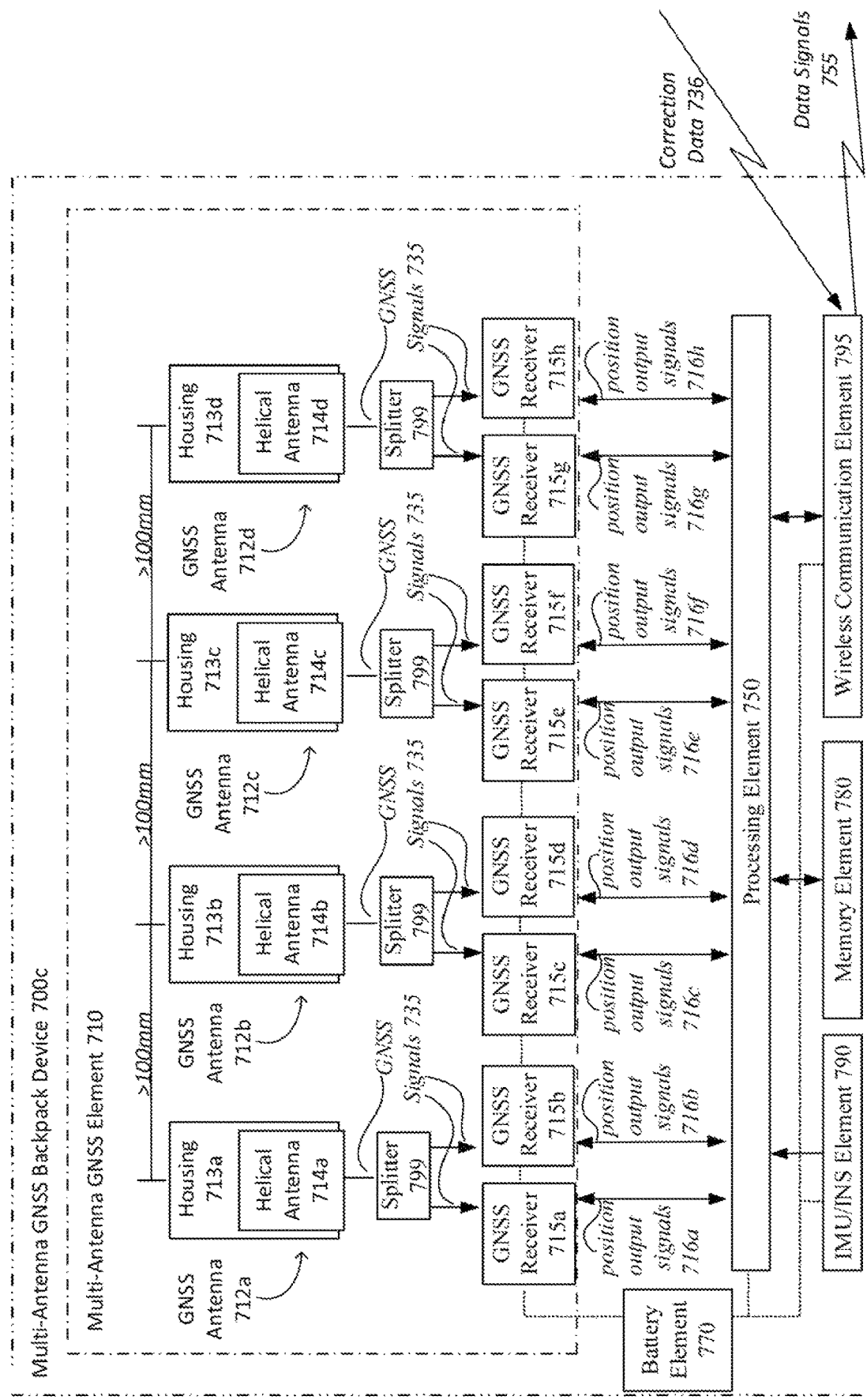
FIG. 7C is an illustration of a multi-antenna utility locator device further showing a splitter.

It should be noted that a splitter may be present in some embodiments where distributing of GNSS signals from a single GNSS antenna to a plurality of GNSS receivers may occur such as the multi-antenna GNSS backpack device 700 of FIG. 7B. Though such a splitter may be implied to practitioners of the art, the multi-antenna GNSS backpack device 700c of FIG. 7C is illustrated with a splitter 799 for clarity. The splitter 799 which may be or share aspects with the splitter 199 of FIGS. 1E and 1H or other splitter configuration for distributing of GNSS signals to GNSS receivers.

Still referring to FIG. 7B, the multi-antenna GNSS backpack device 700 may further include a wireless communication element 795 comprising one or more radio transceivers. The wireless communication element 795 may communicate data with an associated utility locator device (e.g., multi-GNSS antenna utility locator device 100 of FIG. 1A-1D) via data signal 755. In some embodiments, the wireless communication element 795 may additionally or instead communicate data to one or more other system devices transmitter devices (e.g., the multi-GNSS antenna transmitter device 900 of FIGS. 9A-9C), vehicle-mounted locating devices (e.g., multi-GNSS antenna vehicle-mounted locating device 1300 of FIGS. 13A-13B), other computing devices (e.g., remote databases, laptops, smart phones, or the like), and/or the like. The wireless communication element 795, for example, may be or include cellular, Bluetooth, ISM, Wi-Fi, or like wireless transceivers. In yet further embodiments, the multi-GNSS backpack device 700 may store the position output signals 716a-716h or other data on a memory element 780 for post-processing of data. The wireless communication elements 795 may further receive correction data 736 from one or more base stations 732 (FIG. 7B) to perform RTK, SSR, or like differential corrections to position output signals 716a-716h. The multi-antenna GNSS backpack device 700 may optionally include an IMU/INS element 790 that may include, but should not be limited to, one or more accelerometers, gyroscopic sensors, magnetometers, inertial measurement units (IMU), inertial navigation systems (INS) and or other like sensors. In some embodiments, the magnetometers may be arranged in an array to sense magnetic distortions.

It should be noted that in FIG. 7B, pairs of GNSS receivers 715a/715b, 715c/715d, 715e/715f, and 715g/715h may each couple to a single one of the GNSS antennas 712a, 712b, 712c, and 712d in the multi-antenna GNSS backpack device 700. In other embodiments, a multi-antenna GNSS backpack device in keeping with the present disclosure may have other numbers of GNSS antennas and GNSS receivers in various other configurations. Some such different configurations are illustrated with the GNSS antennas 712 and GNSS receivers 715 of the multi-antenna GNSS backpack device embodiments 700d and 700e illustrated in FIGS. 7D and 7E.

Figure 7D:
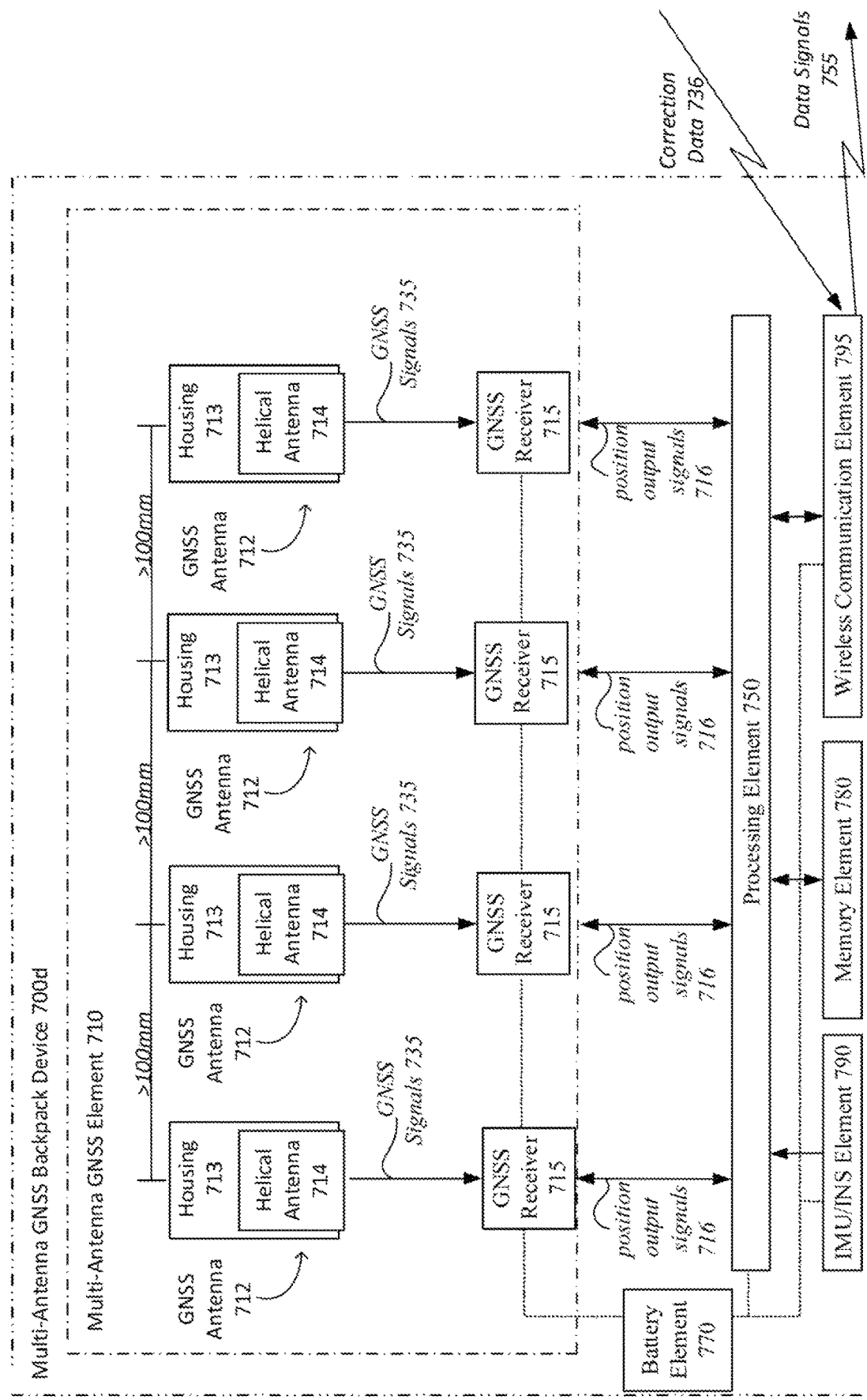
FIG. 7D is an illustration of another multi-antenna utility locator device embodiment.

As illustrated in FIG. 7D, for instance, the multi-antenna GNSS backpack device 700d may include a single GNSS antennas 712 coupled to each individual GNSS receivers 715. The GNSS receivers 715 may be dual or triple band receivers. Likewise, the GNSS antennas 712 and GNSS receivers 715 may be configured for the L1, L2, and L5 GPS bands and/or other signal bands. In the multi-antenna GNSS backpack device 700d, a GNSS signal 735 may be communicated from each GNSS antenna 712 to an individually coupled one of the GNSS receivers 715. Each of the GNSS receivers 715 may further communicate position output signals 716 to a processing element 750.

Figure 7E:
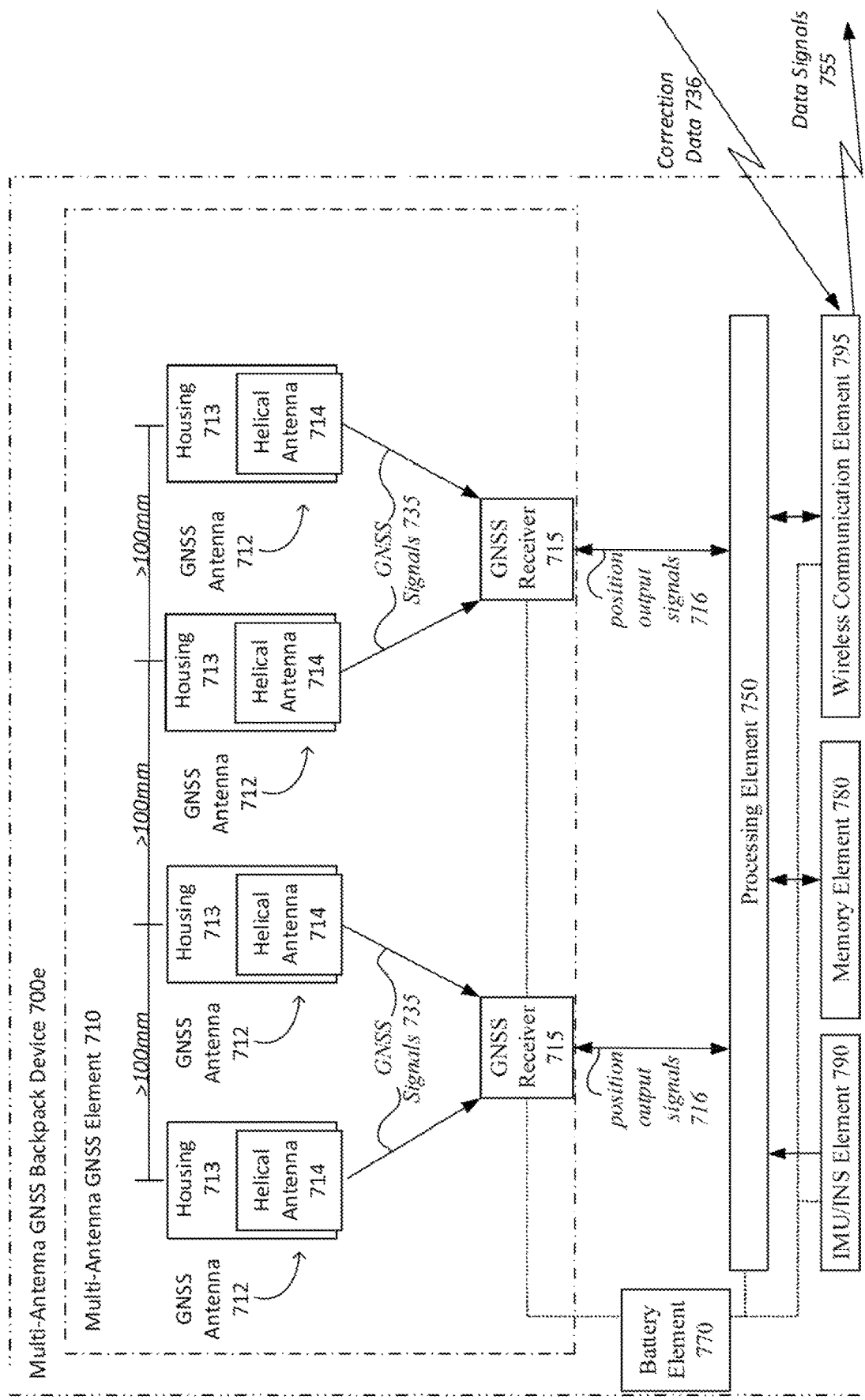
FIG. 7E is an illustration of another multi-antenna utility locator device embodiment.

In yet further embodiments, such as the multi-antenna GNSS backpack device 700e of FIG. 7E, multiple GNSS antennas 712 may couple to a single one of the GNSS receivers 715. The GNSS receivers 715 may be dual or triple band receivers. Likewise, the GNSS antennas 712 and GNSS receivers 715 may be configured for the L1, L2, and L5 GPS bands and/or other signal bands. In some such embodiments, a GNSS receiver configured for use with multiple GNSS antennas may be a multi-input GNSS receiver that provides a measure of pose (pitch, roll, heading, or like orientation measurements) such as the mosaic-H GNSS receiver commercially available from Septentrio.

Figure 8A:
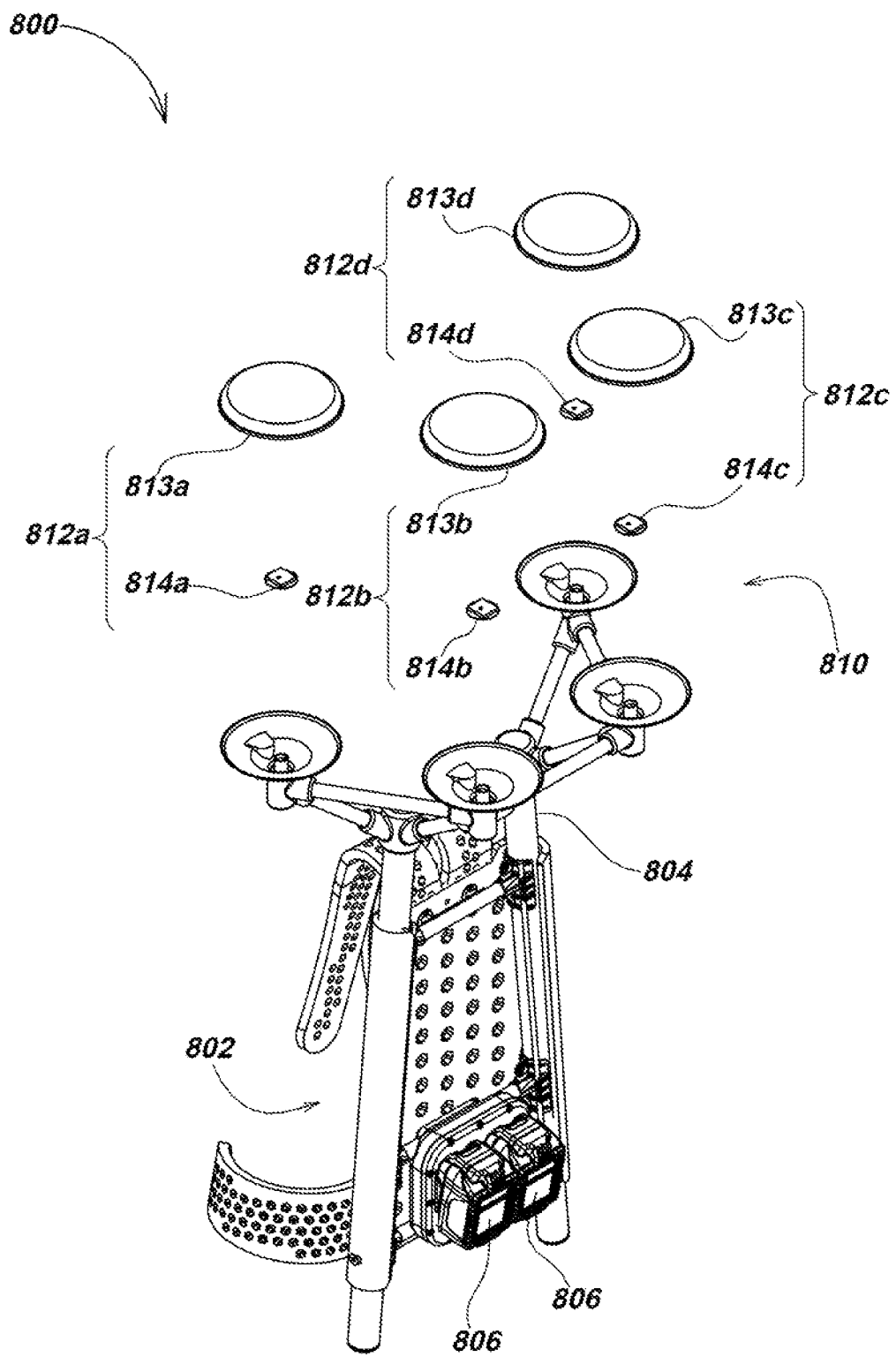
FIG. 8A is an isometric view of a multi-GNSS antenna backpack device with partially exploded GNSS antennas revealing patch antennas.
Figure 8B:
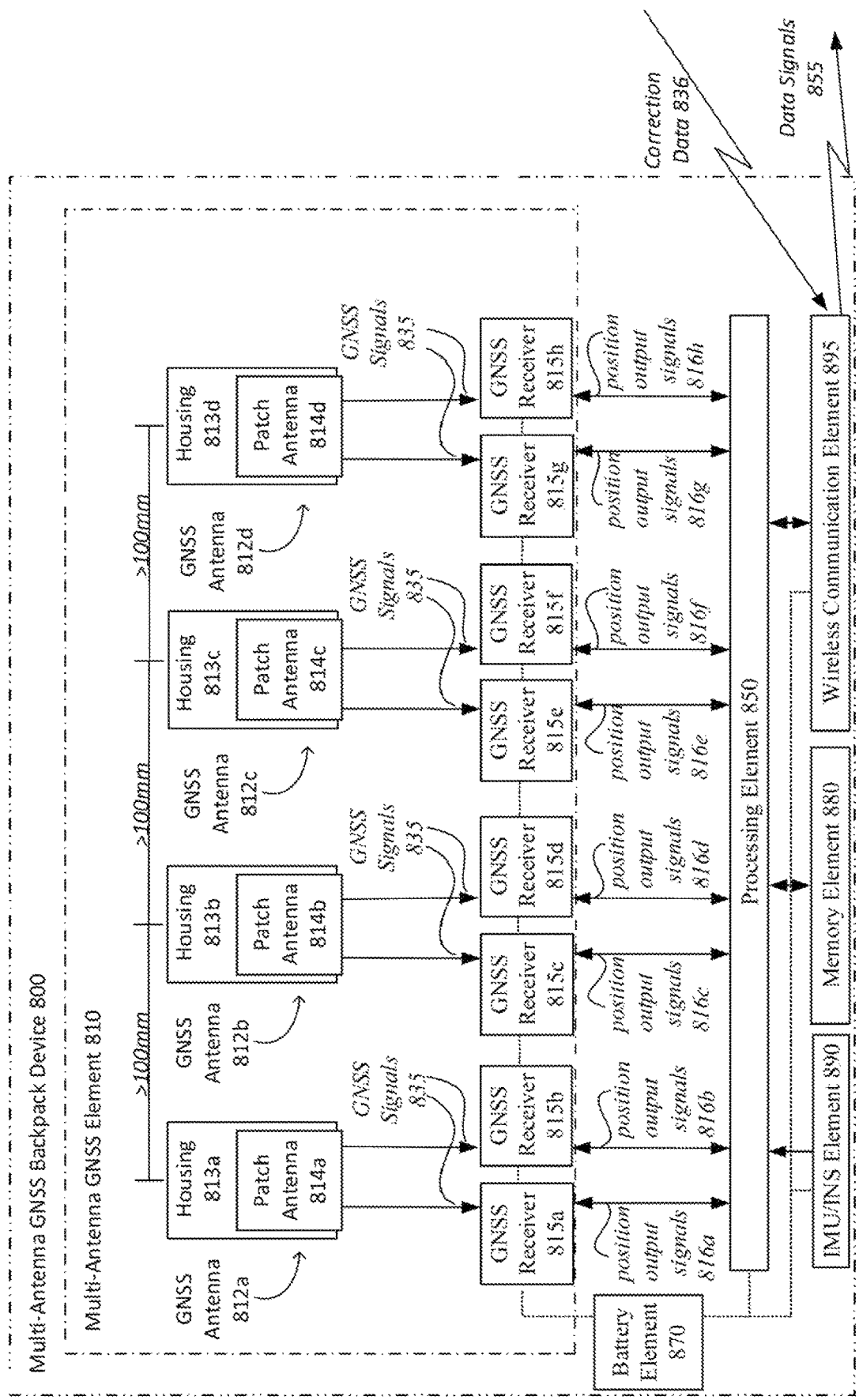
FIG. 8B is a diagram of the multi-GNSS antenna backpack device of FIG. 8A.

As illustrated in FIGS. 8A and 8B, a multi-antenna GNSS backpack device 800 is illustrated which may be or share aspects with the multi-antenna GNSS backpack device 600 of FIGS. 6A-6C. The GNSS backpack device 800 may include a backpack element 802 that may be worn by a user (e.g., user 640 of FIG. 6B) and include one or more masts such as masts 804 to support a multi-antenna GNSS element 810. The multi-antenna GNSS backpack device 800 may further include a battery element 870 for supplying electrical power to the various powered components thereof. The multi-antenna GNSS element 810 may include a multitude of GNSS antennas 812a, 812b, 812c, and 812d each spaced apart by at least 100 millimeters. Each GNSS antenna 812a, 812b, 812c, and 812d may include a housing 813a, 813b, 813c, and 813d encapsulating a patch antenna 814a, 814b, 814c, and 814d.

Further illustrated in FIG. 8B, each patch antenna 814a, 814b, 814c, and 814d may couple to one or more GNSS receivers such as the GNSS receivers 815a-815h. The multi-antenna GNSS backpack device 800 may include a processing element 850 comprising one or more processors coupled to the multi-antenna GNSS element 810 to receive position output signals 816a-816h for purposes of processing and compressing the data and/or for making differential corrections to the position output signals 816a-816h data via correction data 836 received at a wireless communication element 895. The multi-antenna GNSS backpack device 800 may further include a memory element 860 having one or more non-transitory memories for storing positioning data such as the position output signals 816a-816h.

Figure 8C:
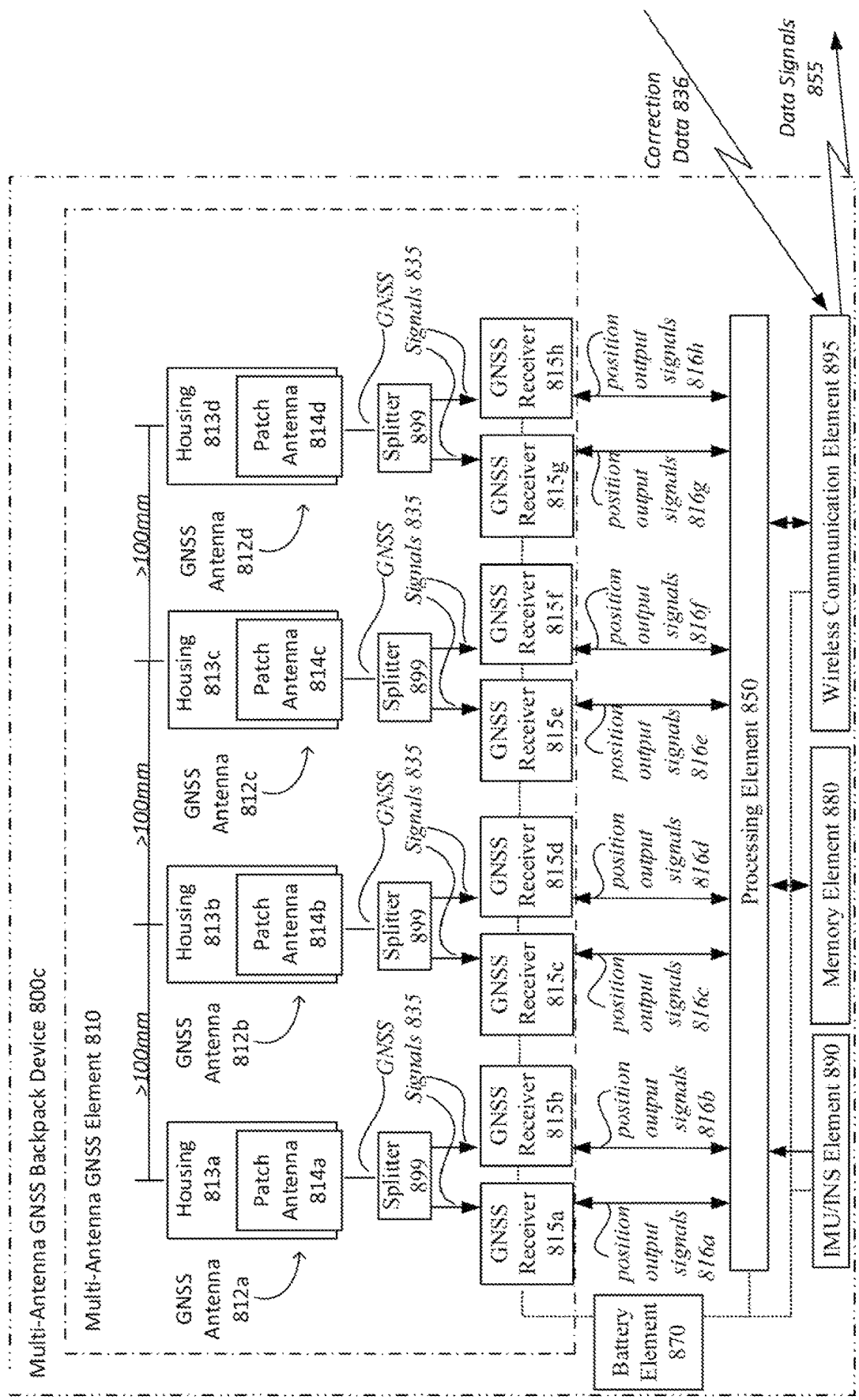
FIG. 8C is an illustration of a multi-antenna utility locator device further showing a splitter.

It should be noted that a splitter may be present in some embodiments where distributing of GNSS signals from a single GNSS antenna to a plurality of GNSS receivers may occur such as the multi-antenna GNSS backpack device 800 of FIG. 8B. Though such a splitter may be implied to practitioners of the art, the multi-antenna GNSS backpack device 800c of FIG. 8C is illustrated with a splitter 899 for clarity. The splitter 899 may be or share aspects with the splitter 199 of FIGS. 1E and 1H or other splitter configuration for distributing of GNSS signals to GNSS receivers.

Still referring to FIG. 8B, the multi-antenna GNSS backpack device 800 may further include a wireless communication element 895 comprising one or more radio transceivers. The wireless communication element 895 may communicate data with an associated utility locator device (e.g., multi-GNSS antenna utility locator device 100 of FIG. 1A—1D) via data signal 855. In some embodiments, the wireless communication element 895 may additionally or instead communicate data to one or more other system devices transmitter devices (e.g., the multi-GNSS antenna transmitter device 900 of FIGS. 9A-9C), vehicle-mounted locating devices (e.g., multi-GNSS antenna vehicle-mounted locating device 1300 of FIGS. 13A-13B), other computing devices (e.g., remote databases, laptops, smart phones, or the like), and/or the like. The wireless communication element 895, for example, may be or include cellular, Bluetooth, ISM, Wi-Fi, or like wireless transceivers. In yet further embodiments, the multi-GNSS backpack device 800 may store the position output signals 816a-816h or other data on a memory element 880 for post-processing of data. The wireless communication elements 895 may further receive correction data 636 from one or more base stations 832 (FIG. 8B) to perform RTK, SSR, or like differential corrections to position output signals 816a-816h.

Some multi-antenna GNSS backpack device embodiments in keeping with the present disclosure may optionally include additional sensors and systems for determining orientation, tilt, and pose. As illustrated in FIG. 8C, the multi-antenna GNSS backpack device 800 may optionally include an IMU/INS element 890 that may include, but should not be limited to, one or more accelerometers, gyroscopic sensors, magnetometers, inertial measurement units (IMU), inertial navigation systems (INS) and or other like sensors. In some embodiments, the magnetometers may be arranged in an array to sense magnetic distortions.

It should be noted that in FIG. 8B, pairs of GNSS receivers 815a/815b, 815c/815d, 815e/815f, and 815g/815h may each couple to a single one of the GNSS antennas 812a, 812b, 812c, and 812d in the multi-antenna GNSS backpack device 800. In other embodiments, a multi-antenna GNSS backpack device in keeping with the present disclosure may have other numbers of GNSS antennas and GNSS receivers in various other configurations. Some such different configurations are illustrated with the GNSS antennas 812 and GNSS receivers 815 of the multi-antenna GNSS backpack device embodiments 800d and 800e illustrated in FIGS. 8D and 8E.

Figure 8D:
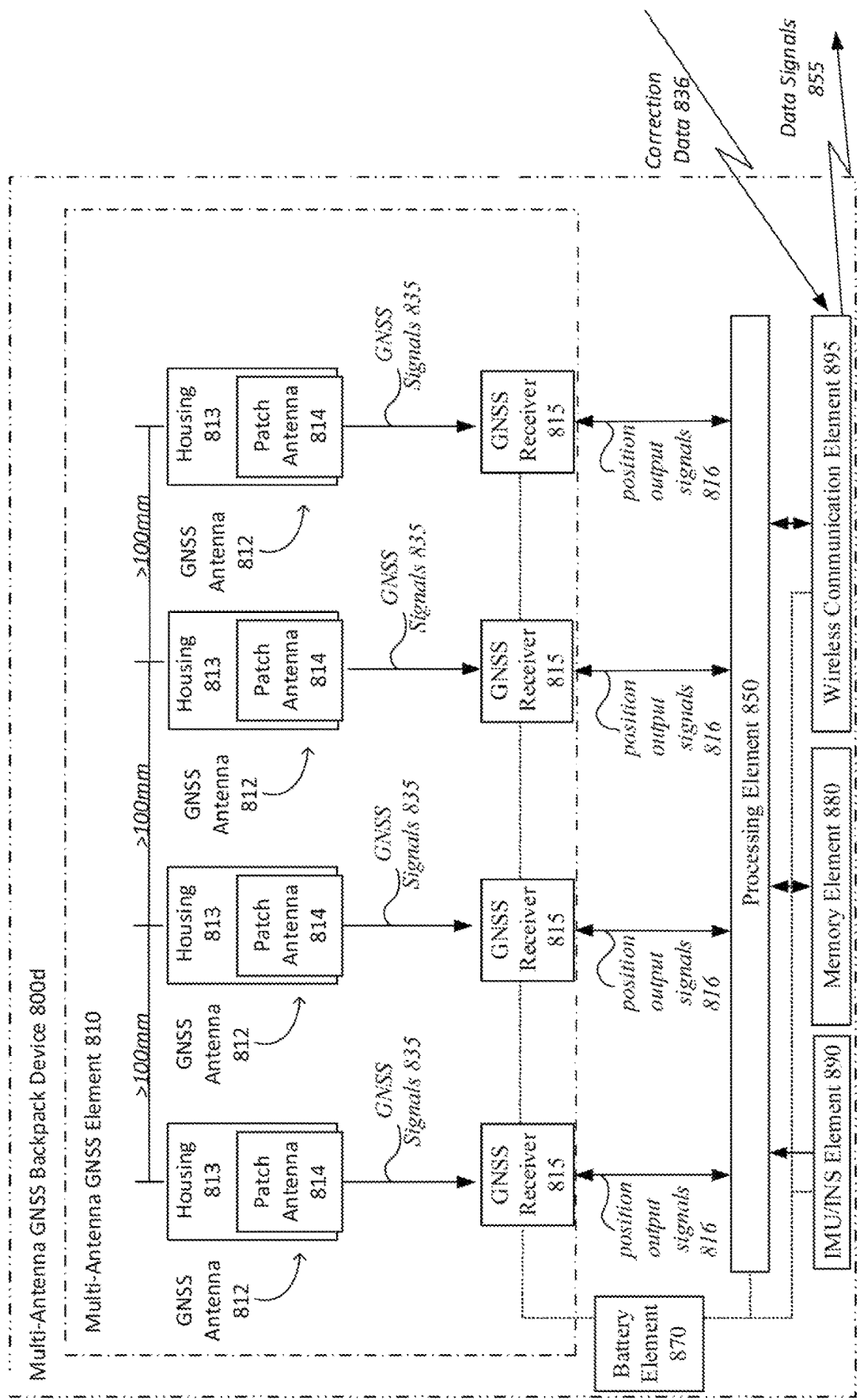
FIG. 8D is an illustration of another multi-antenna utility locator device embodiment.

As illustrated in FIG. 8D, for instance, the multi-antenna GNSS backpack device 800d may include a single GNSS antennas 812 coupled to each individual GNSS receivers 815. The GNSS receivers 815 may be dual or triple band receivers. Likewise, the GNSS antennas 812 and GNSS receivers 815 may be configured for the L1, L2, and L5 GPS bands and/or other signal bands. In the multi-antenna GNSS backpack device 800d, a GNSS signal 835 may be communicated from each GNSS antenna 812 to an individually coupled one of the GNSS receivers 815. Each of the GNSS receivers 815 may further communicate position output signals 816 to a processing element 850.

Figure 8E:
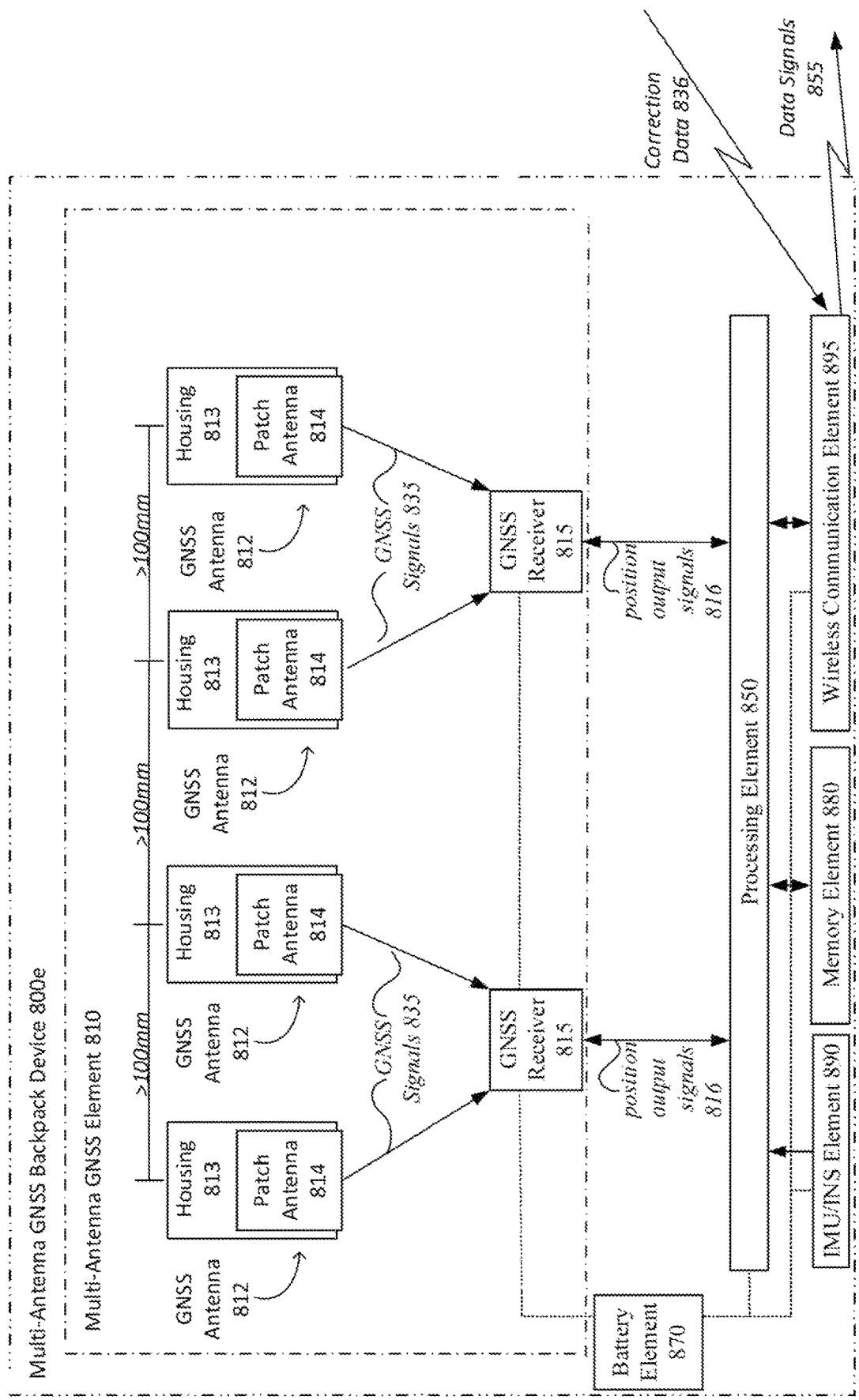
FIG. 8E is an illustration of another multi-antenna utility locator device embodiment.

In yet further embodiments, such as the multi-antenna GNSS backpack device 800c of FIG. 8E, multiple GNSS antennas 812 may couple to a single one of the GNSS receivers 815. The GNSS receivers 815 may be dual or triple band receivers. Likewise, the GNSS antennas 812 and GNSS receivers 815 may be configured for the L1, L2, and L5 GPS bands and/or other signal bands. In some such embodiments, a GNSS receiver configured for use with multiple GNSS antennas may be a multi-input GNSS receiver that provides a measure of pose (pitch, roll, heading, or like orientation measurements) such as the mosaic-H GNSS receiver commercially available from Septentrio.

In the various multi-antenna GNSS backpack devices herein (e.g., multi-antenna GNSS backpack device 600 of FIGS. 6A-6C, multi-antenna GNSS backpack device 700 of FIGS. 7A-7B, multi-antenna GNSS backpack device 700c of FIG. 7C, multi-antenna GNSS backpack device 700d of FIG. 7D, multi-antenna GNSS backpack device 700e of FIG. 7e, multi-antenna GNSS backpack device 800 of FIGS. 8A-8B, multi-antenna GNSS backpack device 800c of FIG. 8C, multi-antenna GNSS backpack device 800D of FIG. 8D, and multi-antenna GNSS backpack device 800e of FIG. 8E), tilt/pose may be determined through the use of GNSS antennas alone via the method 560 described with FIG. 5C. In some embodiments, tilt/pose may be determined via method 530 of FIG. 5B with the aid of additional sensors and systems for determining position, orientation, and pose such as the IMU/INS 690 of the multi-antenna GNSS backpack device 600 of FIG. 6C. Likewise, heading may be determined for the various multi-antenna GNSS backpack devices via the method 500 of FIG. 5A.

Figure 9A:
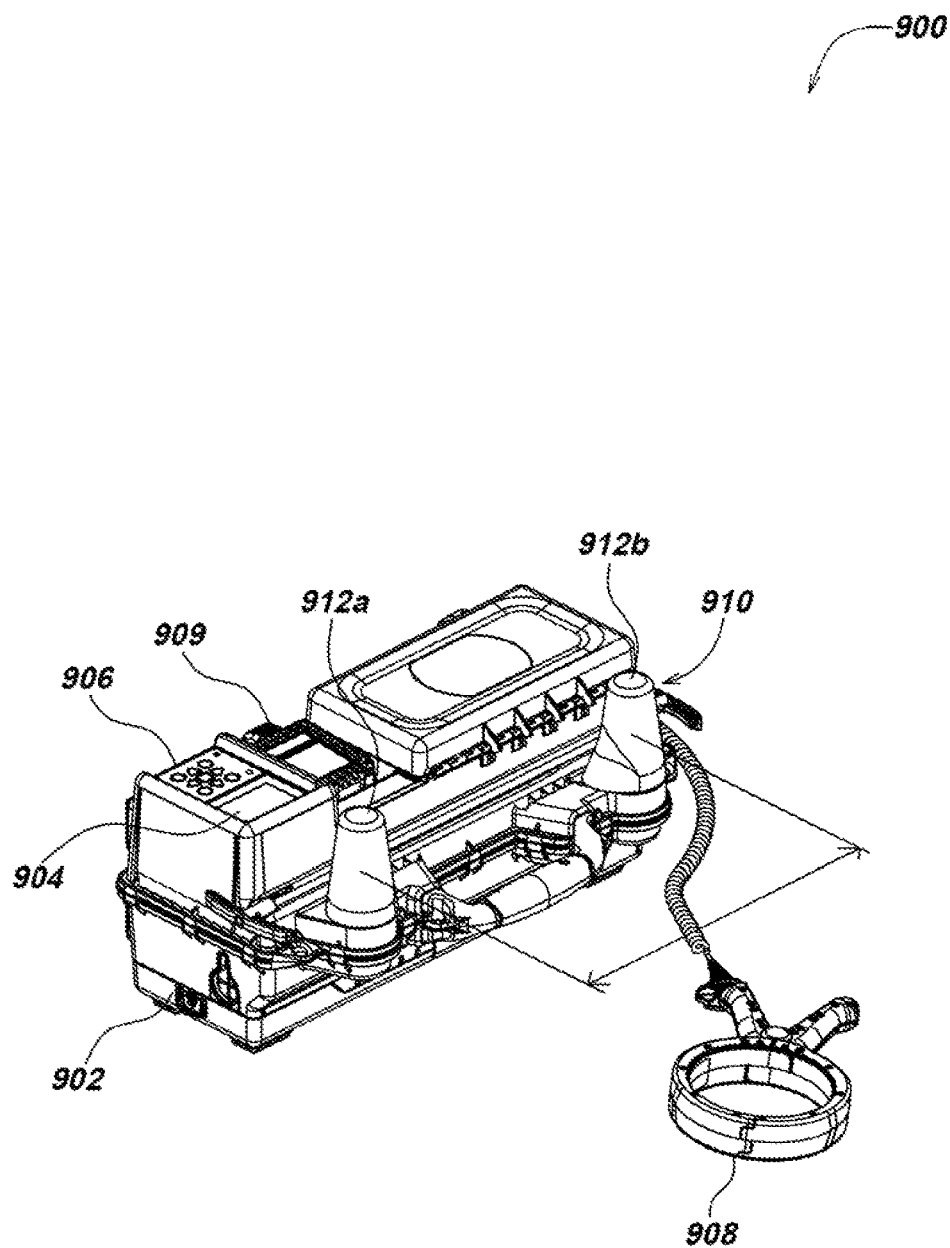
FIG. 9A is an isometric view of a multi-GNSS antenna transmitter device.
Figure 9B:
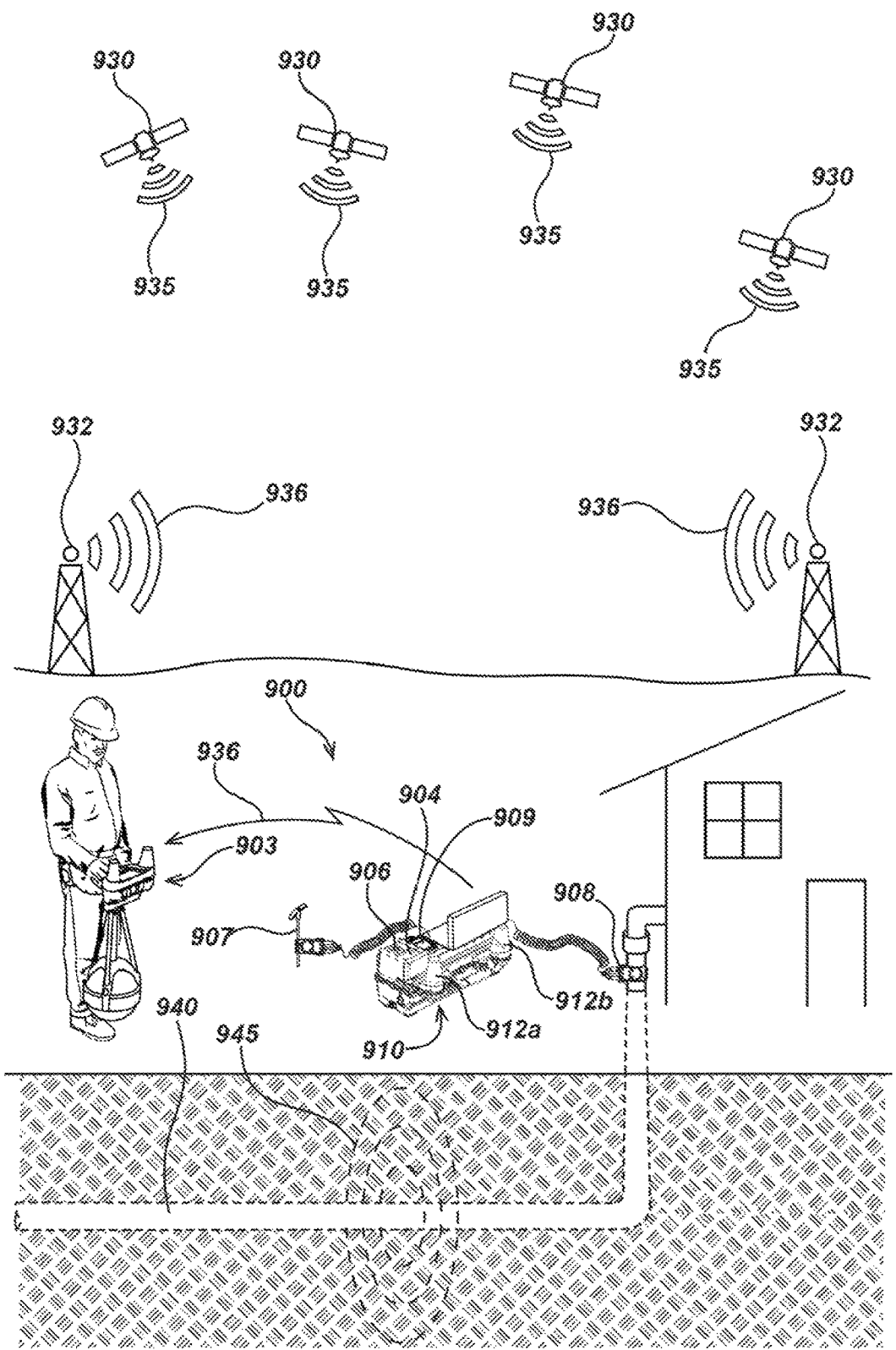
FIG. 9B is an illustration of the multi-GNSS antenna transmitter device of FIG. 9A in use.
Figure 9C:
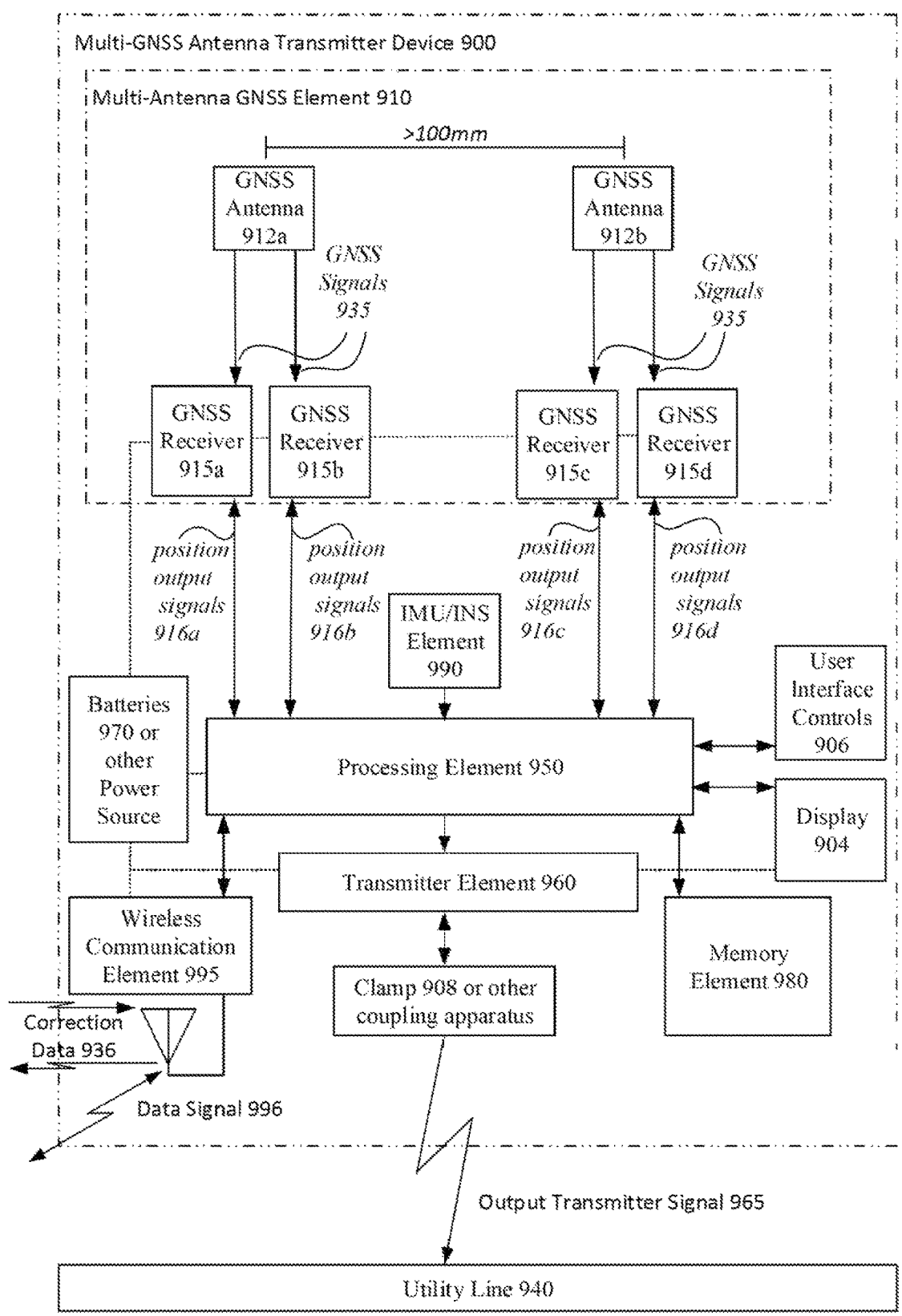
FIG. 9C is a diagram of the multi-GNSS antenna transmitter device of FIG. 9A.
Figure 9D:
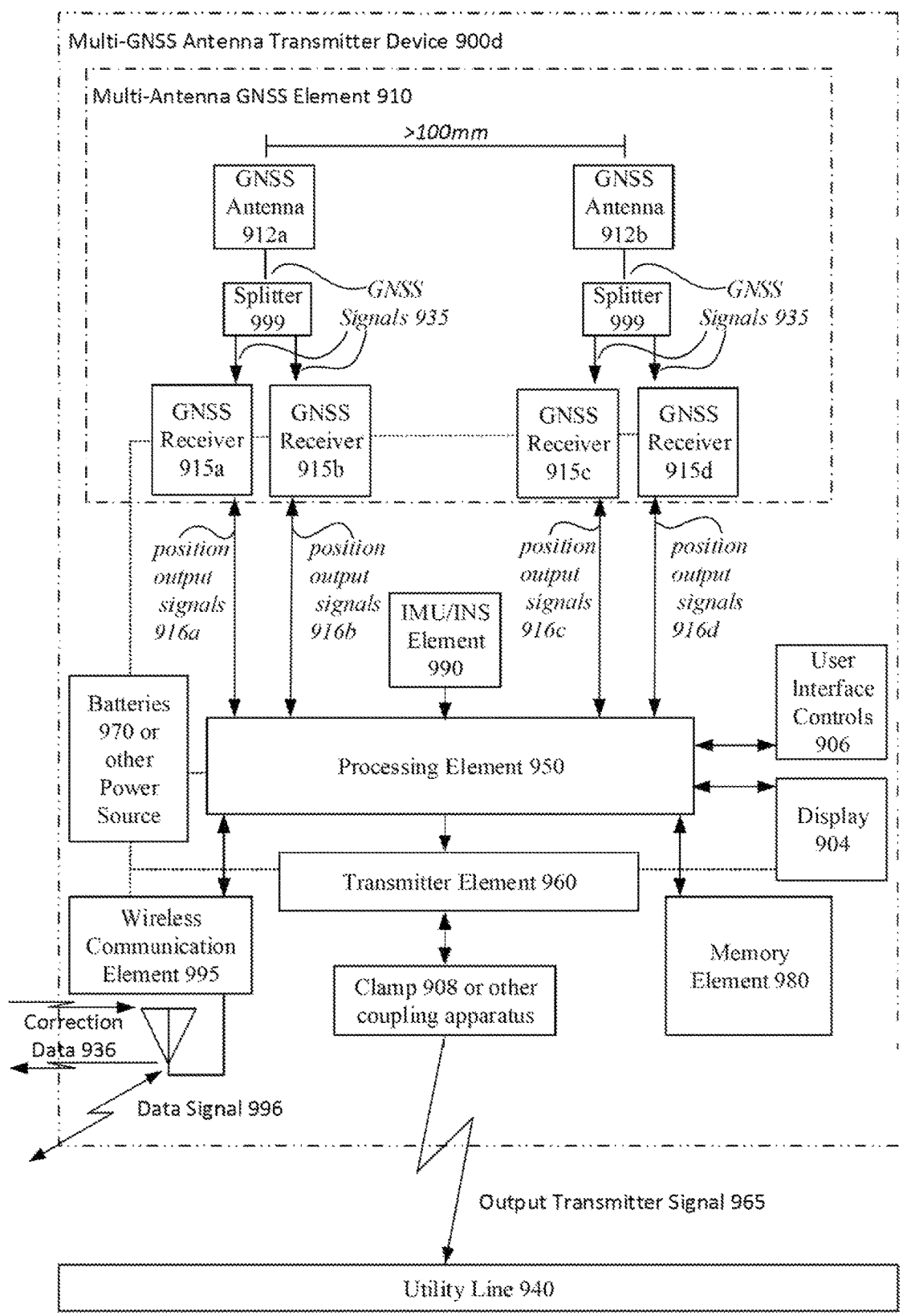
FIG. 9D is an illustration of a multi-antenna utility locator device further showing a splitter.
Figure 9E:
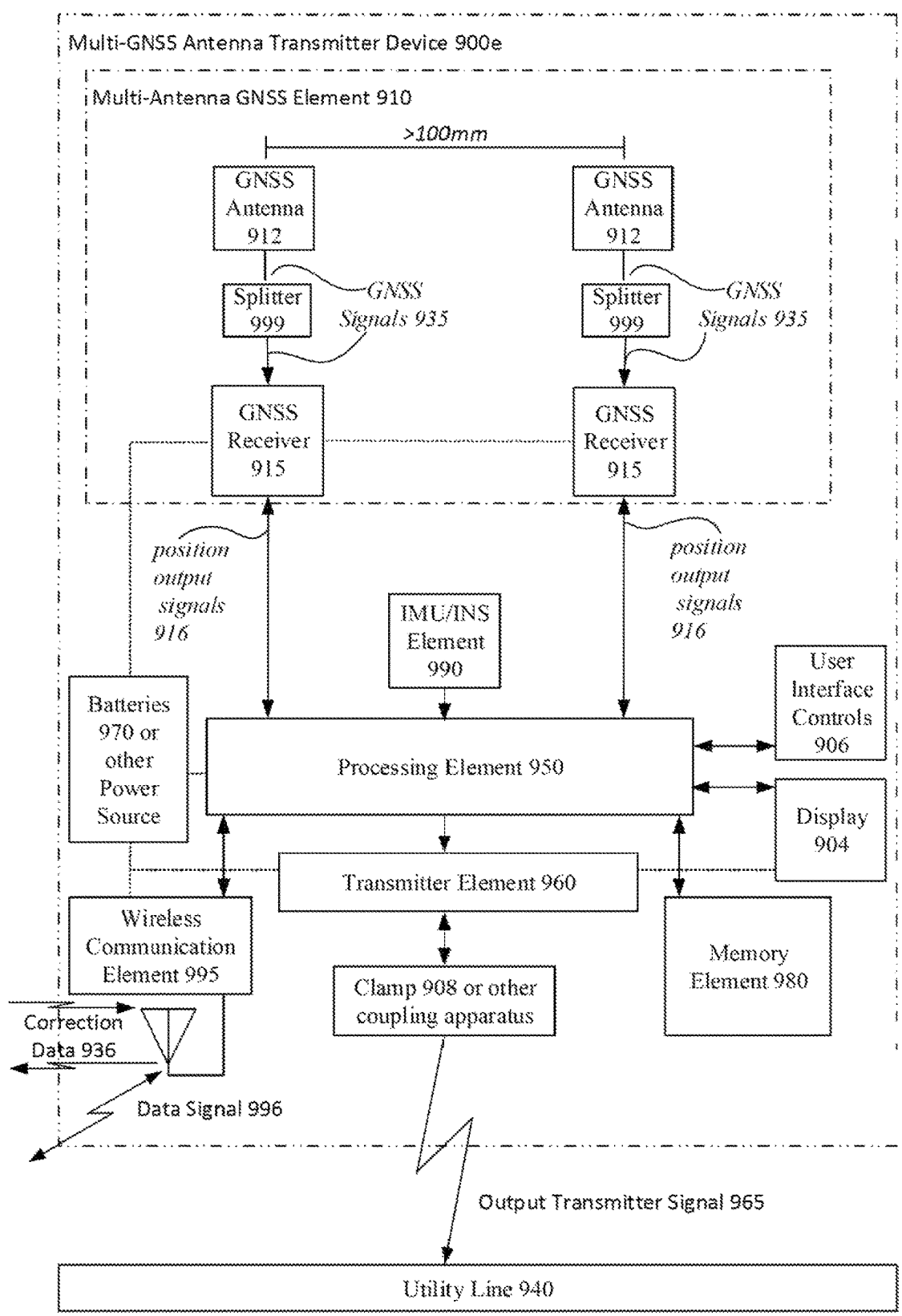
FIG. 9E is an illustration of another multi-antenna utility locator device embodiment.
Figure 9F:
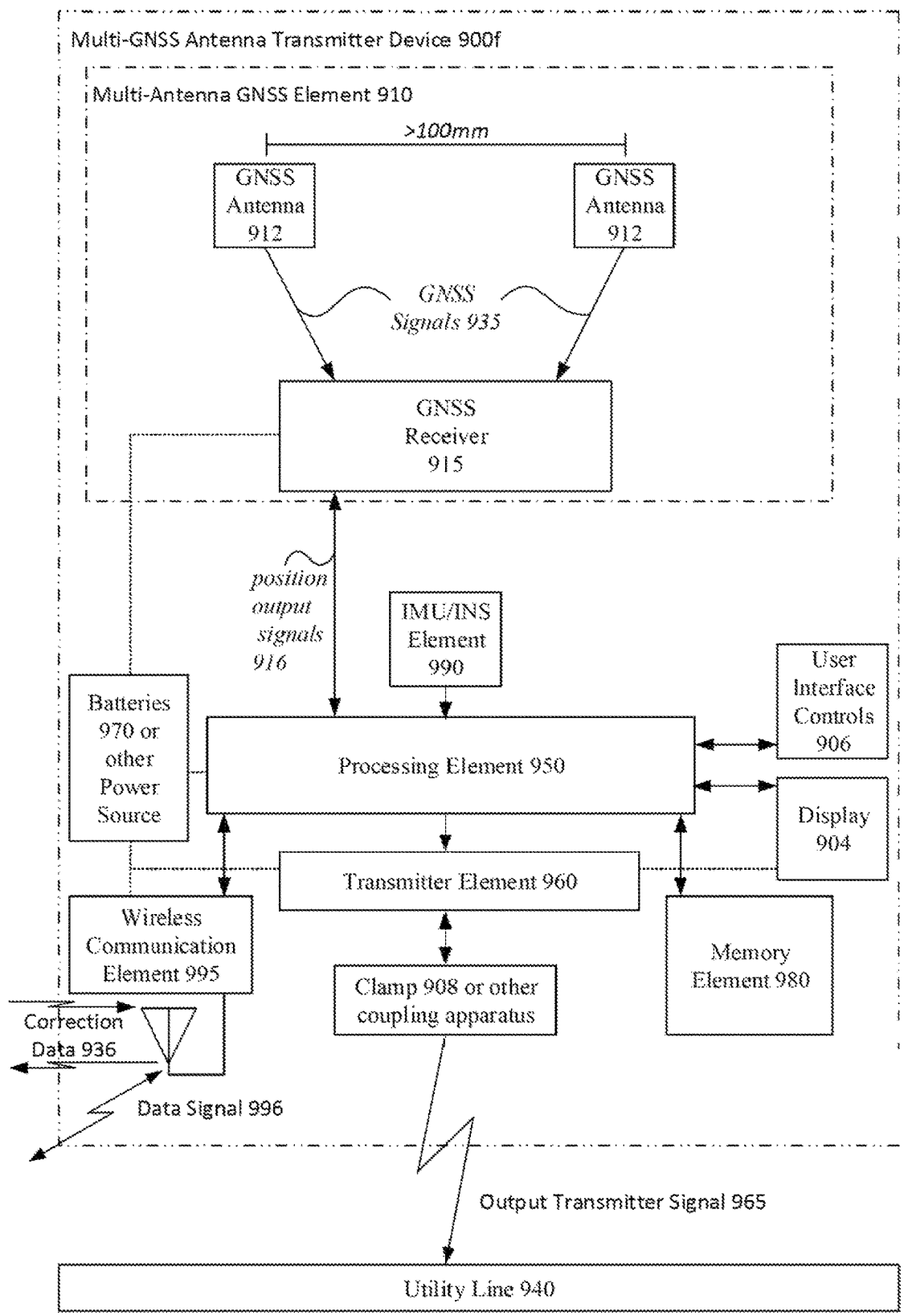
FIG. 9F is an illustration of another multi-antenna utility locator device embodiment.
Figure 10A:
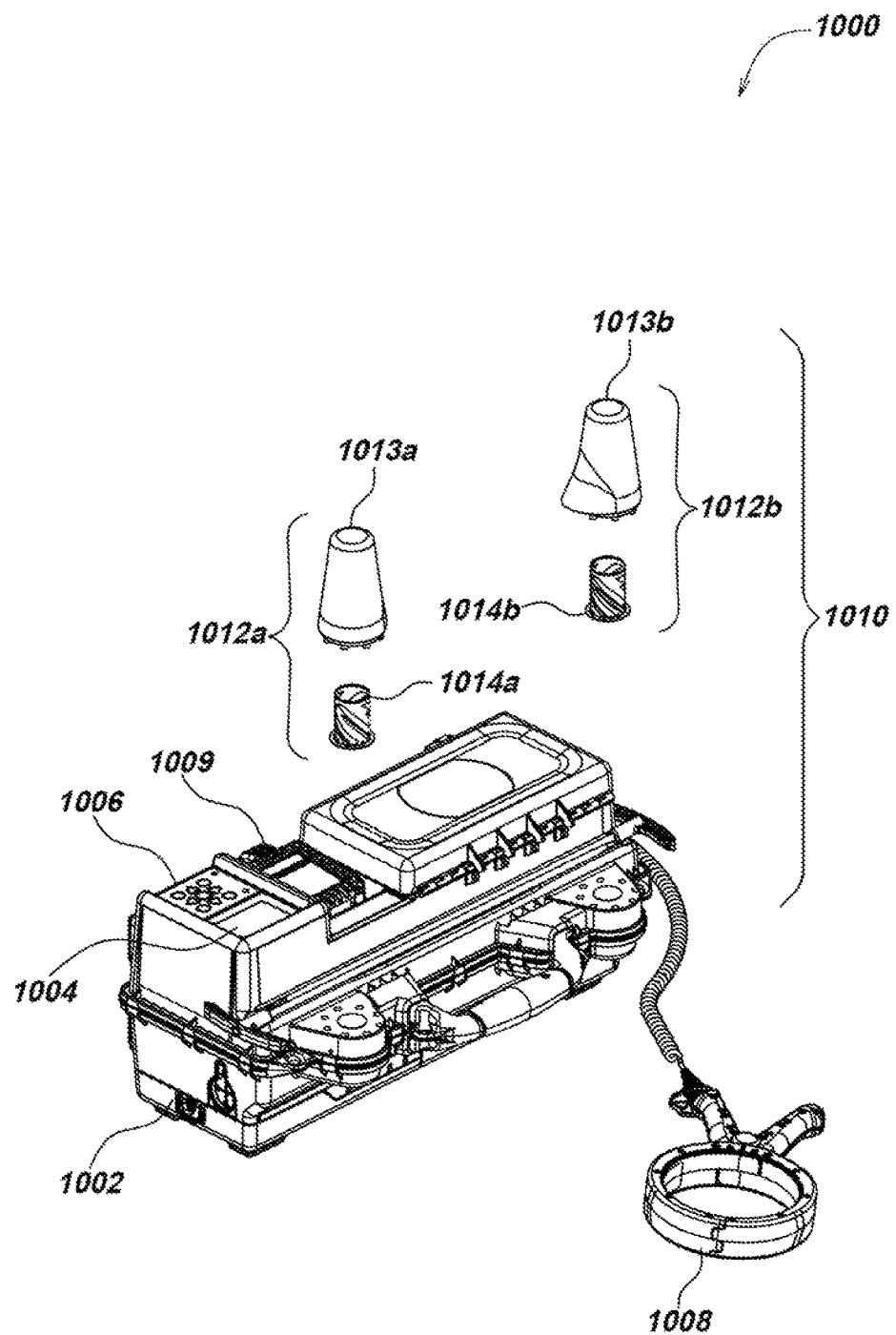
FIG. 10A is an isometric view of a multi-GNSS antenna transmitter device with partially exploded GNSS antennas revealing helical antennas.
Figure 10B:
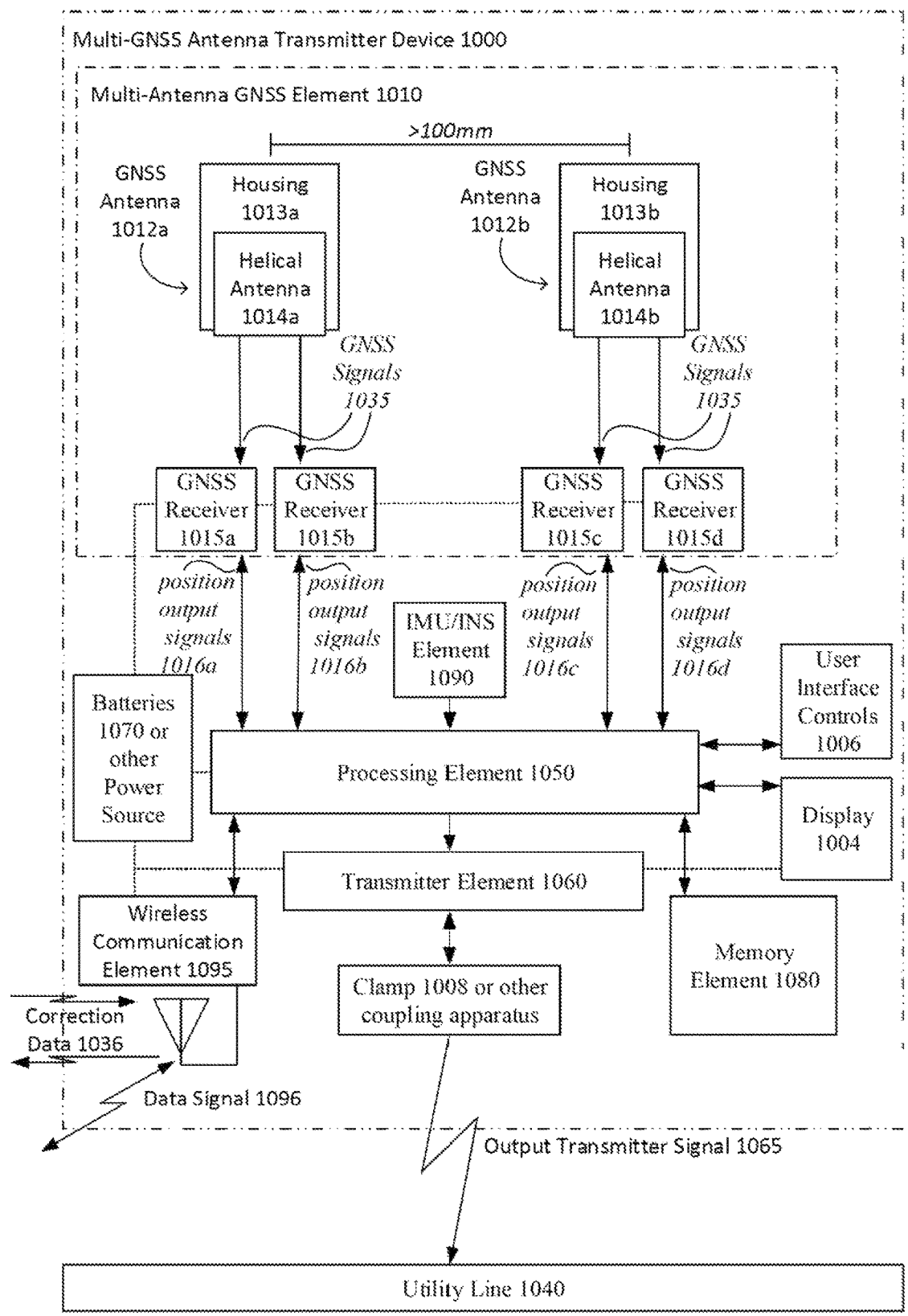
FIG. 10B is a diagram of the multi-GNSS antenna transmitter device of FIG. 10A.
Figure 10C:
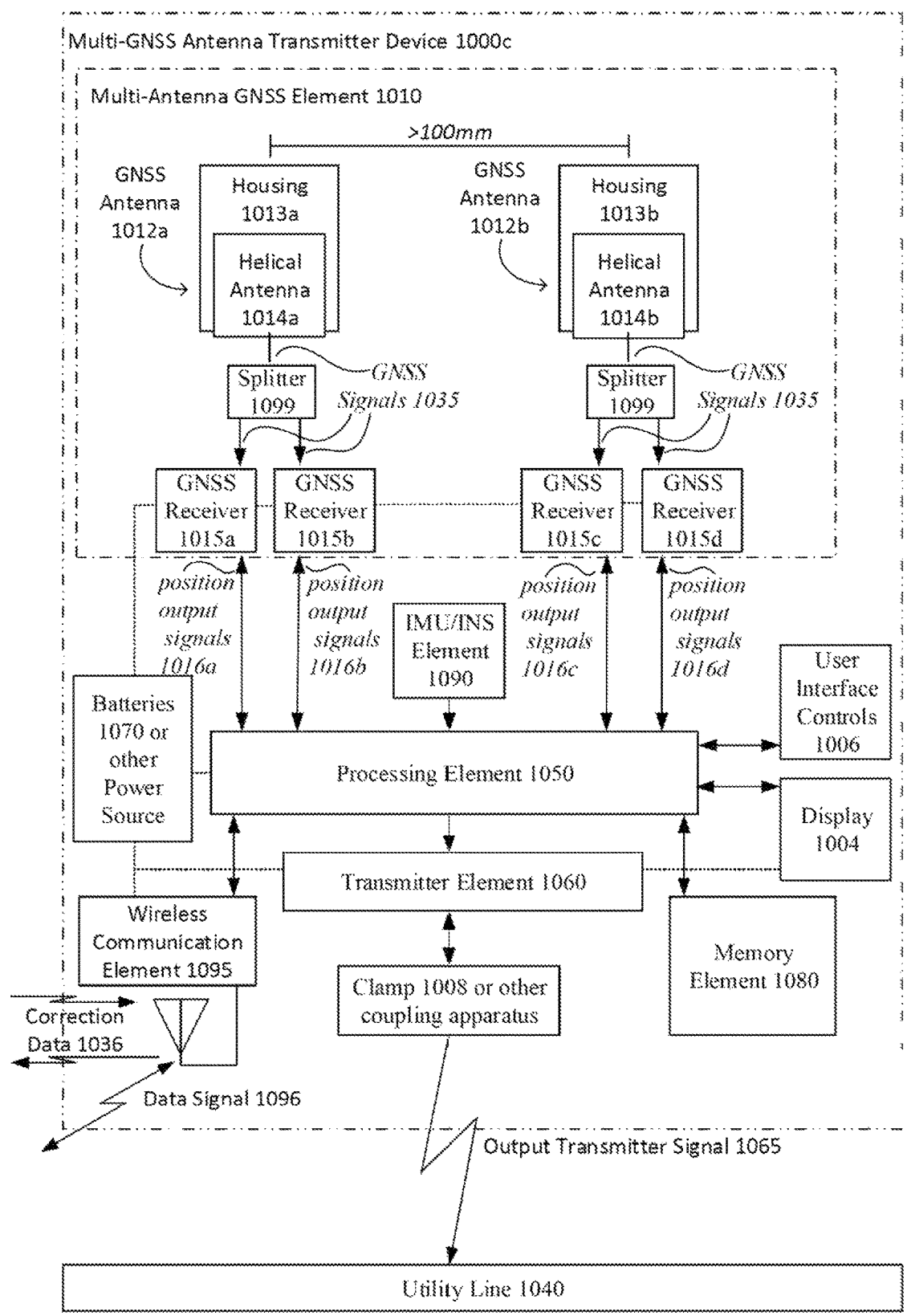
FIG. 10C is an illustration of a multi-antenna utility locator device further showing a splitter.
Figure 10D:
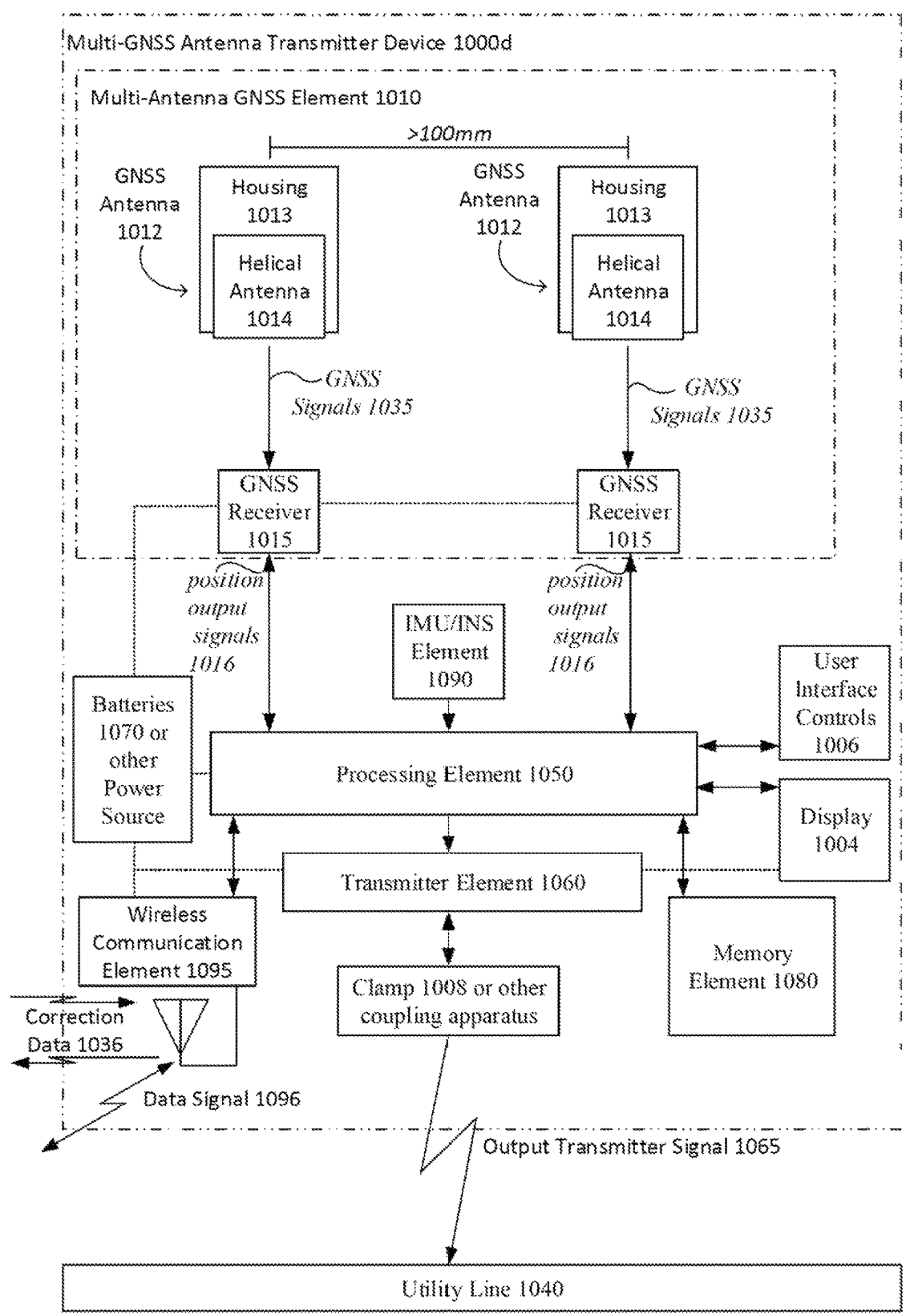
FIG. 10D is an illustration of another multi-antenna utility locator device embodiment.
Figure 10E:
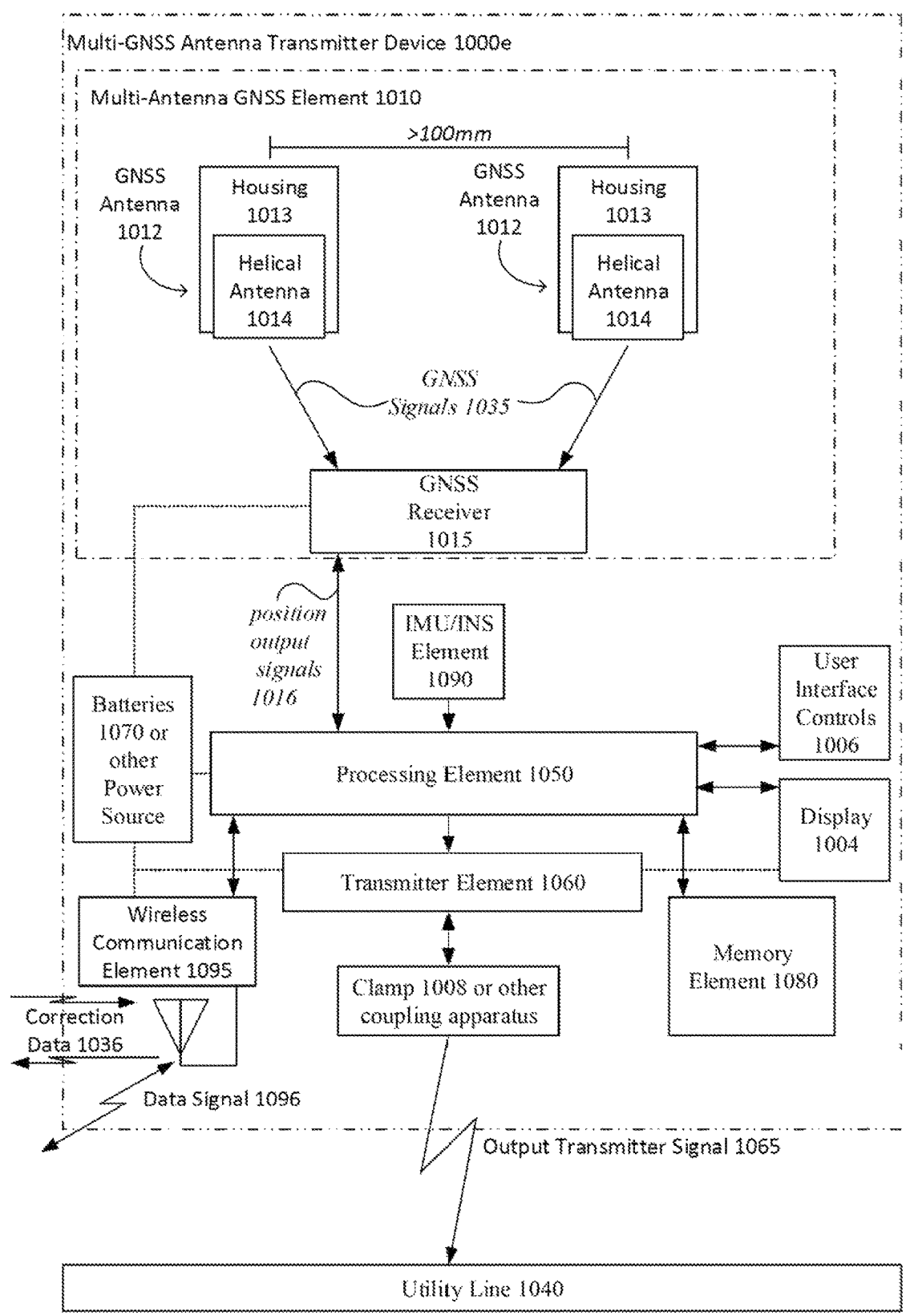
FIG. 10E is an illustration of another multi-antenna utility locator device embodiment.

The present disclosure may include various multi-GNSS antenna transmitter device embodiments such as the multi-GNSS antenna transmitter device 900 of FIGS. 9A-9C, the multi-GNSS antenna transmitter device 900*d* of FIG. 9D, the multi-GNSS antenna transmitter device 900*e* of FIG. 9E, the multi-GNSS antenna transmitter device 900*f* of FIG. 9F, multi-GNSS antenna transmitter device 1000 of FIGS. 10A-10B, the multi-GNSS antenna transmitter device 1000*d* of FIG. 10D, the multi-GNSS antenna transmitter device 1000*e* of FIG. 10E, the multi-GNSS antenna transmitter device 1000*f* of FIG. 10F, multi-GNSS antenna transmitter device 1100 of FIGS. 11A-11B, the multi-GNSS antenna transmitter device 1100*d* of FIG. 11D, the multi-GNSS antenna transmitter device 1100*e* of FIG. 11E, and the multi-GNSS antenna transmitter device 1100*f* of FIG. 11F. The various multi-GNSS antenna transmitter device embodiments may share aspects with the transmitters described in U.S. Pat. No. 8,013,610, issued Sep. 6, 2011, entitled HIGH-Q SELF TUNING LOCATING TRANSMITTER; U.S. Pat. No. 9,880,309, issued Jan. 30, 2018, entitled UTILITY LOCATOR TRANSMITTER APPARATUS AND METHODS; U.S. patent application Ser. No. 15/889,067, filed Feb. 5, 2018, entitled UTILITY LOCATOR TRANSMITTER DEVICES, SYSTEMS, AND METHODS WITH DOCKABLE APPARATUS; U.S. Pat. No. 9,891,337, issued Feb. 13, 2018, entitled UTILITY LOCATOR TRANSMITTER DEVICES, SYSTEMS, AND METHODS WITH DOCKABLE APPARATUS; and U.S. Pat. No. 9,927,546, filed Mar. 27, 2018, entitled PHASE-SYNCHRONIZED BURIED OBJECT TRANSMITTER AND LOCATOR METHODS AND APPARATUS; U.S. Pat. No. 10,754,053, issued Aug. 25, 2020, entitled UTILITY LOCATOR TRANSMITTER DEVICES, SYSTEMS, AND METHODS WITH DOCKABLE APPARATUS of the incorporated applications.

Turning to FIGS. 9A and 9B, a multi-GNSS antenna transmitter device 900 in keeping with the present disclosure may include a housing 902 encasing a transmitter element (e.g., transmitter element 960 of FIGS. 9C-9E) and electronics associated with generating output current (e.g., output transmitter signal 965 of FIGS. 9C-9E) for provision to one or more utilities so as to generate a magnetic field for detection by a utility locator device (e.g., the multi-GNSS antenna utility locator device 903 of FIG. 9B). The multi-GNSS antenna transmitter device 900 may further include a display 904 to communicate information to a user, user input controls 906, and one or more coupling apparatus, such as clamp 908, to directly or inductively couple signal onto one or more utility lines, such as utility line 940 of FIG. 9B. Such coupling apparatuses may include a ground stake 907 or like apparatus for ground return. One or more batteries 970 or other power source may supply power to the various powered elements of the multi-GNSS antenna transmitter device 900.

The multi-GNSS antenna transmitter device 900 may further include a multi-antenna GNSS element 910 having two or more GNSS antennas, such as GNSS antennas 912*a* and 912*b*, each spaced apart by at least 100 millimeters and further coupled to one or more GNSS receivers, such as the GNSS receivers 915*a*, 915*b*, 915*c*, and 915*d* of FIG. 9C. It should be noted that the embodiments described herein having multiple GNSS receivers coupled to a single GNSS antenna, such as the multi-GNSS antenna transmitter device 900, the multiple GNSS observables data streams may compress removing redundant information that is common to the data provided by each GNSS receiver.

It should also be noted that a splitter may be present in some embodiments where distributing of GNSS signals from a single GNSS antenna to a plurality of GNSS receivers may occur such as with the multi-GNSS antenna transmitter device 900 of FIG. 9C. Though such a splitter may be implied to practitioners of the art, for additional clarification the multi-GNSS antenna transmitter device 900*d* of FIG. 9D is illustrated with a splitter 999. The splitter 999 may be or share with the splitter 199 of FIGS. 1E and 1H or other splitter configuration for distributing of GNSS signals to GNSS receivers.

Referring back to FIGS. 9A and 9B, in some embodiments, the GNSS antennas 912*a*/912*b* may, for example, be dual or triple band antennas. Likewise, associated GNSS receivers 915*a*-915*d* (FIG. 9C) may be dual or triple band receivers. For example, the GNSS antennas 912*a*/912*b* and GNSS receivers 915*a*-915*d* (FIG. 9C) may be configured for the L1, L2, and L5 GPS bands. In other embodiments, the GNSS antennas and associated GNSS receivers may be configured for other signal bands. Further embodiments in keeping with the present disclosure may have GNSS antennas with different form factors including, but not limited to, helical antennas (e.g., the helical antennas 1014*a*/1014*b* of FIG. 10B), patch antennas (e.g., the patch antennas 1114*a*/1114*b* of FIG. 11B), or other antenna configurations.

It should be noted that in FIG. 9C, pairs of GNSS receivers 915*a*/915*b* and 915*c*/915*d* may each couple to a single one of the GNSS antennas 912*a* or 912*b* multi-GNSS antenna transmitter device 900. In other embodiments, a multi-GNSS antenna transmitter device in keeping with the present disclosure may have other numbers of GNSS antennas and GNSS receivers in various other configurations. Some such different configurations are illustrated with the GNSS antennas 912 and GNSS receivers 915 of the multi-GNSS antenna transmitter device embodiments 900*e* and 900*f* illustrated in FIGS. 9E and 9F.

As illustrated in FIG. 9E, for instance, the multi-GNSS antenna transmitter device 900*e* may include a single GNSS antennas 912 coupled to each individual GNSS receivers 915. The GNSS receivers 915 may be dual or triple band receivers. Likewise, the GNSS antennas 912 and GNSS receivers 915 may be configured for the L1, L2, and L5 GPS bands and/or other signal bands. In the multi-GNSS antenna transmitter device 900*e*, a GNSS signal 935 may be communicated from each GNSS antenna 912 to an individually coupled one of the GNSS receivers 915. Each of the GNSS receivers 915 may further communicate position output signals 916 to a processing element 950.

In yet further embodiments, such as the multi-GNSS antenna transmitter device 900*f* of FIG. 9F, multiple GNSS antennas 912 may couple to a single one of the GNSS receivers 915. The GNSS receivers 915 may be dual or triple band receivers. Likewise, the GNSS antennas 912 and GNSS receivers 915 may be configured for the L1, L2, and L5 GPS bands and/or other signal bands. In some such embodiments, a GNSS receiver configured for use with multiple GNSS antennas may be a multi-input GNSS receiver that provides a measure of pose (pitch, roll, heading, or like orientation measurements) such as the mosaic-H GNSS receiver commercially available from Septentrio.

Turning to FIG. 9B, each GNSS antenna 912*a*-912*b* may receive GNSS signals 935 from a plurality of navigation satellites 930. Likewise real time kinematic (RTK), space state representation (SSR), or other differential correction data 936 may be received via a wireless communication element 995 (FIG. 9C) from one or more base stations 932. Each GNSS receiver 915a-915d (FIG. 9C) may determine at least one position estimate associated with each GNSS antenna 912a and 912b. With the generation of position estimates, the method 500 of FIG. 5A may be used to determine a heading for the multi-GNSS antenna transmitter device 900. Likewise, tilt/pose may be determined via the method 530 of FIG. 5B and/or a full pose may be determined wherein the multi-GNSS antenna transmitter device embodiment includes additional sensors for determining pose/tilt such as the IMU/INS element 950 of FIG. 9C that may include, but should not be limited to, one or more accelerometers, gyroscopic sensors, magnetometers, inertial measurement units (IMU), inertial navigation systems (INS) and or other like sensors or via method 560 of FIG. 5C wherein the multi-GNSS antenna transmitter device embodiment includes more than two GNSS antennas. In some embodiments, the magnetometers may be arranged in an array to sense magnetic distortions.

Turning to FIG. 9C, multi-GNSS antenna transmitter device 900 may include a processing element 950 comprising one or more processors coupled to a transmitter element 960 for generating output current, such as output transmitter signal 965, for provision to one or more utilities 940, processing and compressing data for communication, and/or for making differential corrections to the position output data. The coupling of output transmitter signal 965 may cause a magnetic field to emanate from the utility, such as the magnetic field 945 (FIG. 9B) from utility line 940, which may further be detected by a utility locator device, such as the multi-GNSS antenna utility locator device 903 of FIG. 9B. The processing element 950 may further be coupled to the GNSS element 910 to receive position output signals 916a-916d in order to generate data relating to position, heading, and pose of the multi-GNSS antenna transmitter device 900 thereof in a world frame. The processing element 950 may further be used for processing and compressing communication data and/or for making differential corrections to the positioning data, such as the position output signals 916a-916d. The multi-GNSS antenna transmitter device 900 may further include a memory element 980 having one or more non-transitory memories for storing data associated with output transmitter signals 965 and positioning data (e.g., GNSS signals 935 and output position signals 916a-916d).

Some multi-GNSS antenna transmitter device embodiments in keeping with the present disclosure may optionally include additional sensors and systems for determining position, orientation, and pose. As illustrated in FIG. 9C, the multi-GNSS antenna transmitter device 900 may include an IMU/INS element 990. The IMU/INS 990 may include, but should not be limited to, one or more accelerometers, gyroscopic sensors, magnetometers, inertial measurement units (IMU), inertial navigation systems (INS) and or other like sensors. In some embodiments, the magnetometers may be arranged in an array to sense magnetic distortions.

Still referring to FIG. 9C, the multi-GNSS antenna transmitter device 900 may further include a wireless communication element 995. The wireless communication element 995 may communicate data via a data signals 996 with one or more utility locating system devices such as, but not limited to, utility locator devices (e.g., the multi-GNSS utility locator device 100 of FIGS. 1A—1D, multi-GNSS utility locator device 100e of FIG. 1E, multi-GNSS utility locator device 100f of FIG. 1F, and multi-GNSS utility locator device 100g of FIG. 1G, the multi-GNSS utility locator device 200 of FIGS. 2A-2B, multi-GNSS utility locator device 200c of FIG. 2C, multi-GNSS utility locator device 200d of FIG. 2D, and multi-GNSS utility locator device 200e of FIG. 2E, the multi-GNSS utility locator device 300 of FIGS. 3A-3B, multi-GNSS utility locator device 300c of FIG. 3C, multi-GNSS utility locator device 300d of FIG. 3D, and multi-GNSS utility locator device 300e of FIG. 3E), GNSS backpack devices (e.g., multi-GNSS antenna backpack device 600 of FIGS. 6A-6C, multi-GNSS antenna backpack device 600d of FIG. 6D, multi-GNSS antenna backpack device 600e of FIG. 6E, multi-GNSS antenna backpack device 600f of FIG. 6F, multi-GNSS antenna backpack device 700 of FIGS. 7A-7B, multi-GNSS antenna backpack device 700c of FIG. 7C, multi-GNSS antenna backpack device 700d of FIG. 7D, multi-GNSS antenna backpack device 600e of FIG. 7E, or multi-GNSS antenna backpack device 800 of FIGS. 8A-8C, multi-GNSS antenna backpack device 800c of FIG. 8C, multi-GNSS antenna backpack device 800d of FIG. 8D, multi-GNSS antenna backpack device 800e of FIG. 8E), vehicle-mounted locating devices (e.g., the multi-GNSS antenna vehicle-mounted locating device 1300 of FIGS. 13A-13B, multi-GNSS antenna vehicle-mounted locating device 1300c of FIG. 13C, multi-GNSS antenna vehicle-mounted locating device 1300d of FIG. 13D, multi-GNSS antenna vehicle-mounted locating device 1300e of FIG. 13E, multi-GNSS antenna vehicle-mounted locating device 1400 of FIGS. 14A-14B, multi-GNSS antenna vehicle-mounted locating device 1400c of FIG. 14C, multi-GNSS antenna vehicle-mounted locating device 1400d of FIG. 14D, multi-GNSS antenna vehicle-mounted locating device 1400e of FIG. 14E, multi-GNSS antenna vehicle-mounted locating device 1500 of FIGS. 15A-15B, multi-GNSS antenna vehicle-mounted locating device 1500c of FIG. 15C, multi-GNSS antenna vehicle-mounted locating device 1500d of FIG. 15D, or multi-GNSS antenna vehicle-mounted locating device 1500e of FIG. 15E), remote databases, computers, smart phones, RTK base stations, or the like. Likewise, the wireless communication element 995 may receive correction data 936 (FIG. 9B) to further supply correction data to the processing element 950. The wireless communication element 995 may, for example, be or include cellular, Bluetooth, ISM, Wi-Fi, or like wireless transceivers. In some embodiments, the data signals 996 received at the communication element 995 may include data relating to RTK, SSR, or other differential corrections that may further allow the multi-GNSS antenna transmitter device 900 to function as a base station and broadcast correction data 936 to be received by one or more utility locator devices and/or other rovers. Such methods are further described in method 1200 of FIG. 12A and method 1250 of FIG. 12B.

Turning to FIGS. 10A and 10B, a multi-GNSS antenna transmitter device 1000 is illustrated which may be or share aspects with the multi-GNSS antenna transmitter device 900 of FIGS. 9A-9C, multi-GNSS antenna transmitter device 900d of FIG. 9D, multi-GNSS antenna transmitter device 900e of FIG. 9E, or multi-GNSS antenna transmitter device 900f of FIG. 9F. The multi-GNSS antenna transmitter device 1000 may include a housing 1002 (FIG. 10A) encasing a transmitter element 1060 (FIG. 10B) which may be or include electronics associated with generating output transmitter signal 1065 (FIG. 10B) for provision to one or more utilities so as to generate a magnetic field for detection by a utility locator device (e.g., utility locator device 903 of FIG. 9B). The multi-GNSS antenna transmitter device 1000 may further include a display 1004 to communicate information to a user, user input controls 1006, and other internal electronics as well as one or more coupling apparatus, such as clamp 1008, to directly or inductively couple signal onto one or more utility lines 1040 (FIG. 10B). Such coupling apparatus may likewise include that used for ground return. One or more batteries 1070 or other power source may supply power to the various powered elements of the multi-GNSS antenna transmitter device 1000. The multi-GNSS antenna transmitter device 1000 may further include a multi-antenna GNSS element 1010 having two or more GNSS antennas 1012*a* and 1012*b* spaced apart a predetermined known spacing that is at least 100 millimeters. The GNSS antennas 1012*a*/1012*b* may each include a housing 1013*a*/1013*b* encapsulating a helical antenna 1014*a*/1014*b*.

Turning to FIG. 10B, each helical antenna 1014*a*/1014*b* may be further coupled to one or more GNSS receivers such as the GNSS receivers 1015*a*-1015*d*. It should be noted that a splitter may be present in some embodiments where distributing of GNSS signals from a single GNSS antenna to a plurality of GNSS receivers may occur such as with the multi-GNSS antenna transmitter device 1000 of FIG. 10C. Though such a splitter may be implied to practitioners of the art, for additional clarification the multi-GNSS antenna transmitter device 1000*d* of FIG. 10D is illustrated with a splitter 1099. The splitter 1099 may be or share aspects with the splitter 199 of FIGS. 1E and 1H or other splitter configuration for distributing of GNSS signals to GNSS receivers.

It should also be noted that in FIG. 10C, pairs of GNSS receivers 1015*a*/1015*b* and 1015*c*/1015*d* may each couple to a single one of the GNSS antennas 1012*a* or 1012*b* multi-GNSS antenna transmitter device 1000. In other embodiments, a multi-GNSS antenna transmitter device in keeping with the present disclosure may have other numbers of GNSS antennas and GNSS receivers in various other configurations. Some such different configurations are illustrated with the GNSS antennas 1012 and GNSS receivers 1015 of the multi-GNSS antenna transmitter device embodiments 1000*d* and 1000*e* illustrated in FIGS. 10D and 10E.

As illustrated in FIG. 10D, for instance, the multi-GNSS antenna transmitter device 1000*d* may include a single GNSS antennas 1012 coupled to each individual GNSS receivers 1015. The GNSS receivers 1015 may be dual or triple band receivers. Likewise, the GNSS antennas 1012 and GNSS receivers 1015 may be configured for the L1, L2, and L5 GPS bands and/or other signal bands. In the multi-GNSS antenna transmitter device 1000*d*, a GNSS signal 1035 may be communicated from each GNSS antenna 1012 to an individually coupled one of the GNSS receivers 1015. Each of the GNSS receivers 1015 may further communicate position output signals 1016 to a processing element 1050.

In yet further embodiments, such as the multi-GNSS antenna transmitter device 1000*e* of FIG. 10E, multiple GNSS antennas 1012 may couple to a single one of the GNSS receivers 1015. The GNSS receivers 1015 may be dual or triple band receivers. Likewise, the GNSS antennas 1012 and GNSS receivers 1015 may be configured for the L1, L2, and L5 GPS bands and/or other signal bands. In some such embodiments, a GNSS receiver configured for use with multiple GNSS antennas may be a multi-input GNSS receiver that provides a measure of pose (pitch, roll, heading, or like orientation measurements) such as the mosaic-H GNSS receiver commercially available from Septentrio.

Referring back to FIG. 10B, the multi-GNSS antenna transmitter device 1000 may include a processing element 1050 comprising one or more processors coupled to a transmitter element 1060 for generating output current, such as output transmitter signal 1065, for provision to one or more utilities 1040, processing and compressing data for communication, and/or for making differential corrections to the position output data The coupling of output transmitter signal 1065 may allow for utility line 1040 to be located by a utility locator device, such as the multi-GNSS antenna utility locator device 100 of FIGS. 1A-1D. The processing element 1050 may further be coupled to the multi-antenna GNSS element 1010 to receive position output signals 1016*a*-1016*d* in order to generate data relating to position, heading, and pose of the multi-GNSS antenna transmitter device 1000 in a world frame. The processing element 1050 may further be used for processing and compressing communication data and/or for making differential corrections to the positioning data, such as the position output signals 1016*a*-1016*d*. The multi-GNSS antenna transmitter device 1000 may further include a memory element 1080 having one or more non-transitory memories for storing data associated with output transmitter signals 1065 and positioning data (e.g., output position signals 1016*a*-1016*d*). The multi-GNSS antenna transmitter device 1000 may further include an IMU/INS element 1090. The IMU/INS 1090 may include, but should not be limited to, one or more accelerometers, gyroscopic sensors, magnetometers, inertial measurement units (IMU), inertial navigation systems (INS) and or other like sensors. In some embodiments, the magnetometers may be arranged in an array to sense magnetic distortions.

Still referring to FIG. 10B, the multi-GNSS antenna transmitter device 1000 may further include a wireless communication element 1095. The wireless communication element 1095 may communicate data via a data signals 1096 with one or more utility locating system devices such as, but not limited to, utility locator devices (e.g., the multi-GNSS utility locator device 100 of FIGS. 1A-1D, multi-GNSS utility locator device 100*e* of FIG. 1E, multi-GNSS utility locator device 100*f* of FIG. 1F, and multi-GNSS utility locator device 100*g* of FIG. 1G, the multi-GNSS utility locator device 200 of FIGS. 2A-2B, multi-GNSS utility locator device 200*c* of FIG. 2C, multi-GNSS utility locator device 200*d* of FIG. 2D, and multi-GNSS utility locator device 200*e* of FIG. 2E, the multi-GNSS utility locator device 300 of FIGS. 3A-3B, multi-GNSS utility locator device 300*c* of FIG. 3C, multi-GNSS utility locator device 300*d* of FIG. 3D, and multi-GNSS utility locator device 300*e* of FIG. 3E), GNSS backpack devices (e.g., multi-GNSS antenna backpack device 600 of FIGS. 6A-6C, multi-GNSS antenna backpack device 600*d* of FIG. 6D, multi-GNSS antenna backpack device 600*e* of FIG. 6E, multi-GNSS antenna backpack device 600*f* of FIG. 6F, multi-GNSS antenna backpack device 700 of FIGS. 7A-7B, multi-GNSS antenna backpack device 700*c* of FIG. 7C, multi-GNSS antenna backpack device 700*d* of FIG. 7D, multi-GNSS antenna backpack device 600*e* of FIG. 7E, or multi-GNSS antenna backpack device 800 of FIGS. 8A-8C, multi-GNSS antenna backpack device 800*c* of FIG. 8C, multi-GNSS antenna backpack device 800*d* of FIG. 8D, multi-GNSS antenna backpack device 800*e* of FIG. 8E), vehicle-mounted locating devices (e.g., the multi-GNSS antenna vehicle-mounted locating device 1300 of FIGS. 13A-13B, multi-GNSS antenna vehicle-mounted locating device 1300*c* of FIG. 13C, multi-GNSS antenna vehicle-mounted locating device 1300*d* of FIG. 13D, multi-GNSS antenna vehicle-mounted locating device 1300*e* of FIG. 13E, multi-GNSS antenna vehicle-mounted locating device 1400 of FIGS. 14A-14B, multi-GNSS antenna vehicle-mounted locating device 1400*c* of FIG. 14C, multi-GNSS antenna vehicle-mounted locating device 1400*d* of FIG. 14D, multi- GNSS antenna vehicle-mounted locating device 1400e of FIG. 14E, multi-GNSS antenna vehicle-mounted locating device 1500 of FIGS. 15A-15B, multi-GNSS antenna vehicle-mounted locating device 1500c of FIG. 15C, multi-GNSS antenna vehicle-mounted locating device 1500d of FIG. 15D, or multi-GNSS antenna vehicle-mounted locating device 1500e of FIG. 15E), remote databases, computers, smart phones, RTK base stations, or the like. Likewise, the wireless communication element 1095 may receive correction data 1036 to further supply correction data to the processing element 1050. The wireless communication element 1095 may, for example, be or include cellular, Bluetooth, ISM, Wi-Fi, or like wireless transceivers. In some embodiments, the data signals 1096 received at the communication element 1095 may include data relating to RTK, SSR, or other differential corrections that may further allow the multi-GNSS antenna transmitter device 1000 to function as a base station and broadcast correction data 1036 to be received by one or more utility locator devices and/or other rovers. Such methods are further described in method 1200 of FIG. 12A and method 1250 of FIG. 12B.

Turning to FIGS. 11A and 11B, a multi-GNSS antenna transmitter device 1100 is illustrated which may be or share aspects with the multi-GNSS antenna transmitter device 900 of FIGS. 9A-9C, multi-GNSS antenna transmitter device 900d of FIG. 9D, multi-GNSS antenna transmitter device 900e of FIG. 9E, or multi-GNSS antenna transmitter device 900f of FIG. 9F. The multi-GNSS antenna transmitter device 1100 may include a housing 1102 (FIG. 11A) enclosing transmitter element 1160 (FIG. 11B) which may include electronics associated with generating output transmitter signal 1165 (FIG. 11B) for provision to one or more utilities (e.g., utility 1140 of FIG. 11B) so as to generate a magnetic field for detection by a utility locator device (e.g., utility locator device 903 of FIG. 9B). The multi-GNSS antenna transmitter device 1100 may further include a display 1104 to communicate information to a user, user input controls 1106, and other internal electronics as well as one or more coupling apparatus, such as clamp 1108, to directly or inductively couple signal onto one or more utility lines 1140. Such coupling apparatus may likewise include that used for ground return. One or more batteries 1170 or other power source may supply power to the various powered elements of the multi-GNSS antenna transmitter device 1100. The multi-GNSS antenna transmitter device 1100 may further include a multi-antenna GNSS element 1110 having two or more GNSS antennas 1112a and 1112b spaced apart a predetermined known spacing that is at least 100 millimeters. The GNSS antennas 1112a/1112b may each include a housing 1113a/1113b encapsulating a patch antenna 1114a/1114b.

Turning to FIG. 11B, each patch antenna 1114a/1114b may be further coupled to one or more GNSS receivers such as the GNSS receivers 1115a-1115d. It should be noted that a splitter may be present in some embodiments where distributing of GNSS signals from a single GNSS antenna to a plurality of GNSS receivers may occur such as with the multi-GNSS antenna transmitter device 1100 of FIG. 11C. Though such a splitter may be implied to practitioners of the art, for additional clarification the multi-GNSS antenna transmitter device 1100d of FIG. 11D is illustrated with a splitter 1199. The splitter 1199 may be or share aspects with the splitter 199 of FIGS. 1E and 1H or other splitter configuration for distributing of GNSS signals to GNSS receivers.

It should also be noted that in FIG. 11C, pairs of GNSS receivers 1115a/1115b and 1115c/1115d may each couple to a single one of the GNSS antennas 1112a or 1112b multi-GNSS antenna transmitter device 1100. In other embodiments, a multi-GNSS antenna transmitter device in keeping with the present disclosure may have other numbers of GNSS antennas and GNSS receivers in various other configurations. Some such different configurations are illustrated with the GNSS antennas 1112 and GNSS receivers 1115 of the multi-GNSS antenna transmitter device embodiments 1100d and 1100e illustrated in FIGS. 11D and 11E.

As illustrated in FIG. 11D, for instance, the multi-GNSS antenna transmitter device 1100d may include a single GNSS antennas 1112 coupled to each individual GNSS receivers 1115. The GNSS receivers 1115 may be dual or triple band receivers. Likewise, the GNSS antennas 1112 and GNSS receivers 1115 may be configured for the L1, L2, and L5 GPS bands and/or other signal bands. In the multi-GNSS antenna transmitter device 1100d, a GNSS signal 1135 may be communicated from each GNSS antenna 1112 to an individually coupled one of the GNSS receivers 1115. Each of the GNSS receivers 1115 may further communicate position output signals 1116 to a processing element 1150.

In yet further embodiments, such as the multi-GNSS antenna transmitter device 1100e of FIG. 11E, multiple GNSS antennas 1112 may couple to a single one of the GNSS receivers 1115. The GNSS receivers 1115 may be dual or triple band receivers. Likewise, the GNSS antennas 1112 and GNSS receivers 1115 may be configured for the L1, L2, and L5 GPS bands and/or other signal bands. In some such embodiments, a GNSS receiver configured for use with multiple GNSS antennas may be a multi-input GNSS receiver that provides a measure of pose (pitch, roll, heading, or like orientation measurements) such as the mosaic-H GNSS receiver commercially available from Septentrio.

Referring back to FIG. 11B, the multi-GNSS antenna transmitter device 1100 may include a processing element 1150 comprising one or more processors coupled to a transmitter element 1160 for generating output current, such as output transmitter signal 1165, for provision to one or more utilities 1140, processing and compressing data for communication, and/or for making differential corrections to the position output data The coupling of output transmitter signal 1165 may allow for utility line 1140 to be located by a utility locator device, such as the multi-GNSS antenna utility locator device 100 of FIGS. 1A—1D. The processing element 1150 may further be coupled to the multi-antenna GNSS element 1110 to receive position output signals 1116a-1116d in order to generate data relating to position, heading, and pose of the multi-GNSS antenna transmitter device 1100 in a world frame. The processing element 1150 may further be used for processing and compressing communication data and/or for making differential corrections to the positioning data, such as the position output signals 1116a-1116d. The multi-GNSS antenna transmitter device 1100 may further include a memory element 1180 having one or more non-transitory memories for storing data associated with output transmitter signals 1165 and positioning data (e.g., output position signals 1116a-1116d). The multi-GNSS antenna transmitter device 1100 may further include an IMU/INS element 1190. The IMU/INS element 1190 may include, but should not be limited to, one or more accelerometers, gyroscopic sensors, magnetometers, inertial measurement units (IMU), inertial navigation systems (INS) and or other like sensors. In some embodiments, the magnetometers may be arranged in an array to sense magnetic distortions.

Still referring to FIG. 11B, the multi-GNSS antenna transmitter device 1100 may further include a wireless communication element 1195. The wireless communication element 1195 may communicate data via a data signals 1196 with one or more utility locating system devices such as, but not limited to, utility locator devices (e.g., the multi-GNSS utility locator device 100 of FIGS. 1A-1D, multi-GNSS utility locator device 100e of FIG. 1E, multi-GNSS utility locator device 100f of FIG. 1F, and multi-GNSS utility locator device 100g of FIG. 1G, the multi-GNSS utility locator device 200 of FIGS. 2A-2B, multi-GNSS utility locator device 200c of FIG. 2C, multi-GNSS utility locator device 200d of FIG. 2D, and multi-GNSS utility locator device 200e of FIG. 2E, the multi-GNSS utility locator device 300 of FIGS. 3A-3B, multi-GNSS utility locator device 300c of FIG. 3C, multi-GNSS utility locator device 300d of FIG. 3D, and multi-GNSS utility locator device 300e of FIG. 3E), GNSS backpack devices (e.g., multi-GNSS antenna backpack device 600 of FIGS. 6A-6C, multi-GNSS antenna backpack device 600d of FIG. 6D, multi-GNSS antenna backpack device 600e of FIG. 6E, multi-GNSS antenna backpack device 600f of FIG. 6F, multi-GNSS antenna backpack device 700 of FIGS. 7A-7B, multi-GNSS antenna backpack device 700c of FIG. 7C, multi-GNSS antenna backpack device 700d of FIG. 7D, multi-GNSS antenna backpack device 600e of FIG. 7E, or multi-GNSS antenna backpack device 800 of FIGS. 8A-8C, multi-GNSS antenna backpack device 800c of FIG. 8C, multi-GNSS antenna backpack device 800d of FIG. 8D, multi-GNSS antenna backpack device 800e of FIG. 8E), vehicle-mounted locating devices (e.g., the multi-GNSS antenna vehicle-mounted locating device 1300 of FIGS. 13A-13B, multi-GNSS antenna vehicle-mounted locating device 1300c of FIG. 13C, multi-GNSS antenna vehicle-mounted locating device 1300d of FIG. 13D, multi-GNSS antenna vehicle-mounted locating device 1300e of FIG. 13E, multi-GNSS antenna vehicle-mounted locating device 1400 of FIGS. 14A-14B, multi-GNSS antenna vehicle-mounted locating device 1400c of FIG. 14C, multi-GNSS antenna vehicle-mounted locating device 1400d of FIG. 14D, multi-GNSS antenna vehicle-mounted locating device 1400e of FIG. 14E, multi-GNSS antenna vehicle-mounted locating device 1500 of FIGS. 15A-15B, multi-GNSS antenna vehicle-mounted locating device 1500c of FIG. 15C, multi-GNSS antenna vehicle-mounted locating device 1500d of FIG. 15D, or multi-GNSS antenna vehicle-mounted locating device 1500e of FIG. 15E), remote databases, computers, smart phones, RTK base stations, or the like. Likewise, the wireless communication element 1195 may receive correction data 1136 to further supply correction data to the processing element 1150. The wireless communication element 1195 may, for example, be or include cellular, Bluetooth, ISM, Wi-Fi, or like wireless transceivers. In some embodiments, the data signals 1196 received at the communication element 1195 may include data relating to RTK, SSR, or other differential corrections that may further allow the multi-GNSS antenna transmitter device 1100 to function as a base station and broadcast correction data 1136 to be received by one or more utility locator devices and/or other rovers. Such methods are further described in method 1200 of FIG. 12A and method 1250 of FIG. 12B.

In multi-GNSS antenna transmitter device embodiments configured for wireless communication, the multi-GNSS antenna transmitter device may be a base station generating correction data for performing RTK, SSR, or other differential corrections. Likewise, in other multi-GNSS antenna transmitter device embodiments, such as those not configured for wireless communication, correction data may be stored in one or more non-transitory memories and RTK, SSR, or other differential corrections may be carried out in a post-processing procedure.

The various multi-GNSS antenna transmitter devices described herein (e.g., multi-GNSS antenna transmitter device 900 of FIGS. 9A-9C, multi-GNSS antenna transmitter device 900d of FIG. 9D, multi-GNSS antenna transmitter device 900e of FIG. 9E, and multi-GNSS antenna transmitter device 900e of FIG. 9E) may stay stationary while coupling the output transmitter signal to a utility line. The redundancy of positioning at the multi-antenna transmitter device may allow for improved positioning accuracy.

Some multi-GNSS antenna transmitter device embodiments described herein may further be base stations allowing for RTK, SSR, or like differential corrections at a utility locator device or other rover devices. Referring back to FIG. 9B, the multi-GNSS antenna transmitter device 900 may receive data signals 996 (FIG. 9C) which may include data relating to RTK, SSR, or other differential corrections. The multi-GNSS antenna transmitter device 900 may broadcast correction data 936 that may be received by the utility locator device 903 for the purpose of making RTK, SSR, or other differential correction in real-time, near real-time, or may be saved in a memory element and corrections may be made in a post-processing method.

Figure 12A:
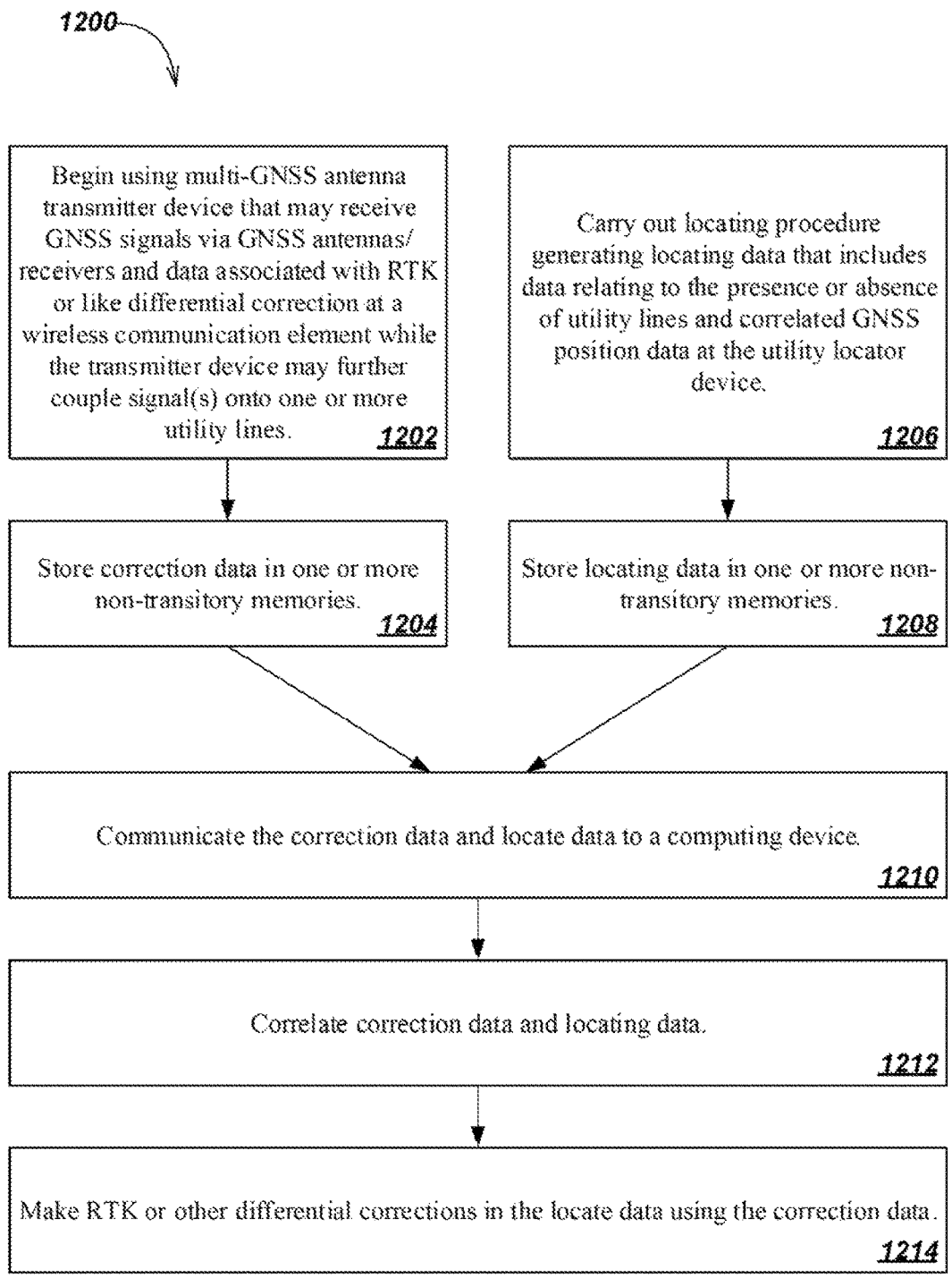
FIG. 12A is a diagram describing a post-processing method for a multi-GNSS antenna transmitter device base station.

Turning to FIG. 12A, a method 1200 for a multi-GNSS antenna transmitter device base station is described that may occur in post-processing. In a first step 1202, a transmitter device may receive positioning data via GNSS antennas/receivers and data associated with RTK, SSR, or like differential corrections at a wireless communication element while the transmitter device may couple signal(s) onto one or more utility lines. In a step 1204 subsequent to step 1202, correction data may be stored in one or more non-transitory memories in the multi-GNSS antenna transmitter device. In a step 1206 parallel to steps 1202 and 1204, a locating procedure may be carried out generating locating data that includes data relating to the presence or absence of utility lines and correlated GNSS position data via a utility locator device. In a step 1208 subsequent to step 1206, locating data may be stored in one or more non-transitory memories in the utility locator device. In a step 1210 combining from the parallel steps 1204 and 1208, correction data and locate data may be communicated to a computing device. Such devices may be or include a computer, smart phone, tablet computer, the utility locator device, or like device. In a step 1212, the correction data and locating data may be correlated. For instance, the timing as determined via the clock in the GNSS of both the multi-GNSS antenna transmitter device and utility locator device may be used to correlate data. In a step 1214, make RTK, SSR, or other differential corrections in the locate data using the correction data.

Turning to FIG. 12B, a method 1250 for a multi-GNSS antenna transmitter device base station is described that may occur in real-time, near real-time, or in post-processing. In a first step 1252, the multi-GNSS antenna transmitter device may receive GNSS signals via GNSS antennas/receivers and data associated with RTK, SSR, or like differential corrections at the wireless communication element while the transmitter device may further couple signal(s) onto one or more utility lines. In a subsequent step 1254, the multi-GNSS antenna transmitter device may broadcast the correction data via the wireless communication element. In a step 1256, correction data may be received at a utility locator device such that RTK, SSR, or other differential corrections may be made as the locate procedure is carried out. It should be noted, such correction data may be broadcasted by a transmitter device base station that may also be received by other rovers than utility locator devices for making RTK, SSR, or other differential corrections. In a step 1258, locate data, correction data, and/or corrected or non-corrected position data may be stored on one or more non-transitory memories. Such data may be stored on the utility locator device or instead or additionally communicated to another device (e.g., remote computer, laptop, smart phone, other locating devices, or the like) to be stored on one or more non-transitory memories.

Figure 13A:
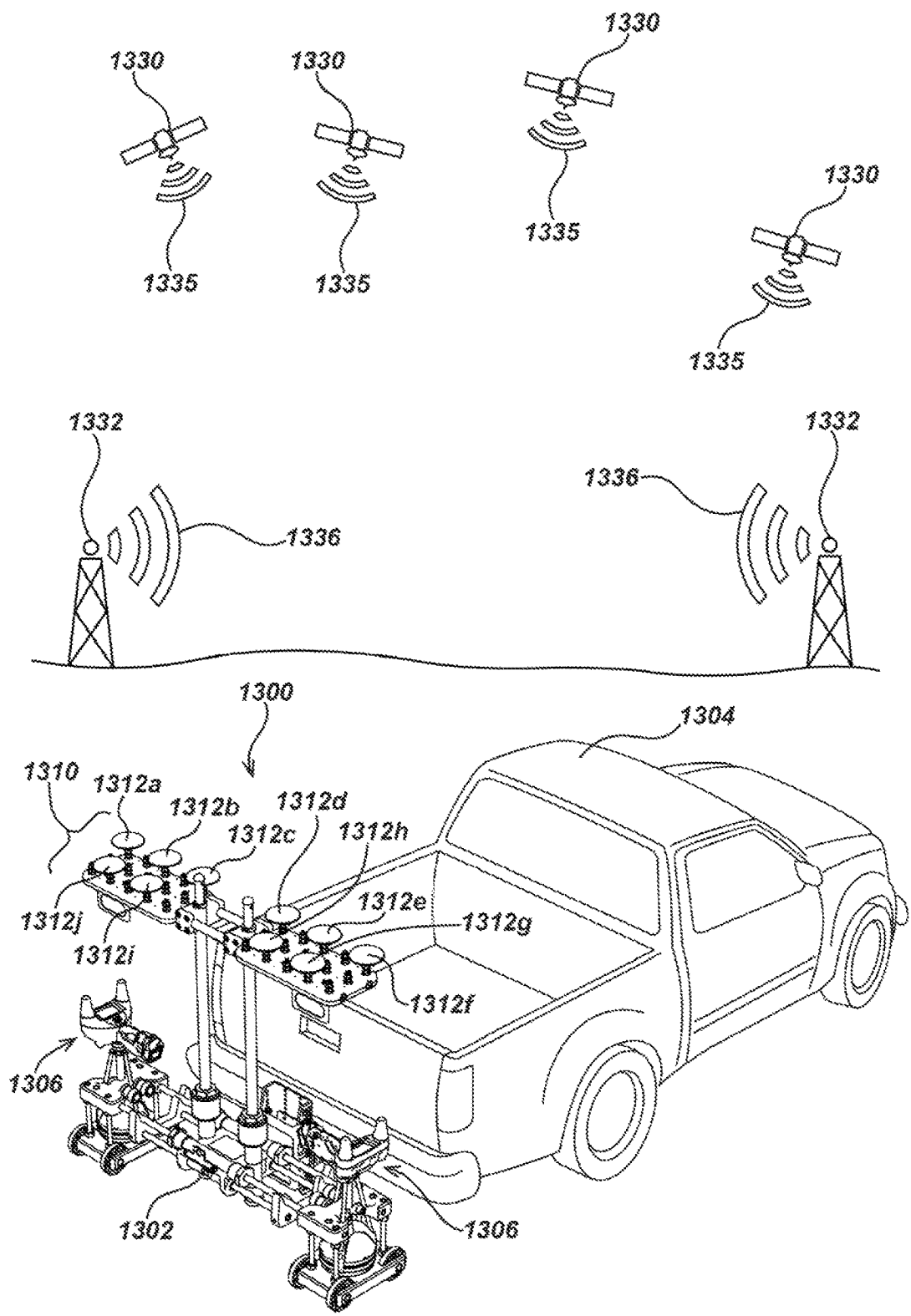
FIG. 13A is an illustration including a multi-GNSS antenna vehicle-mounted locating device.
Figure 13B:
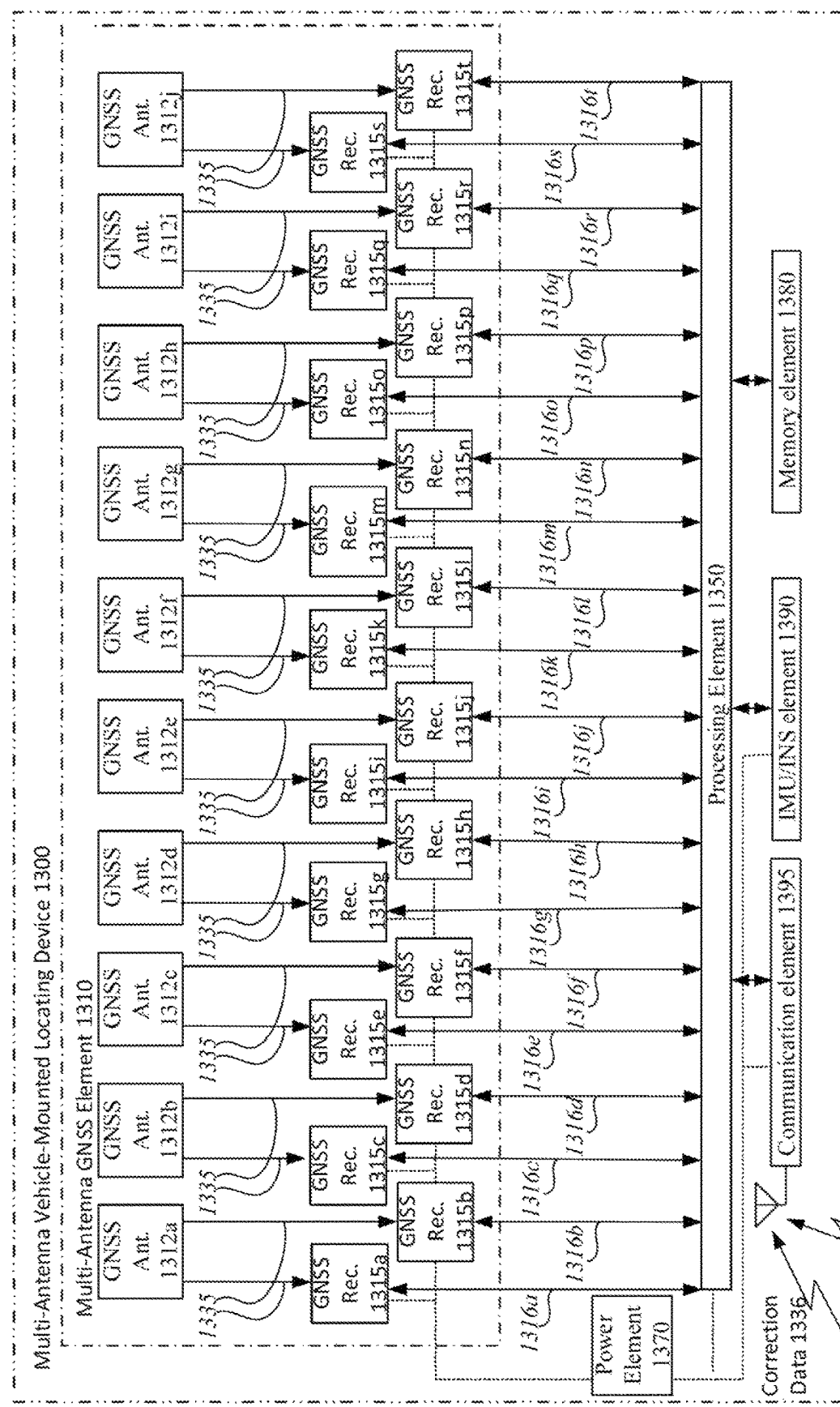
FIG. 13B is a diagram of the multi-GNSS antenna vehicle-mounted locating device of FIG. 13A.
Figure 14A:
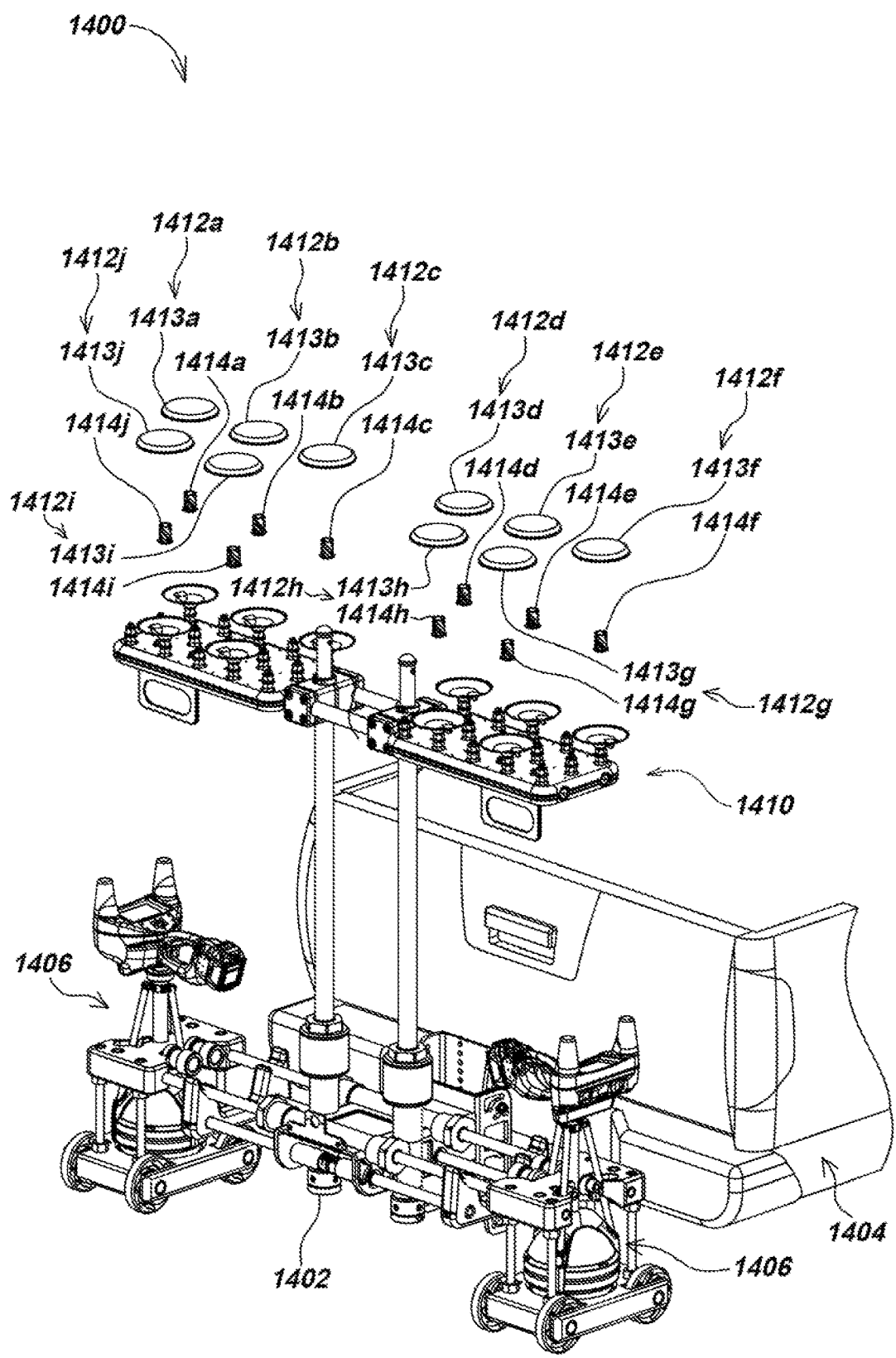
FIG. 14A is an illustration of a multi-GNSS antenna vehicle-mounted locating device with partially exploded GNSS antennas revealing helical antennas.
Figure 14B:
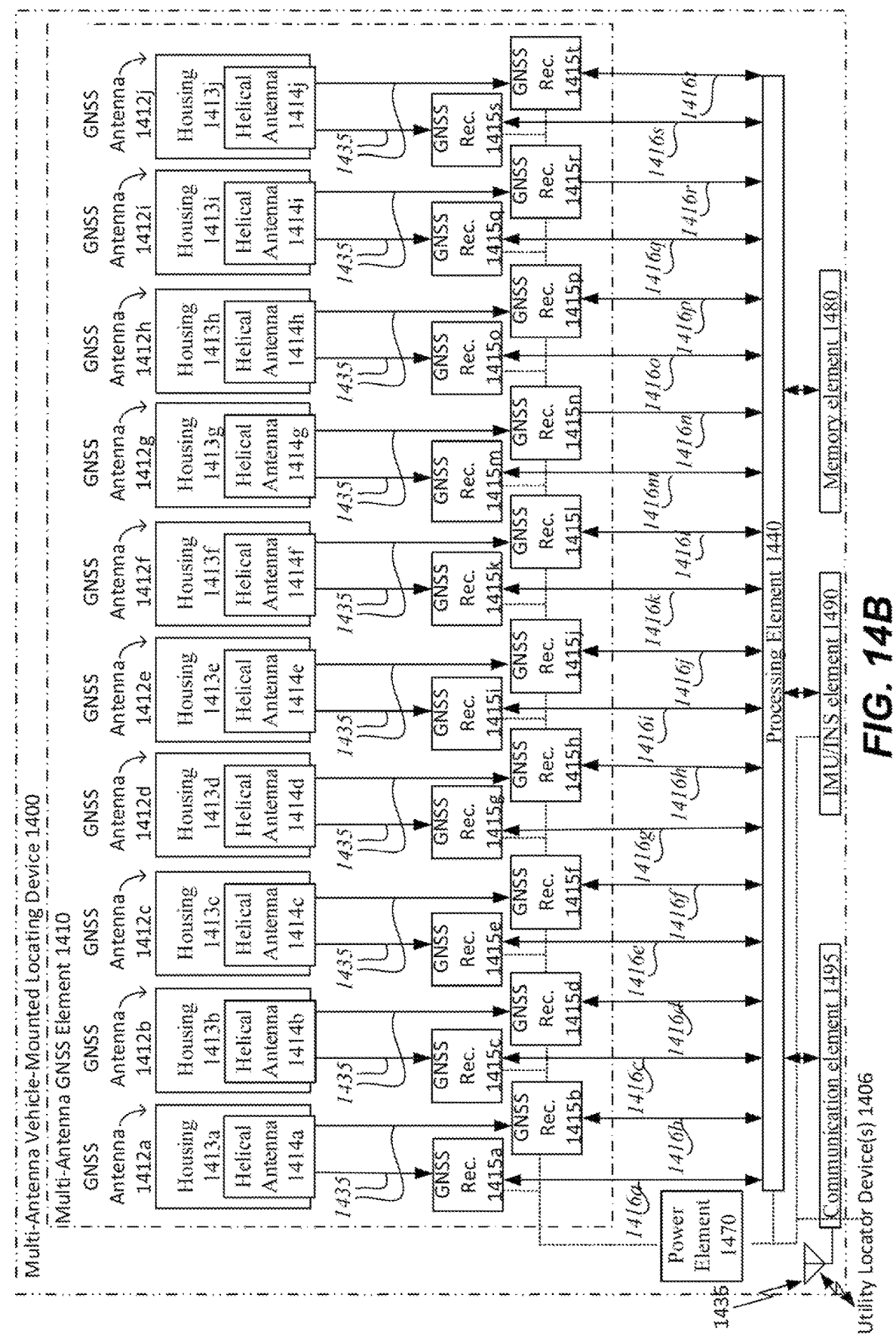
FIG. 14B is a diagram of the multi-GNSS antenna vehicle-mounted locating device from FIG. 14A.
Figure 15A:
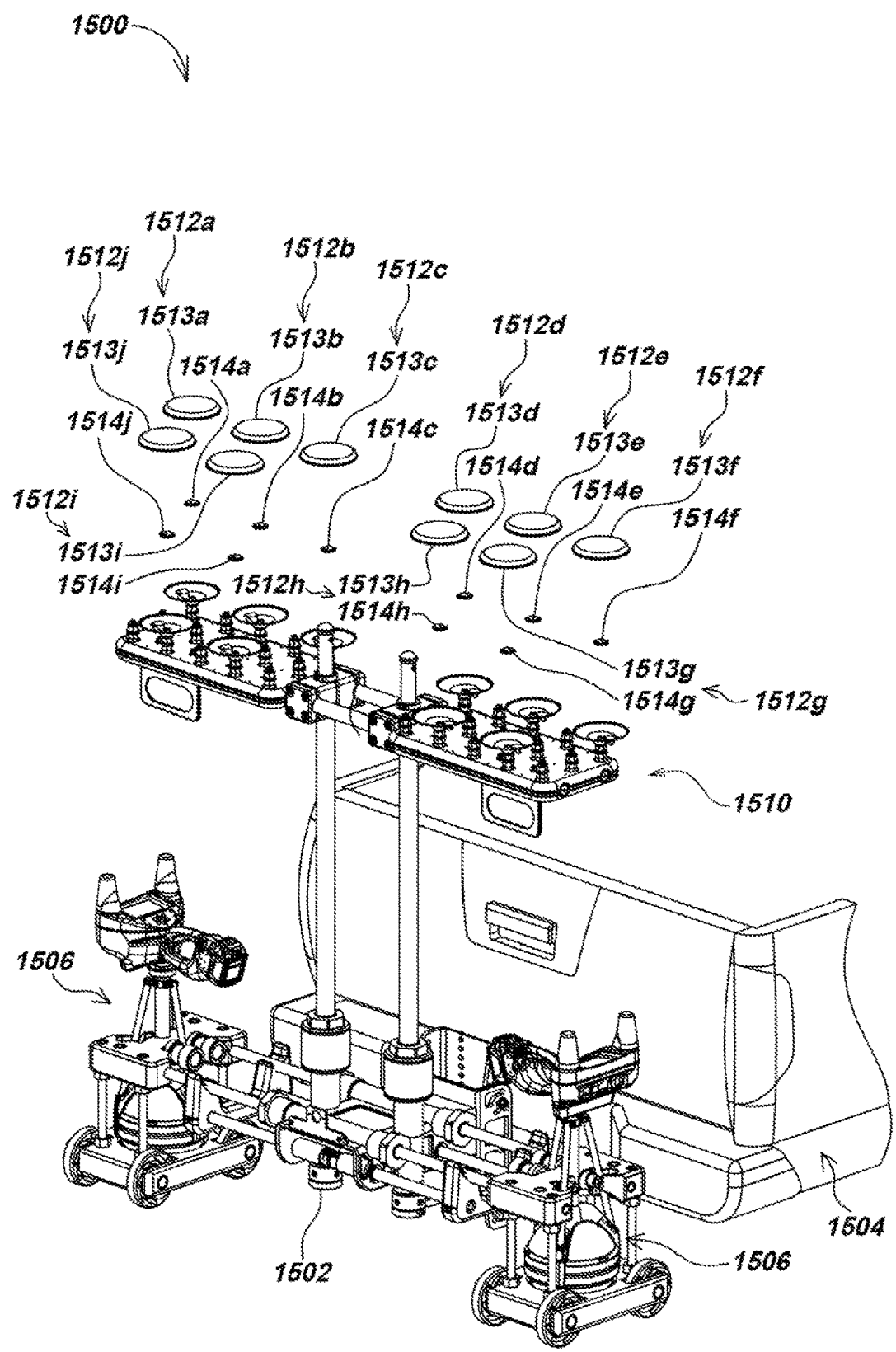
FIG. 15A is an illustration of a multi-GNSS antenna vehicle-mounted locating device with partially exploded GNSS antennas revealing patch antennas.
Figure 15B:
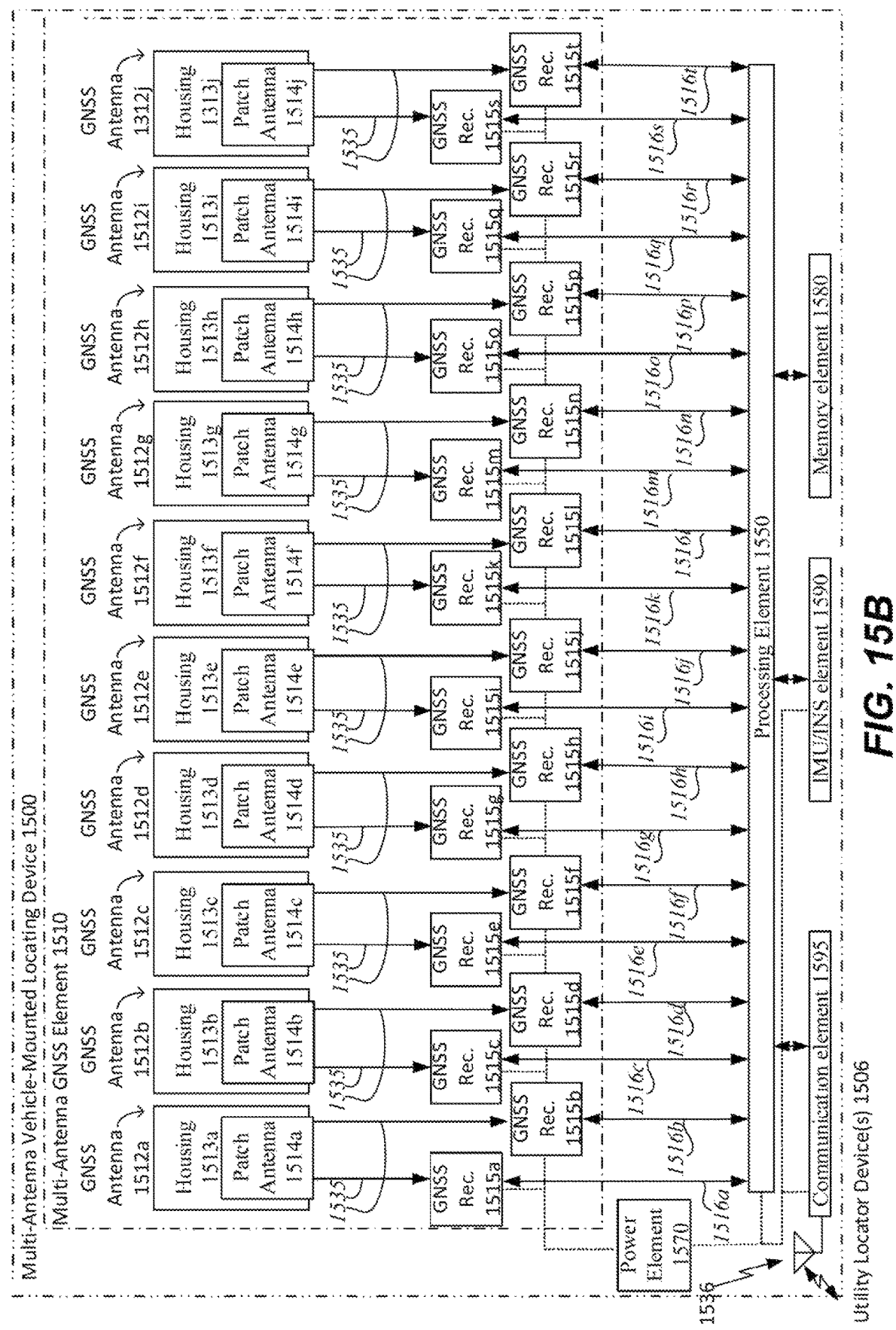
FIG. 15B is a diagram of the multi-GNSS antenna vehicle-mounted locating device from FIG. 15A.

The embodiments of the present invention may further include multi-GNSS antenna vehicle-mounted locating devices such as the multi-GNSS antenna vehicle-mounted locating device 1300 of FIGS. 13A-13B, multi-GNSS antenna vehicle-mounted locating device 1400 of FIGS. 14A-14B, and multi-GNSS antenna vehicle-mounted locating device 1500 of FIGS. 15A-15B, which may share aspects with the vehicle-mounted locating devices described in U.S. patent application Ser. No. 15/497,040, filed Apr. 25, 2017, entitled SYSTEMS AND METHODS FOR LOCATING AND/OR MAPPING BURIED UTILITIES USING VEHICLE-MOUNTED LOCATING DEVICES of the incorporated applications.

As illustrated in FIG. 13A, a multi-GNSS antenna vehicle-mounted locating device 1300 may include a vehicle-mounting element 1302 that may couple to a vehicle 1304 and provide further mounting for one or more utility locator devices, such as the utility locator devices 1306, and a multi-antenna GNSS element 1310. The multi-antenna GNSS element 1310 may include a multitude of GNSS antennas 1312a-1312j each spaced apart a known spacing that is by at least 100 millimeters or more and each connected to one or more GNSS receivers 1315a-1315t (FIG. 13B). It should be noted, that the embodiments described herein having multiple GNSS receivers coupled to a single GNSS antenna, such as the multi-GNSS antenna vehicle-mounted locating device 1300, the multiple GNSS observables data streams may compress removing redundant information that is common to the data provided by each GNSS receiver.

Figure 13C:
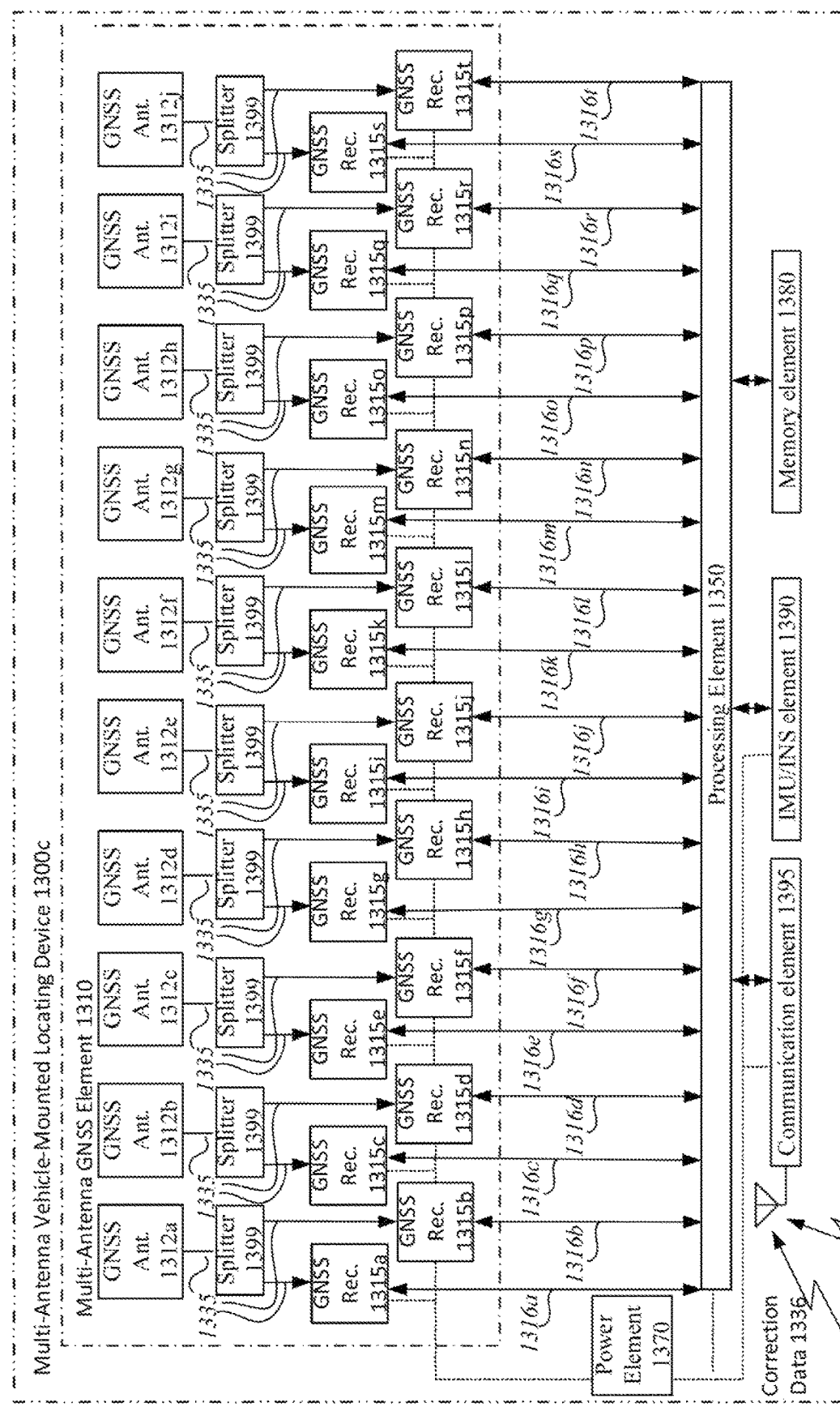
FIG. 13C is an illustration of a multi-antenna utility locator device further showing a splitter.

It should be noted that a splitter may be present in some embodiments where distributing of GNSS signals from a single GNSS antenna to a plurality of GNSS receivers may occur such as with the multi-GNSS antenna vehicle-mounted locating device 1300 of FIG. 13B. Though such a splitter may be implied to practitioners of the art, for additional clarification the multi-GNSS antenna vehicle-mounted locating device 1300c of FIG. 13C is illustrated with a splitter 1399. The splitter 1399 may be or share aspects with the splitter 199 of FIGS. 1E and 1H or other splitter configuration for distributing of GNSS signals to GNSS receivers.

It should also be noted that in FIG. 13B, pairs of GNSS receivers 1315a/1315b, 1315c/1315d, 1315e/1315f, 1315g/1315h, 1315i/1315j, 1315k/1315l, 1315m/1315n, 1315o/1315p, 1315q/1315r, and 1315s/1315t may each couple to one of the GNSS antennas 1312a, 1312b, 1312c, 1312d, 1312e, 1312f, 1312g, 1312h, 1312i, or 1312j of the multi-GNSS antenna vehicle-mounted locating device 1300. In other embodiments, a multi-GNSS antenna vehicle-mounted locating device in keeping with the present disclosure may have other numbers of GNSS antennas and GNSS receivers in various other configurations. Some such different configurations are illustrated with the GNSS antennas 1312 and GNSS receivers 1315 of the multi-GNSS antenna vehicle-mounted locating device embodiments 1300d and 1300e illustrated in FIGS. 13D and 13E.

Figure 13D:
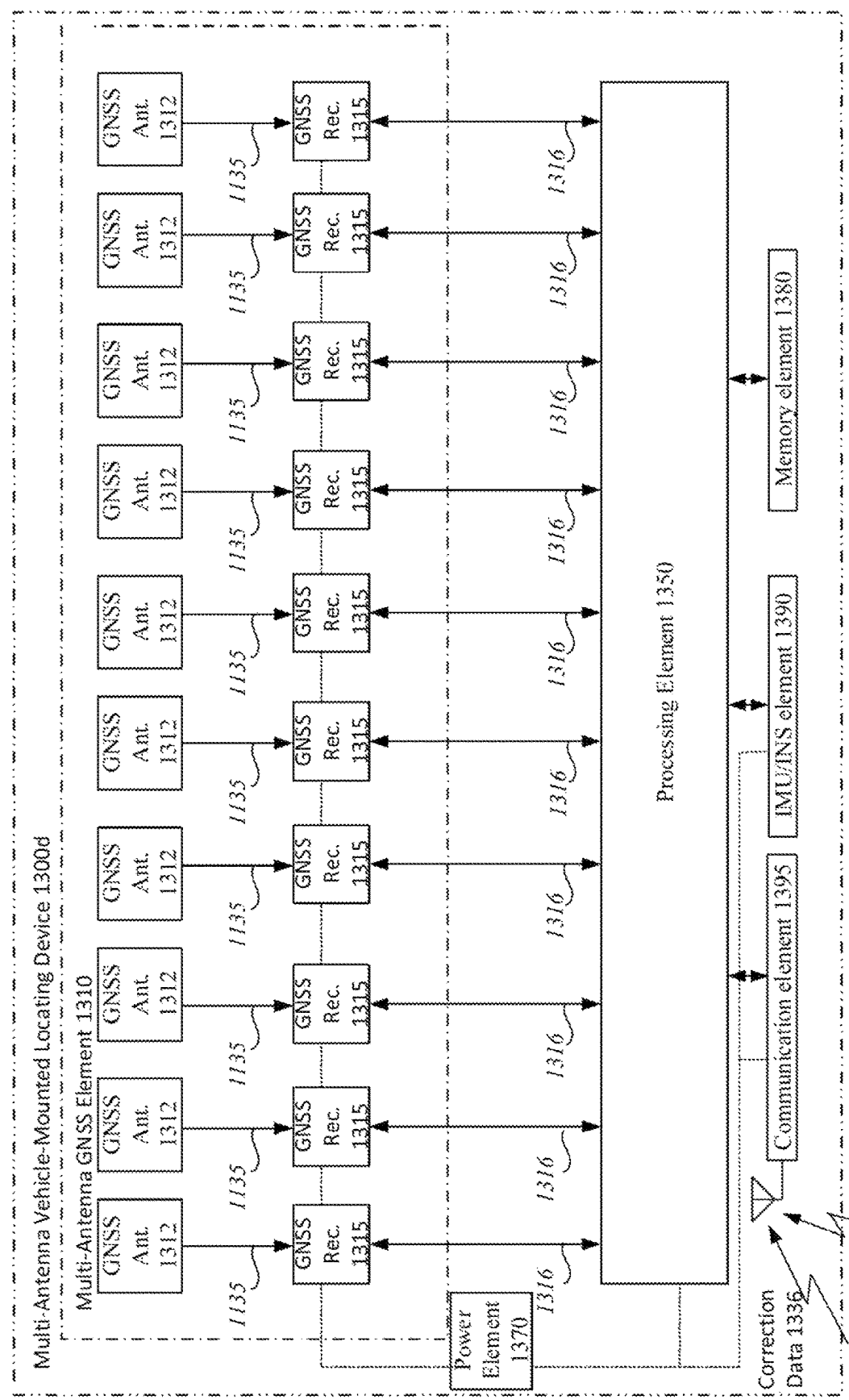
FIG. 13D is an illustration of another multi-antenna utility locator device embodiment.

As illustrated in FIG. 13D, for instance, the multi-GNSS antenna vehicle-mounted locating device 1300d may include a single GNSS antennas 1312 coupled to each individual GNSS receivers 1315. The GNSS receivers 1315 may be dual or triple band receivers. Likewise, the GNSS antennas 1312 and GNSS receivers 1315 may be configured for the L1, L2, and L5 GPS bands and/or other signal bands. In the multi-GNSS antenna vehicle-mounted locating device 1300d, a GNSS signal 1335 may be communicated from each GNSS antenna 1312 to an individually coupled one of the GNSS receivers 1315. Each of the GNSS receivers 1315 may further communicate position output signals 1316 to a processing element 1350.

Figure 13E:
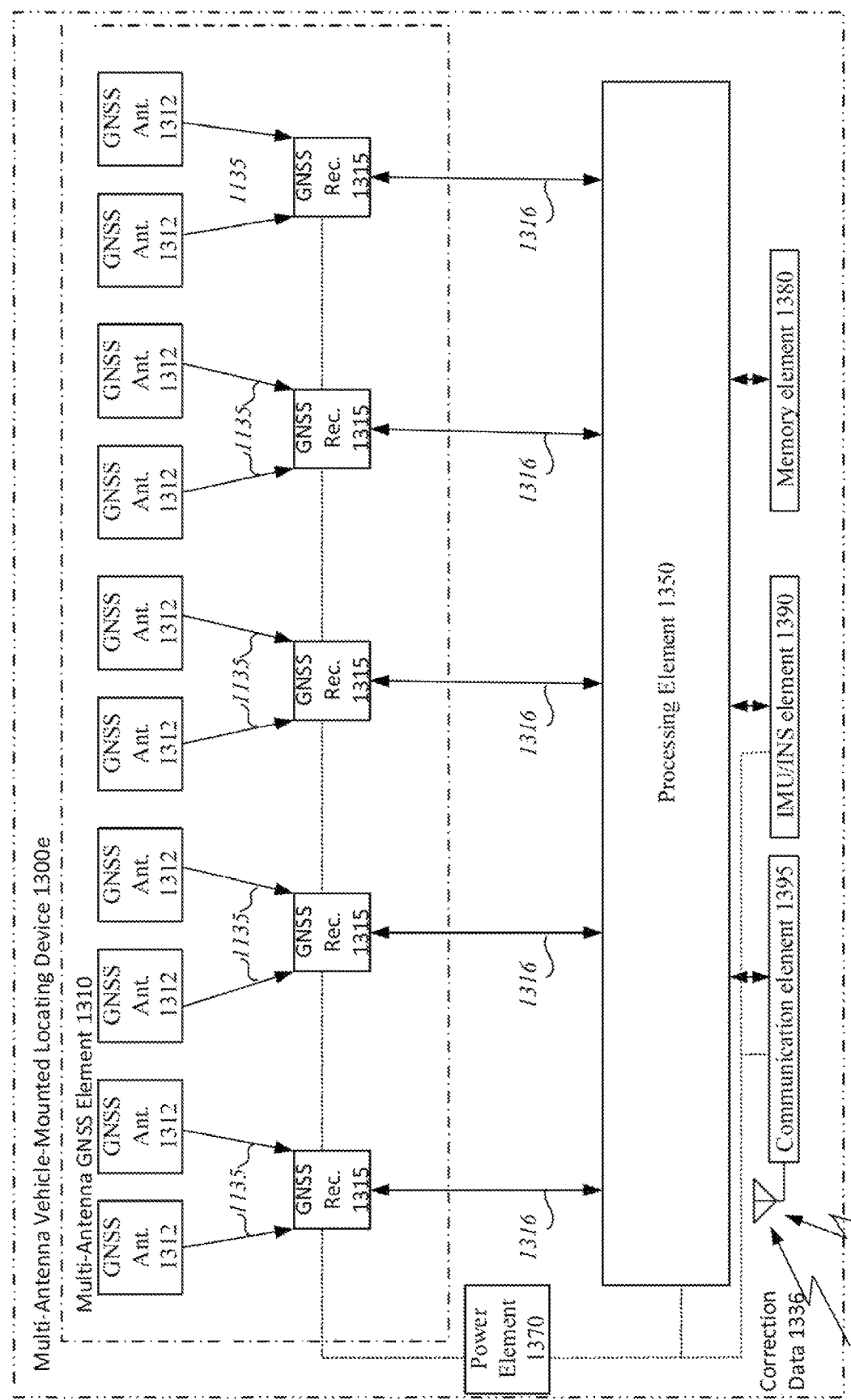
FIG. 13E is an illustration of another multi-antenna utility locator device embodiment.

In yet further embodiments, such as the multi-GNSS antenna vehicle-mounted locating device 1300e of FIG. 13E, multiple GNSS antennas 1312 may couple to a single one of the GNSS receivers 1315. The GNSS receivers 1315 may be dual or triple band receivers. Likewise, the GNSS antennas 1312 and GNSS receivers 1315 may be configured for the L1, L2, and L5 GPS bands and/or other signal bands. In some such embodiments, a GNSS receiver configured for use with multiple GNSS antennas may be a multi-input GNSS receiver that provides a measure of pose (pitch, roll, heading, or like orientation measurements) such as the mosaic-H GNSS receiver commercially available from Septentrio.

Referring back to FIG. 13B, in some embodiments the GNSS antennas 1312a-1312j may, for example, be dual or triple band antennas. Likewise, associated GNSS receivers 1315a-1315t (FIG. 13B) may be dual or triple band receivers. For example, the GNSS antennas 1312a-1312j and GNSS receivers 1315a-1315t (FIG. 13B) may be configured for the L1, L2, and L5 GPS bands. In other embodiments, the GNSS antennas and associated GNSS receivers may be configured for other signal bands. The embodiments in keeping with the present disclosure may have GNSS antennas with different form factors including, but not limited to, helical antennas (e.g., the helical antennas 1414a-1414j of FIG. 14), patch antennas (e.g., the patch antennas 1514a-1514j of FIG. 15), or other antenna configurations. Each GNSS antenna 1312a-1312j may receive GNSS signals 1335 from a plurality of navigation satellites 1330 and base stations 1332.

Further illustrated in FIG. 13B, GNSS antennas 1312a-1312j may further supply GNSS signals 1335 to the GNSS receivers 1315a-1315t generating position output signals 1316a-1316t corresponding to the estimated position of associated GNSS antennas 1312a-1312j. The generated position output signals 1316a-1316t may be supplied to a processing element 1350 comprising one or more processors coupled to the multi-antenna GNSS element 1310 for purposes of processing and compressing the data and/or for making differential corrections to the position output signals 1316a-1316h data via correction data 1336 received at a communication element 1395. The communication element 1395 comprising one or more radio transceivers may be configured for communicating position output signals, communicating data with other system devices, and/or receiving differential correction signals. The communication element 1395 may further communicate with one or more utility locator devices, such as the utility locator device 1306 of FIG. 13A, and/or other computing device (e.g., the vehicle 1304, laptop, smart phone, remote computer, other utility locating system devices, or the like). The multi-GNSS antenna vehicle-mounted locating device 1300 may further include a memory element 1360 having one or more non-transitory memories for storing positioning data such as the position output signals 1316a-1316h. The multi-GNSS antenna vehicle-mounted locating device 1300 may further include a power element 1370 to supply power to the various powered elements of the multi-GNSS antenna vehicle-mounted locating device 1300. The power element 1370 may, for instance, be one or more batteries or may be power supplied by the vehicle 1304 (FIG. 13A) or utility locator devices 1306 (FIG. 13A).

Some multi-GNSS antenna vehicle-mounted locating device embodiments in keeping with the present disclosure may further include additional sensors and systems for determining position, orientation, and pose. The multi-GNSS antenna vehicle-mounted locating device 1300 may include an IMU/INS element 1390 that may include, but should not be limited to, one or more accelerometers, gyroscopic sensors, magnetometers, inertial measurement units (IMU), inertial navigation systems (INS) and or other like sensors. In some embodiments, the magnetometers may be arranged in an array to sense magnetic distortions. In yet further multi-GNSS antenna vehicle-mounted locating device 1300 embodiments, additional or other sensors may be included to determine position, orientation, and pose.

Turning to FIG. 14A, a multi-GNSS antenna vehicle-mounted locating device 1400 is illustrated which may be or share aspects with the multi-GNSS antenna vehicle-mounted locating device 1300 of FIGS. 13A-13B, multi-GNSS antenna vehicle-mounted locating device 1300c of FIG. 13C, multi-GNSS antenna vehicle-mounted locating device 1300d of FIG. 13D, multi-GNSS antenna vehicle-mounted locating device 1300e of FIG. 13E. The multi-GNSS antenna vehicle-mounted locating device 1400 may include a vehicle-mounting element 1402 that may couple to a vehicle 1404 and provide mounting of one or more utility locator devices, such as the utility locator devices 1406, and a multi-antenna GNSS element 1410. The multi-antenna GNSS element 1410 may include a multitude of GNSS antennas 1412a-1412j each spaced apart by a known spacing that is at least 100 millimeters or more. Each GNSS antenna 1412a-1412j may include a housing 1413a-1413j encapsulating a respective helical antenna 1414a-1414j.

Figure 14C:
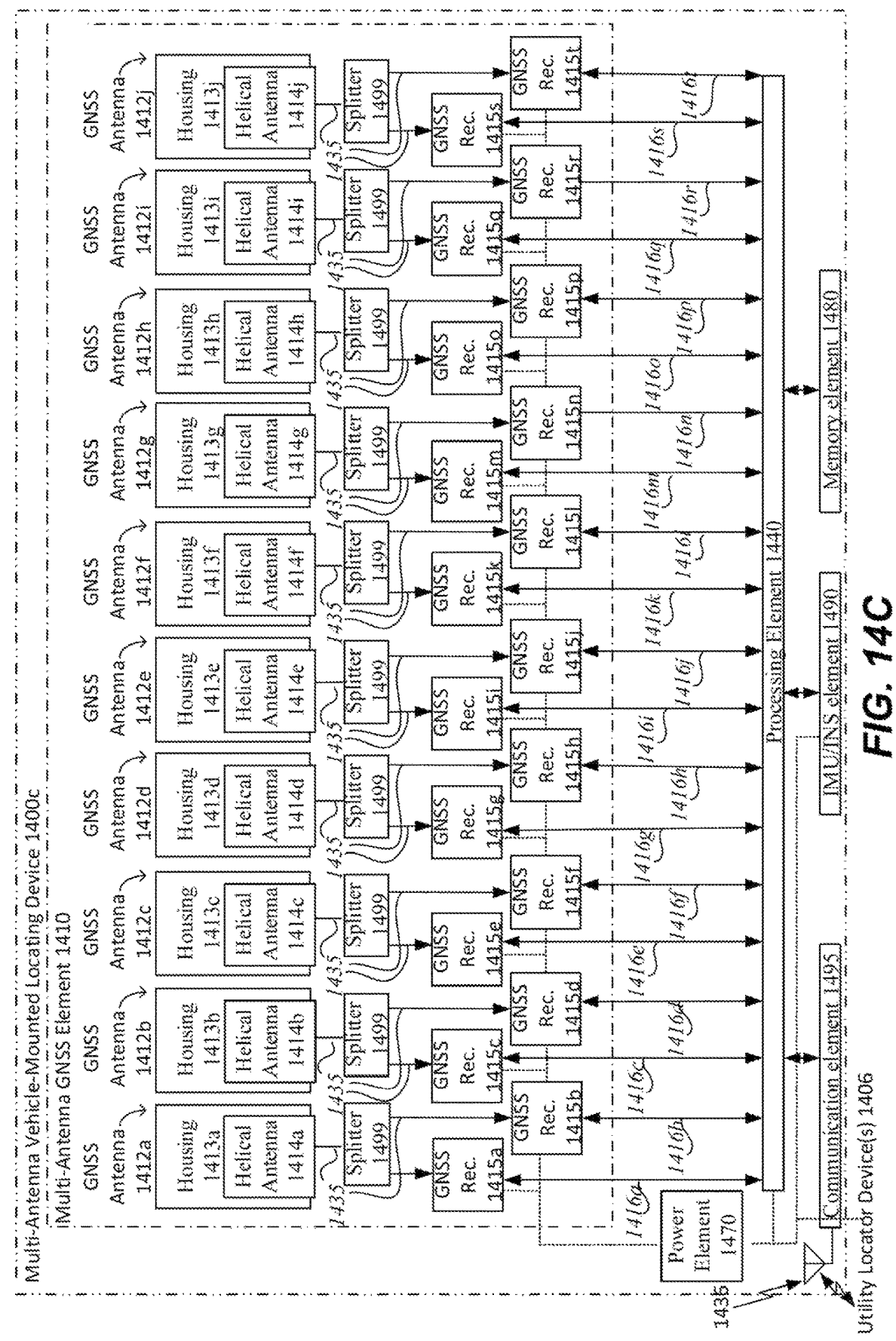
FIG. 14C is an illustration of a multi-antenna utility locator device further showing a splitter.

Further illustrated in FIG. 14B, each helical antenna 1414a-1414j may further supply GNSS signals 1435 to the GNSS receivers 1415a-1415t generating position output signals 1416a-1416t corresponding to the estimated position of associated GNSS antennas 1412a-1412j. It should be noted that a splitter may be present in some embodiments where distributing of GNSS signals from a single GNSS antenna to a plurality of GNSS receivers may occur such as with the multi-GNSS antenna vehicle-mounted locating device 1400 of FIG. 14B. Though such a splitter may be implied to practitioners of the art, for additional clarification the multi-GNSS antenna vehicle-mounted locating device 1400c of FIG. 14C is illustrated with a splitter 1499. The splitter 1499 may be or share aspects with the splitter 199 of FIGS. 1E and 1H or other splitter configuration for distributing of GNSS signals to GNSS receivers.

It should also be noted that in FIG. 14B, pairs of GNSS receivers 1415a/1415b, 1415c/1415d, 1415e/1415f, 1415g/1415h, 1415i/1415j, 1415k/1415l, 1415m/1415n, 1415o/1415p, 1415q/1415r, and 1415s/1415t may each couple to a single one of the GNSS antennas 1412a, 1412b, 1412c, 1412d, 1412e, 1412f, 1412g, 1412h, 1412i, or 1412j of the multi-GNSS antenna vehicle-mounted locating device 1400. In other embodiments, a multi-GNSS antenna vehicle-mounted locating device in keeping with the present disclosure may have other numbers of GNSS antennas and GNSS receivers in various other configurations. Some such different configurations are illustrated with the GNSS antennas 1412 and GNSS receivers 1415 of the multi-GNSS antenna vehicle-mounted locating device embodiments 1400d and 1400e illustrated in FIGS. 14D and 14E.

Figure 14D:
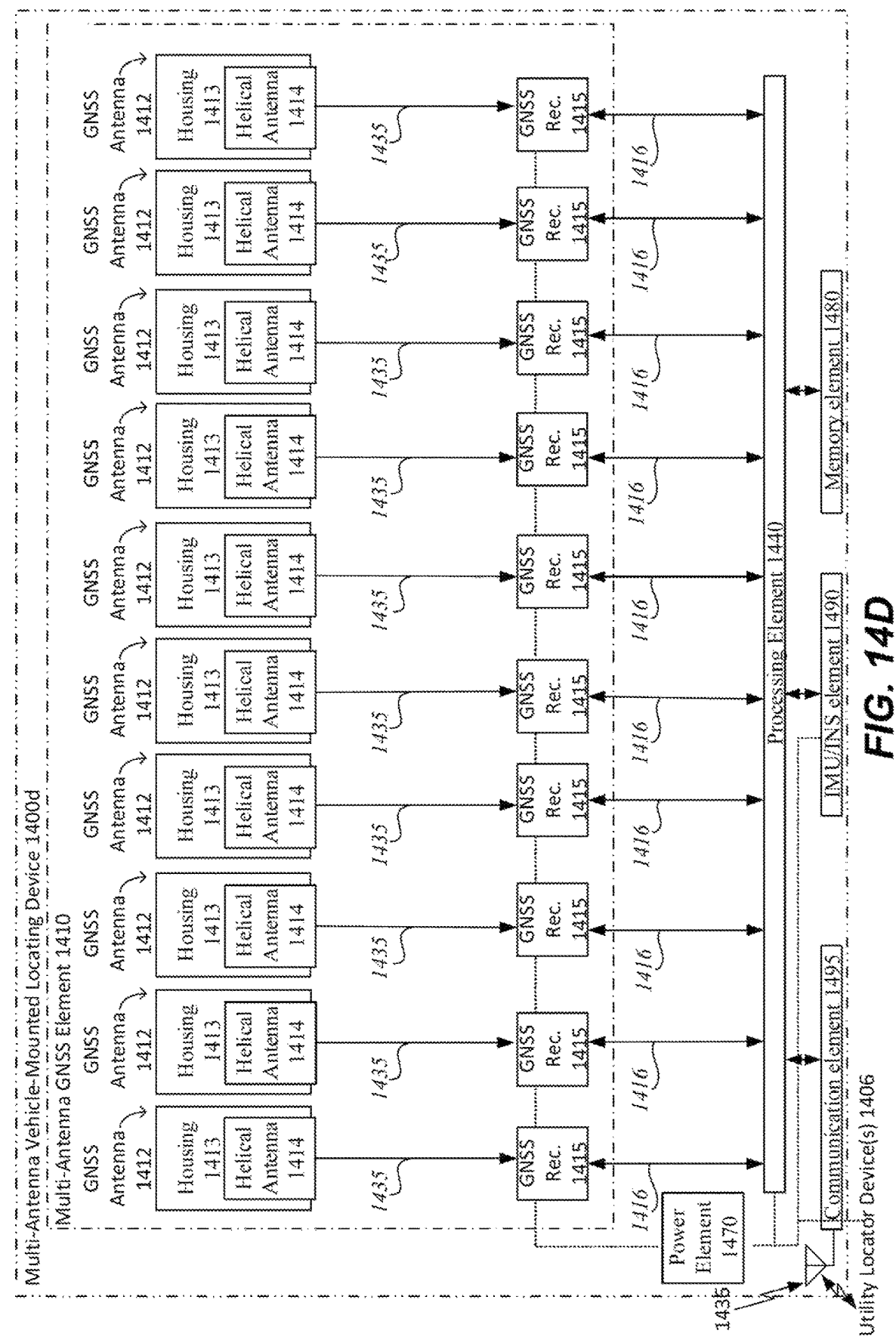
FIG. 14D is an illustration of another multi-antenna utility locator device embodiment.

As illustrated in FIG. 14D, for instance, the multi-GNSS antenna vehicle-mounted locating device 1400d may include a single GNSS antennas 1412 coupled to each individual GNSS receivers 1415. The GNSS receivers 1415 may be dual or triple band receivers. Likewise, the GNSS antennas 1412 and GNSS receivers 1415 may be configured for the L1, L2, and L5 GPS bands and/or other signal bands. In the multi-GNSS antenna vehicle-mounted locating device 1400d, a GNSS signal 1435 may be communicated from each GNSS antenna 1412 to an individually coupled one of the GNSS receivers 1415. Each of the GNSS receivers 1415 may further communicate position output signals 1416 to a processing element 1450.

Figure 14E:
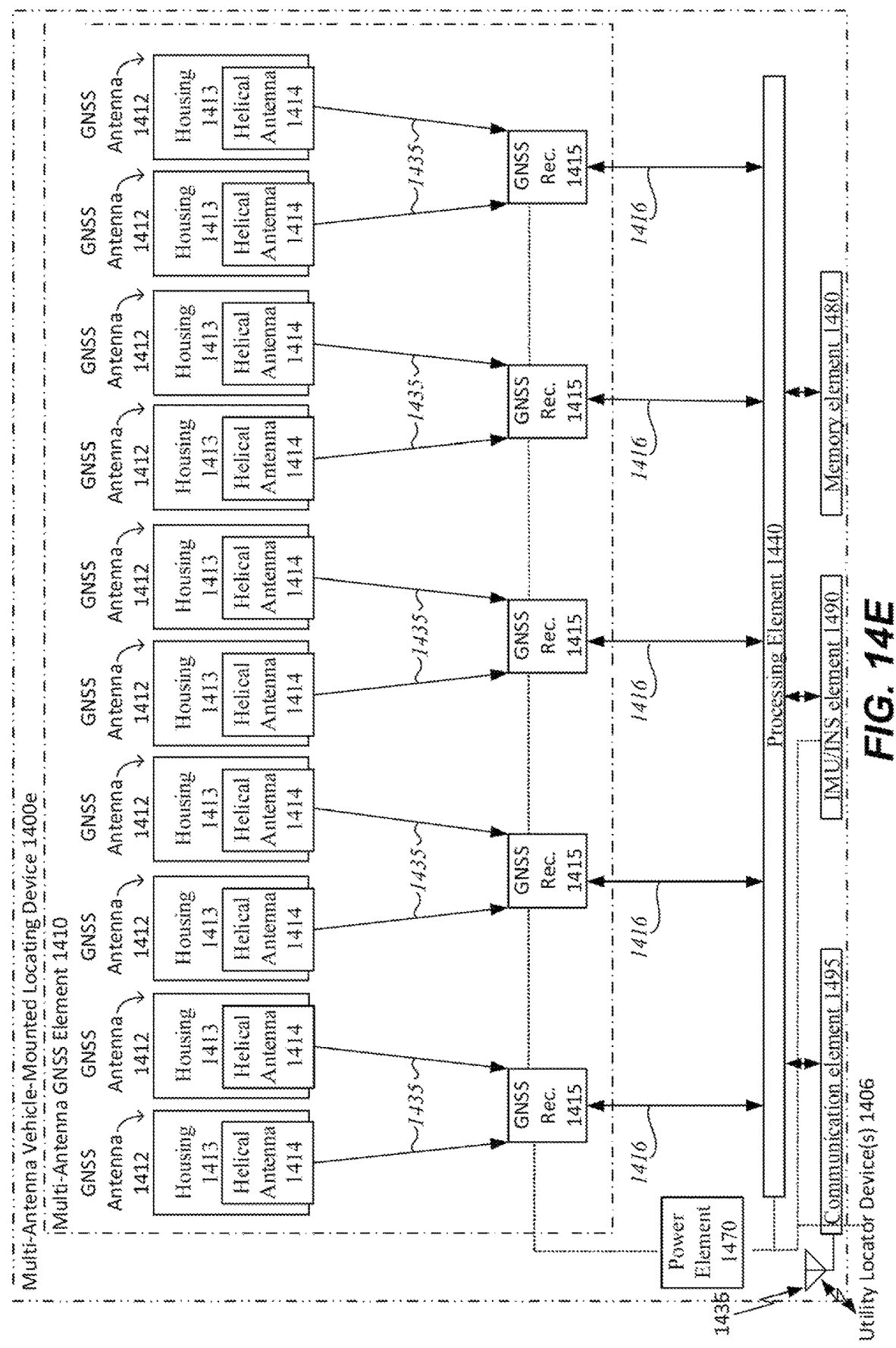
FIG. 14E is an illustration of another multi-antenna utility locator device embodiment.

In yet further embodiments, such as the multi-GNSS antenna vehicle-mounted locating device 1400e of FIG. 14E, multiple GNSS antennas 1412 may couple to a single one of the GNSS receivers 1415. The GNSS receivers 1415 may be dual or triple band receivers. Likewise, the GNSS antennas 1412 and GNSS receivers 1415 may be configured for the L1, L2, and L5 GPS bands and/or other signal bands. In some such embodiments, a GNSS receiver configured for use with multiple GNSS antennas may be a multi-input GNSS receiver that provides a measure of pose (pitch, roll, heading, or like orientation measurements) such as the mosaic-H GNSS receiver commercially available from Septentrio.

Referring back to FIG. 14B, the generated position output signals 1416a-1416t may be supplied to a processing element 1450 comprising one or more processors coupled to the multi-antenna GNSS element 1410 for purposes of processing and compressing the data and/or for making differential corrections to the position output signals 1416a-1416h data via correction data 1436 received at a wireless communication element 1495. The multi-GNSS antenna vehicle-mounted locating device 1400 may further include a memory element 1460 having one or more non-transitory memories for storing positioning data such as the position output signals 1416a-1416h. The communication element 1495 may further communicate with one or more utility locator devices, such as the utility locator device 1406 of FIG. 14A, and/or other computing device (e.g., the vehicle 1404, laptop, smart phone, remote computer, other utility locating system devices, or the like). The multi-GNSS antenna vehicle-mounted locating device 1400 may further include a power element 1470 to supply power to the various powered elements of the multi-GNSS antenna vehicle-mounted locating device 1400. The power element 1470 may, for instance, be one or more batteries or may be power supplied by the vehicle 1404 (FIG. 14A) or utility locator devices 1406 (FIG. 14A). The multi-GNSS antenna vehicle-mounted locating device 1400 may further include an IMU/INS element 1490 that may include, but should not be limited to, one or more accelerometers, gyroscopic sensors, magnetometers, inertial measurement units (IMU), inertial navigation systems (INS) and or other like sensors. In some embodiments, the magnetometers may be arranged in an array to sense magnetic distortions.

Turning to FIG. 15A, a multi-GNSS antenna vehicle-mounted locating device 1500 is illustrated which may be or share aspects with the multi-GNSS antenna vehicle-mounted locating device 1300 of FIGS. 13A-13B, multi- GNSS antenna vehicle-mounted locating device 1300c of FIG. 13C, multi-GNSS antenna vehicle-mounted locating device 1300d of FIG. 13D, multi-GNSS antenna vehicle-mounted locating device 1300e of FIG. 13E. The multi-GNSS antenna vehicle-mounted locating device 1500 may include a vehicle-mounting element 1502 that may couple to a vehicle 1504 and provide mounting of one or more utility locator devices, such as the utility locator devices 1506, and a multi-antenna GNSS element 1510. The multi-antenna GNSS element 1510 may include a multitude of GNSS antennas 1512a-1512j each spaced apart by at least 100 millimeters. Each antenna 1512a-1512j may include a housing 1513a-1513j each encapsulating a respective patch antenna 1514a-1514j.

Figure 15C:
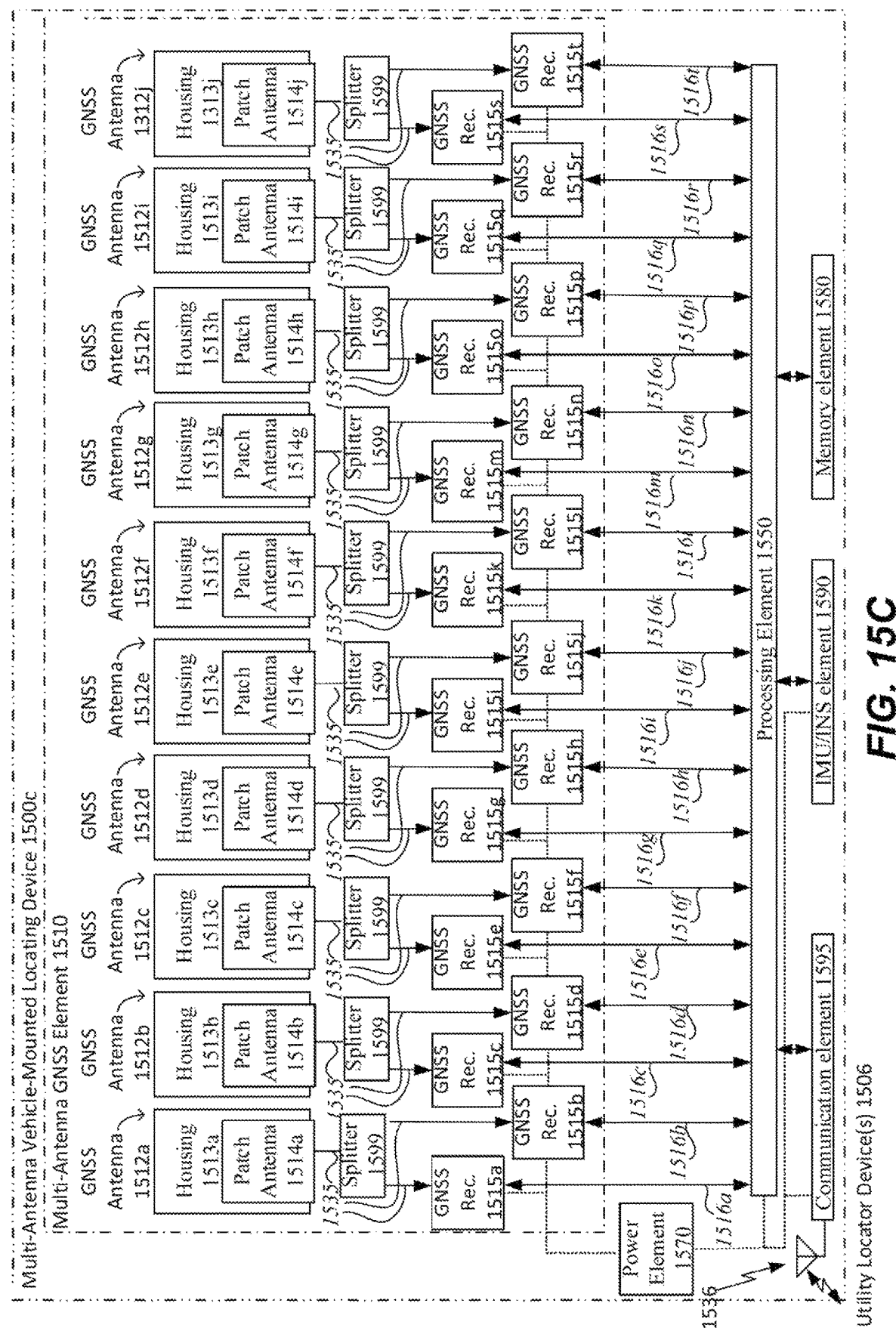
FIG. 15C is an illustration of a multi-antenna utility locator device further showing a splitter.

Further illustrated in FIG. 15B, each patch antenna may further supply GNSS signals 1535 to the GNSS receivers 1515a-1515t generating position output signals 1516a-1516t corresponding to the estimated position of associated GNSS antennas 1512a-1512j. It should be noted that a splitter may be present in some embodiments where distributing of GNSS signals from a single GNSS antenna to a plurality of GNSS receivers may occur such as with the multi-GNSS antenna vehicle-mounted locating device 1500 of FIG. 15B. Though such a splitter may be implied to practitioners of the art, for additional clarification the multi-GNSS antenna vehicle-mounted locating device 1500c of FIG. 15C is illustrated with a splitter 1599. The splitter 1599 may be or share aspects with the splitter 199 of FIGS. 1E and 1H or other splitter configuration for distributing of GNSS signals to GNSS receivers.

It should also be noted that in FIG. 15B, pairs of GNSS receivers 1515a/1515b, 1515c/1515d, 1515e/1515f, 1515g/1515h, 1515i/1515j, 1515k/1515l, 1515m/1515n, 15150/1515p, 1515q/1515r, and 1515s/1515t may each couple to one of the GNSS antennas 1512a, 1512b, 1512c, 1512d, 1512e, 1512f, 1512g, 1512h, 1512i, or 1512j of the multi-GNSS antenna vehicle-mounted locating device 1500. In other embodiments, a multi-GNSS antenna vehicle-mounted locating device in keeping with the present disclosure may have other numbers of GNSS antennas and GNSS receivers in various other configurations. Some such different configurations are illustrated with the GNSS antennas 1512 and GNSS receivers 1515 of the multi-GNSS antenna vehicle-mounted locating device embodiments 1500d and 1500e illustrated in FIGS. 15D and 15E.

Figure 15D:
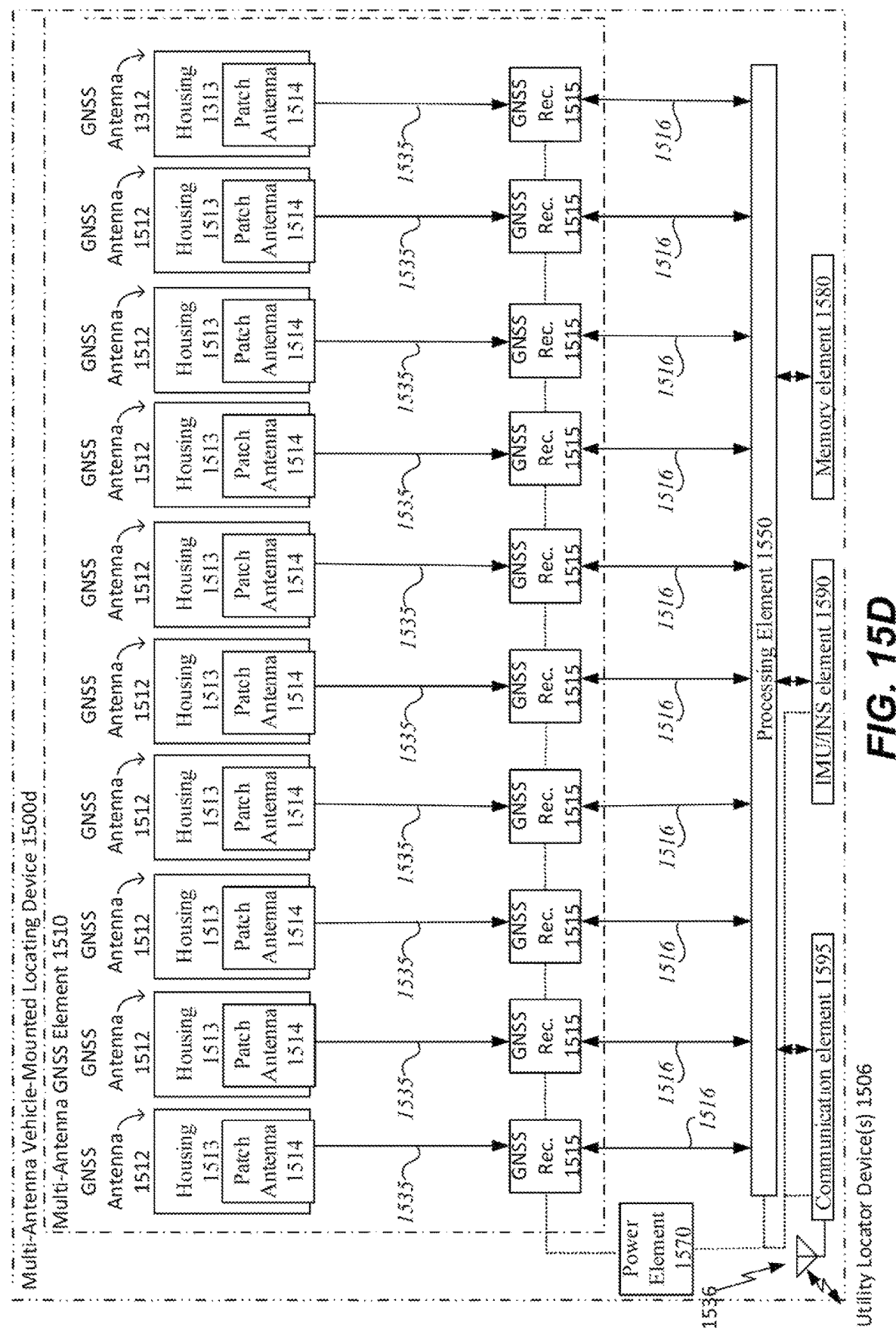
FIG. 15D is an illustration of another multi-antenna utility locator device embodiment.

As illustrated in FIG. 15D, for instance, the multi-GNSS antenna vehicle-mounted locating device 1500d may include a single GNSS antennas 1512 coupled to each individual GNSS receivers 1515. The GNSS receivers 1515 may be dual or triple band receivers. Likewise, the GNSS antennas 1512 and GNSS receivers 1515 may be configured for the L1, L2, and L5 GPS bands and/or other signal bands. In the multi-GNSS antenna vehicle-mounted locating device 1500d, a GNSS signal 1535 may be communicated from each GNSS antenna 1512 to an individually coupled one of the GNSS receivers 1515. Each of the GNSS receivers 1515 may further communicate position output signals 1516 to a processing element 1550.

Figure 15E:
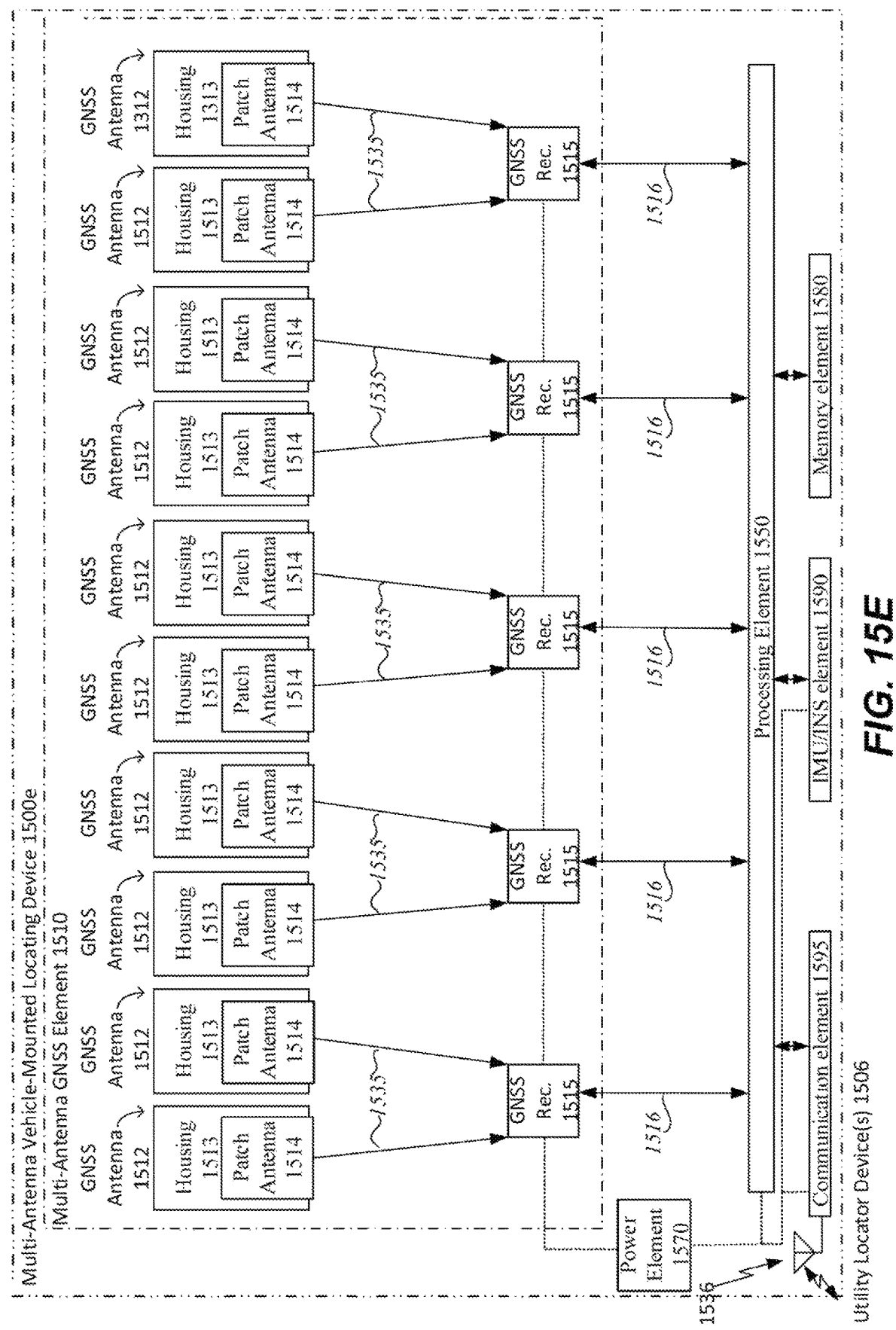
FIG. 15E is an illustration of another multi-antenna utility locator device embodiment.

In yet further embodiments, such as the multi-GNSS antenna vehicle-mounted locating device 1500e of FIG. 15E, multiple GNSS antennas 1512 may couple to a single one of the GNSS receivers 1515. The GNSS receivers 1515 may be dual or triple band receivers. Likewise, the GNSS antennas 1512 and GNSS receivers 1515 may be configured for the L1, L2, and L5 GPS bands and/or other signal bands. In some such embodiments, a GNSS receiver configured for use with multiple GNSS antennas may be a multi-input GNSS receiver that provides a measure of pose (pitch, roll, heading, or like orientation measurements) such as the mosaic-H GNSS receiver commercially available from Septentrio.

Referring back to FIG. 15B, the generated position output signals 1516a-1516t may be supplied to a processing element 1550 comprising one or more processors coupled to the multi-antenna GNSS element 1510 for purposes of processing and compressing the data and/or for making differential corrections to the position output signals 1516a-1516h data via correction data 1536 received at a wireless communication element 1595. The multi-GNSS antenna vehicle-mounted locating device 1500 may further include a memory element 1560 having one or more non-transitory memories for storing positioning data such as the position output signals 1516a-1516h. The communication element 1595 may further communicate with one or more utility locator devices, such as the utility locator device 1506 of FIG. 15A, and/or other computing device (e.g., the vehicle 1504, laptop, smart phone, remote computer, other utility locating system devices, or the like). The multi-GNSS antenna vehicle-mounted locating device 1500 may further include a power element 1570 to supply power to the various powered elements of the multi-GNSS antenna vehicle-mounted locating device 1500. The power element 1570 may, for instance, be one or more batteries or may be power supplied by the vehicle 1504 (FIG. 15A) or utility locator devices 1506 (FIG. 15A) The multi-GNSS antenna vehicle-mounted locating device 1500 may further include an IMU/INS element 1590 that may include, but should not be limited to, one or more accelerometers, gyroscopic sensors, magnetometers, inertial measurement units (IMU), inertial navigation systems (INS) and or other like sensors. In some embodiments, the magnetometers may be arranged in an array to sense magnetic distortions.

Figure 16A:
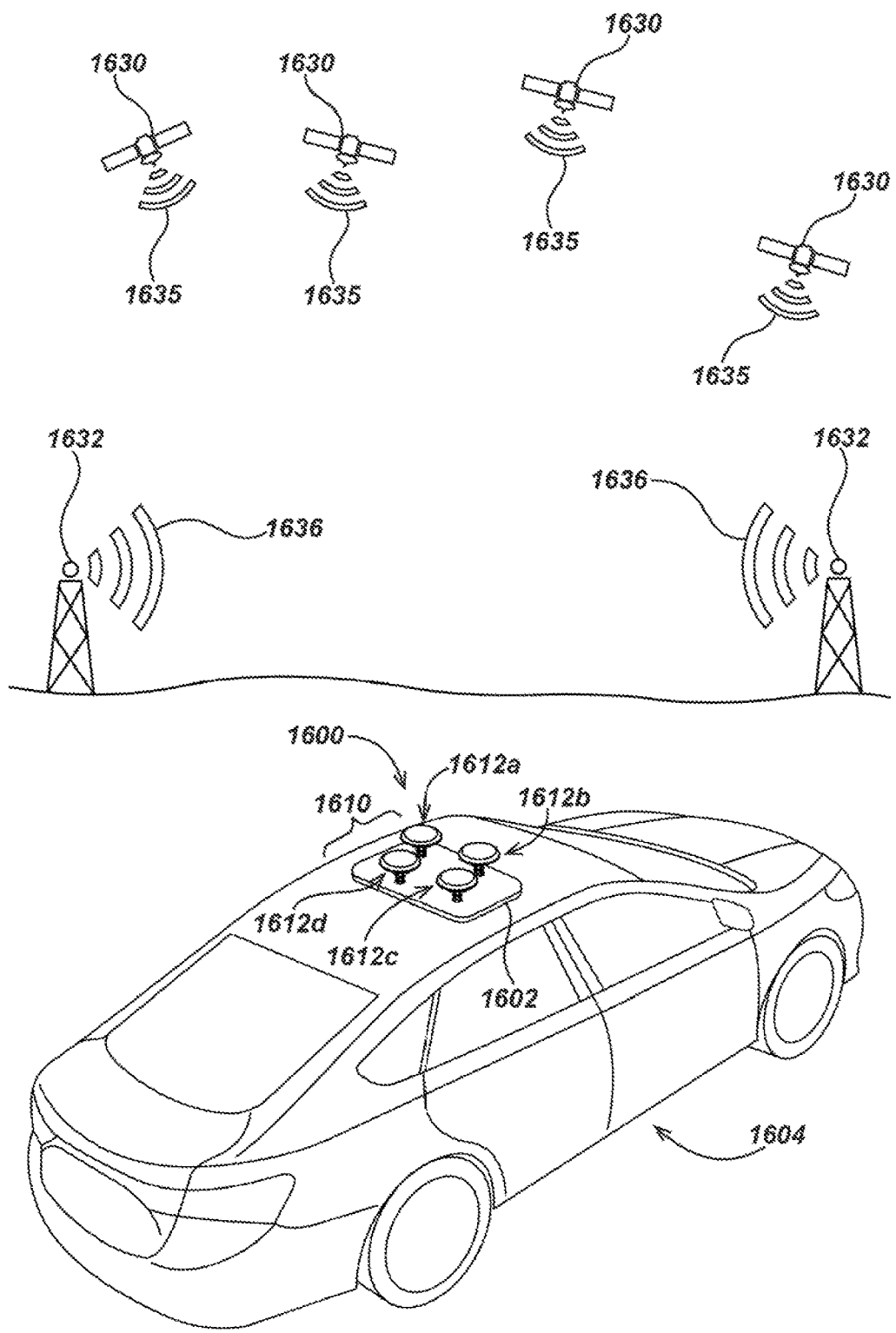
FIG. 16A is a multi-GNSS antenna vehicle tracking device disposed on a vehicle.
Figure 16B:
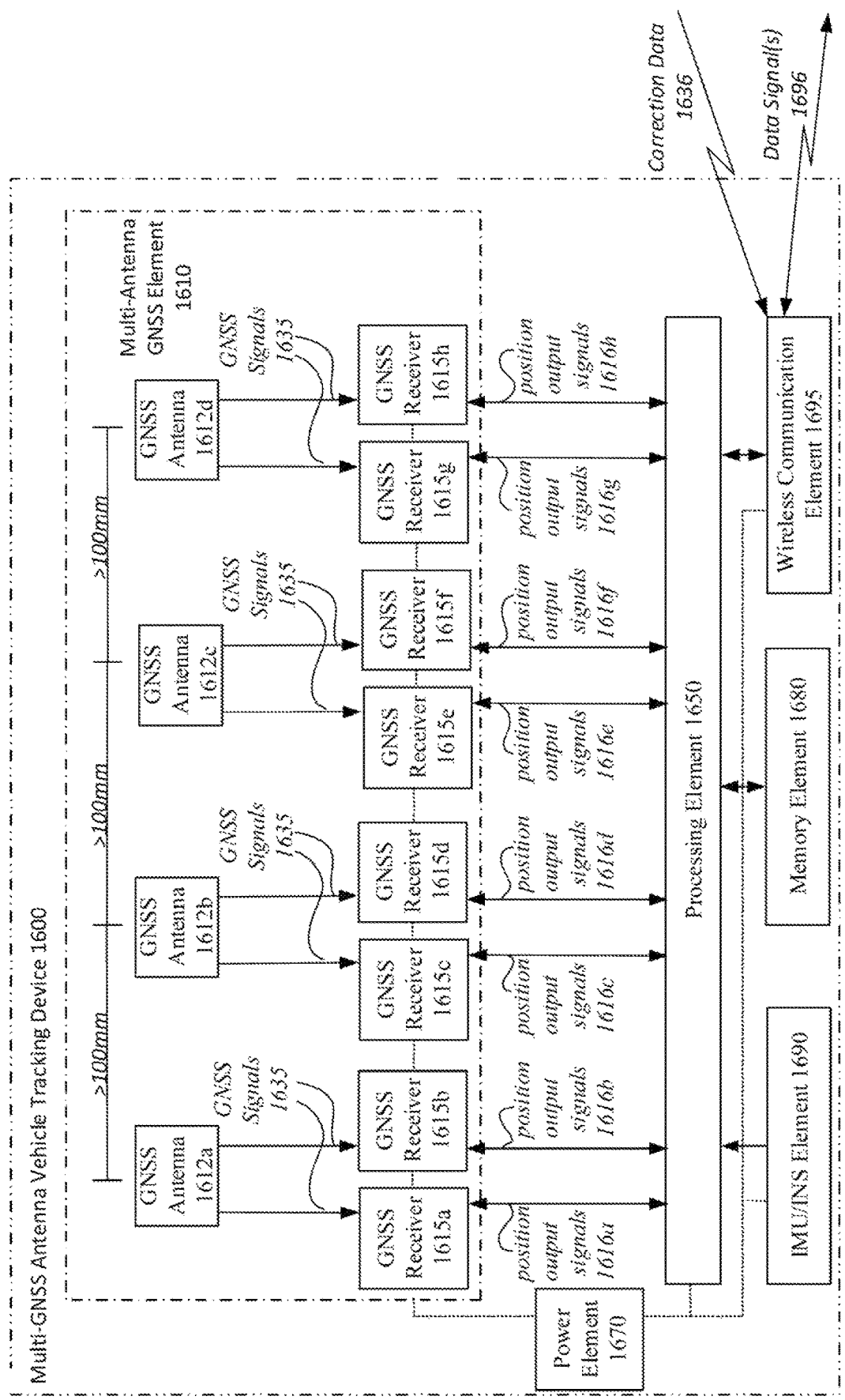
FIG. 16B is a diagram of the multi-GNSS antenna vehicle tracking device and vehicle from FIG. 16A.

The multi-GNSS antenna elements of the present disclosure may be used in position tracking of various other rover types. As illustrated in FIG. 16A, a multi-GNSS antenna vehicle tracking device 1600 may include a mounting element 1602 that may couple to a vehicle 1604 to a multi-antenna GNSS element 1610. The multi-antenna GNSS element 1610 may include a multitude of GNSS antennas 1612a-1612d each spaced apart a known spacing by at least 100 millimeters or more and each connected to one or more GNSS receivers 1615a-1615h (FIG. 16B). It should be noted, that the embodiments described herein having multiple GNSS receivers coupled to a single GNSS antenna, such as the multi-GNSS antenna vehicle tracking device 1600, the multiple GNSS observables data streams may compress removing redundant information that is common to the data provided by each GNSS receiver.

In some embodiments, the GNSS antennas 1612a-1612d may, for example, be dual or triple band antennas. Likewise, associated GNSS receivers 1615a-1615h (FIG. 16B) may be dual or triple band receivers. For example, the GNSS antennas 1612a-1612d and GNSS receivers 1615a-1615h (FIG. 13B) may be configured for the L1, L2, and L5 GPS bands. In other embodiments, the GNSS antennas and associated GNSS receivers may be configured for other signal bands. The embodiments in keeping with the present disclosure may have GNSS antennas with different form factors including, but not limited to, helical antennas (e.g., the helical antennas 1714a-1714d of FIGS. 17A and 17B), patch antennas (e.g., the patch antennas 1814a-1814d of FIGS. 18A and 18B), or other antenna configurations. Each GNSS antenna 1612*a*-1612*d* may receive GNSS signals 1635 from a plurality of navigation satellites 1630 and base stations 1632.

Further illustrated in FIG. 16B, GNSS antennas 1612*a*-1612*d* may further supply GNSS signals 1635 to the GNSS receivers 1615*a*-1615*h* generating position output signals 1616*a*-1616*h* corresponding to the estimated position of associated GNSS antennas 1612*a*-1612*d*. It should be noted, that the embodiments described herein having multiple GNSS receivers coupled to a single GNSS antenna, such as the multi-GNSS vehicle tracking device 1600, the multiple GNSS observables data streams may compress removing redundant information that is common to the data provided by each GNSS receiver.

Figure 16C:
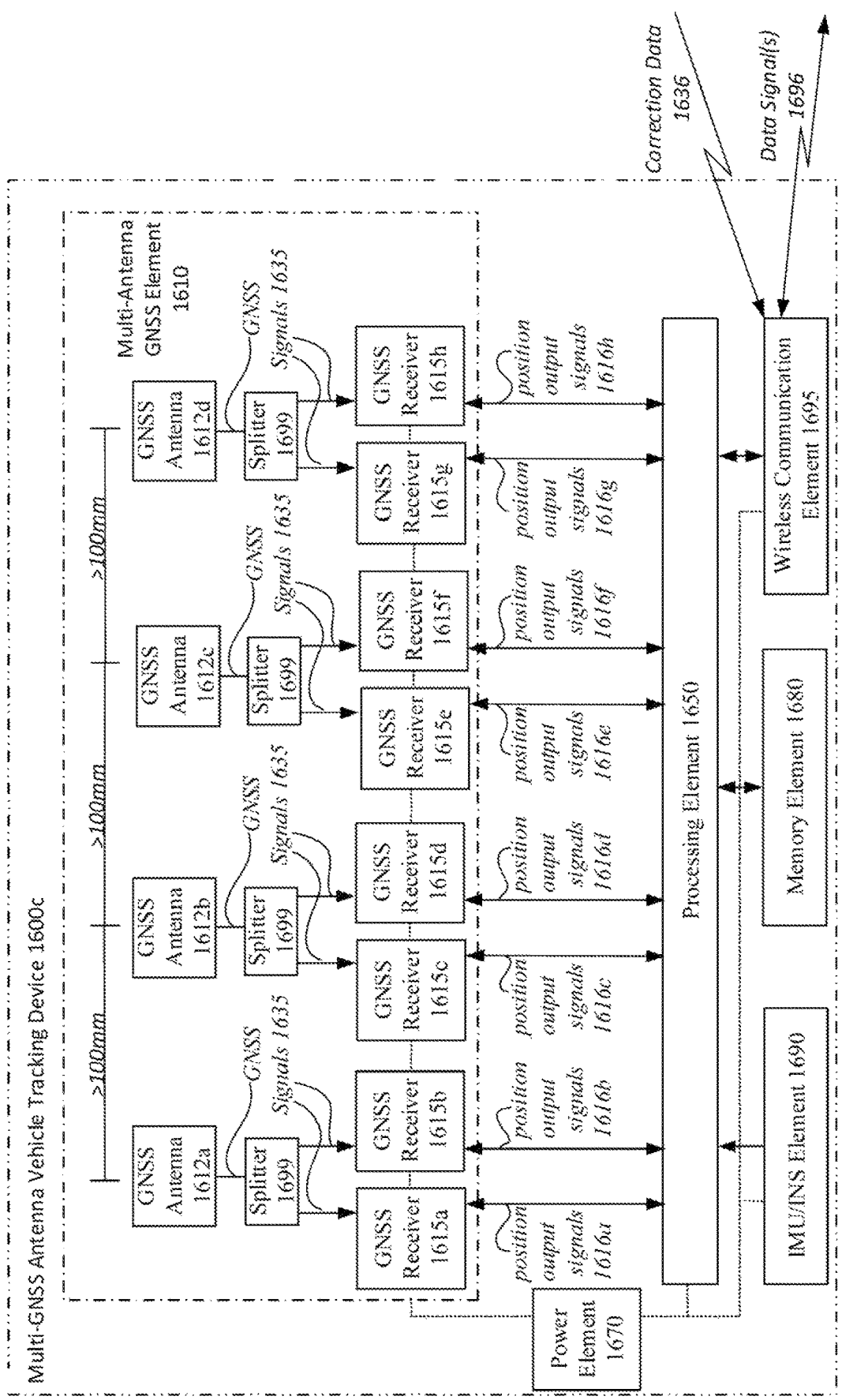
FIG. 16C is an illustration of a multi-antenna utility locator device further showing a splitter.

It should also be noted that a splitter may be present in some embodiments where distributing of GNSS signals from a single GNSS antenna to a plurality of GNSS receivers may occur such as with the multi-GNSS antenna vehicle tracking device 1600 of FIG. 16B. Though such a splitter may be implied to practitioners of the art, for additional clarification the multi-GNSS antenna vehicle tracking device 1600*c* of FIG. 16C is illustrated with a splitter 1699. The splitter 1699 may be or share aspects with the splitter 199 of FIGS. 1E and 1H or other splitter configuration for distributing of GNSS signals to GNSS receivers.

It should also be noted that in FIG. 16B, pairs of GNSS receivers 1615*a*/1615*b*, 1615*c*/1615*d*, 1615*e*/1615*f*, and 1615*g*/1615*h* may each couple to a single one of the GNSS antennas 1612*a* or 1612*b* of the multi-GNSS antenna vehicle tracking device 1600. In other embodiments, a multi-GNSS antenna vehicle tracking device in keeping with the present disclosure may have other numbers of GNSS antennas and GNSS receivers in various other configurations. Some such different configurations are illustrated with the GNSS antennas 1612 and GNSS receivers 1615 of the multi-GNSS antenna vehicle tracking device embodiments 1600*d* and 1600*e* illustrated in FIGS. 16D and 16E.

Figure 16D:
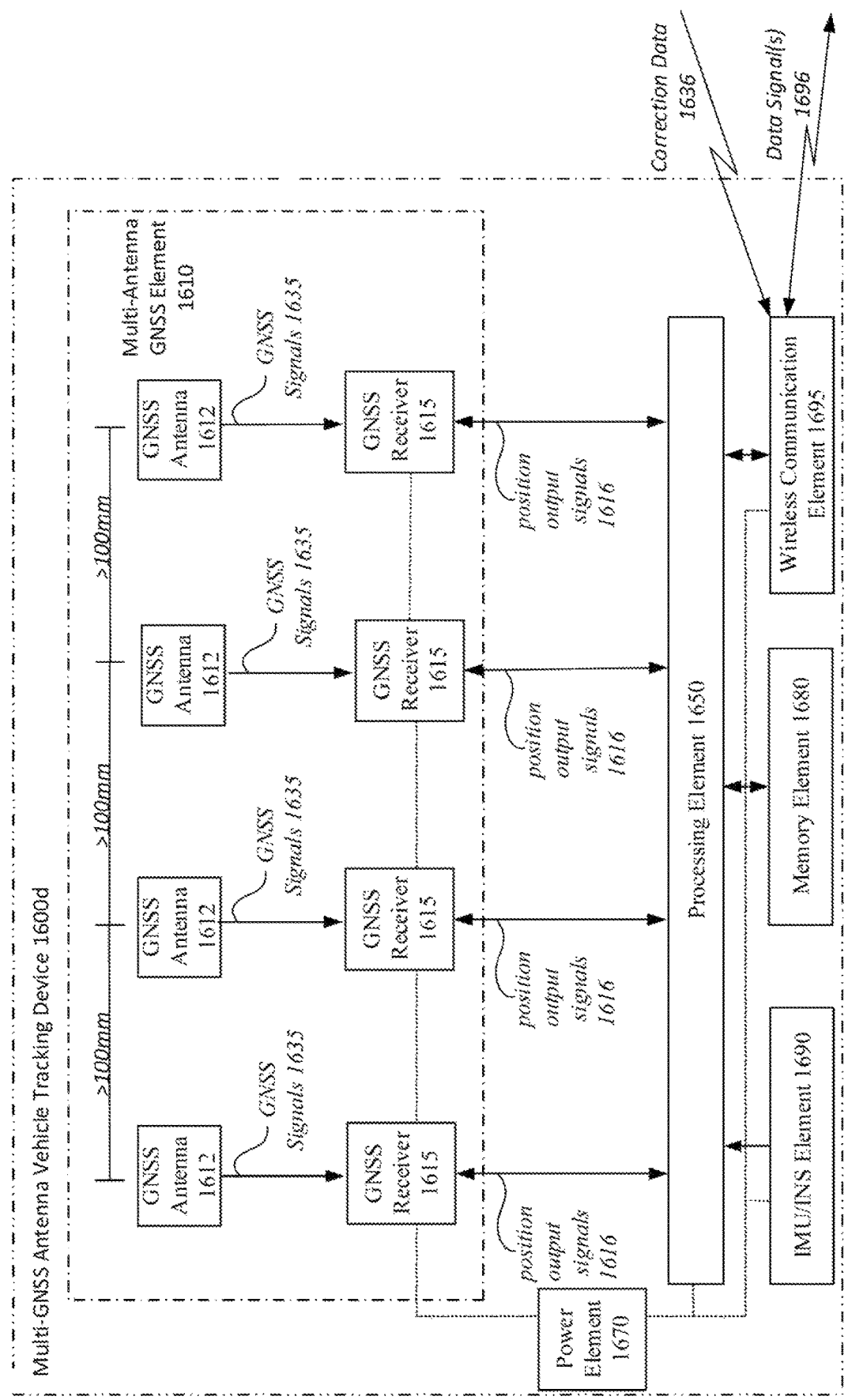
FIG. 16D is an illustration of another multi-antenna utility locator device embodiment.

As illustrated in FIG. 16D, for instance, the multi-GNSS antenna vehicle tracking device 1600*d* may include a single GNSS antennas 1612 coupled to each individual GNSS receivers 1615. The GNSS receivers 1615 may be dual or triple band receivers. Likewise, the GNSS antennas 1612 and GNSS receivers 1615 may be configured for the L1, L2, and L5 GPS bands and/or other signal bands. In the multi-GNSS antenna vehicle tracking device 1600*d*, a GNSS signal 1635 may be communicated from each GNSS antenna 1612 to an individually coupled one of the GNSS receivers 1615. Each of the GNSS receivers 1615 may further communicate position output signals 1616 to a processing element 1650.

Figure 16E:
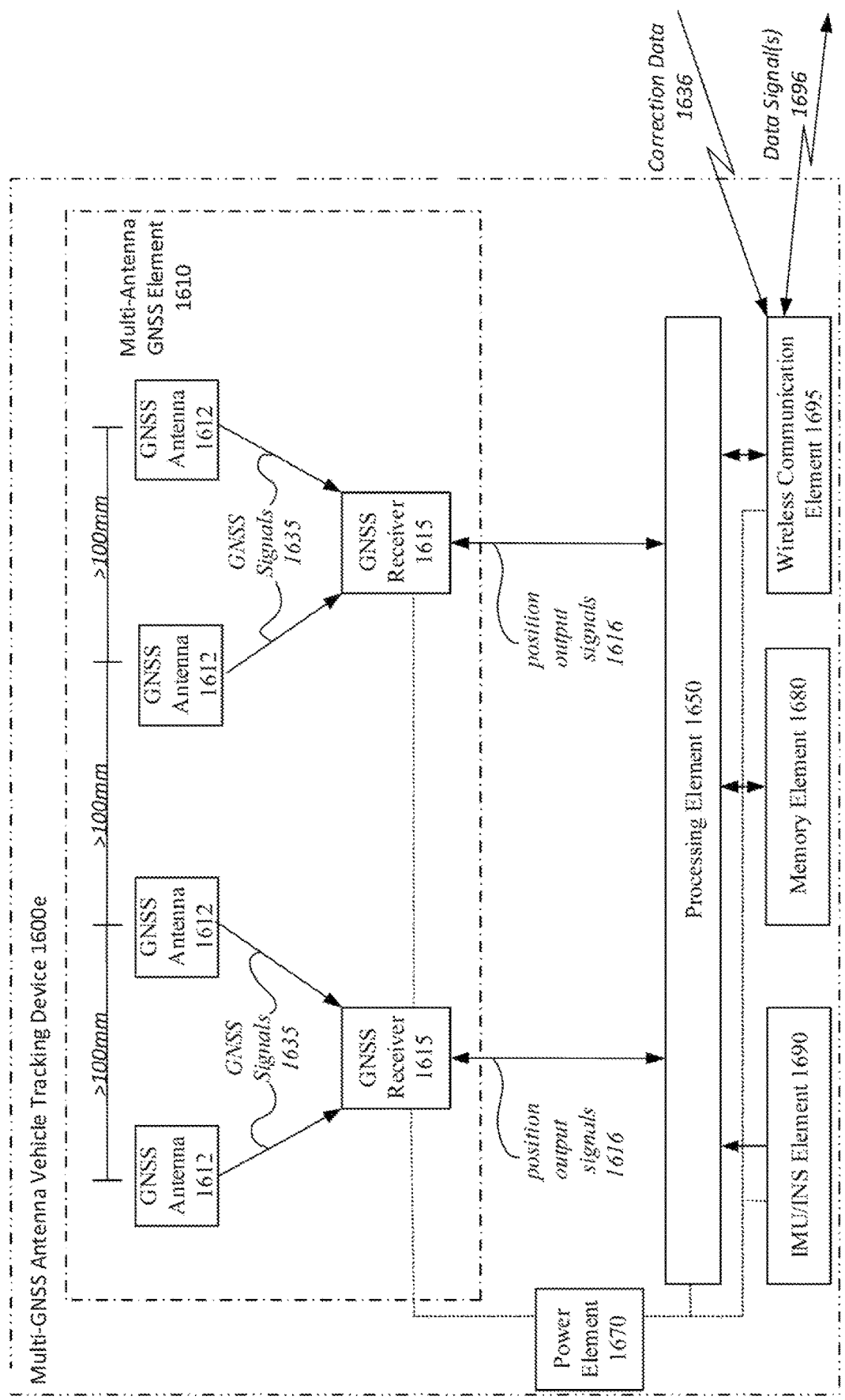
FIG. 16E is an illustration of another multi-antenna utility locator device embodiment.

In yet further embodiments, such as the multi-GNSS antenna vehicle tracking device 1600*e* of FIG. 16E, multiple GNSS antennas 1612 may couple to a single one of the GNSS receivers 1615. The GNSS receivers 1615 may be dual or triple band receivers. Likewise, the GNSS antennas 1612 and GNSS receivers 1615 may be configured for the L1, L2, and L5 GPS bands and/or other signal bands. In some such embodiments, a GNSS receiver configured for use with multiple GNSS antennas may be a multi-input GNSS receiver that provides a measure of pose (pitch, roll, heading, or like orientation measurements) such as the mosaic-H GNSS receiver commercially available from Septentrio.

The generated position output signals 1616*a*-1616*h* may be supplied to a processing element 1650 comprising one or more processors coupled to the multi-antenna GNSS element 1610 to receive position output signals 1616*a*-1616*h* for purposes of processing and compressing the data and/or for making differential corrections to the position output signals 1616*a*-1616*h* data via correction data 1636 received at a wireless communication element 1695. The wireless communication element 1695, comprising one or more radio transceivers, may also communicate a data signal 1696 with vehicle 1604 and/or other system devices. In some embodiments, a wired connection may instead or in addition to wireless communication element 1695 be used to communicate various device data. The multi-GNSS antenna vehicle locating device 1600 may further include a memory element 1660 having one or more non-transitory memories for storing positioning data such as the position output signals 1616*a*-1616*h*. The multi-GNSS antenna vehicle locating device 1600 may further include a power element 1670 to supply power to the various powered elements of the multi-GNSS antenna vehicle tracking device 1600. The power element 1670 may, for instance, be one or more batteries or may be power supplied by the vehicle 1604.

Some multi-GNSS antenna vehicle tracking device embodiments in keeping with the present disclosure may further include additional sensors and systems for determining position, orientation, and pose. As illustrated in FIG. 16B, the multi-GNSS antenna vehicle tracking device 1600 may optionally include an IMU/INS element 1690 that may include, but should not be limited to, one or more accelerometers, gyroscopic sensors, magnetometers, inertial measurement units (IMU), inertial navigation systems (INS) and or other like sensors. In some embodiments, the magnetometers may be arranged in an array to sense magnetic distortions.

Figure 17A:
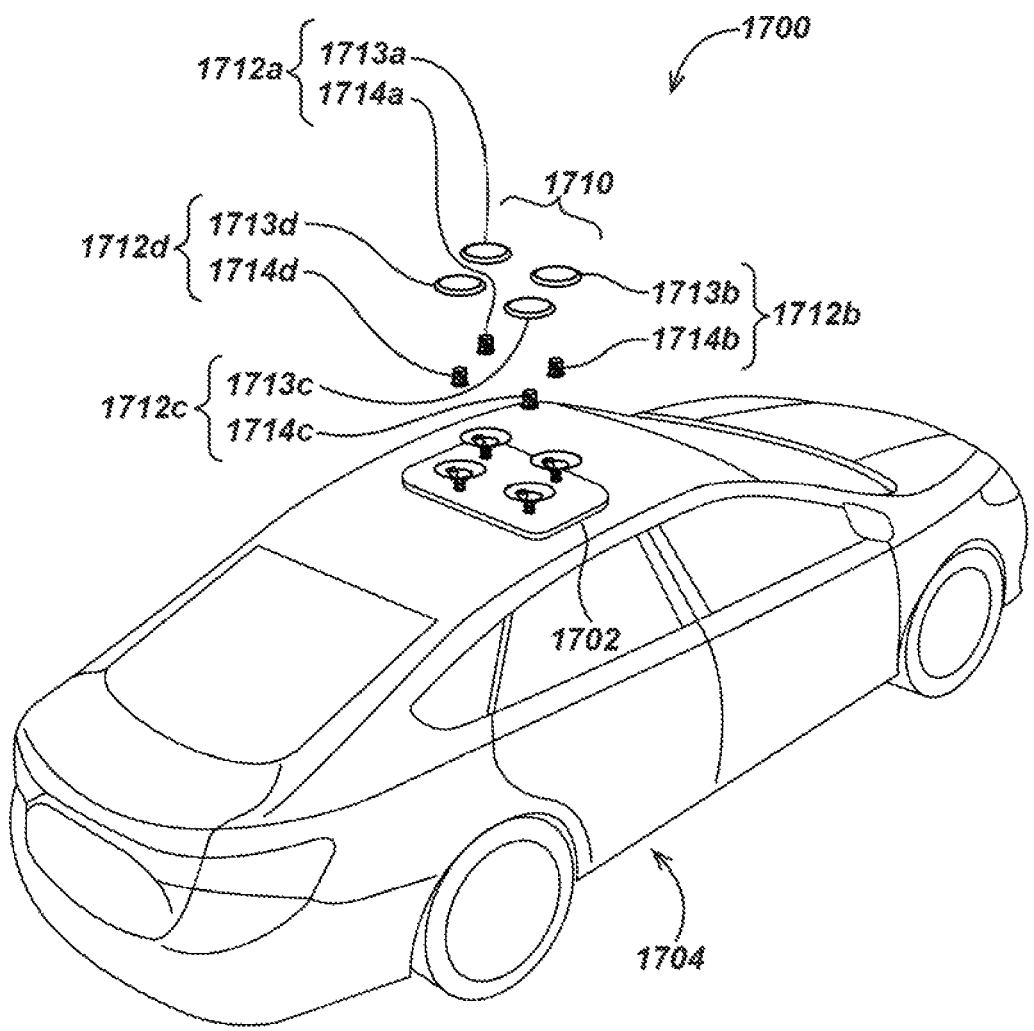
FIG. 17A is an illustration of a multi-GNSS antenna vehicle tracking device with partially exploded GNSS antennas revealing helical antennas.

Turning to FIG. 17A, a multi-GNSS antenna vehicle locating device 1700 is illustrated which may be or share aspects with the multi-GNSS antenna vehicle locating device 1600 of FIGS. 16A-16B, the multi-GNSS antenna vehicle locating device 1600*c* of FIG. 16C, the multi-GNSS antenna vehicle locating device 1600*d* of FIG. 16D, or the multi-GNSS antenna vehicle locating device 1600*e* of FIG. 16E. The multi-GNSS antenna vehicle tracking device 1700 may include a mounting element 1702 that may couple to a vehicle 1704 to a multi-antenna GNSS element 1710. The multi-antenna GNSS element 1710 may include a multitude of GNSS antennas 1712*a*-1712*d* each spaced apart by a known spacing that is at least 100 millimeters or more. Each GNSS antenna 1712*a*-1712*d* may include a housing 1713*a*-1713*d* encapsulating a respective helical antenna 1714*a*-1714*d*.

Figure 17B:
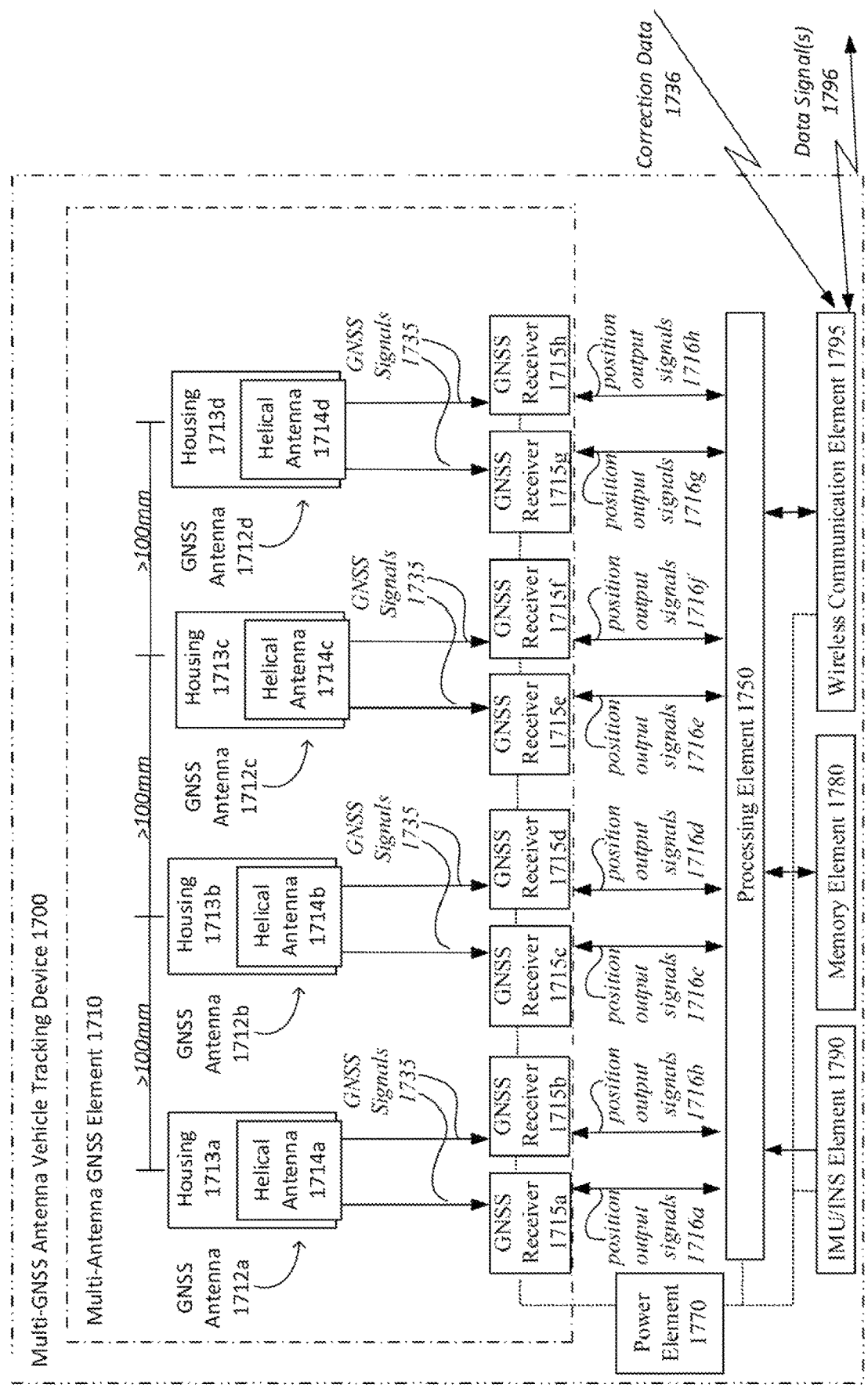
FIG. 17B is a diagram of the multi-GNSS antenna vehicle tracking device from FIG. 17A.
Figure 17C:
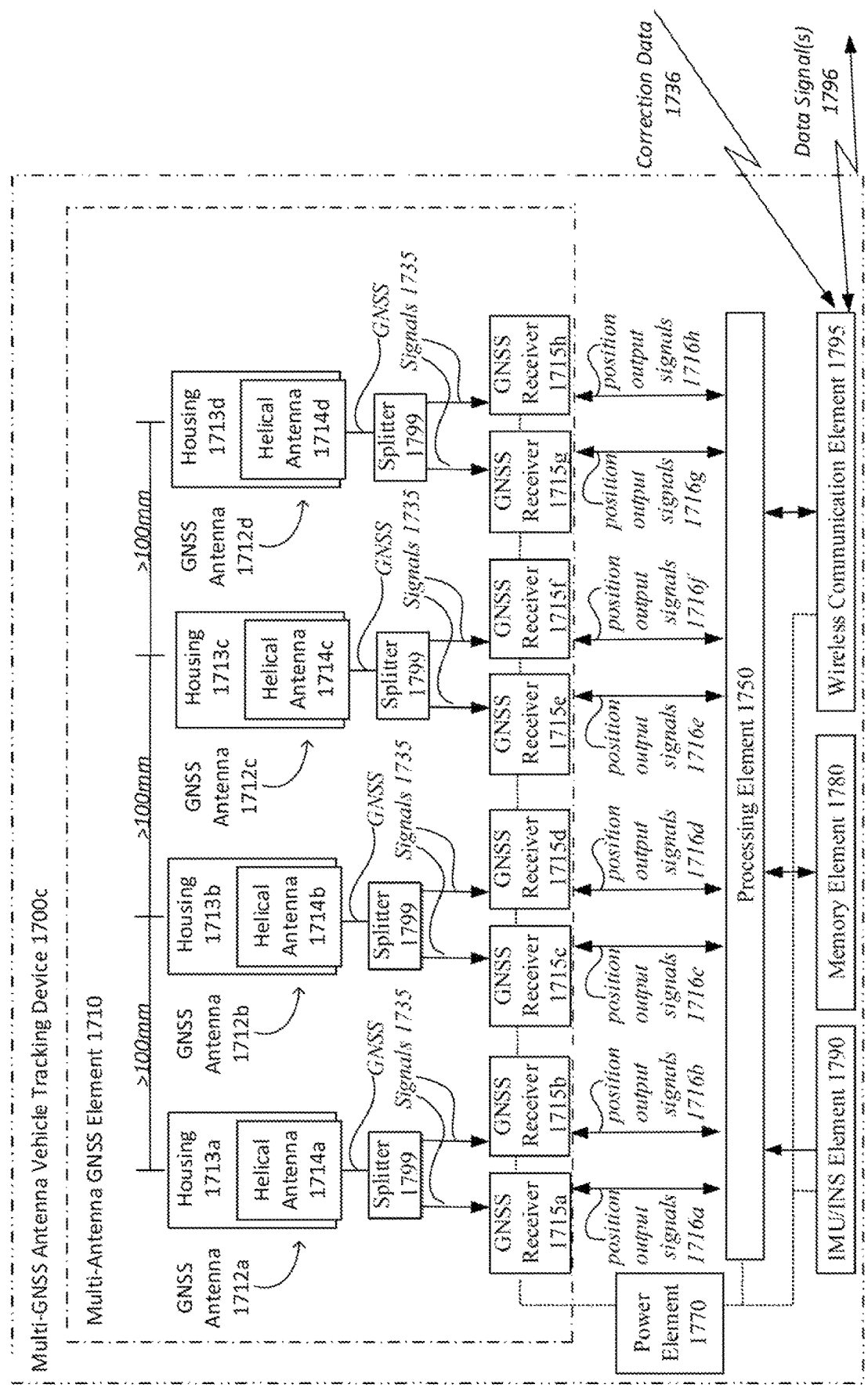
FIG. 17C is an illustration of a multi-antenna utility locator device further showing a splitter.

Further illustrated in FIG. 17B, each helical antenna 1714*a*-1714*d* may further supply a processing element 1750 comprising one or more processors coupled to the GNSS receivers 1715*a*-1715*h* of the multi-antenna GNSS element 1710 to receive position output signals 1716*a*-1716*h* for purposes of processing and compressing the data and/or for making differential corrections to the position output signals 1716*a*-1716*h* data via correction data 1736 received at a wireless communication element 1795. It should be noted that a splitter may be present in some embodiments where distributing of GNSS signals from a single GNSS antenna to a plurality of GNSS receivers may occur such as with the multi-GNSS antenna vehicle tracking device 1700 of FIG. 17B. Though such a splitter may be implied to practitioners of the art, for additional clarification the multi-GNSS antenna vehicle tracking device 1700*c* of FIG. 17C is illustrated with a splitter 1799. The splitter 1799 may be or share aspects with the splitter 199 of FIGS. 1E and 1H or other splitter configuration for distributing of GNSS signals to GNSS receivers.

It should also be noted that in FIG. 17B, pairs of GNSS receivers 1715a/1715b, 1715c/1715d, 1715e/1715f, and 1715g/1715h may each couple to a single one of the GNSS antennas 1712a or 1712b of the multi-GNSS antenna vehicle tracking device 1700. In other embodiments, a multi-GNSS antenna vehicle tracking device in keeping with the present disclosure may have other numbers of GNSS antennas and GNSS receivers in various other configurations. Some such different configurations are illustrated with the GNSS antennas 1712 and GNSS receivers 1715 of the multi-GNSS antenna vehicle tracking device embodiments 1700d and 1700e illustrated in FIGS. 17D and 17E.

Figure 17D:
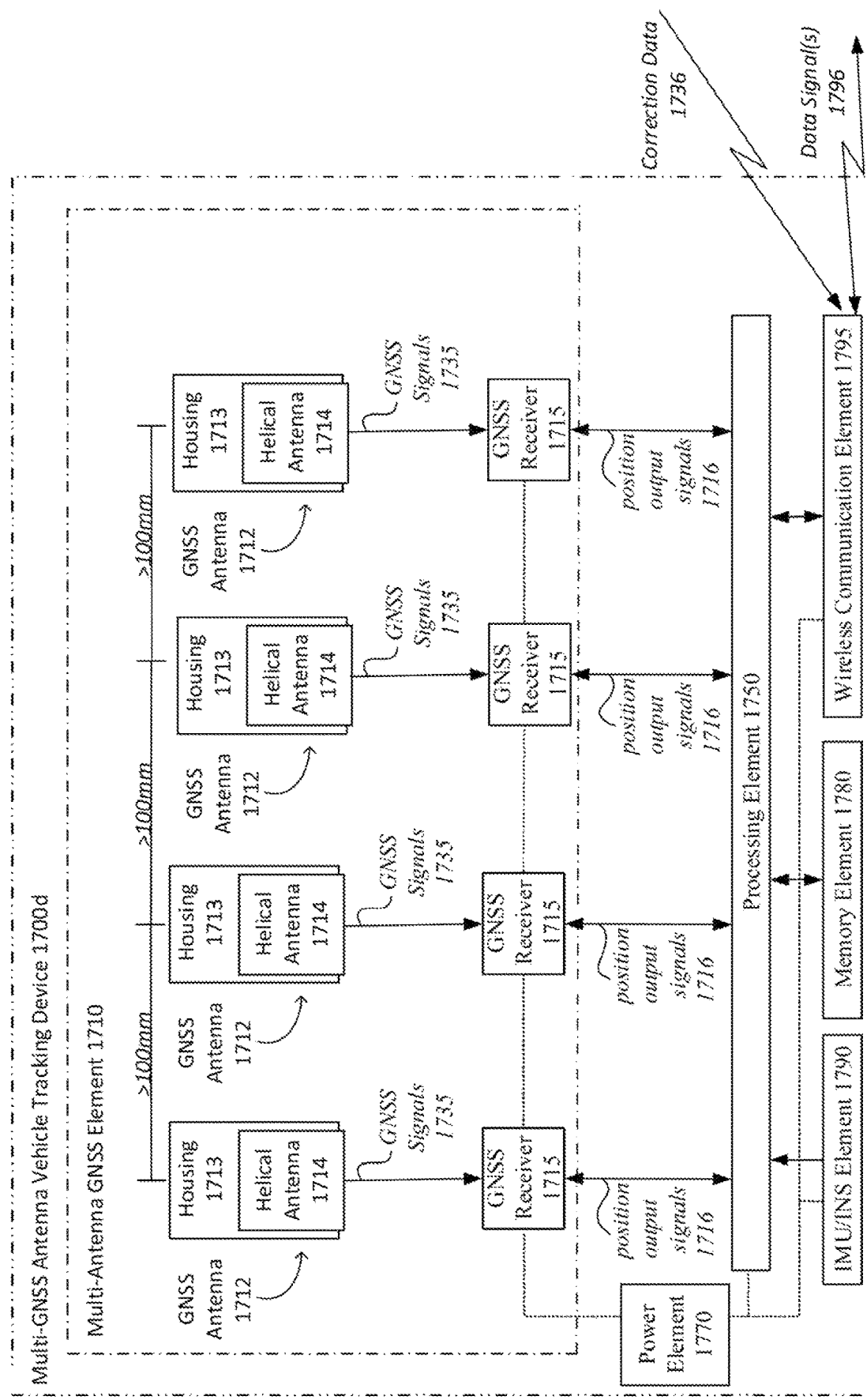
FIG. 17D is an illustration of another multi-antenna utility locator device embodiment.

As illustrated in FIG. 17D, for instance, the multi-GNSS antenna vehicle tracking device 1700d may include a single GNSS antennas 1712 coupled to each individual GNSS receivers 1715. The GNSS receivers 1715 may be dual or triple band receivers. Likewise, the GNSS antennas 1712 and GNSS receivers 1715 may be configured for the L1, L2, and L5 GPS bands and/or other signal bands. In the multi-GNSS antenna vehicle tracking device 1700d, a GNSS signal 1735 may be communicated from each GNSS antenna 1712 to an individually coupled one of the GNSS receivers 1715. Each of the GNSS receivers 1715 may further communicate position output signals 1716 to a processing element 1750.

Figure 17E:
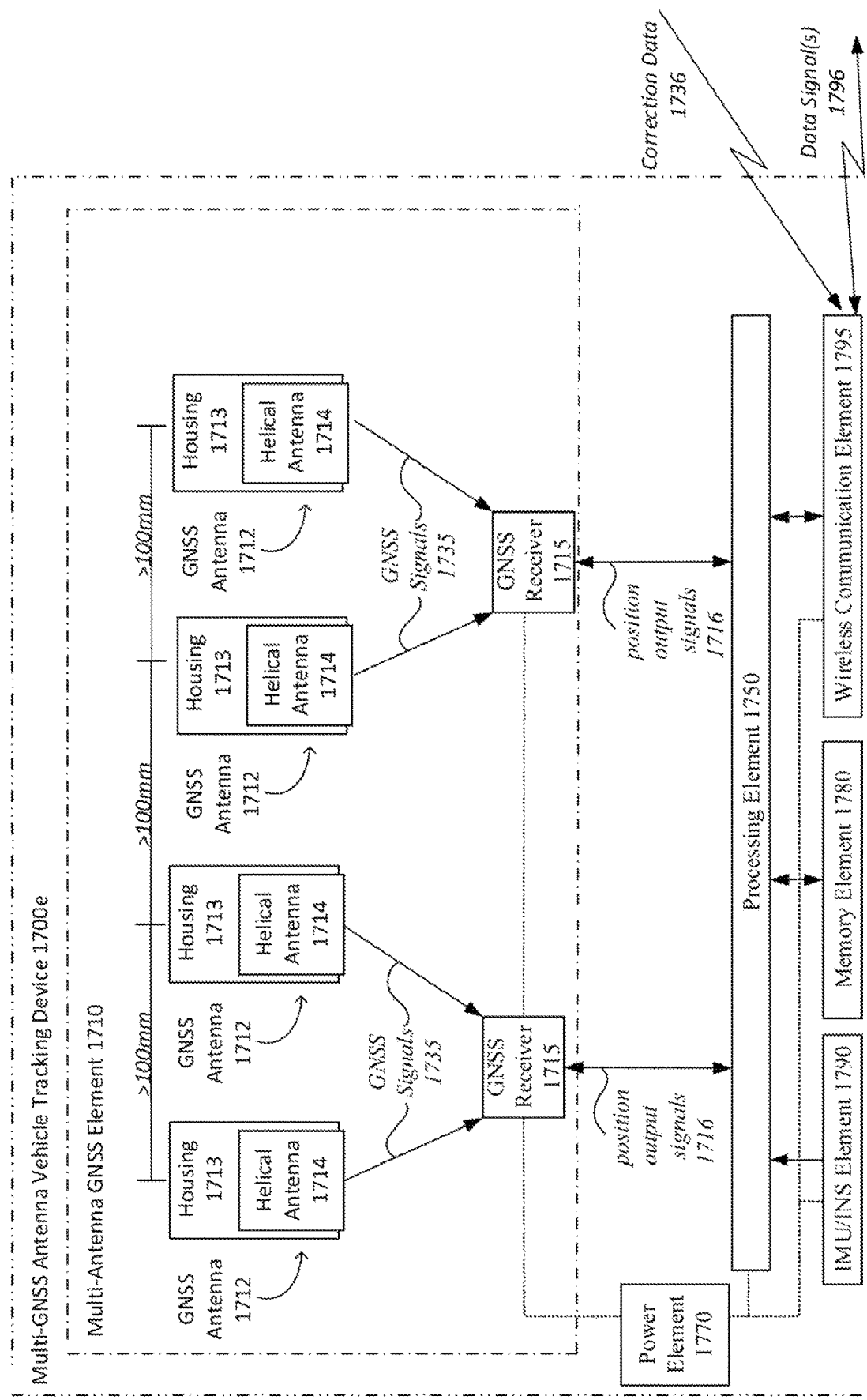
FIG. 17E is an illustration of another multi-antenna utility locator device embodiment.

In yet further embodiments, such as the multi-GNSS antenna vehicle tracking device 1700e of FIG. 17E, multiple GNSS antennas 1712 may couple to a single one of the GNSS receivers 1715. The GNSS receivers 1715 may be dual or triple band receivers. Likewise, the GNSS antennas 1712 and GNSS receivers 1715 may be configured for the L1, L2, and L5 GPS bands and/or other signal bands. In some such embodiments, a GNSS receiver configured for use with multiple GNSS antennas may be a multi-input GNSS receiver that provides a measure of pose (pitch, roll, heading, or like orientation measurements) such as the mosaic-H GNSS receiver commercially available from Septentrio.

Referring back to the wireless communication element 1795, comprising one or more radio transceivers, may also communicate a data signal 1796 with vehicle 1704 and/or other system devices. In some embodiments, a wired connection may instead or in addition to wireless communication element 1795 be used to communicate various device data. The multi-antenna GNSS backpack device 1700 may further include a memory element 1760 having one or more non-transitory memories for storing positioning data such as the position output signals 1716a-1716h. The multi-GNSS antenna vehicle-mounted locating device 1700 may further include a power element 1770 to supply power to the various powered elements of the multi-GNSS antenna vehicle tracking device 1700. The power element 1770 may, for instance, be one or more batteries or may be power supplied by the vehicle 1704. The multi-GNSS antenna vehicle tracking device 1700 may optionally include an IMU/INS element 1790 that may include, but should not be limited to, one or more accelerometers, gyroscopic sensors, magnetometers, inertial measurement units (IMU), inertial navigation systems (INS) and or other like sensors. In some embodiments, the magnetometers may be arranged in an array to sense magnetic distortions.

Figure 18A:
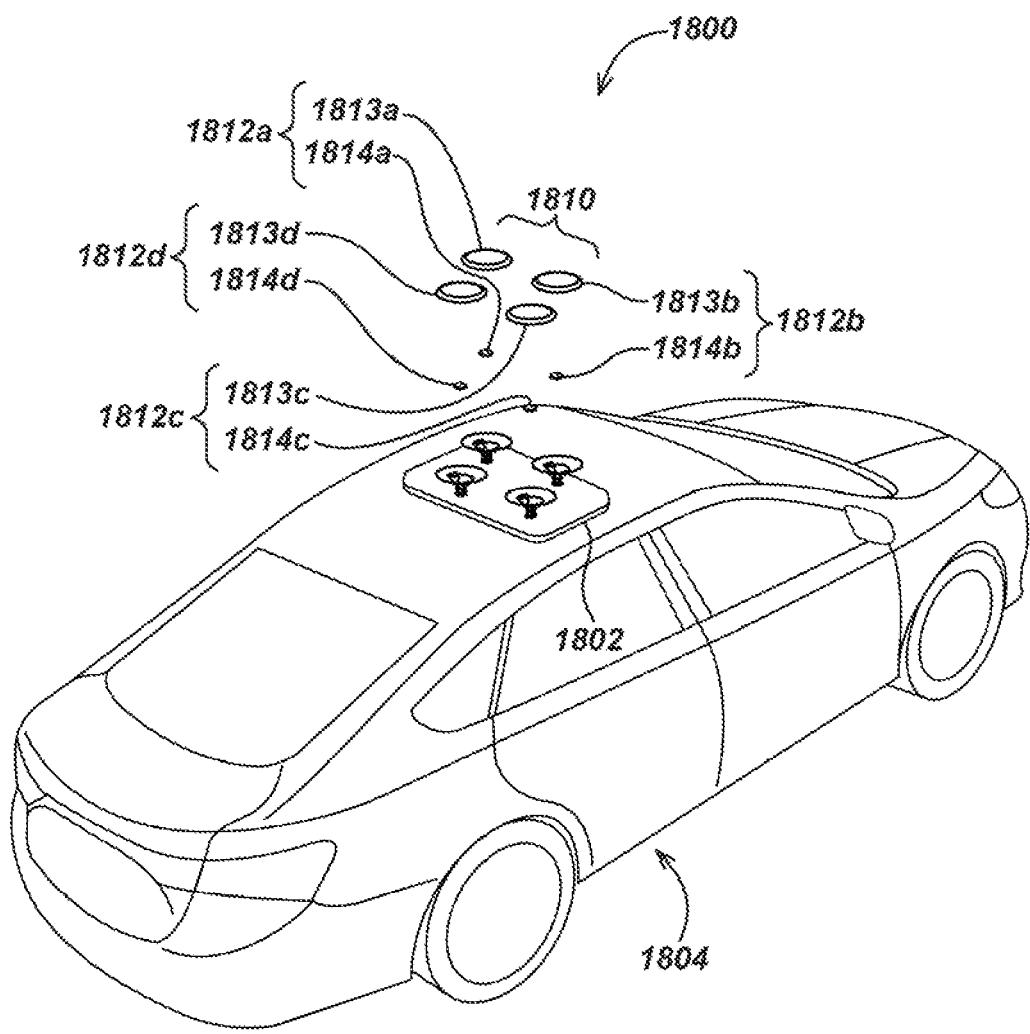
FIG. 18A is an illustration of a multi-GNSS vehicle tracking device with partially exploded GNSS antennas revealing patch antennas.

Turning to FIG. 18A, a multi-GNSS antenna vehicle locating device 1800 is illustrated which may be or share aspects with the multi-GNSS antenna vehicle locating device 1600 of FIGS. 16A-16B, the multi-GNSS antenna vehicle locating device 1600c of FIG. 16C, the multi-GNSS antenna vehicle locating device 1600d of FIG. 16D, or the multi-GNSS antenna vehicle locating device 1600e of FIG. 16E. The multi-GNSS antenna vehicle tracking device 1800 may include a mounting element 1802 that may couple to a vehicle 1804 to a multi-antenna GNSS element 1810. The multi-antenna GNSS element 1810 may include a multitude of GNSS antennas 1812a-1812d each spaced apart by a known spacing that is at least 100 millimeters or more. Each GNSS antenna 1812a-1812d may include a housing 1813a-1813d encapsulating a respective patch antenna 1814a-1814d.

Figure 18B:
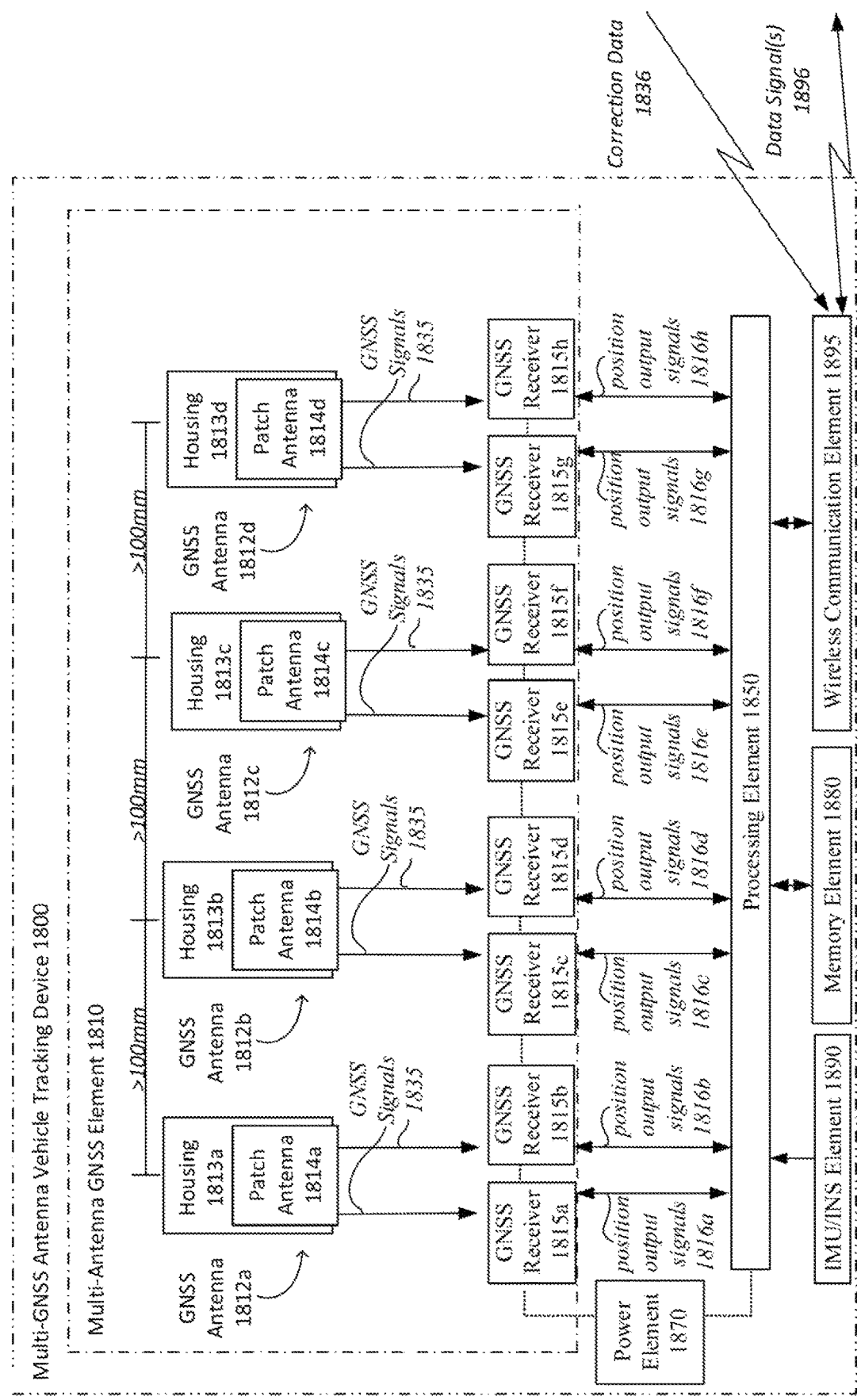
FIG. 18B is a diagram of the multi-GNSS antenna vehicle tracking device from FIG. 18A.
Figure 18C:
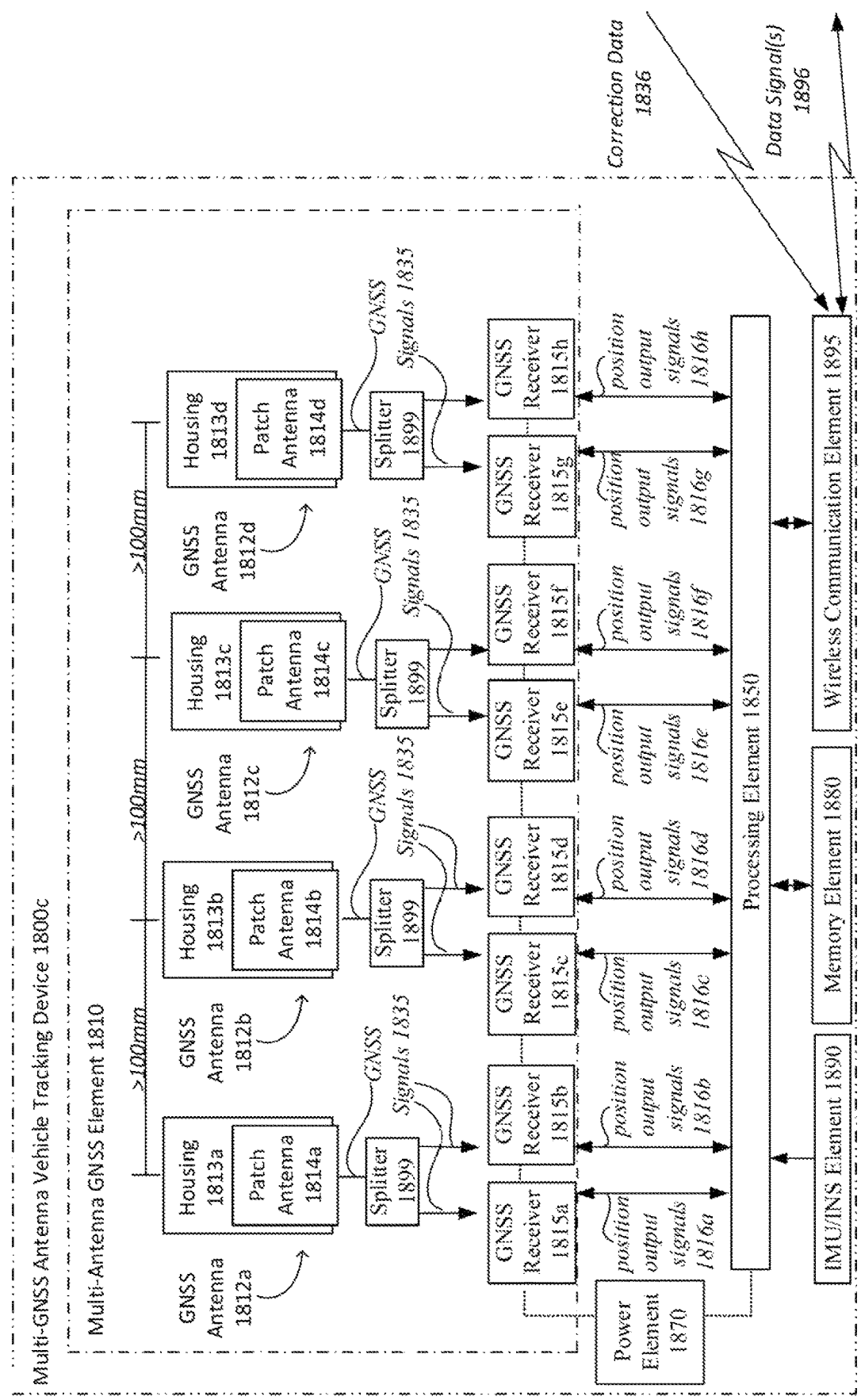
FIG. 18C is an illustration of a multi-antenna utility locator device further showing a splitter.

Further illustrated in FIG. 18B, each patch antenna 1814a-1814d may further supply a processing element 1850 comprising one or more processors coupled to the multi-antenna GNSS element 1810 to receive position output signals 1816a-1816h for purposes of processing and compressing the data and/or for making differential corrections to the position output signals 1816a-1816h data via correction data 1836 received at a wireless communication element 1895. It should be noted that a splitter may be present in some embodiments where distributing of GNSS signals from a single GNSS antenna to a plurality of GNSS receivers may occur such as with the multi-GNSS antenna vehicle tracking device 1800 of FIG. 18B. Though such a splitter may be implied to practitioners of the art, for additional clarification the multi-GNSS antenna vehicle tracking device 1800c of FIG. 18C is illustrated with a splitter 1899. The splitter 1899 may be or share aspects with the splitter 199 of FIGS. 1E and 1H or other splitter configuration for distributing of GNSS signals to GNSS receivers.

It should also be noted that in FIG. 18B, pairs of GNSS receivers 1815a/1815b, 1815c/1815d, 1815e/1815f, and 1815g/1815h may each couple to a single one of the GNSS antennas 1812a or 1812b of the multi-GNSS antenna vehicle tracking device 1800. In other embodiments, a multi-GNSS antenna vehicle tracking device in keeping with the present disclosure may have other numbers of GNSS antennas and GNSS receivers in various other configurations. Some such different configurations are illustrated with the GNSS antennas 1812 and GNSS receivers 1815 of the multi-GNSS antenna vehicle tracking device embodiments 1800d and 1800e illustrated in FIGS. 18D and 18E.

Figure 18D:
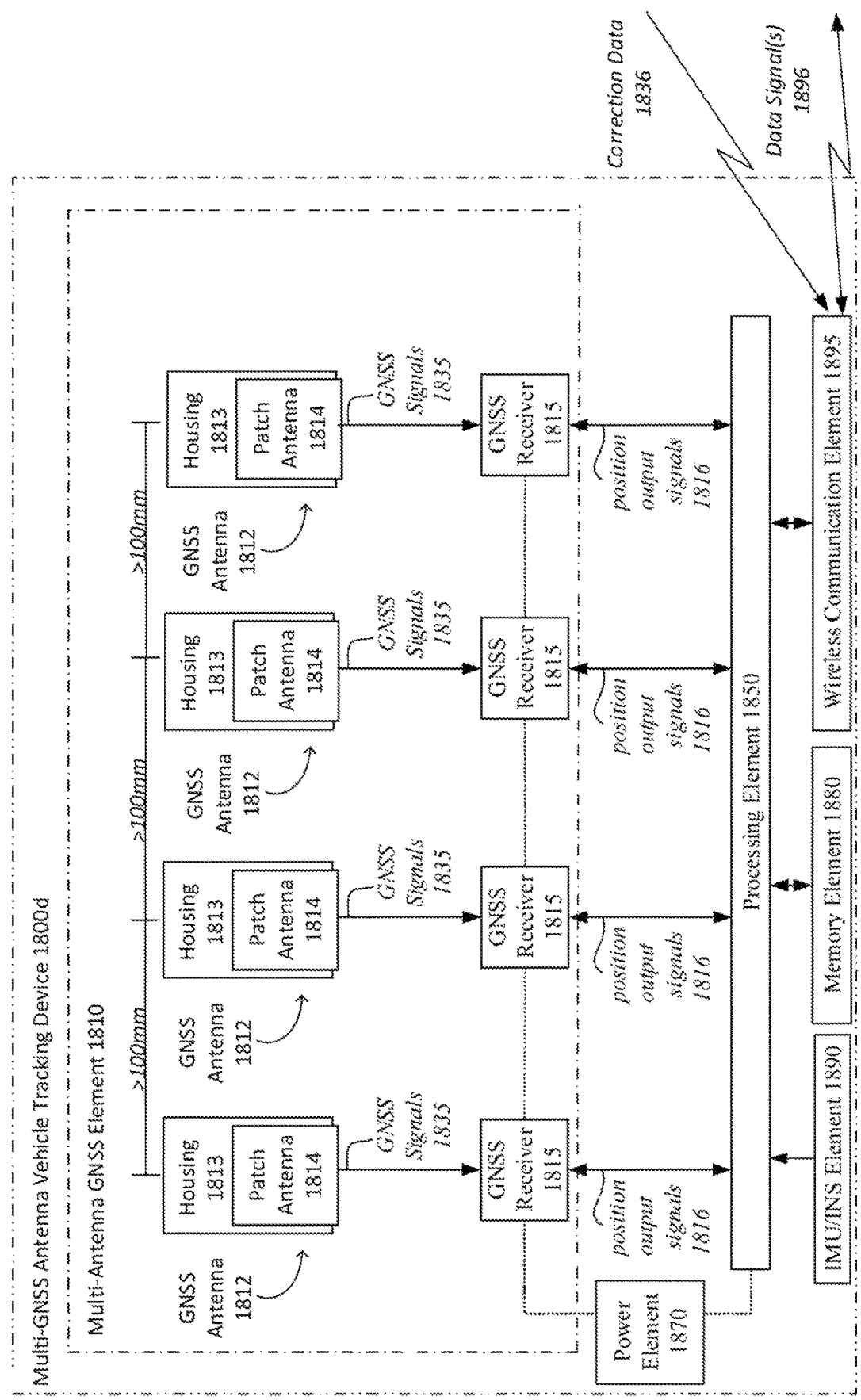
FIG. 18D is an illustration of another multi-antenna utility locator device embodiment.

As illustrated in FIG. 18D, for instance, the multi-GNSS antenna vehicle tracking device 1800d may include a single GNSS antennas 1812 coupled to each individual GNSS receivers 1815. The GNSS receivers 1815 may be dual or triple band receivers. Likewise, the GNSS antennas 1812 and GNSS receivers 1815 may be configured for the L1, L2, and L5 GPS bands and/or other signal bands. In the multi-GNSS antenna vehicle tracking device 1800d, a GNSS signal 1835 may be communicated from each GNSS antenna 1812 to an individually coupled one of the GNSS receivers 1815. Each of the GNSS receivers 1815 may further communicate position output signals 1816 to a processing element 1850.

Figure 18E:
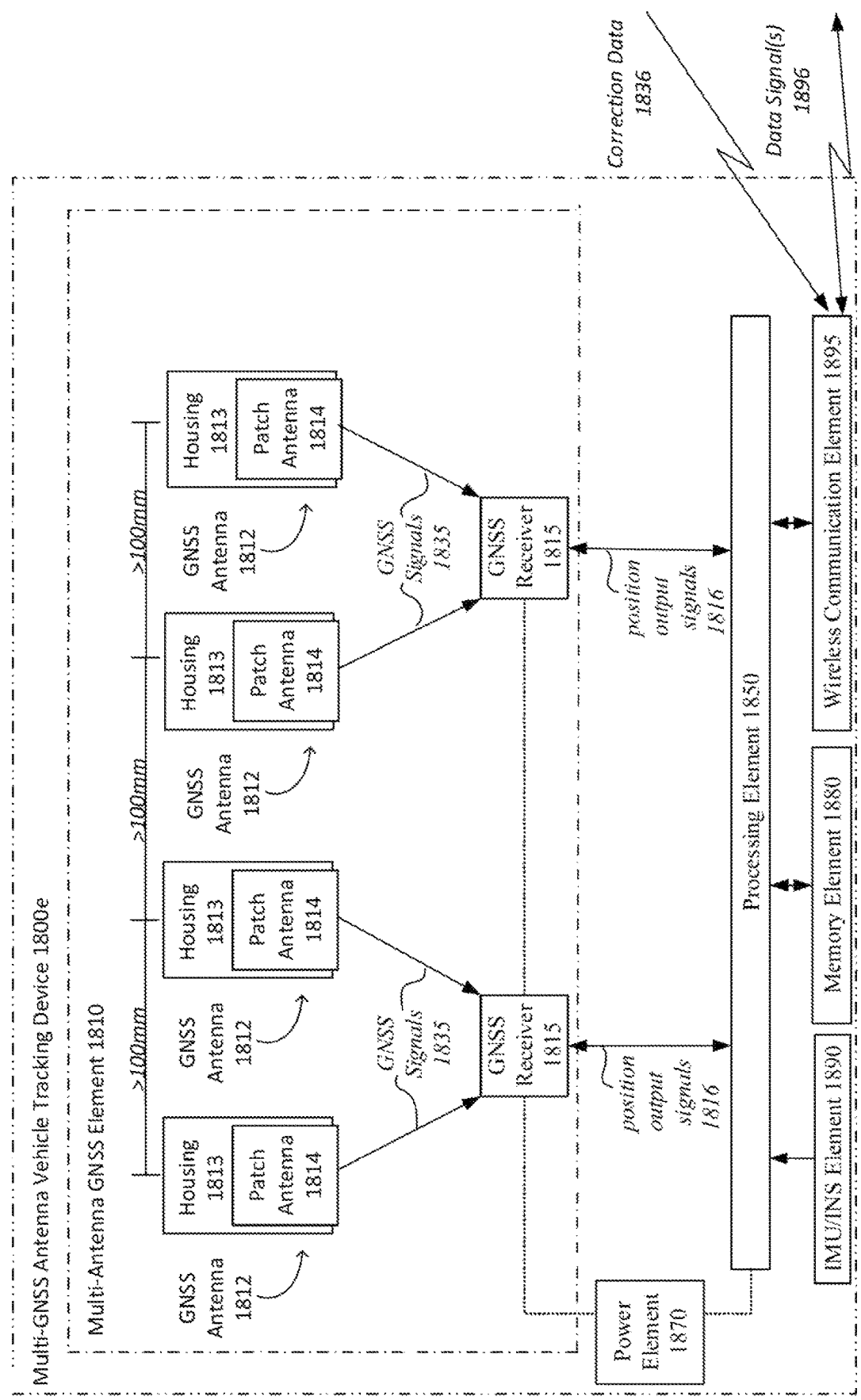
FIG. 18E is an illustration of another multi-antenna utility locator device embodiment.

In yet further embodiments, such as the multi-GNSS antenna vehicle tracking device 1800e of FIG. 18E, multiple GNSS antennas 1812 may couple to a single one of the GNSS receivers 1815. The GNSS receivers 1815 may be dual or triple band receivers. Likewise, the GNSS antennas 1812 and GNSS receivers 1815 may be configured for the L1, L2, and L5 GPS bands and/or other signal bands. In some such embodiments, a GNSS receiver configured for use with multiple GNSS antennas may be a multi-input GNSS receiver that provides a measure of pose (pitch, roll, heading, or like orientation measurements) such as the mosaic-H GNSS receiver commercially available from Septentrio.

Referring back to FIG. 18B, the wireless communication element 1895, comprising one or more radio transceivers, may also communicate a data signal 1896 with vehicle 1804 and/or other system devices. In some embodiments, a wired connection may instead or in addition to wireless communication element 1895 be used to communicate various device data. The multi-antenna GNSS backpack device 1800 may further include a memory element 1860 having one or more non-transitory memories for storing positioning data such as the position output signals 1816a-1816h. The multi-GNSS antenna vehicle-mounted locating device 1800 may further include a power element 1870 to supply power to the various powered elements of the multi-GNSS antenna vehicle tracking device 1800. The power element 1870 may, for instance, be one or more batteries or may be power supplied by the vehicle 1804. The multi-GNSS antenna vehicle tracking device 1800 may optionally include an IMU/INS element 1890 that may include, but should not be limited to, one or more accelerometers, gyroscopic sensors, magnetometers, inertial measurement units (IMU), inertial navigation systems (INS) and or other like sensors. In some embodiments, the magnetometers may be arranged in an array to sense magnetic distortions.

In the various multi-GNSS antenna vehicle tracking devices herein (e.g., multi-GNSS antenna vehicle tracking device 1600 of FIGS. 16A-16B, multi-GNSS antenna vehicle tracking device 1700 of FIGS. 17A-17B, and multi-GNSS antenna vehicle tracking device 1800 of FIGS. 18A-18B), tilt/pose may be determined through the use of GNSS antennas alone via the method 560 described with FIG. 5C. In some embodiments, tilt/pose may be determined via method 530 of FIG. 5B with the aid of additional sensors and systems for determining position, orientation, and pose such as the IMU/INS 1690 of the multi-GNSS antenna vehicle tracking device 1600 of FIG. 16B. Likewise, heading may be determined for the various multi-GNSS antenna vehicle tracking devices via the method 500 of FIG. 5A. In one or more exemplary embodiments, the functions, methods, and processes described may be implemented in whole or in part in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer.

By way of example, and not limitation, such computer-readable media can include RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The various illustrative functions, modules, and circuits described in connection with the embodiments disclosed herein may be implemented or performed in one or more processing elements or modules with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The disclosures are not intended to be limited to the aspects shown herein, but are to be accorded the full scope consistent with the specification and drawings, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c.

The previous description of the disclosed aspects is provided to enable any person skilled in the art to make or use embodiments of the present invention. Various modifications to these aspects will be readily apparent to those skilled in the art, and the generic principles defined herein may be applied to other aspects without departing from the spirit or scope of the disclosure and invention. Thus, the invention is not intended to be limited to the aspects shown herein but is to be accorded the widest scope consistent with the following claims and their equivalents.

I claim:

1. A human-portable utility locator device, comprising:
at least one antenna node to sense magnetic fields emitted from one or more buried utilities and provide locating antenna output signals corresponding to the sensed magnetic fields;
a multi-antenna GNSS element comprising two or more GNSS antennas spaced apart by a predetermined known spacing at least 100 millimeters, each receiving GNSS signals to further supply signals to at least GNSS receiver to generate position output signals corresponding to the estimated position of the associated one of the GNSS antennas;
a processing element comprising one or more processors coupled to the antenna node(s) to receive locating antenna output signals and also coupled to the GNSS element to receive position output signals for purposes of processing and compressing the output signal data and/or for making differential corrections to the position output data;
a wireless communication element comprising one or more radio transceivers coupled to the processing element for communicating position output signals, communicating data with other system devices, and/or receiving differential correction signals;
a plurality of magnetometers arranged in an array, and wherein outputs of the array are processed to determine magnetic distortions;

a memory element having one or more non-transitory memories for storing data associated with utilities and positioning data; and a battery element for supplying of electrical power.

2. The utility locator device of claim 1, wherein two or more GNSS receivers are coupled at each GNSS antenna.

3. The utility locator device of claim 1, wherein each GNSS antenna is coupled to each GNSS receiver.

4. The utility locator device of claim 1, wherein two or more GNSS antenna are coupled to each GNSS receiver.

5. The utility locator device of claim 1, wherein the GNSS antennas and associated GNSS receivers are dual band.

6. The utility locator device of claim 1, wherein the GNSS antennas and associated GNSS receivers are triple band.

7. The utility locator device of claim 1, wherein the GNSS antennas are helical antennas.

8. The utility locator device of claim 1, wherein the GNSS antennas are patch antennas.

9. The utility locator device of claim 1, wherein outputs of at least two GNSS antennas are processed to determine a heading of the utility locator device.

10. The utility locator device of claim 1, wherein outputs of at least two GNSS antennas are processed to determine a tilt/pose of the utility locator device.

11. The utility locator device of claim 1, further including one or more accelerometers.

12. The utility locator device of claim 1, further including one or more gyroscopic sensors.

13. The utility locator device of claim 1, further including one or more inertial navigation systems (INS).

14. The utility locator device of claim 1, wherein the processing element is further configured to compress the position output data.

* * * * *